United States Patent [19]
Watanabe et al.

[11] Patent Number: 6,004,015
[45] Date of Patent: Dec. 21, 1999

[54] OPTIMIZATION ADJUSTING METHOD AND OPTIMIZATION ADJUSTING APPARATUS

[75] Inventors: Tatsumi Watanabe, Soraku-gun; Hideyuki Takagi, Fukuoka; Kazuaki Obara, Neyagawa; Susumu Maruno, Osaka, all of Japan

[73] Assignee: Matsushita Electric Industrial Co., Ltd., Osaka, Japan

[21] Appl. No.: 08/561,708

[22] Filed: Nov. 22, 1995

[30] Foreign Application Priority Data

Nov. 24, 1994 [JP] Japan .................................... 6-289608
Jun. 7, 1995 [JP] Japan .................................... 7-140231

[51] Int. Cl.$^6$ .................................................. G06F 15/18
[52] U.S. Cl. .............................................. 364/148; 395/13
[58] Field of Search .................................... 364/148, 151, 364/152, 153, 164, 578; 395/13

[56] References Cited

U.S. PATENT DOCUMENTS

| | | | |
|---|---|---|---|
| 4,935,877 | 6/1990 | Koza | 395/13 |
| 5,136,686 | 8/1992 | Koza | 395/13 |
| 5,148,513 | 9/1992 | Koza et al. | 395/13 |
| 5,222,192 | 6/1993 | Shaefer | 395/13 |
| 5,241,465 | 8/1993 | Oba et al. | 395/208 |
| 5,255,345 | 10/1993 | Shaefer | 395/13 |
| 5,343,554 | 8/1994 | Koza et al. | 395/13 |
| 5,375,195 | 12/1994 | Johnston | 395/135 |
| 5,394,509 | 2/1995 | Winston | 395/13 |

FOREIGN PATENT DOCUMENTS 2-236660  9/1990  Japan .

OTHER PUBLICATIONS

Caldwell et al., "Tracking A Criminal Suspect through "Face–Space" with a Genetic Algorithm", Psychology Department, New Mexico State University, Proc. of 4th Int'l Conf. on Genetic Algorithms (ICGA '91), pp. 416–421.

*Primary Examiner*—Jacques H. Louis-Jacques
*Assistant Examiner*—Edward J. Pipala
*Attorney, Agent, or Firm*—Ratner & Prestia

[57] ABSTRACT

At the start of a process, an information presenting section presents information expressed by a solution vector, while an auxiliary information presenting section presents information for facilitating comparative evaluation of multiple pieces of information being presented simultaneously. Based on these pieces of information, the user evaluates each solution vector. A model estimation executing section generates an evaluation model for an adjustment process from a user evaluation history, and thereafter, a model evaluation calculating section performs evaluation using the evaluation model. A fitness calculating section calculates fitness from the evaluation made by the user or by the model, and in accordance with the thus calculated fitness, a recombination operation section performs an arithmetical recombination operation. The above process is iteratively performed to carry out optimum adjustment of solution vectors.

21 Claims, 80 Drawing Sheets

ESTIMATE COORDINATE VECTOR $q_{best}$ THAT MAXIMIZES $w(x)$

Fig. 7
$a_i$ IN REAL VALUE INTERVAL
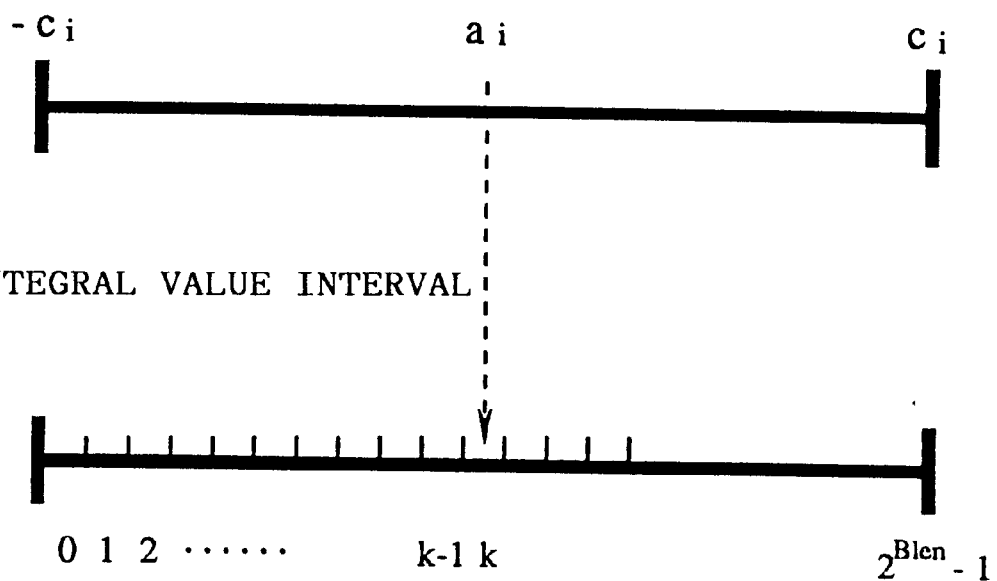
CONVERT k TO BIT STRING CODE OF
BIT LENGTH Blen IN BINARY NOTATION
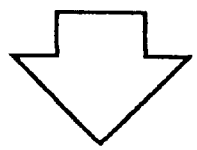
WHEN Blen = 8
k = 20 ⟶ $(00010100)_2$

Fig. 12

○、△、□ : POINTS EXPRESSED BY SOLUTION VECTORS BELONGING TO SOLUTION VECTOR SET
○ : SOLUTION SET AROUND VECTOR $p_l$
△ : SOLUTION SET AROUND VECTOR $p_i$
□ : SOLUTION SET AROUND VECTOR $p_j$ (a) LOCAL UPDATING NEAR $p_k$

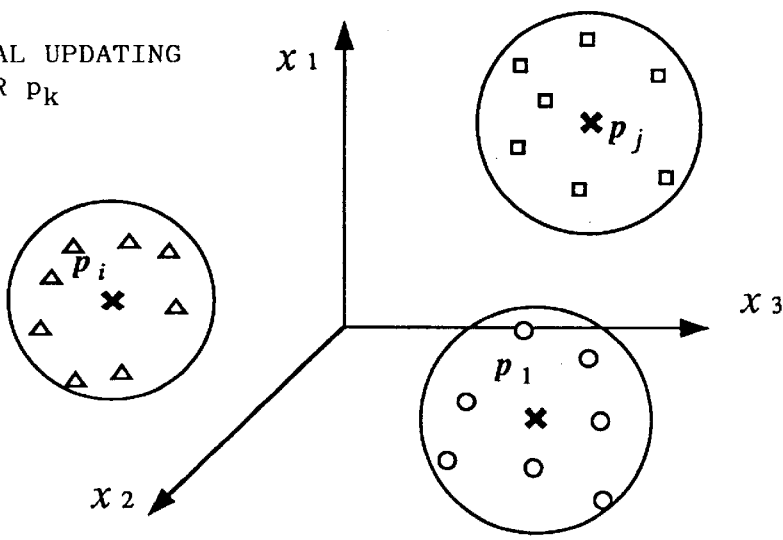

HIGHER-FITNESS SET IS GENERATED AROUND EACH $p_k$ POINT (b) GLOBAL UPDATING THROUGH WHOLE SPACE

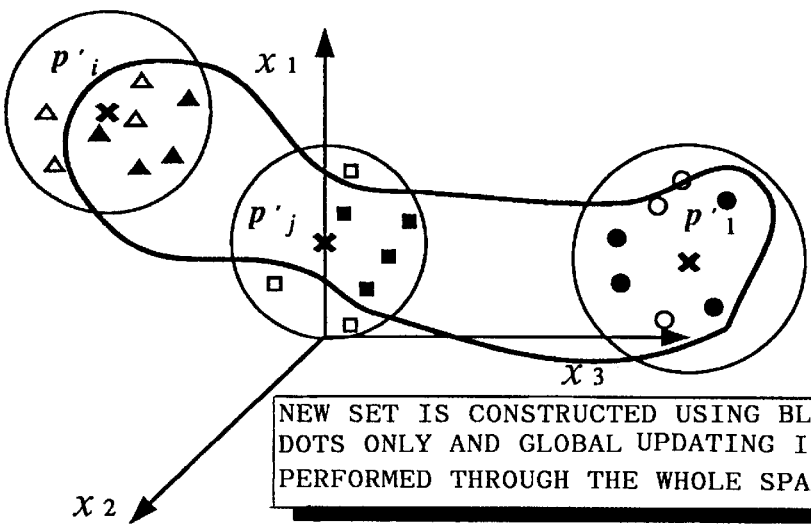

NEW SET IS CONSTRUCTED USING BLACK DOTS ONLY AND GLOBAL UPDATING IS PERFORMED THROUGH THE WHOLE SPACE

Fig. 18
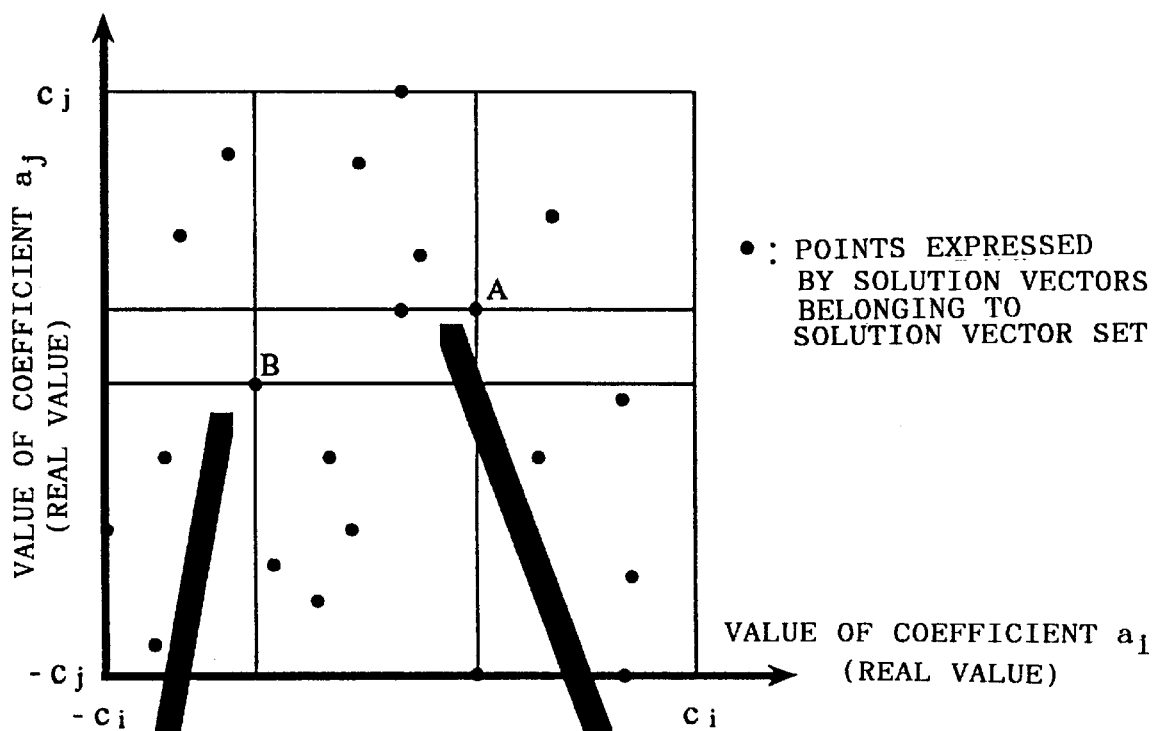
• : POINTS EXPRESSED BY SOLUTION VECTORS BELONGING TO SOLUTION VECTOR SET
SELECT REPRESENTATIVE SOLUTION VECTORS AND EXTRACT VECTORS FROM EACH NEIGHBORHOOD
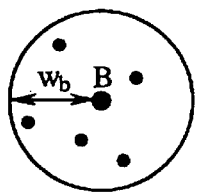 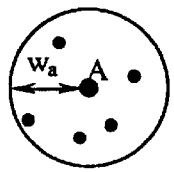
RANDOMLY EXTRACT POINTS WITHIN RADIUS $w_b$ WITH B AT CENTER
RANDOMLY EXTRACT POINTS WITHIN RADIUS $w_a$ WITH A AT CENTER Fig. 24
(a)
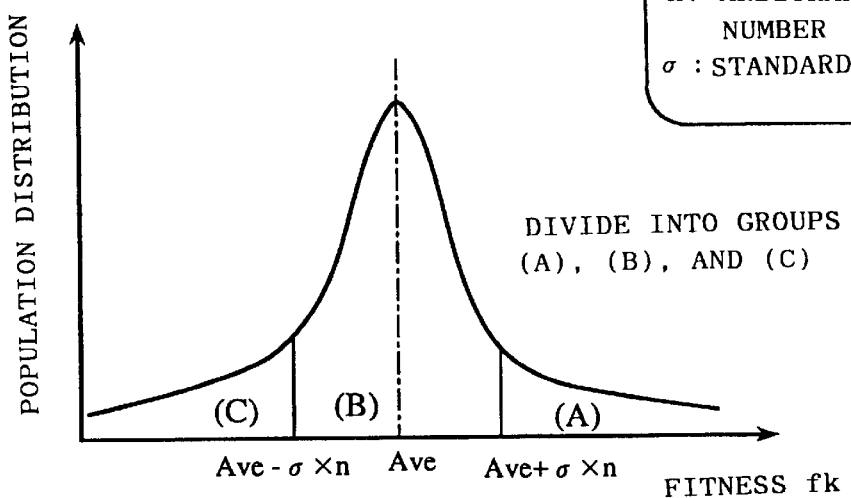
(b)
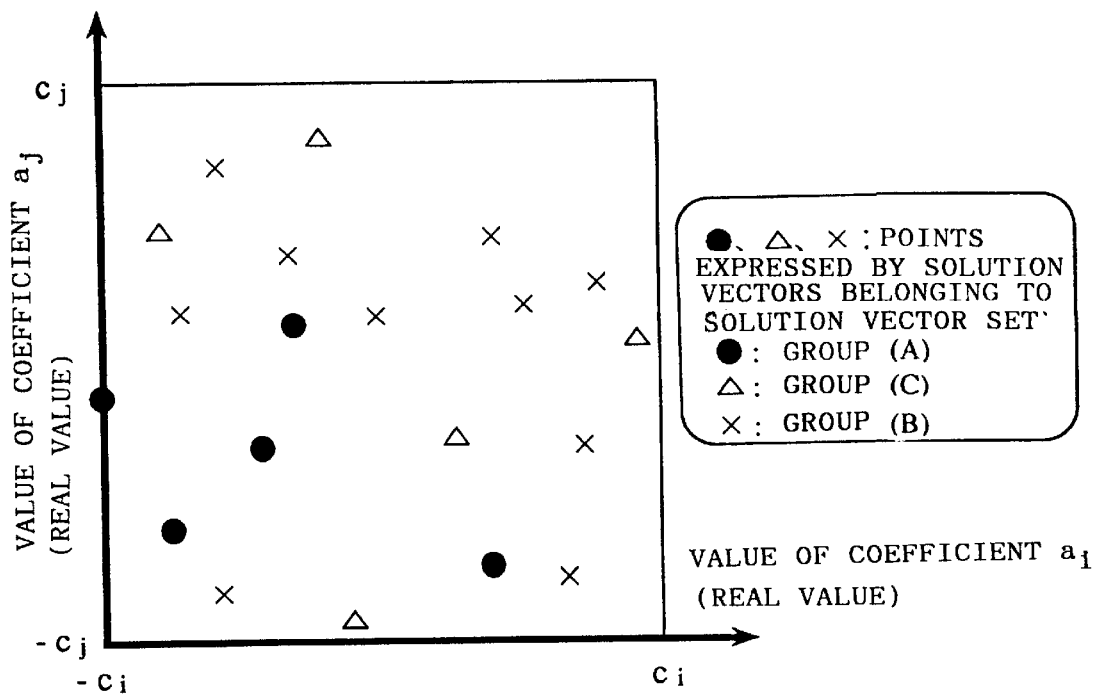

Fig. 30
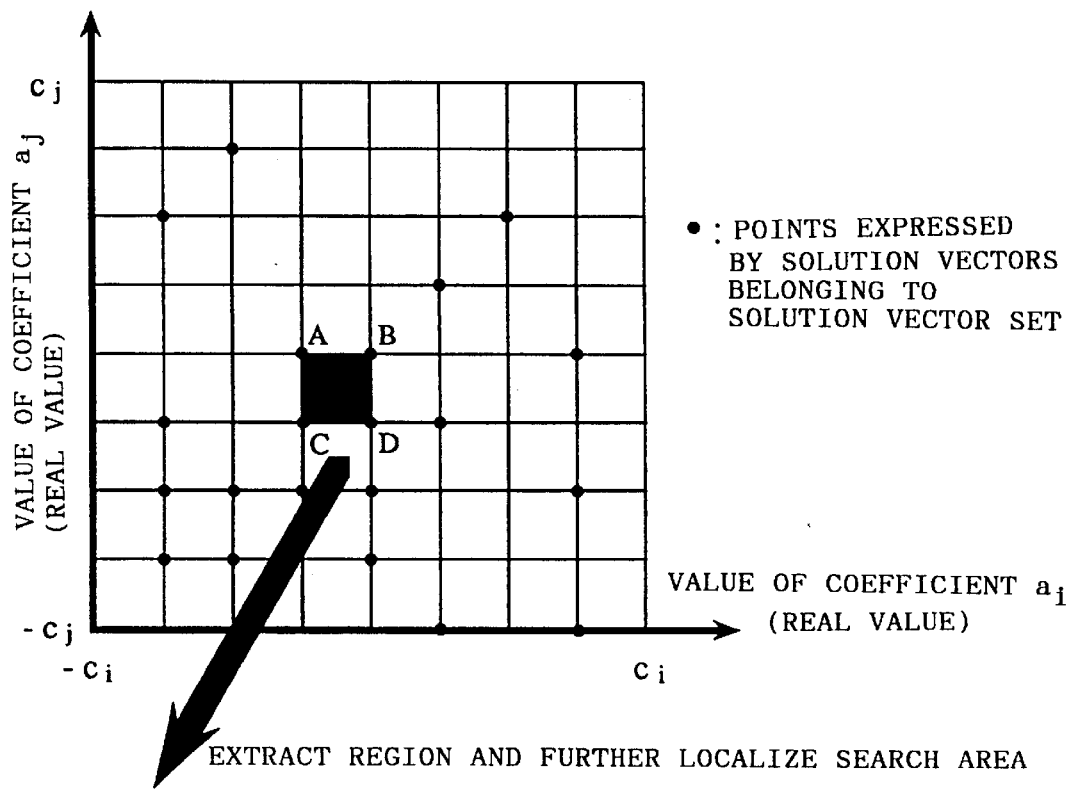
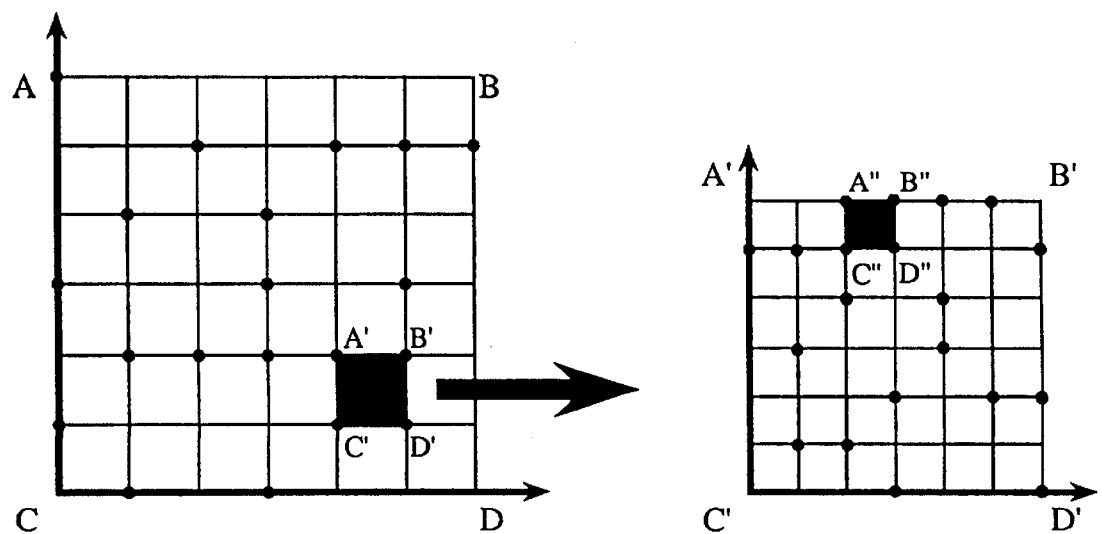
EXTRACT REGION AND FURTHER LOCALIZE SEARCH AREA

Fig. 71
(a)
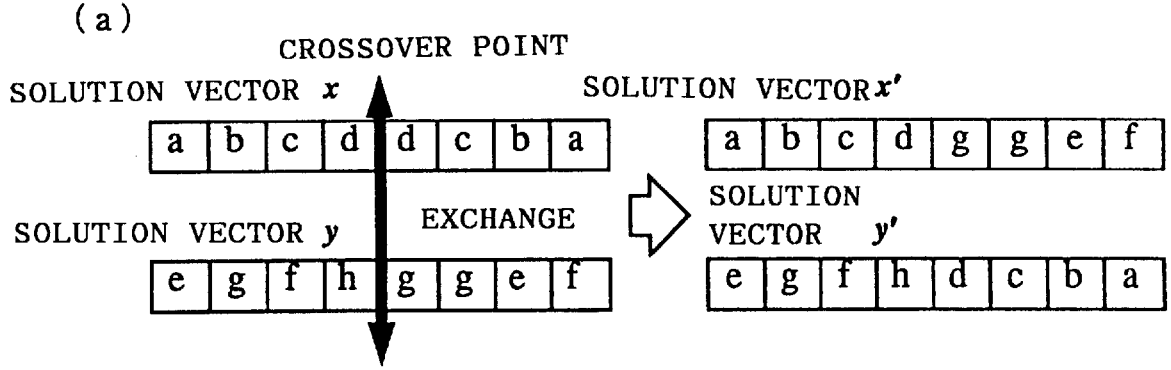
(b)
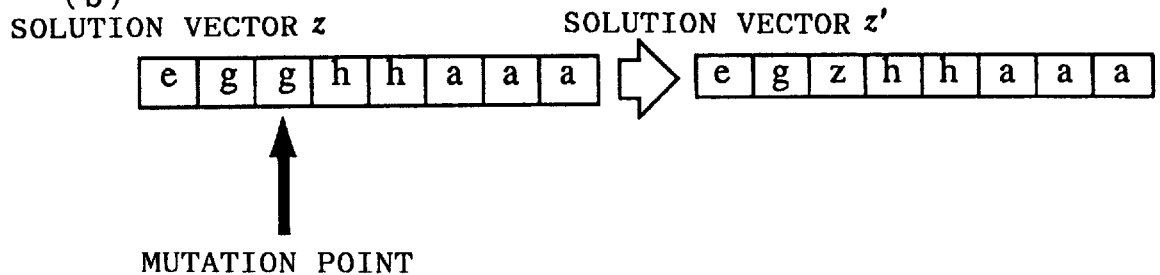
a → DENOTES FINITE SYMBOL

Fig. 74 bit  0  1  2  3  4  ............  Blen×m

| 1 | 0 | 1 | 1 | 0 | 0 | 1 | 0 | ... | 0 | 0 |

HIGH-FITNESS
SOLUTION VECTOR $x_1$

| 1 | 1 | 0 | 1 | 1 | 0 | 1 | 0 | ... | 1 | 0 |

HIGH-FITNESS
SOLUTION VECTOR $x_2$

| 0 | 0 | 1 | 0 | 1 | 1 | 1 | 0 | ... | 0 | 0 |

LOW-FITNESS
SOLUTION VECTOR $x_3$

NEWLY GENERATED
SOLUTION VECTOR $x$

| 1 | 1 | 0 | 1 | 0 | 0 | 0 | 0 | ... | 1 | 0 |

Fig. 79
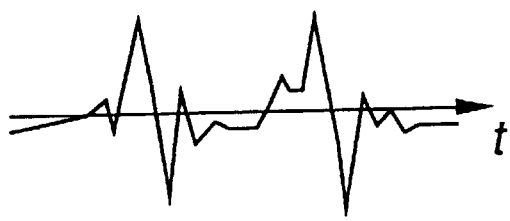
DISTORTION-CORRECTED SOUND
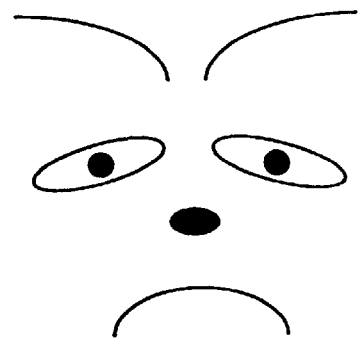
FACE IMAGE
$$H(z) = \sum_{k=0}^{step-1} a_k z^{-k}$$
COEFFICIENTS OF
DISTORTION-CORRECTING FILTER

OPTIMIZATION ADJUSTING METHOD AND OPTIMIZATION ADJUSTING APPARATUS

BACKGROUND OF THE INVENTION

1. Field of the Invention

The present invention relates to an optimization adjusting method and an optimization adjusting apparatus capable of effectively conducting searches for optimal solutions, by making improvements that compensate for the lack of local solution search abilities which has been considered a drawback inherent in optimization adjusting methods and optimization adjusting apparatus using prior art genetic algorithms for optimal solution estimation problems and the like such as the travelling salesman problem and the circuit design problem.

The invention also relates to an optimization adjusting method and an optimization adjusting apparatus wherein interactive genetic algorithms, by which solution vectors optimum for users can be obtained based on the users' subjective evaluation, are effectively applied to problems where the results of adjustments cannot be evaluated quantitatively since criteria are idealistic and unclear, such as those occurring in the adjustment of the characteristics of hearing aids, the creation of products and interior designs based on inexplicit concepts, and the adjustment of sound and image characteristics to match personal preferences.

2. Description of the Related Art

A genetic algorithm is an optimal solution search method and has the advantage that it rapidly converges to the neighborhood of an optimal solution and does not easily fall into local solutions. Genetic algorithms have been attracting attention particularly in the field of combinatorial optimization. Optimization adjusting methods and optimization adjusting apparatus using genetic algorithms are disclosed in the prior art in such documents as "Genetic Algorithms in Search, Optimization, and Machine Learning" (David E, Goldberg, Addison Wesley), and Japanese Patent Unexamined Publication No. 2-236660. An outline of the prior art will be described below.

FIG. 68 is a flowchart illustrating the principle of optimal solution estimation using a prior art genetic algorithm.

<<Step 1>> Consider a set P consisting of n members, each member being an m-dimensional vector $p_k$ ($p_{k1}$, $p_{k2}$, ..., $p_{km}$). Each element of the m-dimensional vector $p_k$ constituting a member of the set P expresses a specific solution for a corresponding parameter in an optimal solution search problem being solved, and the vector $p_k$ corresponds to a specific solution vector. The elements $p_{ki}$ (i=1, ..., m) of the vector $p_k$ may be referred to as genes and the vector $p_{ki}$ as a chromosome in association with a living creature. When using a genetic algorithm, first an initial set P of solution vectors is constructed appropriately. <<Step2>> The goodness of the solution given by each member (chromosome) of the set P is evaluated using a predetermined evaluation criterion, and the result is presented as an evaluation value. Here, the predetermined evaluation criterion is called a fitness function. <<Step3>> The fitness of the solution is judged on the basis of the magnitude of the evaluation value obtained in step 2. Depending on the problem, there are two cases: one in which a larger evaluation value means a higher fitness, and the other in which a smaller evaluation value means a higher fitness, the former being called the maximization problem and the latter the minimization problem. Solution vectors of low fitness are eliminated from the current solution set, and solution vectors of high fitness are selected for survival. This operation is called selection. Various methods are known for selection, but details of such methods should be referred to the above-mentioned document. <<Step4>> Genetic recombination operations such as crossover and mutation are performed on the set of solution vectors selected in step 3, to construct a new solution vector set. It is assumed here that the number of individual solution vectors contained in the solution vector set is fixed, but it will be appreciated that the number may be increased or decreased. FIG. 71 illustrates the concept of recombination operations in the genetic algorithm, part (a) of the figure showing an example of the crossover operation and part (b) an example of the mutation operation.

Crossover is an operation for creating new solution vectors by replacing part of a solution vector expressed by a finite number of symbols with part of another vector, as shown in part (a). On the other hand, mutation is an operation by which part of the components of a solution vector selected from the solution vector set is changed, with a low probability, to another symbol, as shown in part (b). A crossover operation corresponds to a search at a position far apart from the current solution vector, while mutation corresponds to a search in the neighborhood of the current solution vector. With these two operations, the genetic algorithm construct a new set of solution vectors. Various methods have been proposed for the crossover, mutation, and other operations, but details of such methods should be referred to the above-mentioned document.

In the genetic algorithm, the above operations are iteratively performed until each solution vector in the solution vector set P converges to a nearly optimal solution to the problem being solved.

In the above-mentioned document, the "travelling salesman problem" is treated as an application example of optimization using the genetic algorithm. The names of N cities are denoted by 1 to N. Each member of the solution vector set P can be represented by a vector whose components are a permutation of 1 to N. The evaluation criterion is the total tour distance when the cities are visited in the order determined by the permutation. For example, when the cities are assigned $A_1$, $A_2$, ..., $A_N$ and are visited in the order $A_1$->$A_2$->. . . ->$A_N$, the corresponding solution vector is ($A_1$, $A_2$, ..., $A_N$). This is simply denoted by $A_1 A_2 A_3$... $A_N$, for example. By iteratively performing the above genetic algorithm thereafter, a travelling path nearly equal to the shortest path can be obtained.

FIG. 67 shows the configuration of a successive optimization processing apparatus based on the prior art genetic algorithm that is performed in accordance with the flowchart shown in FIG. 68. In FIG. 67, reference numeral 101 is an initial solution set setting section for setting an initial set of solution vectors to be improved; 102 is a genetic algorithm processing section for performing the estimation of an optimal solution vector by genetic operations; and 103 is an optimal solution output section for outputting a solution vector having the highest fitness when a predetermined termination condition is satisfied. The genetic algorithm processing section 102 comprises: an evaluation value acquisition section 104 for obtaining an evaluation value for each solution vector from a prescribed fitness function; a fitness calculation section 105 for calculating the fitness of each solution vector from the evaluation value obtained by the evaluation value acquisition section 104; a selection executing section 6701 for performing selection on the solution vector set in accordance with the fitness calculated by the fitness calculating section 105; a crossover operation executing section 202 for performing a crossover operation on solution vectors; and a mutation operation executing section 203 for performing a mutation operation on solution vectors. In the thus configured optimization adjusting apparatus using the prior art genetic algorithm, the process through the evaluation value acquisition section 104, the selection executing section 6701, the crossover operation executing section 202, and the mutation operation executing section 203 is performed iteratively in accordance with the flowchart shown in FIG. 68, successively updating the solution vector set and thereby estimating a nearly optimal solution vector for the optimization problem being solved.

However, for problems such as the adjustment of the characteristics of hearing aids, the creation of products and interior designs based on inexplicit concepts, and the adjustment of sound and image characteristics to match personal preferences, since the criteria used are idealistic and unclear and since the characteristics can vary greatly from one individual to another, there is the problem that the results of adjustments cannot be evaluated in quantitative terms. It is therefore not possible, in view of its principle, to apply to such problems a technique that, as in a neural network, predefines a clear fitness function and makes adjustments in such a manner as to optimize the fitness function. For example, the characteristics of a hearing aid are adjusted in the following procedure. First, a test sound signal is divided into several frequency ranges, and test signals are produced that correspond to the upper and lower limit levels of test sound in each frequency range. The upper and lower limit level test signals of the sound are input to the hearing aid, and the test signals output from the hearing aid are input to the ears of a hearing-impaired person, the user of the hearing aid, to confirm if the sound can be heard comfortably. If the lower limit level output test signal of the sound in a specific frequency range is too small and difficult to hear, a tuning specialist adjusts the frequency characteristics of the gain of the hearing aid so that the gain of the hearing aid is increased in that frequency range. Conversely, if the upper limit level output test signal of the sound in a specific frequency range is too large and is not pleasant to hear, the tuning specialist adjusts the frequency characteristics of the gain of the hearing aid so that the gain of the hearing aid is lowered in that frequency range. This process is repeated until the user is satisfied. Thus, under the current circumstances, a hearing aid tuning specialist adjusts the frequency characteristics of the gain of hearing aids, relying on his or her past experience, until the demand of the hearing-impaired user can be met; in fact, it takes a lot of time and labor to determine the characteristics that match each individual hearing-impaired person. Furthermore, the parameters for adjustment vary with the environment and with the personal preferences of each individual hearing-impaired person, and because of that, one hearing-impaired person has to have a plurality of hearing aids, the resulting problem being the need to adjust his or her hearing aids frequently. And each time such a need arises, he or she has to visit a tuning specialist who can adjust the characteristics of hearing aids.

Among the above-described genetic algorithm techniques, there has recently been proposed an interactive genetic algorithm by which the user evaluates each solution vector and, based on the evaluation value obtained, an optimal solution is estimated. Since evaluation and judgement can be made based only on human senses and the user's subjective evaluation, this interactive genetic algorithm can be applied to problems, such as those described earlier, for which a fitness function cannot be clearly prescribed. The prior art optimization adjusting methods for optimal solution vectors based on such an interactive genetic algorithm are disclosed, for example, in "Tracking a Criminal Suspect through "Face-Space" with a Genetic Algorithm" (Caldwell, C. and Johnston, V. S.: Proc. of 4th Int'l Conf. on Genetic Algorithms (ICGA '91)) and "Evolutionary Art and Computers" (Todd, S. and Latham, W.: Academic Press, Harcourt, Brace, Jovanovich).

An optimization adjusting method using an interactive genetic algorithm will be described briefly below.

FIG. 70 is a flowchart illustrating the principle of a solution vector optimization adjustment using an interactive genetic algorithm. As can be seen from the flowchart of FIG. 70, the significant difference from the previously described genetic algorithm is that in <<Step2>> information such as an image or graphical figure expressed by each solution vector is presented for the user to evaluate the goodness of the solution vector, rather than providing an evaluation criterion predefined by an operation as in the previously described optimization adjusting method.

As an application example of optimal vector searching using the interactive genetic algorithm, the former document treats the application to "creation of a montage by a crime witness." The face is composed of such parts as hair, eyes, nose, mouth, chin, ears, etc. A plurality of pattern images are prepared for each part, and by combining pattern images of these parts, a face photograph is produced. Using the interactive genetic algorithm, a vector with the pattern number of each part as an element is defined as a solution vector. Then, the user, who is the witness, views a plurality of faces brought onto the display, each face being created by each solution vector, and subjectively judges the degree of resemblance to the suspect he or she witnessed. A photomontage that is considered most likely to express the face of the criminal suspect is thus produced by using the interactive genetic algorithm.

FIG. 69 shows the configuration of an optimization adjusting apparatus based on the prior art genetic algorithm that is performed in accordance with the flowchart of FIG. 70. In FIG. 69, the apparatus comprises an initial solution set setting section 101, an interactive genetic algorithm processing section 6901 for performing optimal vector searching by genetic recombination operations, and an optimal solution output section 103. The interactive genetic algorithm processing section 6901 includes an information presenting section 3207 for presenting information expressed by each solution vector to the user, a user evaluation judging section 3208 for making the user judge the evaluation value of each solution vector on the basis of the information presented by the information presenting section 3207, a fitness calculating section 105, and a recombination operation section 108. The information presenting section 3207 has the role of presenting information expressed by each solution vector to the user, and the user evaluation judging section 3208 makes the user evaluate the goodness of each solution vector on the basis of his or her own criteria and input his or her evaluation score. Otherwise, the configuration is fundamentally the same as that of the optimization adjusting apparatus using the genetic algorithm shown in FIG. 67, and further explanation is omitted here.

However, the genetic algorithm is a probabilistic and collective search method and uses information (evaluation value) only at the current point in the search space. Therefore, compared to a method wherein a search is made for solutions to a combinatorial optimization problem by using a neural network or the like that utilizes the curved surface features of a fitness function, the successive optimization processing apparatus using the prior art genetic algorithm is superior in global solution searching, but since local information is not used, it lacks the search ability in the neighborhood of an optimal solution and takes a longer time to search for solutions in that neighborhood. Furthermore, since the prior art does not use history information of past multi-point searches, there is a tendency to converge to the neighborhood of an optimal solution while more or less oscillating through the search space.

Furthermore, generally, in the optimization adjusting method based on the interactive genetic algorithm, it is necessary to evaluate the goodness of each solution vector by presenting multiple pieces of information expressed by each solution vector to the user for comparative evaluation. Therefore, the optimization adjusting apparatus using the prior art interactive genetic algorithm can be applied without any problem to the adjustment of static data such as characters and images that can be simultaneously presented spatially, but when the data to be evaluated by the user is time sequential information, such as the previously described problem of adjusting hearing aid characteristics, if multiple pieces of time sequential information are presented as they are, it is difficult for the user to distinguish the differences between them, so that it is extremely difficult to evaluate each solution vector. In addition, the burden on the user who is making the adjustment increases with time, and also, the user's preferences vary greatly. In reality, however, no measures to remedy these problems have ever been incorporated in the adjusting apparatus using the prior art interactive genetic algorithm.

The present invention is intended to resolve the above-outlined problems, and it is an object of the invention to provide an optimization adjusting apparatus capable of estimating an optimal solution quickly and effectively, by making improvements to the prior art genetic algorithm to reinforce its local search ability without impairing the global search ability innate to the genetic algorithm.

It is another object of the invention to provide an optimization adjusting apparatus that can effectively apply an interactive genetic algorithm not only to the adjustment of characters, images, etc., but to the adjustment of time sequential signals. It is a further object of the invention to provide an optimization adjusting method using an interactive genetic algorithm and an optimization adjusting apparatus implementing the same, which effectively alleviate the burden on a user who is working on the adjustment of an apparatus, by improving processing efficiency of solution vector optimization, and by modelling a user adjustment process from a user adjustment history and thereby automatically adjusting the solution vector.

SUMMARY OF THE INVENTION

To achieve the above objects, according to a first optimization adjusting method and optimization adjusting apparatus of the invention, the movement of a barycentric vector of a group having high fitness within a solution vector group is examined, and if the moving direction vector is pointing in approximately the same direction, then that moving direction vector is regarded as an update direction vector. Then, solution vectors are updated along the update direction vector, which is followed by a recombination operation to generate new solution vectors from the current solution vector set. By iteratively performing this process, an optimal solution vector is estimated.

To achieve the above objects, according to a second optimization adjusting method and optimization adjusting apparatus of the invention, an initial solution vector group is constructed around each solution vector in an initial solution vector set, and a recombination operation is performed a predetermined number of times to generate a further optimized solution vector group. Then, a plurality of solution vector groups thus generated are consolidated into a larger set, and again a recombination operation is performed, updating and thereby optimizing solution vectors. In this manner, the second successive optimization processing apparatus of the invention estimates an optimal solution vector by first performing local updating of solution vectors several times by using a recombination operation, and then performing global updating of solution vectors, again using a recombination operation.

To achieve the above objects, according to a third optimization adjusting method and optimization adjusting apparatus of the invention, each solution vector in a solution vector set is compared with a vector group randomly extracted from its neighborhood space, and a vector group having high fitness is selected as solution vectors belonging to the solution vector set that is to be subjected to a recombination operation. By performing the recombination operation on the solution vector set, an optimal solution vector is estimated.

To achieve the above objects, according to a fourth optimization adjusting method and optimization adjusting apparatus of the invention, a search for an optimal solution is performed by extracting neighbor vector groups from the neighborhoods of selected solution vectors and by performing a genetic recombination operation on each of the extracted neighbor vector groups.

To achieve the above objects, according to a fifth optimization adjusting method and optimization adjusting apparatus of the invention, the neighborhood of each solution vector in a solution vector set is divided into a plurality of regions, and a plurality of solution vectors are selected randomly from a region having the highest average fitness, while at the same time, a recombination operation is performed on the solution vectors within the original solution vector set to generate a new solution vector set. From the solution vectors thus obtained, solution vectors are selected in decreasing order of fitness and consolidated into a new solution vector set. Thus, in the successive optimization processing apparatus of this embodiment, the operation to update solution vectors near each solution vector of the solution vector set is performed concurrently with the optimization of solution vectors performed by the recombination operation within the solution vector set.

To achieve the above objects, according to a sixth optimization adjusting method and optimization adjusting apparatus of the invention, a search for an optimal solution is performed by dividing a solution vector set into a plurality of groups based on the arithmetic mean and standard deviation of fitness, and by performing a recombination operation on the solution vectors within each of the groups.

To achieve the above objects, according to a seventh optimization adjusting method and optimization adjusting apparatus of the invention, a decision is made as to whether to divide or not divide a solution vector set, based on the arithmetic mean of the fitness of each solution vector, its standard deviation, and the maximum and minimum fitnesses. If it is decided that the set should be divided, the solution vector set is divided in to a plurality of groups and a recombination operation is performed on the solution vectors within each group; if it is decided otherwise, the recombination operation is performed on the whole solution vector set. By iteratively performing the above process, the seventh optimization adjusting method and apparatus of the invention estimates an optimal solution.

To achieve the above objects, according to an eighth optimization adjusting method and optimization adjusting apparatus of the invention, the whole space is globally and roughly divided and solution vectors are updated, thereby roughly estimating a region which is likely to contain optimal solution vectors. Thereafter, a stepwise convergence criterion by which to judge the convergence of solution vectors is gradually tightened and the update region is localized in a stepwise manner, to update solution vectors locally and thereby estimating an optimal solution vector.

To achieve the above objects, according to a ninth optimization adjusting method and optimization adjusting apparatus of the invention, there are provided an update region limiting section for limiting an update region of each solution vector to be adjusted, on the basis of its characteristics and the results of past adjustments, and a set resetting section for resetting a solution vector set so that the solution vectors of a solution vector set newly generated by a recombination operation always fall within the update region. Using an interactive genetic algorithm, a solution vector adjustment operation is performed only on the solution vectors within the update region, thereby achieving quick estimation of an optimal solution vector.

To achieve the above objects, according to a 10th optimization adjusting method and optimization adjusting apparatus of the invention, there are provided an initial solution vector selecting section for selecting previously recorded optimal adjustment information, and an optimal solution vector recording section for recording optimal solution vectors. Accordingly, the previously obtained optimal information is always selected as the adjustment start point of an interactive genetic algorithm so that a solution vector adjustment operation can be performed quickly.

To achieve the above objects, according to an 11th optimization adjusting method and optimization adjusting apparatus of the invention, there are provided a psychological state estimating section for estimating the user's psychological state from the physiological data of the user who is working on evaluation, and an evaluation correcting section for correcting an evaluation value on the basis of the user's psychological state. Thus, an optimal solution vector is derived using an interactive genetic algorithm, while effectively reducing the effect of variation in user evaluation.

To achieve the above objects, according to a 12th optimization adjusting method and optimization adjusting apparatus of the invention, a model estimation executing section is provided for estimating an evaluation model for user adjustment process on the basis of an adjustment history when the user performs solution vector optimization by himself by using an interactive genetic algorithm. With this processing, patterns of the user's preferences can be obtained.

To achieve the above objects, according to a 13th optimization adjusting method and optimization adjusting apparatus of the invention, a common model estimating section is provided for estimating a common model representing a plurality of users' adjustment precesses on the basis of the history of solution vector optimizations performed by a plurality of users by using an interactive genetic algorithm. With this processing, characteristic patterns of users' preferences can be obtained in a further generalized form.

To achieve the above objects, according to a 14th optimization adjusting method and optimization adjusting apparatus of the invention, there are provided a common model evaluation calculating section for automatically evaluating each solution vector by using a common model representing a plurality of users' adjustment processes, and a common model updating section for further updating the common model on the basis of user evaluation. In this manner, using an interactive genetic algorithm the adjustment of a solution vector optimum for the user is quickly performed, while at the same time, updating the common model representing a plurality of users' adjustment processes.

To achieve the above objects, according to a 15th optimization adjusting method and optimization adjusting apparatus of the invention, there are provided an evaluation model estimating section for estimating an evaluation model for user adjustment process from the history of adjustments performed by using an interactive genetic algorithm, and a model evaluation calculating section for calculating an evaluation value for each solution vector from the evaluation model. By using the adjustment process evaluation model estimated from the history of user adjustments, optimum adjustment of solution vectors is automatically performed.

To achieve the above objects, according to a 16th optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are incorporated into an interactive genetic algorithm, thereby facilitating comparative evaluation of time sequential information expressed by each solution vector.

To achieve the above objects, according to a 17th optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. With further provision of an update region limiting section for limiting an update region that solution vectors can take, and a set resetting section for resetting a solution vector set so that the solution vectors of a solution vector set newly generated by a recombination operation always fall within the update region, quick estimation of an optimal solution vector can be achieved.

To achieve the above objects, according to a 18th optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. With further provision of an initial solution vector selecting section for setting an initial set of search vectors on the basis of previously recorded adjustment information, and an optimal solution vector recording section for recording optimal solution vectors, quick adjustment of an optimal solution vector can be achieved.

To achieve the above objects, according to a 19th optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. In addition, with the provision of a psychological state estimating section and an evaluation value correcting section, user evaluation value is corrected on the basis of the user's psychological state, thereby reducing the effect of variation in the evaluation value.

To achieve the above objects, according to a 20th optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. In addition, a model estimation executing section is provided for estimating an evaluation model for user adjustment process on the basis of the history of user adjustments.

To achieve the above objects, according to a 21st optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. In addition, a common model estimating section is provided for estimating a common model representing a plurality of users' adjustment processes on the basis of a recorded history of adjustments performed by a plurality of users.

To achieve the above objects, according to a 22nd optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. Furthermore, with the provision of a common model evaluation calculating section and a common model updating section, the adjustment of a solution vector optimum for the user is quickly accomplished, while, at the same time, updating a common model representing a plurality of users' adjustment processes.

To achieve the above objects, according to a 23rd optimization adjusting method and optimization adjusting apparatus of the invention, for a problem dealing with a time sequential signal, an auxiliary information presenting section for presenting information for facilitating comparative evaluation of each solution vector and an information rearranging section for rearranging the order of presenting information expressed by each solution vector are provided so that comparative evaluation of time sequential information expressed by each solution vector can be performed easily. Further, with the provision of an evaluation model estimating section and a model evaluation calculating section, optimum adjustment of solution vectors is automatically performed using an evaluation model estimated from the history of user adjustments.

The first optimization adjusting method and optimization adjusting apparatus calculate an update direction candidate vector based on a barycentric vector of solution vectors having higher fitness than a predetermined reference fitness and a barycentric vector obtained in a previous update operation, the solution vectors being selected from a prescribed solution set on the basis of their fitness; if the update direction candidate vector is pointing in the same direction as a previously recorded update direction candidate vector, then it is judged that optimal solution vectors are distributed along the direction of that vector, and the same vector is now set as the update direction vector, along which a plurality of solution vectors are updated, while the remaining solution vectors are updated by performing a recombination operation, based on a genetic operation, on the solution vectors within the original solution vector set before updating. If the update direction vector cannot be obtained, the recombination operation based on a genetic operation is performed on the whole solution vector set. By using the distributed direction of optimal solution vectors thus estimated based on the history of previous solution vector updates, the first optimization adjusting method and apparatus accomplish fast and efficient estimation of the optimal solution vector.

The second optimization adjusting method and optimization adjusting apparatus first set an appropriate initial solution vector set, and then set an initial solution vector group within a limited region around each solution vector; on the thus set initial solution vector group a recombination operation based on fitness is performed, thus achieving local updating of solution vectors. After that, a plurality of solution vector groups generated by local updating are consolidated into a larger set, and again, a solution vector recombination operation is performed based on fitness, thus globally estimating an optimal solution vector. In this manner, by first performing local updating of solution vectors using a recombination operation, and then globally updating the solution vectors, again using a recombination operation, the local solution updating ability, which the prior art genetic algorithm lacks, can be reinforced.

The third optimization adjusting method and optimization adjusting apparatus first set an appropriate initial solution vector set, and then extract a plurality of solution vectors from a limited region set around each solution vector in the initial solution vector set. From each solution vector groups thus extracted, solution vectors having high fitness are selected to construct a new solution vector set. A solution vector recombination operation is performed on the new solution vector set in accordance with the fitness of each vector. Accordingly, the third optimization adjusting method and apparatus have a reinforced local solution updating ability, with which quick estimation of an optimal solution can be achieved.

The fourth optimization adjusting method and optimization adjusting apparatus first set an appropriate initial solution vector set, and then obtain the fitness of each solution vector belonging to the solution vector set; based on the fitness thus obtained, representative solution vectors are selected, and their neighbor vector groups are extracted. A group recombination operation section then performs a solution vector recombination operation on each of the neighbor vector groups. After that, a mutation operation executing section performs a recombination operation on a newly generated solution vector set. With this sequence of processing, not only solution vectors having particularly high fitness can be prevented from causing a direct and significant influence on the whole solution set, but the optimal solution set can be estimated efficiently.

The fifth optimization adjusting method and optimization adjusting apparatus first set an appropriate initial solution vector set, then obtain the fitness of each solution vector belonging to the solution vector set, and perform a recombination operation on the solution vectors within the solution vector set in accordance with the fitness. In the meantime, a plurality of solution vectors are randomly extracted from the solution vector set, and a space neighboring each solution vector is divided into a plurality of regions. Then, a plurality of solution vectors are extracted from each region, and the average evaluation value and average fitness are calculated for each region. A region having the highest average fitness is selected, from which a plurality of solution vectors are arbitrarily extracted as a solution vector group. From the thus generated solution vector group and the solution vector group generated by the recombination operation, solution vectors are selected in decreasing order of fitness to generate a new solution vector set for the next process. By repeating the above sequence of processing, the ability to localize the solution updating can be improved while exploiting the superior global solution updating ability innate to the genetic algorithm. This achieves efficient estimation of an optimal solution vector.

The sixth optimization adjusting method and optimization adjusting apparatus first set an appropriate initial solution vector set, and then obtain the fitness of each solution vector belonging to the solution vector set. Based on the arithmetic mean and standard deviation of the fitness, the whole solution vector set is divided into a plurality of groups. Solution vector selection and solution vector updating by a recombination operation are performed on the solution vectors within each group. Then, the recombination operation by mutation is performed on newly generated solution vectors. With this sequence of processing, not only solution vectors having particularly high fitness can be prevented from causing a direct and significant influence on the whole solution set, but the optimal solution set can be estimated efficiently.

The seventh optimization adjusting method and optimization adjusting apparatus first set an appropriate initial solution vector set, and then obtain the fitness of each solution vector belonging to the solution vector set. Based on the arithmetic mean and standard deviation of the fitness, and the maximum and minimum fitnesses, a decision is made as to whether a recombination operation should be performed on the whole solution set or the whole solution set should be divided into a plurality of groups. If it is decided that the set should be divided, the whole solution set is divided into a plurality of groups, as in the sixth optimization adjusting method and optimization adjusting apparatus; if it is decided otherwise, the whole solution set is set as the target of the recombination operation. After that, solution vector selection and recombination operations are performed on the thus set recombination target. In this manner, the presence or absence of a solution vector having particularly high fitness is detected based on the distribution of the fitness, and the recombination target is limited in such a manner as to reduce the effect of such a solution vector. Efficient estimation of an optimal solution can thus be achieved.

The eighth optimization adjusting method and optimization adjusting apparatus first set an appropriate initial solution vector set, and then obtain the fitness of each solution vector belonging to the solution vector set. In accordance with this fitness, solution vector selection and recombination operations are performed by a genetic recombination operation; the recombination operation is performed on the solution vectors within a prescribed update region until a predetermined stepwise convergence criterion is satisfied. When the stepwise convergence criterion is satisfied, the stepwise convergence criterion is, for example, further tightened and the update region is reduced in size, whereupon the process of fitness calculation, recombination, etc. is repeated once again. In this sequence of processing, a global search is conducted first, and then the process gradually shifts to local updating. This achieves efficient estimation of an optimal solution.

Optimal parameters tend to vary according to the environment in which the user uses an apparatus to be optimized, but it is presumed that these parameters exist within certain limits. With the ninth optimization adjusting method and optimization adjusting apparatus of the invention, the update region of each solution vector to be adjusted is limited based on its characteristics and the results of past adjustments, and the interactive genetic algorithm is performed on the solution vectors within the limited region. This makes it possible to omit update operations in regions where solution search is presumably not necessary, and thus quickens the process of optimal solution adjustment.

Likewise, with the 10th optimization adjusting method and optimization adjusting apparatus of the invention, when using the interactive genetic algorithm, the initial set of solution vectors is constructed using the previously recorded optimal information and the search is performed by excluding solution vectors undesirable for the user. As a result, convergence to an optimal solution vector can be quickly accomplished, and the user burden can be alleviated when performing the evaluation of each solution vector.

Optimal parameters tend to vary according to the environment in which the user uses an apparatus to be optimized. With the 11th optimization adjusting method and optimization adjusting apparatus of the invention, the effect of variation in user evaluation is reduced by correcting the user's evaluation value on the basis of the user's psychological state estimated from the user's physiological data. Accordingly, the adjustment of a solution vector optimum related to the user's conditions (hearing, vision, etc.) free from the effect of the environment can be achieved using an interactive genetic algorithm.

The 12th optimization adjusting method and optimization adjusting apparatus of the invention estimate an evaluation model for user adjustment process on the basis of the history of adjustments when the user performs solution vector optimization by himself by using an interactive genetic algorithm. This makes it possible to obtain the user's preferences on the problem being solved.

The 13th optimization adjusting method and optimization adjusting apparatus of the invention estimate a common model representing a plurality of users' adjustment precesses on the basis of the history of solution vector optimizations performed by a plurality of users by using an interactive genetic algorithm. This makes it possible to estimate common factors in the preferences of a plurality of users.

The 14th optimization adjusting method and optimization adjusting apparatus of the invention, using an interactive genetic algorithm, quickly estimate a solution vector optimum for the user, while at the same time, updating the common model representing a plurality of users' adjustment processes. Accordingly, the user need not evaluate information presented by all the solution vectors, and thus the user burden can be alleviated.

The 15th optimization adjusting method and optimization adjusting apparatus of the invention, using an interactive genetic algorithm, estimate an evaluation model representing the user adjustment process, and by using the thus obtained evaluation model, automatically adjusts the optimal solution vector. This contributes to alleviating the user burden, which has been a problem in the implementation of an interactive genetic algorithm.

The 16th optimization adjusting method and optimization adjusting apparatus of the invention are adapted to handle a problem dealing with a time sequential signal, and perform the adjustment of an optimal solution by using an interactive genetic algorithm into which an operation to present information for facilitating comparative evaluation of each solution vector and an operation to rearrange the order of presentation are incorporated. Accordingly, the interactive genetic algorithm, which has previously been applied only to static data such as images, can be applied to dynamic data such as time sequential data.

The 17th optimization adjusting method and optimization adjusting apparatus of the invention are adapted to handle a problem dealing with a time sequential signal, limit the update region of each solution vector to be adjusted on the basis of its characteristics and the history of past adjustments, and perform the adjustment of an optimal solution vector by using an interactive genetic algorithm with functions to present information for facilitating comparative evaluation of each solution vector and rearrange the order of presentation are incorporated. Accordingly, the adjustment of the optimal solution vector can be achieved quickly when the interactive genetic algorithm, which has previously been applied only to static data such as images, is applied to dynamic data such as time sequential data.

The 18th optimization adjusting method and optimization adjusting apparatus of the invention are adapted to handle a problem dealing with a time sequential signal, construct on the basis of previously recorded adjustment information an initial solution vector set to be updated, and perform the optimization of a solution vector by using an interactive genetic algorithm with functions to present information for facilitating comparative evaluation of each solution vector and rearrange the order of presentation. Accordingly, the adjustment of the optimal solution vector can be achieved quickly when the interactive genetic algorithm, which has previously been applied only to static data such as images, is applied to dynamic data such as time sequential data.

The 19th optimization adjusting method and optimization adjusting apparatus of the invention are adapted to handle a problem dealing with a time sequential signal, and perform an optimal solution vector update by using an interactive genetic algorithm, with functions to present information for facilitating comparative evaluation of each solution vector and rearrange the order of presentation are incorporated, while correcting the user evaluation value based on the user's psychological state estimated from the user's physiological information, and thereby reducing the effect of variation in the user evaluation. Accordingly, the interactive genetic algorithm, which has previously been applied only to static data such as images, can be applied to dynamic data such as time sequential data, and also the adjustment of an optimum solution vector that matches the user's own conditions can be performed without being affected by the environment.

The 20th optimization adjusting method and optimization adjusting apparatus of the invention are adapted to handle a problem dealing with a time sequential signal, and estimate an evaluation model for the user adjustment process from the history of user adjustments by using an interactive genetic algorithm into which an operation to present information for facilitating comparative evaluation of each solution vector and an operation to rearrange the order of presentation based on evaluation value are incorporated. It is thus possible to obtain the user's preferences on the problem dealing with a time sequential signal.

The 21st optimization adjusting method and optimization adjusting apparatus of the invention are adapted to handle a problem dealing with a time sequential signal, and estimate a common model for adjustment processes from a recorded history of the adjustments made by a plurality of users, by using an interactive genetic algorithm into which an operation to present information for facilitating comparative evaluation of each solution vector and an operation to rearrange the order of presentation based on evaluation value are incorporated. It is thus possible to extract common factors in the preferences of a plurality of users when handling time sequential signals.

The 22nd optimization adjusting method and optimization adjusting apparatus of the invention are adapted to handle a problem dealing with a time sequential signal, and quickly accomplish the adjustment of a solution vector optimum for the user by using an interactive genetic algorithm, with functions to present information for facilitating comparative evaluation of each solution vector and rearrange the order of presentation based on evaluation value, while, at the same time, updating a common model representing a plurality of users' adjustment processes. Accordingly, the user need not evaluate information presented by all the solution vectors, and thus the user burden can be alleviated.

The 23rd optimization adjusting method and optimization adjusting apparatus of the invention are adapted to handle a problem dealing with a time sequential signal, estimate a personal model representing user's preferences by using an interactive genetic algorithm with functions to present information for facilitating comparative evaluation of each solution vector and rearrange the order of presentation based on evaluation value, and automatically perform the adjustment of an optimal solution vector by using the thus obtained personal model. Accordingly, the user burden, which has been a problem in the implementation of an interactive genetic algorithm, can be alleviated, thus making it possible to apply the interactive genetic algorithm to time sequential signals.

BRIEF DESCRIPTION OF THE DRAWINGS

FIG. 7 is a diagram illustrating how a value in a real interval is converted to a fixed-length bit string code;

FIG. 12 is a diagram schematically illustrating a local update operation and a global update operation;

FIG. 18 is a diagram schematically illustrating the extraction of neighbor vectors in a real space;

FIG. 24 is a diagram schematically illustrating the division of a solution set, part (a) showing population distribution with respect to fitness fk, and part (b) showing how the division is performed in a real space;

FIG. 30 is a diagram schematically illustrating the localization of an update region in a real space;

FIG. 71 is a diagram for explaining the concept of recombination operations in a genetic algorithm, part (a) showing an example of a crossover operation and part (b) an example of a mutation operation;

FIG. 74 is a conceptual diagram illustrating simplex crossover;

FIG. 79 is a conceptual diagram illustrating the mapping of a time sequential signal to auxiliary information.

DESCRIPTION OF THE REFERENCE NUMERALS

Figure 1:
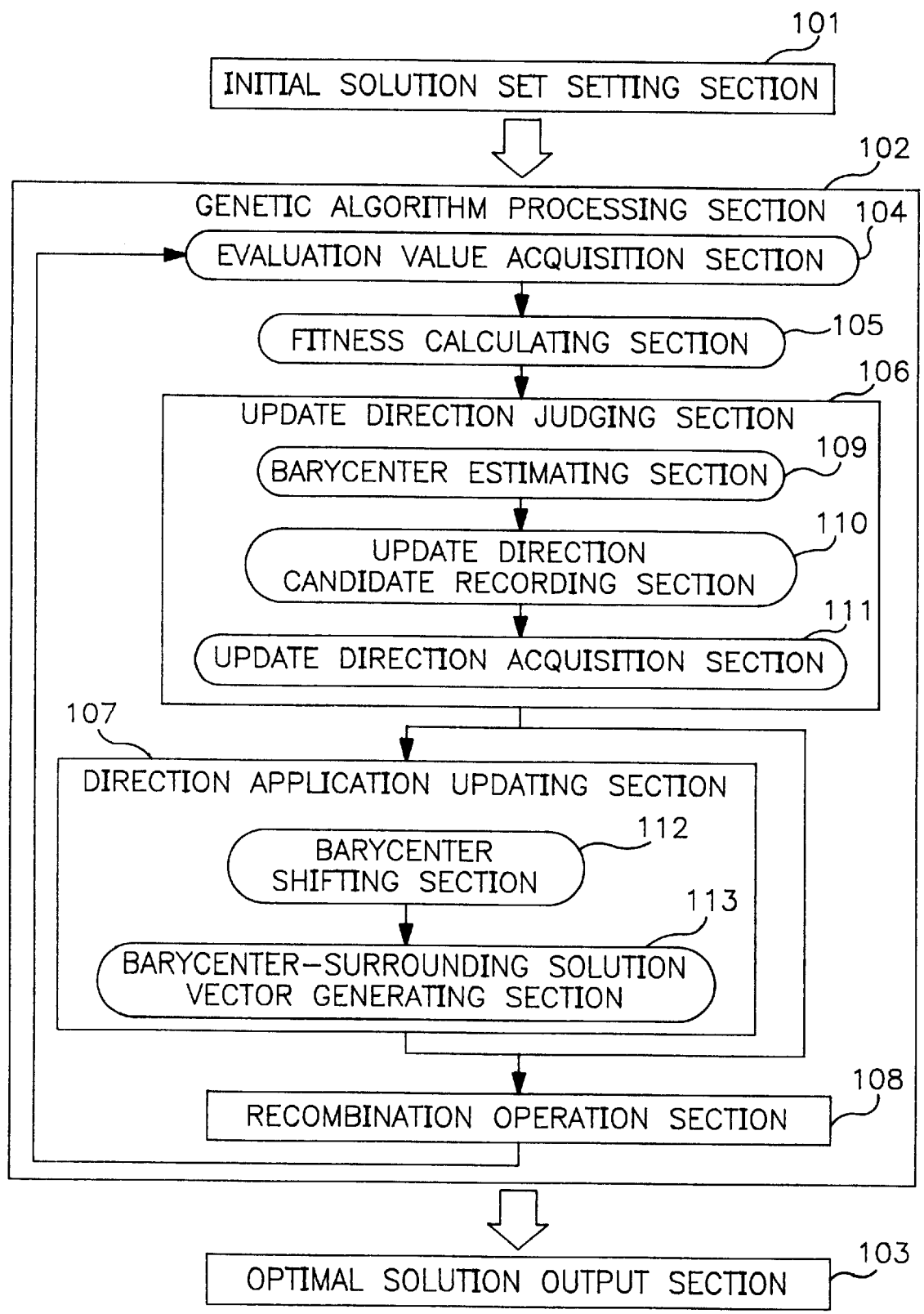
FIG. 1 is a block diagram showing the configuration of an optimization adjusting apparatus according to a first embodiment of the present invention.

101. INITIAL SOLUTION SET SETTING SECTION, 102. GENETIC ALGORITHM PROCESSING SECTION, 103. OPTIMAL SOLUTION OUTPUT SECTION, 104. EVALUATION VALUE ACQUISITION SECTION, 105. FITNESS CALCULATING SECTION, 106. UPDATE DIRECTION JUDGING SECTION, 107. DIRECTION APPLICATION UPDATING SECTION, 108. RECOMBINATION OPERATION SECTION, 109. BARYCENTER ESTIMATING SECTION, 110. UPDATE DIRECTION CANDIDATE RECORDING SECTION, 111. UPDATE DIRECTION ACQUISITION SECTION, 112. BARYCENTER SHIFTING SECTION, 113. BARYCENTER-SURROUNDING SOLUTION VECTOR GENERATING SECTION, 201. CANDIDATE SELECTING SECTION, 202. CROSSOVER OPERATION EXECUTING SECTION, 203. MUTATION OPERATION EXECUTING SECTION, 204. SELECTION RANGE DERIVING SECTION, 205. RANDOM NUMBER GENERATING SECTION, 206. SOLUTION VECTOR EXTRACTING SECTION, 1001. LOCAL UPDATING SECTION, 1002. GLOBAL UPDATING SECTION, 1003. LOCAL UPDATE SETTING SECTION, 1004. VECTOR GROUP INITIAL SETTING SECTION, 1005. LOCAL RECOMBINATION OPERATION SECTION, 1006. LOCAL UPDATE TERMINATION JUDGING SECTION, 1007. SET CONSOLIDATING SECTION, 1008. GLOBAL RECOMBINATION

OPERATION SECTION, 1301. INITIAL UPDATE REGION LIMITING SECTION, 1302. INITIAL SOLUTION VECTOR GROUP EXTRACTING SECTION, 1303. SOLUTION VECTOR SET CONSOLIDATING SECTION, 1601. SOLUTION SET RESETTING SECTION, 1602. GROUP RECOMBINATION OPERATION SECTION, 1603. REPRESENTATIVE SOLUTION VECTOR SELECTING SECTION, 1604. NEIGHBOR VECTOR GROUP EXTRACTING SECTION, 1901. UPDATE REGION DIVIDING SECTION, 1902. AVERAGE FITNESS CALCULATING SECTION, 1903. FIT REGION SOLUTION VECTOR EXTRACTING SECTION, 1904. SOLUTION VECTOR CONSOLIDATING SECTION, 2201. SOLUTION SET DIVIDING SECTION, 2202. DIVIDED REGION DETERMINING SECTION, 2203. DIVISION EXECUTING SECTION, 2501. RECOMBINATION TARGET CONTROL SECTION, 2801. UPDATE REGION SETTING SECTION, 2802. STEPWISE CONVERGENCE JUDGING SECTION, 2803. CONVERGENCE CRITERION ALTERING SECTION, 3201. SUBJECT DATA INPUT SECTION, 3202. UPDATE REGION LIMITING SECTION, 3203. MAIN PROCESSING SECTION, 3204. APPARATUS ADJUSTMENT EXECUTING SECTION, 3205. USER EVALUATION SECTION, 3206. SET RESETTING SECTION, 3207. INFORMATION PRESENTING SECTION, 3208. USER EVALUATION JUDGING SECTION, 3401. RECORDING MEDIUM, 3402. RECORDED INFORMATION READING SECTION, 3403. INITIAL SOLUTION VECTOR SELECTING SECTION, 3404. INITIAL SOLUTION VECTOR REPLENISHING SECTION, 3405. OPTIMAL SOLUTION VECTOR RECORDING SECTION, 3601. USER PSYCHOLOGY ESTIMATING SECTION, 3602. EVALUATION VALUE CORRECTING SECTION, 3603. PHYSIOLOGICAL DATA MEASURING SECTION, 3604. PSYCHOLOGY ESTIMATION EXECUTING SECTION, 3801. EVALUATION MODEL OUTPUT SECTION, 3802. SECOND USER EVALUATION SECTION, 3803. EVALUATION MODEL ESTIMATION JUDGING SECTION, 3804. MODEL ESTIMATION EXECUTING SECTION, 3805. ADJUSTMENT HISTORY RECORDING SECTION, 4001. COMMON MODEL OUTPUT SECTION, 4002. USER ADJUSTMENT TERMINATION JUDGING SECTION, 4003. COMMON MODEL ESTIMATING SECTION, 4004. COMMON MODEL ESTIMATION JUDGING SECTION, 4005. COMMON MODEL ESTIMATION EXECUTING SECTION, 4301. COMMON MODEL EVALUATION CALCULATING SECTION, 4302. COMMON MODEL EVALUATION JUDGING SECTION, 4303. COMMON MODEL UPDATING SECTION, 4304. COMMON MODEL UPDATE JUDGING SECTION, 4305. COMMON MODEL UPDATE EXECUTING SECTION, 4601. METHOD SELECTION SWITCH, 4602. EVALUATION MODEL ESTIMATING SECTION, 4603. MODEL EVALUATION CALCULATING SECTION, 4604. METHOD SELECTION JUDGING SECTION, 4901. TIME SERIES EVALUATION EXECUTING SECTION, 4902. AUXILIARY INFORMATION PRESENTING SECTION, 4903. INFORMATION REARRANGING SECTION, 6701. DISCRIMINATIVE SELECTION EXECUTING SECTION, 6901. INTERACTIVE GENETIC ALGORITHM EXECUTING SECTION

DESCRIPTION OF THE PREFERRED EMBODIMENTS

Figure 2:
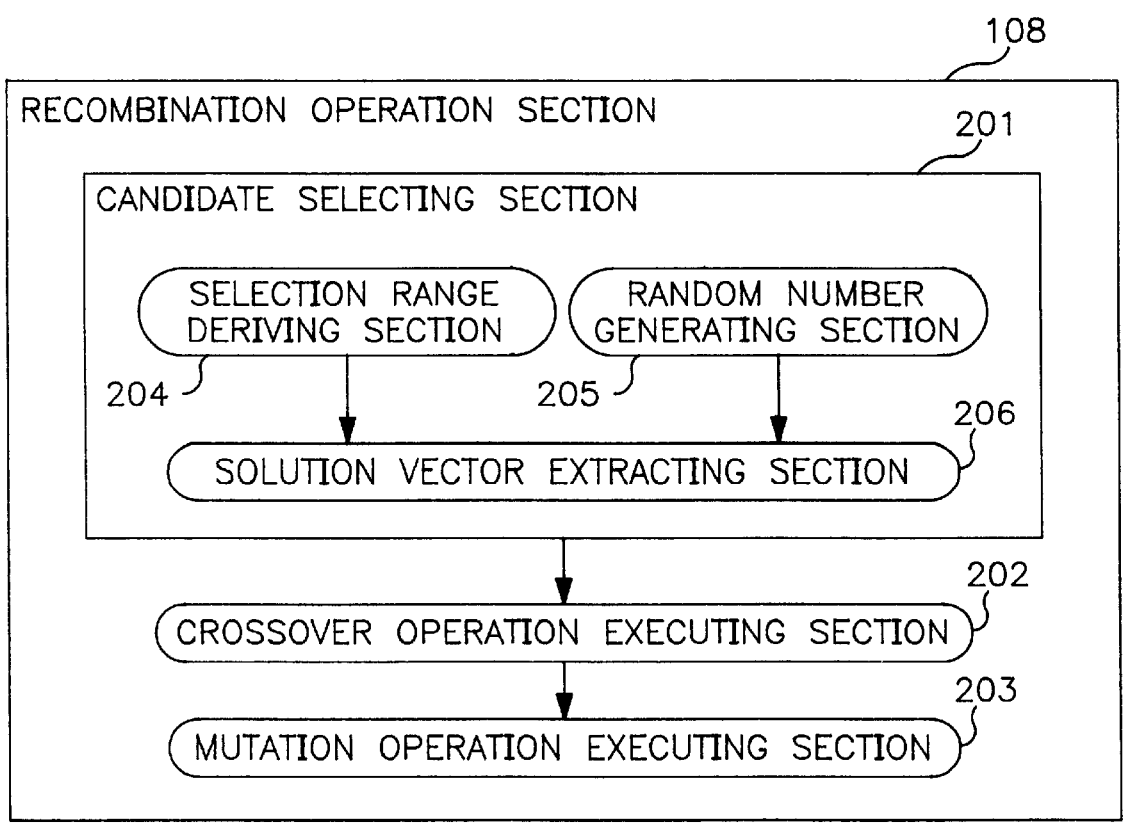
FIG. 2 is a block diagram showing the configuration of a recombination operation section which forms an essential portion of the optimization adjusting apparatus according to the first embodiment of the present invention.
Figure 10:
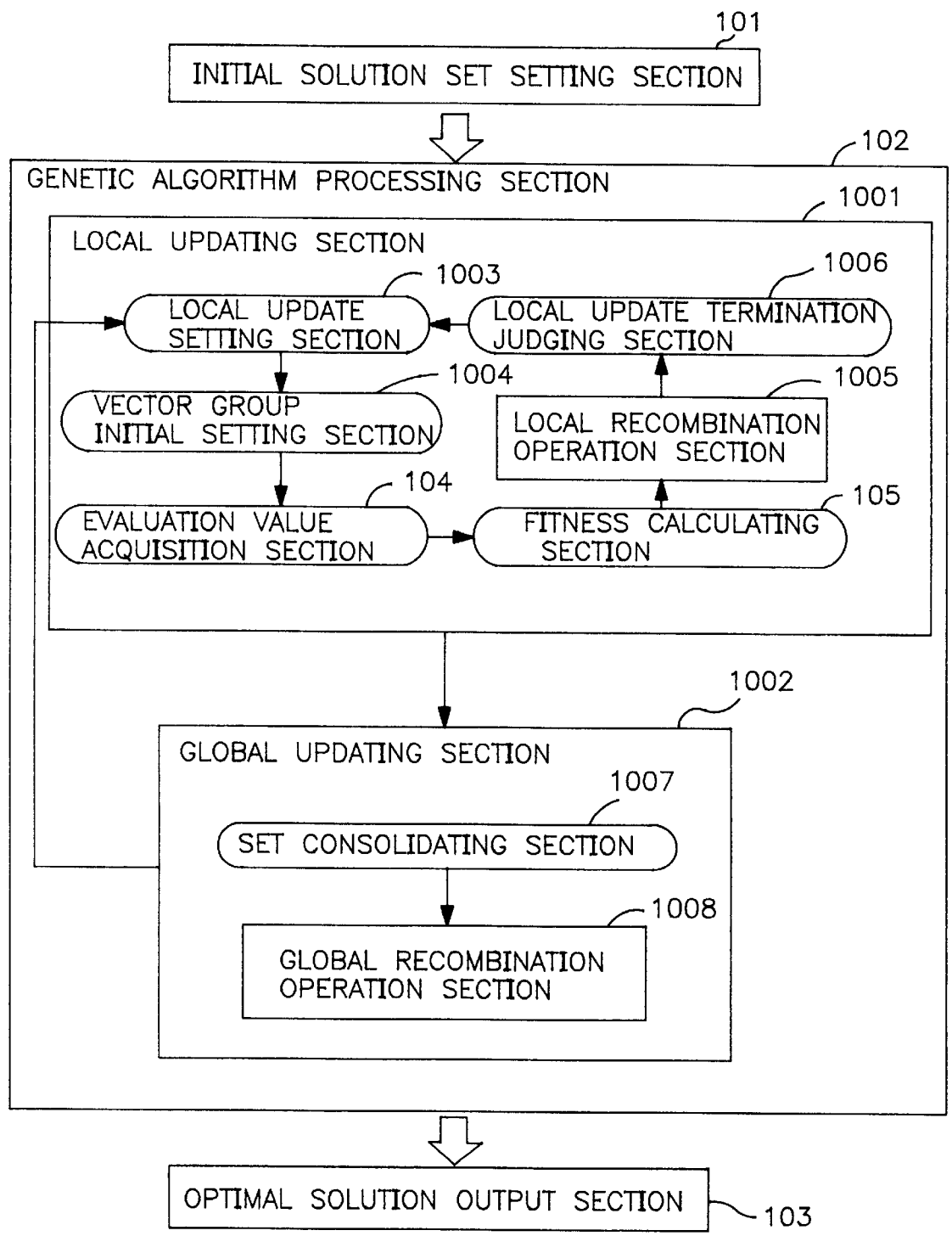
FIG. 10 is a block diagram showing the configuration of an optimization adjusting apparatus according to a second embodiment of the present invention.
Figure 13:
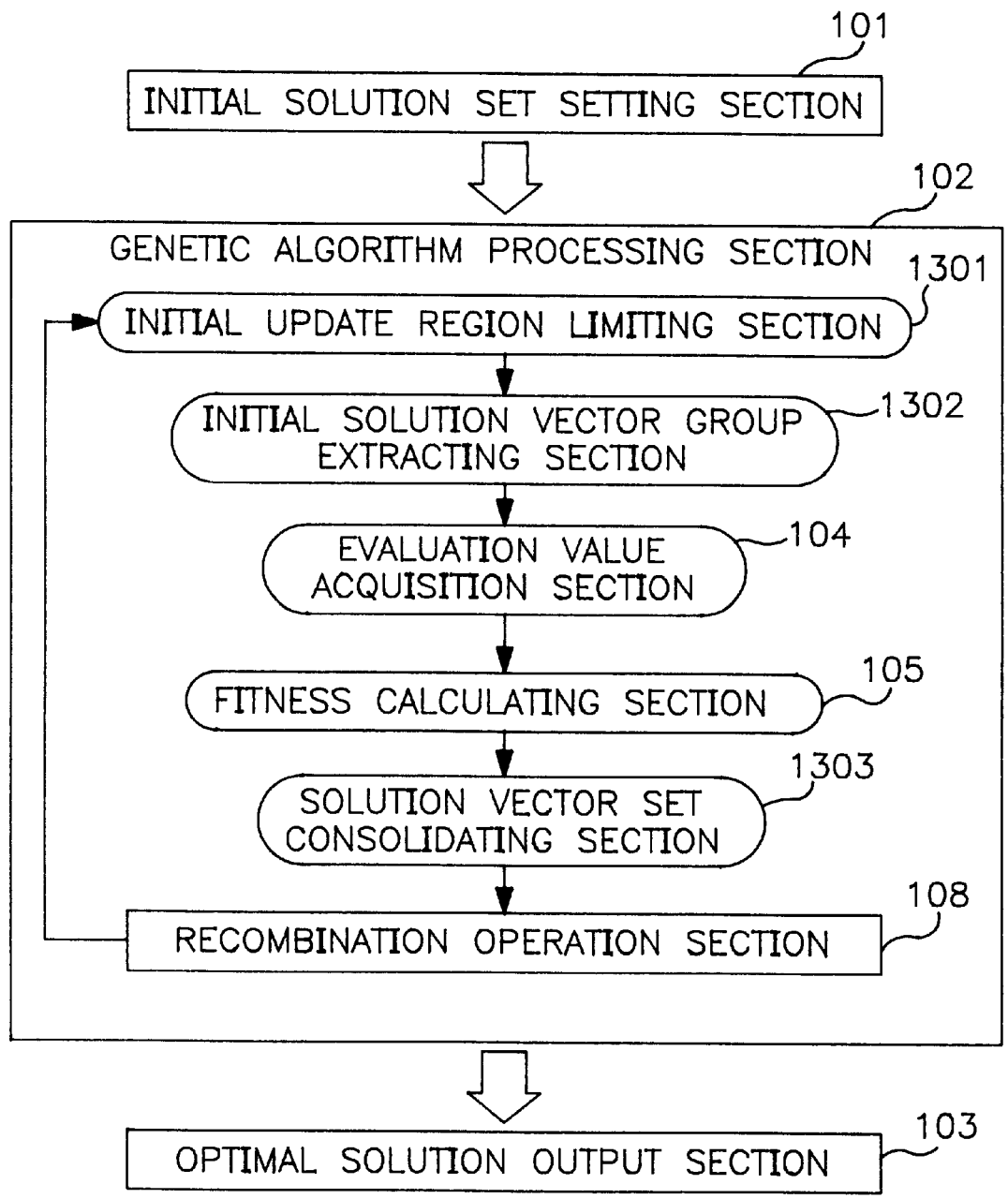
FIG. 13 is a block diagram showing the configuration of an optimization adjusting apparatus according to a third embodiment of the present invention.
Figure 16:
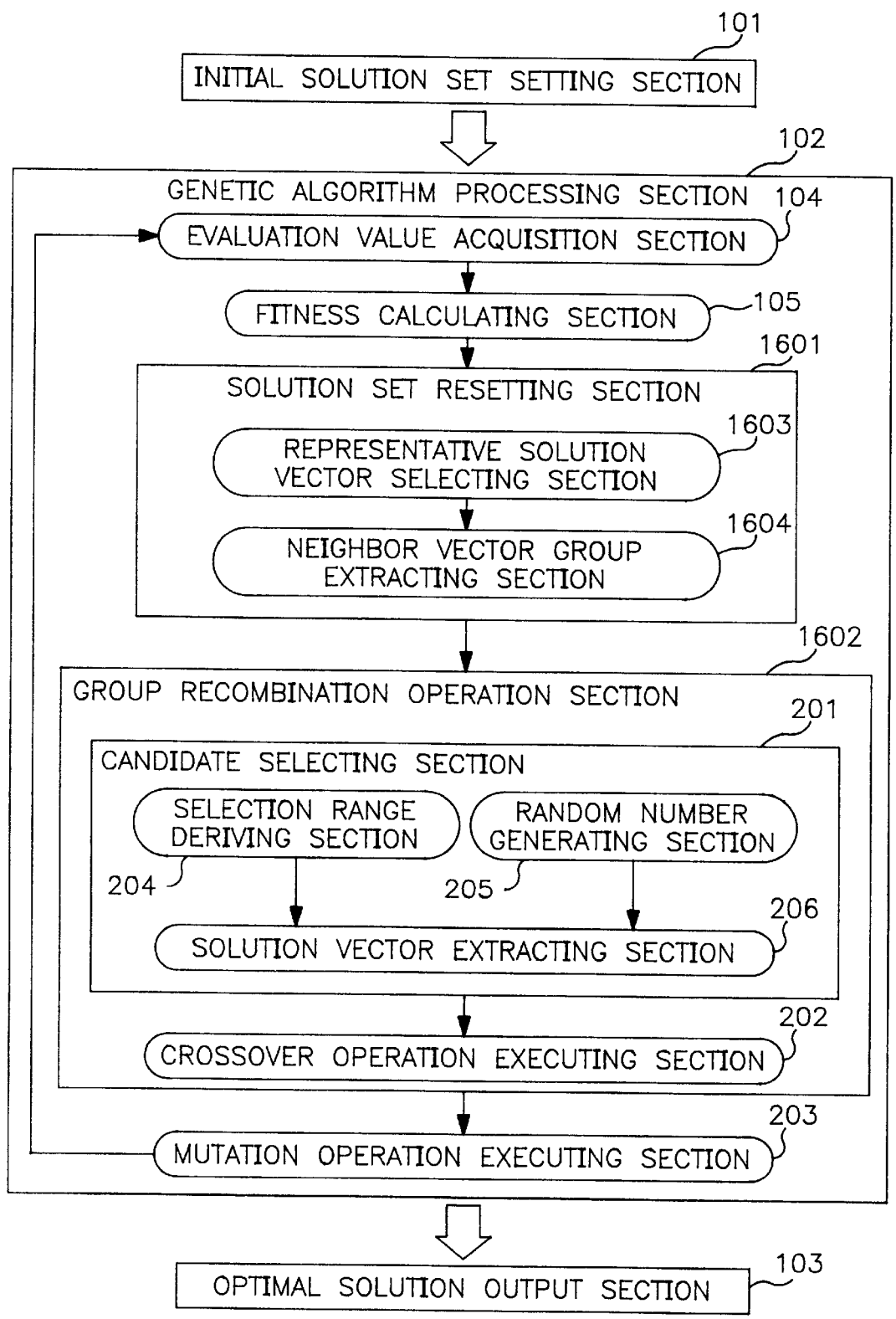
FIG. 16 is a block diagram showing the configuration of an optimization adjusting apparatus according to a fourth embodiment of the present invention.
Figure 19:
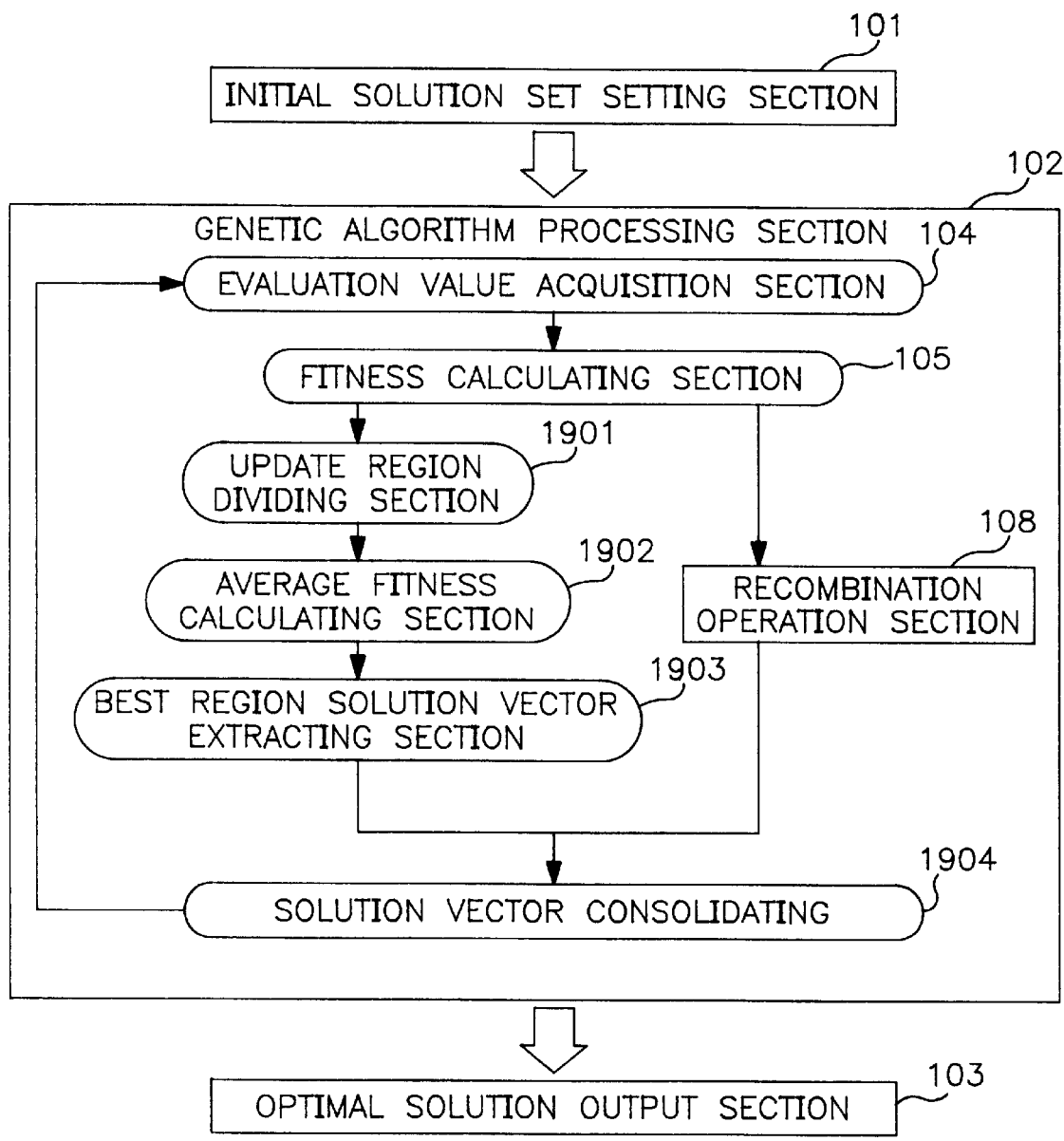
FIG. 19 is a block diagram showing the configuration of an optimization adjusting apparatus according to a fifth embodiment of the present invention.
Figure 22:
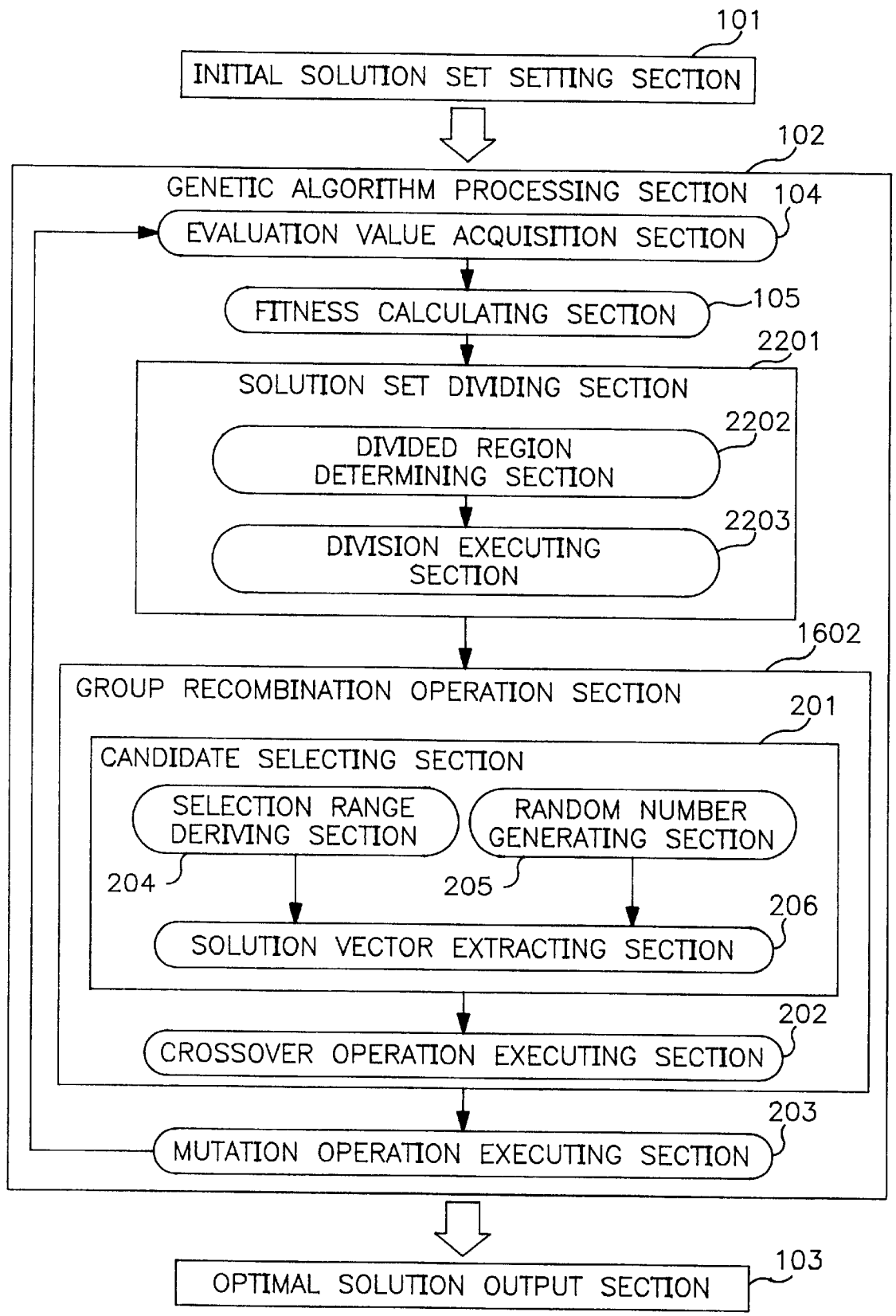
FIG. 22 is a block diagram showing the configuration of an optimization adjusting apparatus according to a sixth embodiment of the present invention.
Figure 25:
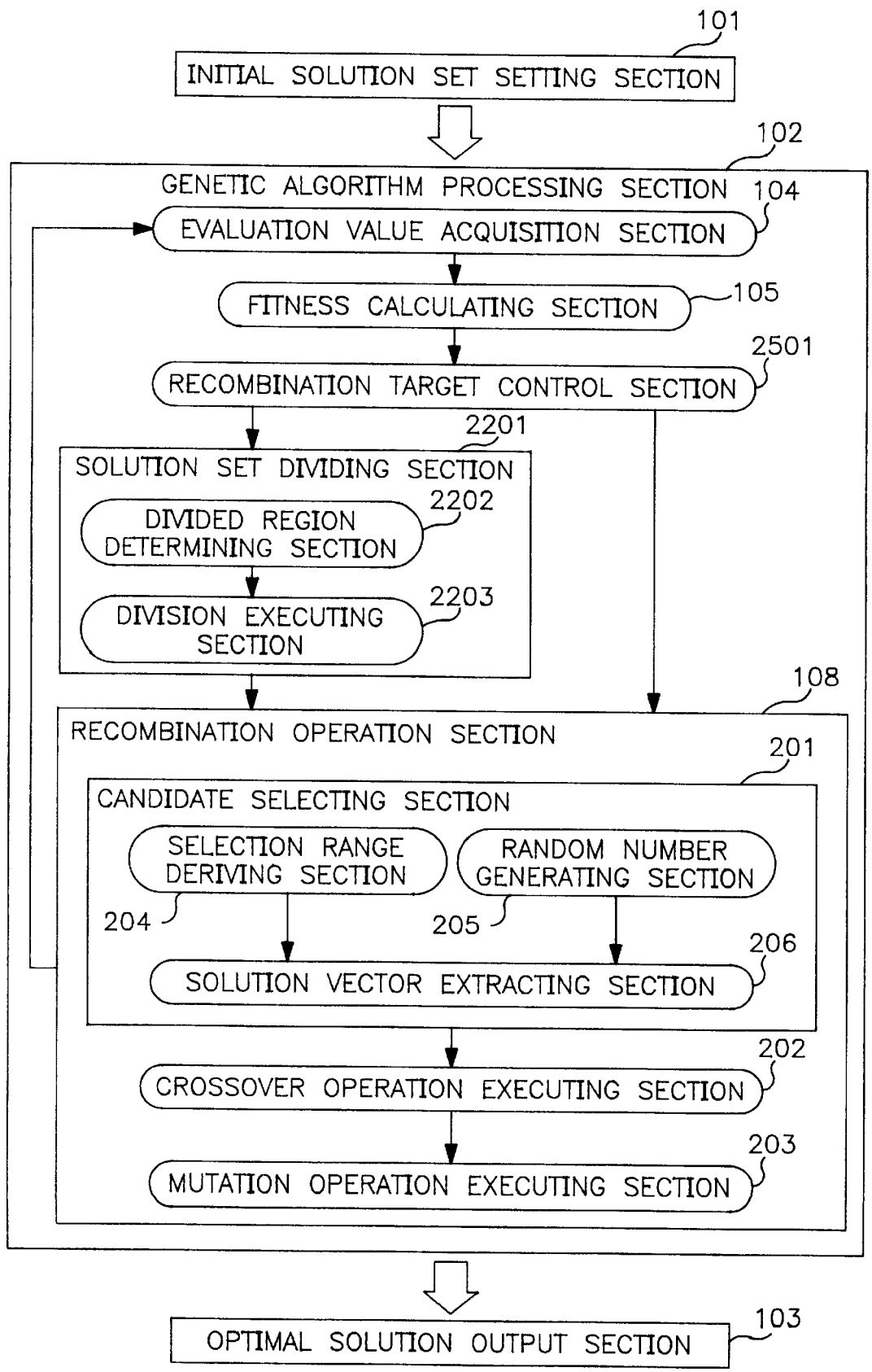
FIG. 25 is a block diagram showing the configuration of an optimization adjusting apparatus according to a seventh embodiment of the present invention.
Figure 28:
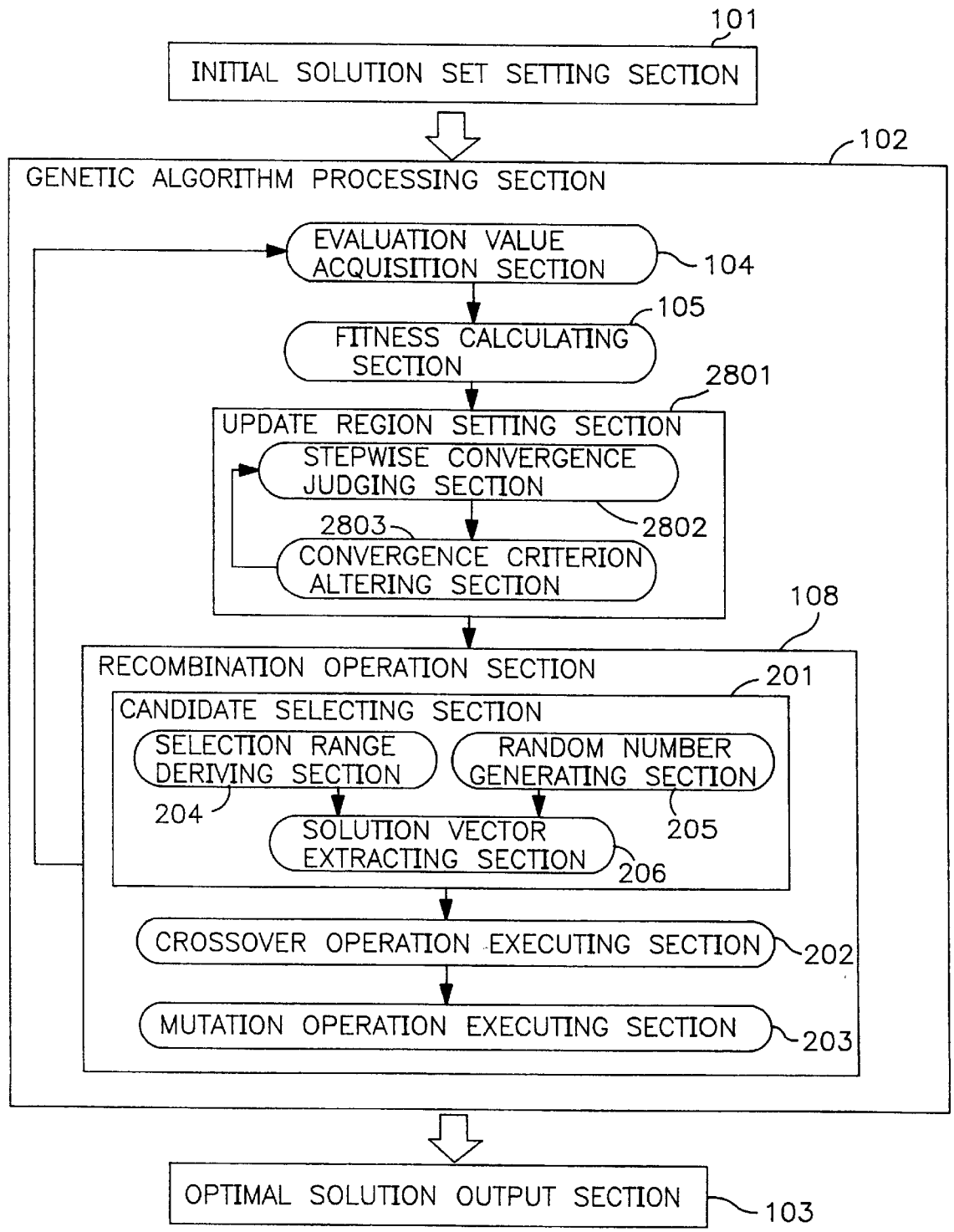
FIG. 28 is a block diagram showing the configuration of an optimization adjusting apparatus according to an eighth embodiment of the present invention.
Figure 32:
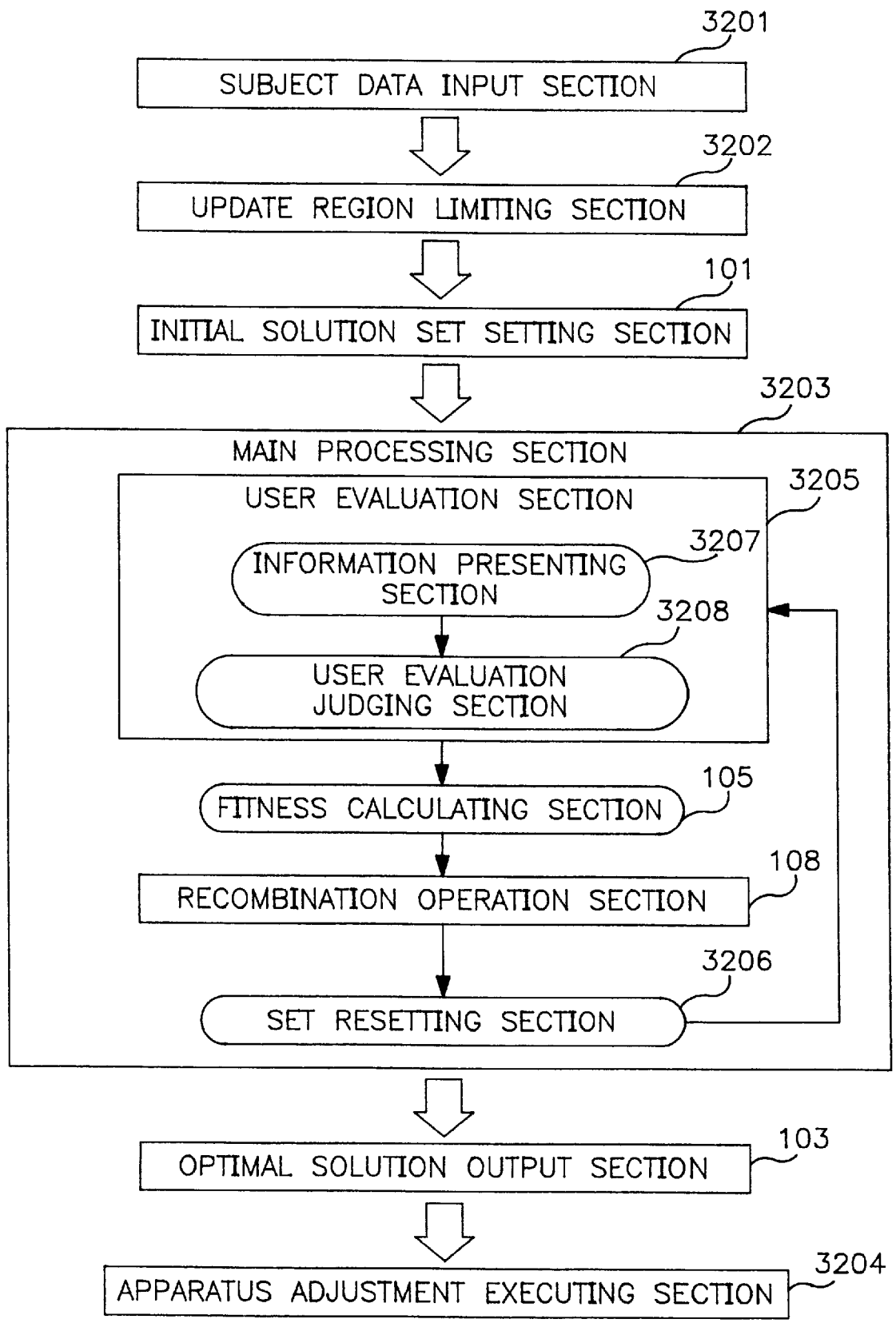
FIG. 32 is a block diagram showing the configuration of an optimization adjusting apparatus according to a ninth embodiment of the present invention.
Figure 34:
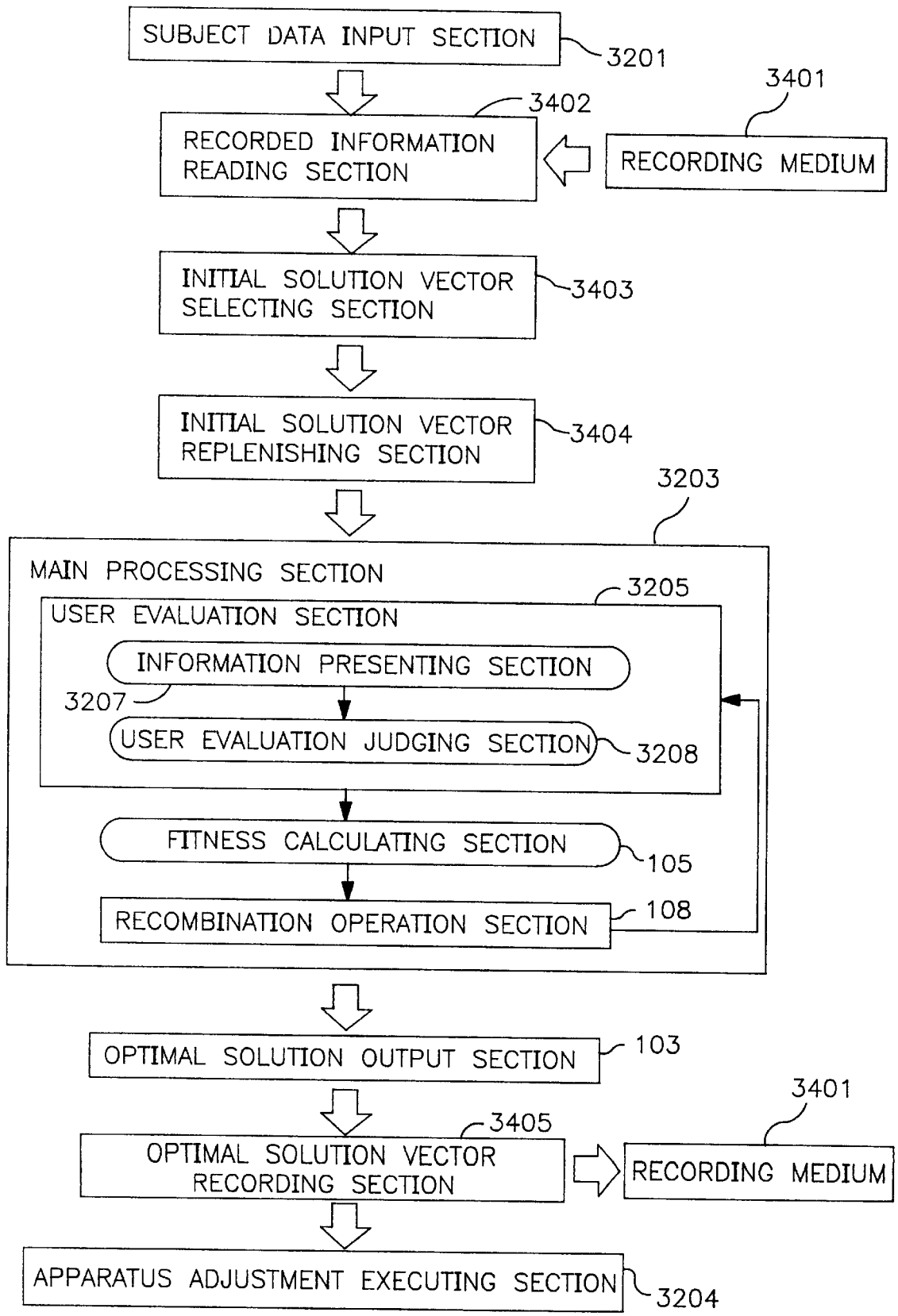
FIG. 34 is a block diagram showing the configuration of an optimization adjusting apparatus according to a 10th embodiment of the present invention.
Figure 36:
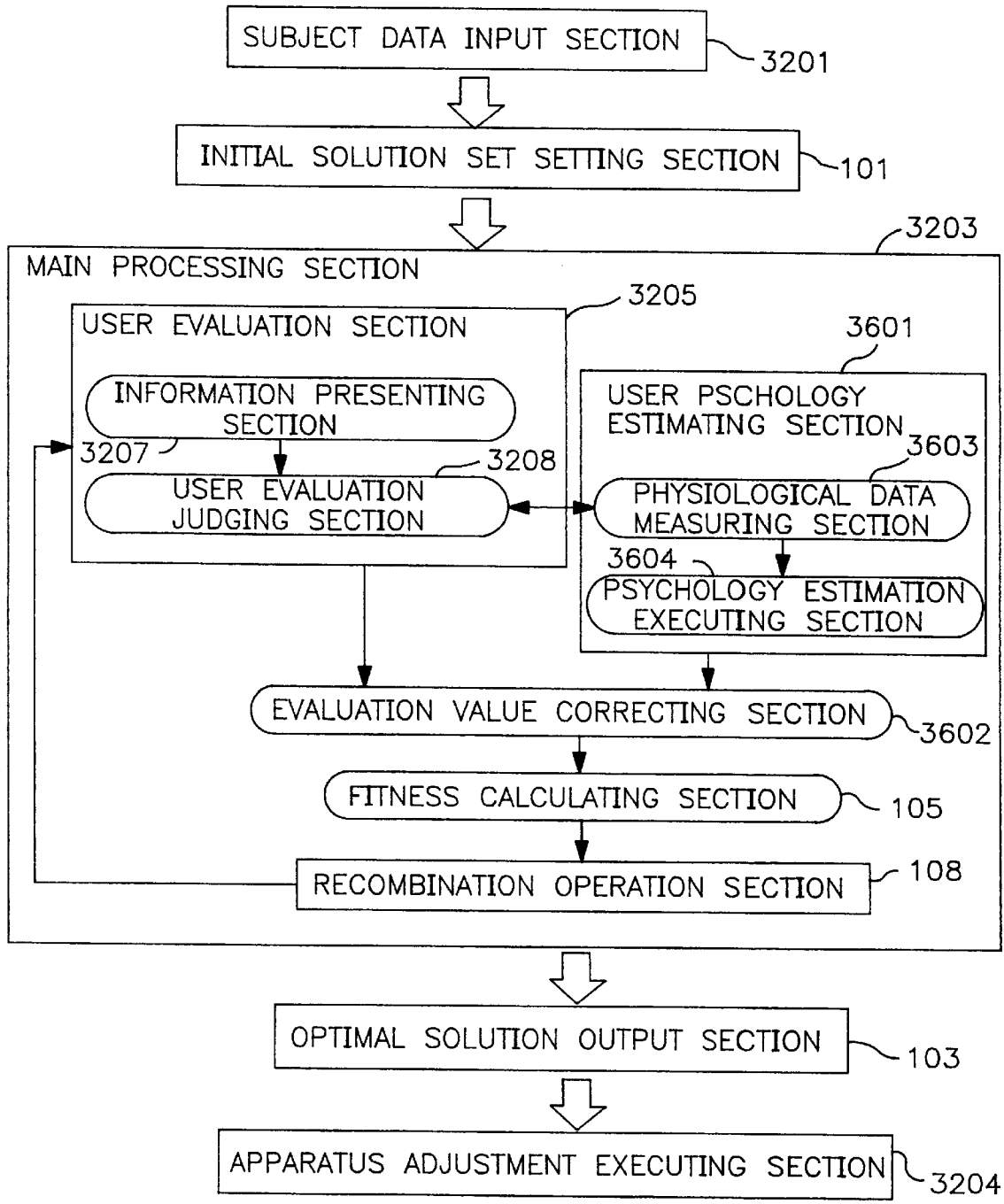
FIG. 36 is a block diagram showing the configuration of an optimization adjusting apparatus according to an 11th embodiment of the present invention.
Figure 38:
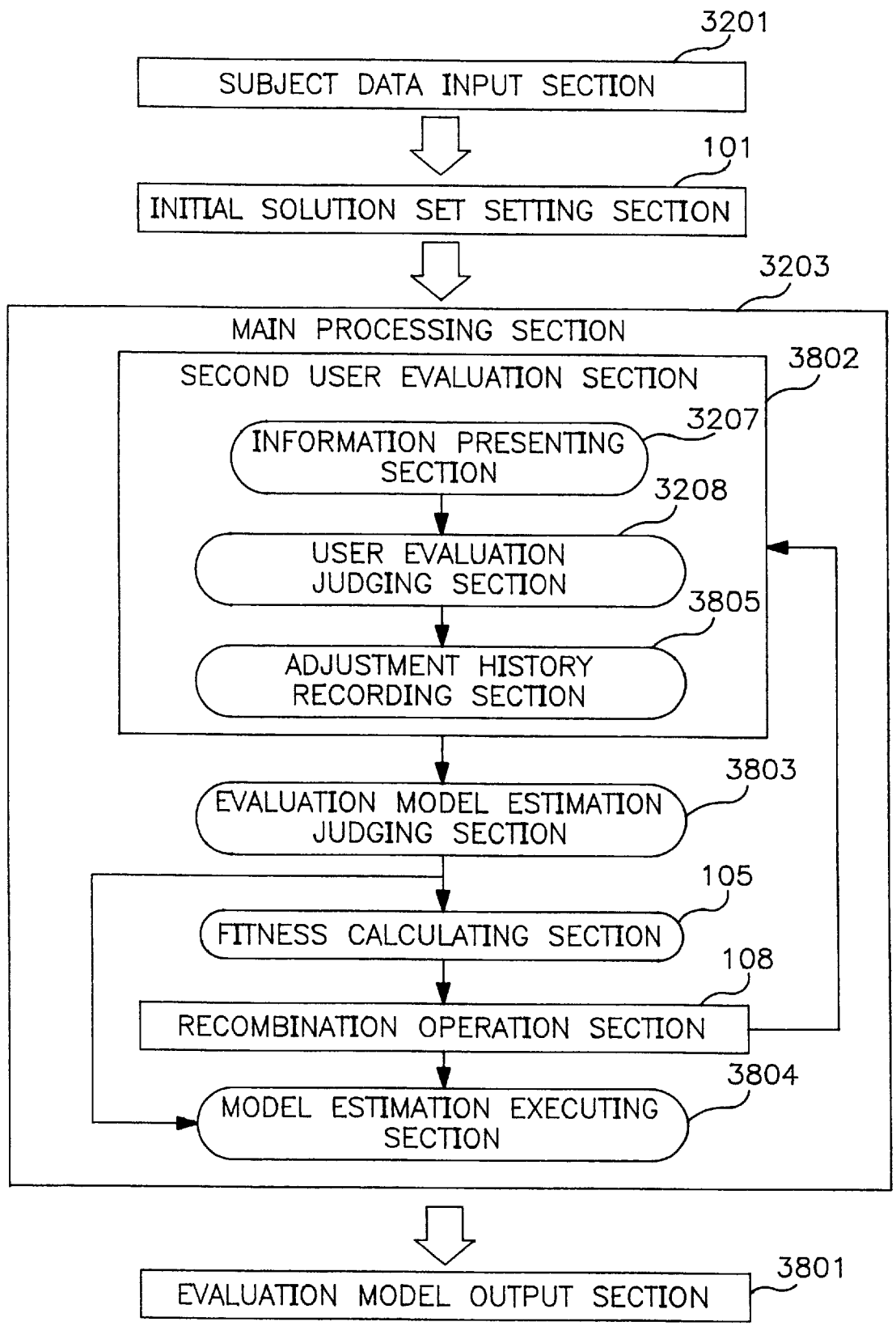
FIG. 38 is a block diagram showing the configuration of an optimization adjusting apparatus according to a 12th embodiment of the present invention.
Figure 40:
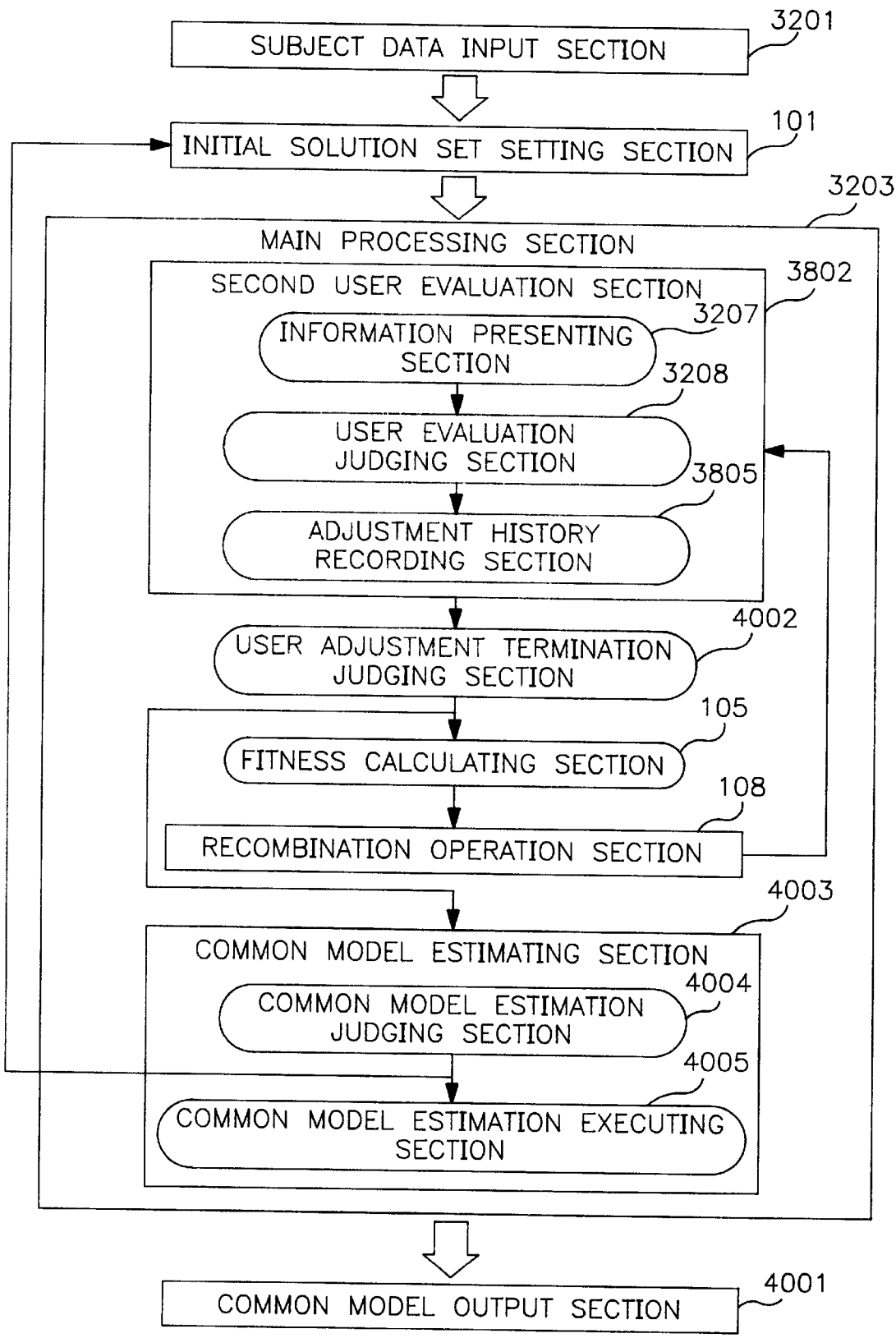
FIG. 40 is a block diagram showing the configuration of an optimization adjusting apparatus according to a 13th embodiment of the present invention.
Figure 43:
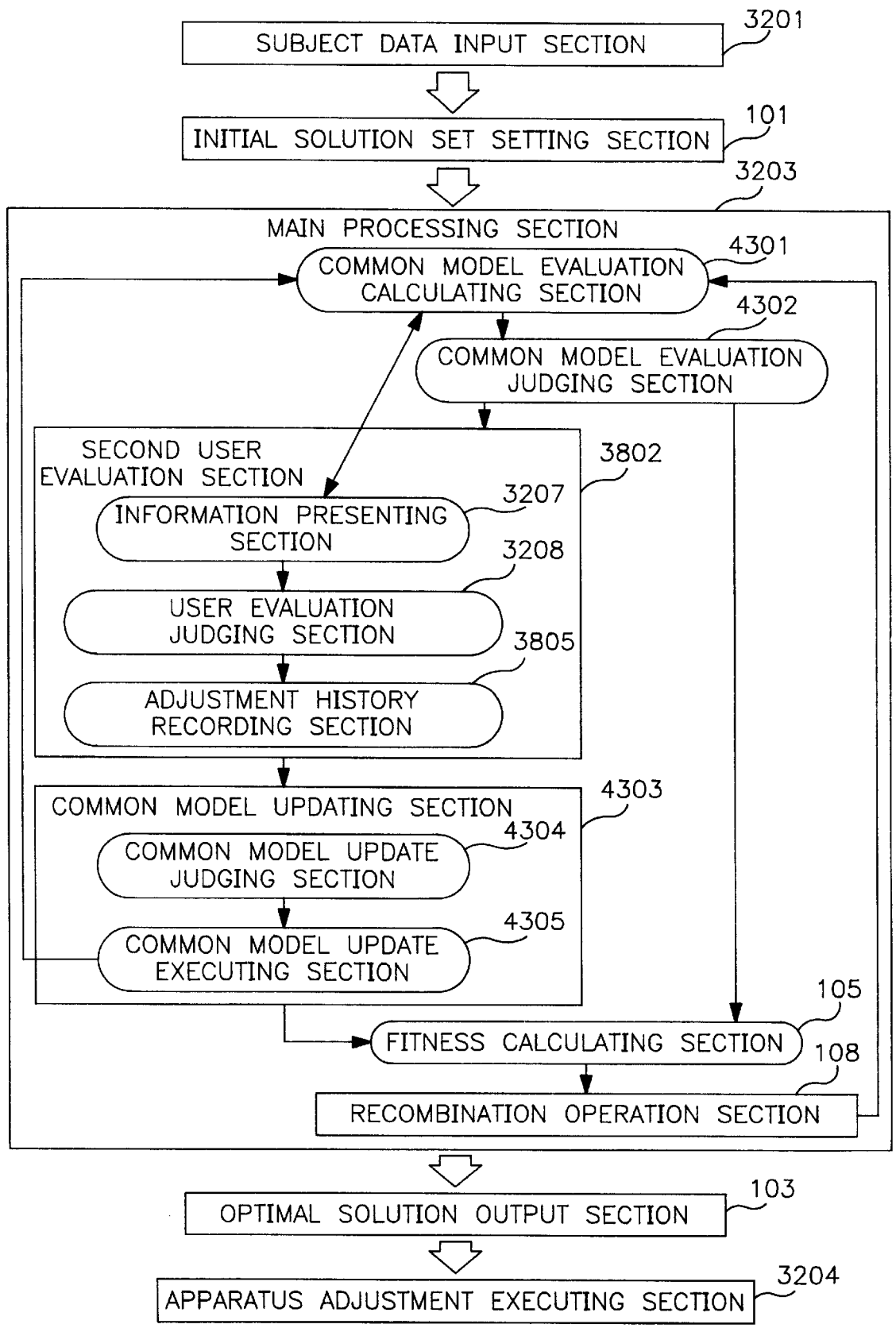
FIG. 43 is a block diagram showing the configuration of an optimization adjusting apparatus according to a 14th embodiment of the present invention.
Figure 46:
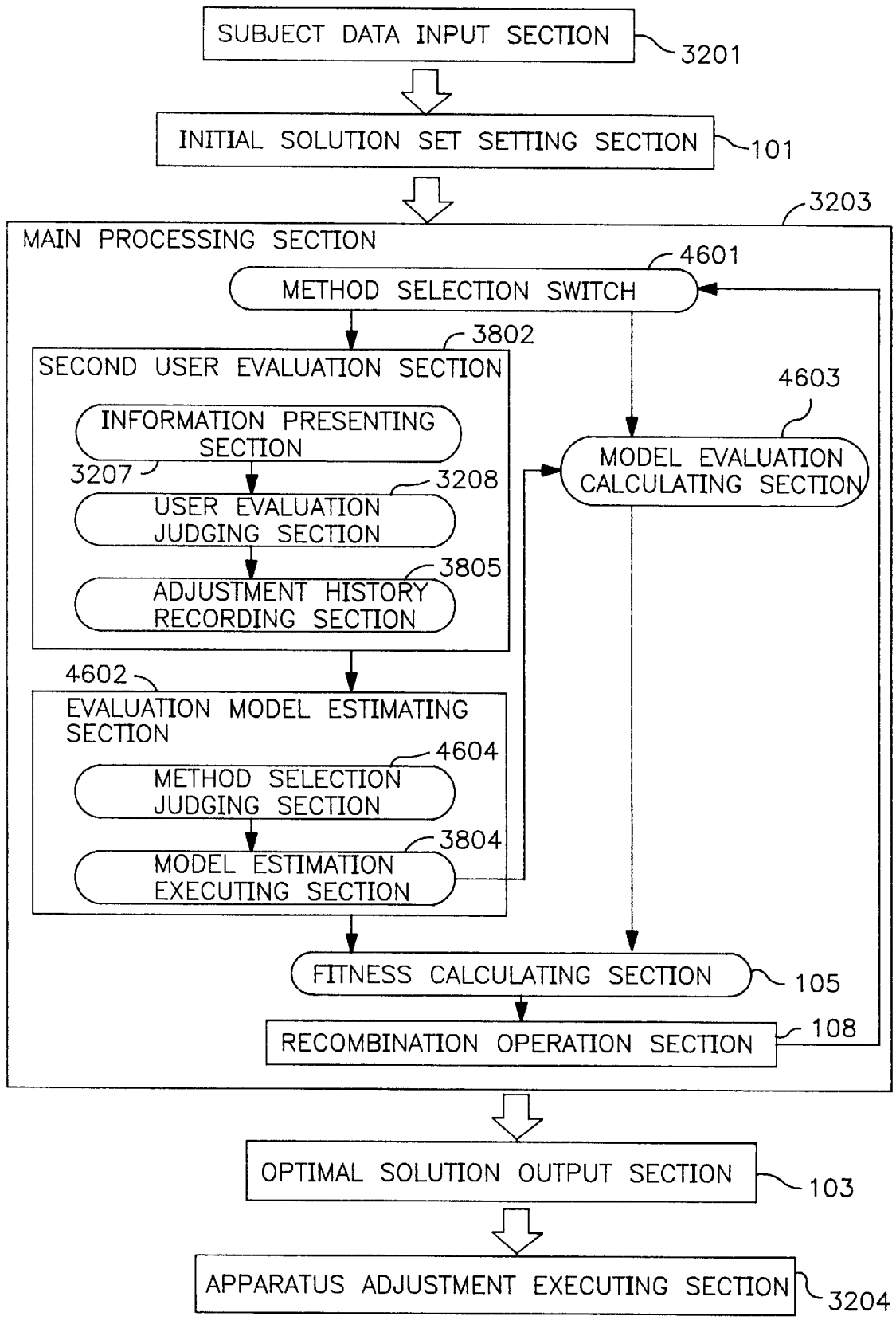
FIG. 46 is a block diagram showing the configuration of an optimization adjusting apparatus according to a 15th embodiment of the present invention.
Figure 49:
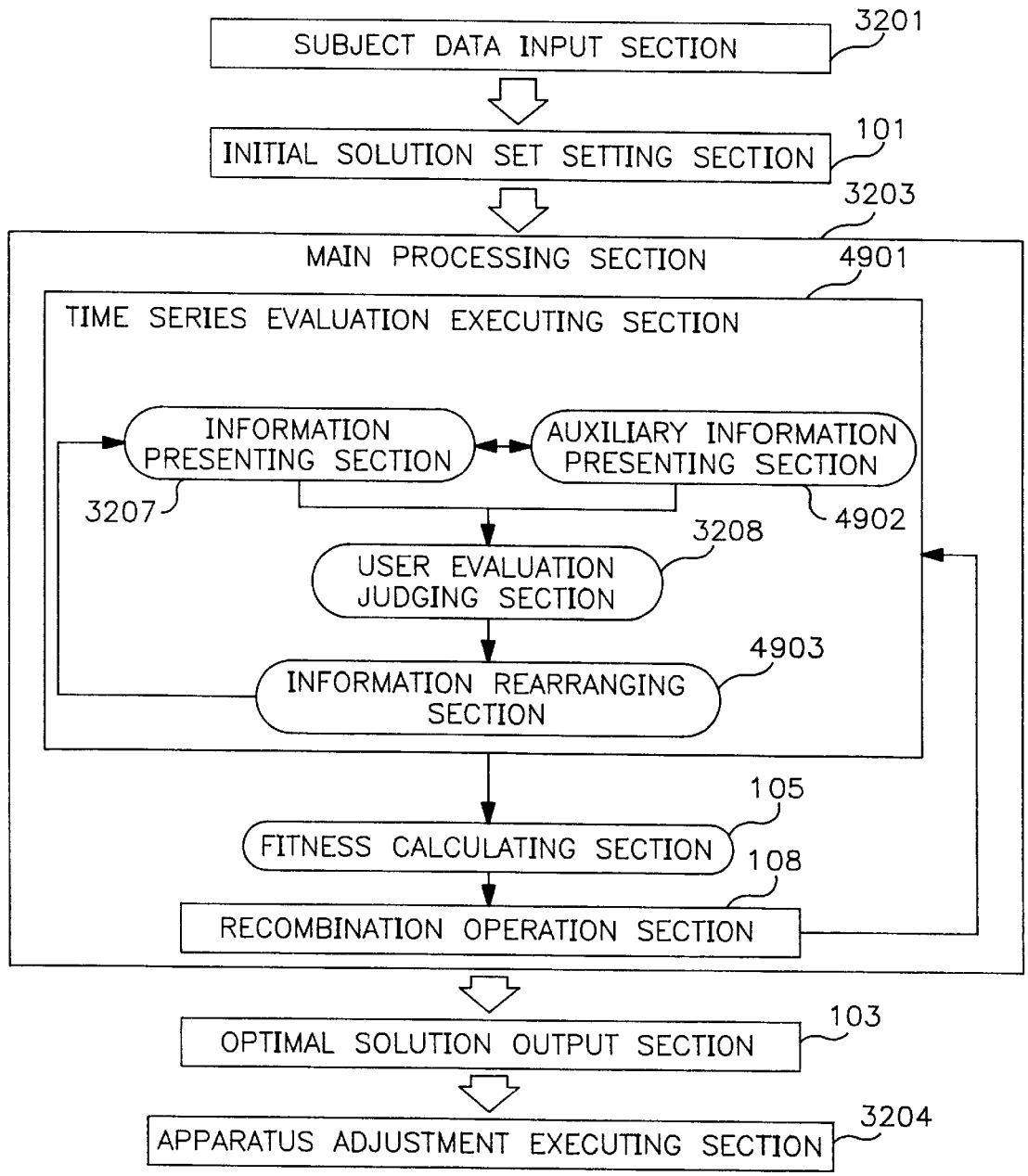
FIG. 49 is a block diagram showing the configuration of an optimization adjusting apparatus according to a 16th embodiment of the present invention.
Figure 51:
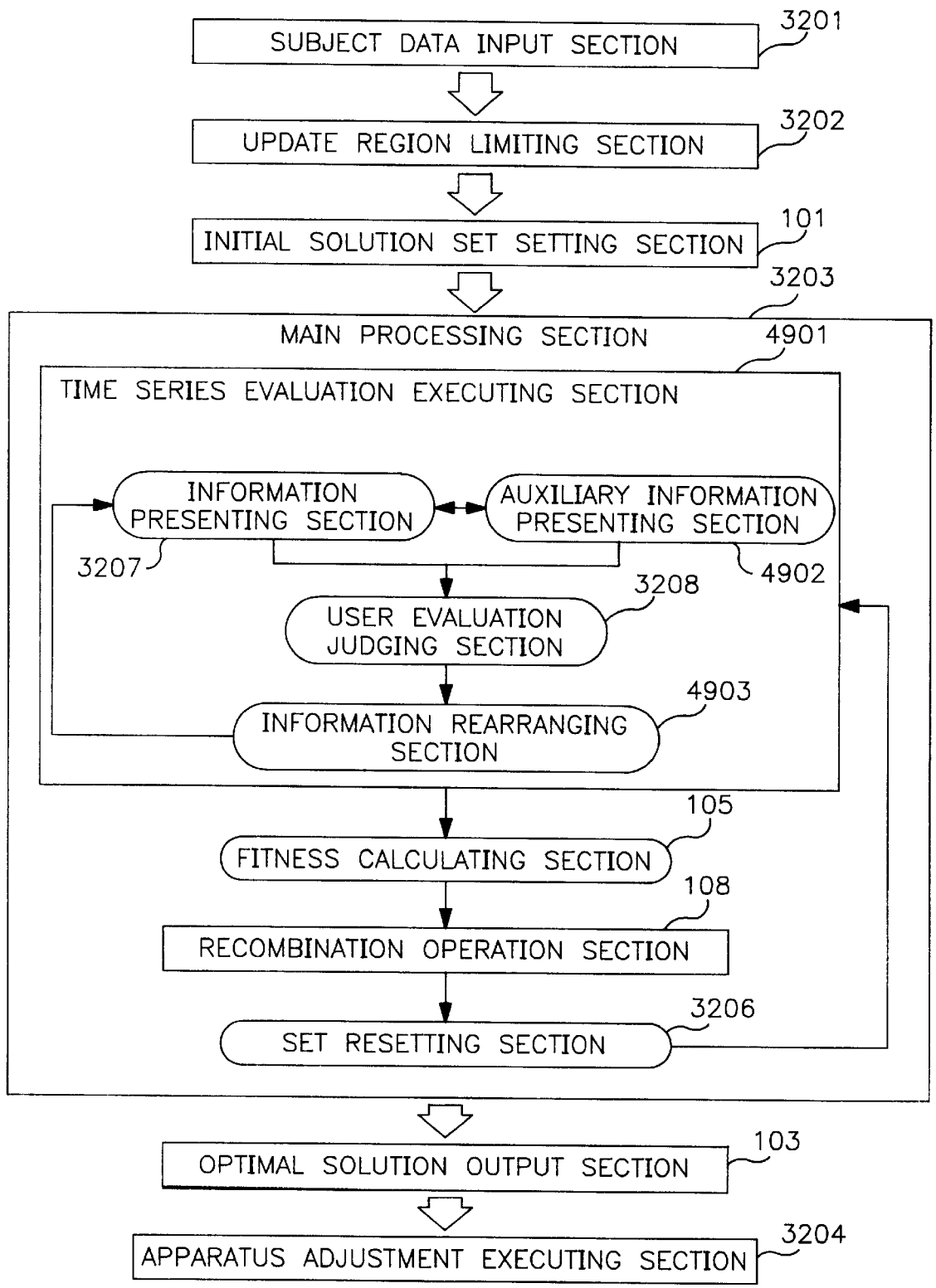
FIG. 51 is a block diagram showing the configuration of an optimization adjusting apparatus according to a 17th embodiment of the present invention.
Figure 53:
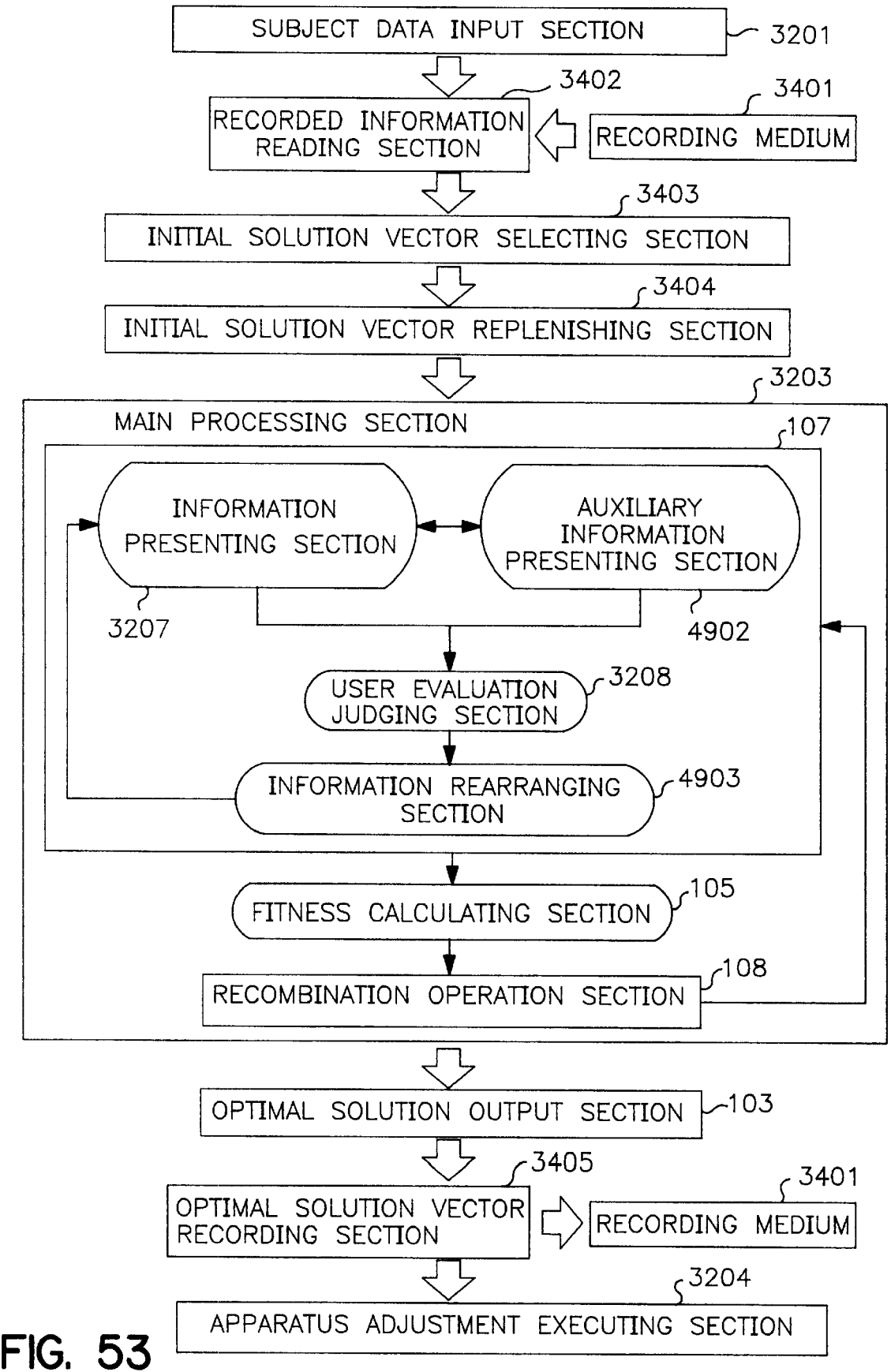
FIG. 53 is a block diagram showing the configuration of an optimization adjusting apparatus according to an 18th embodiment of the present invention.
Figure 55:
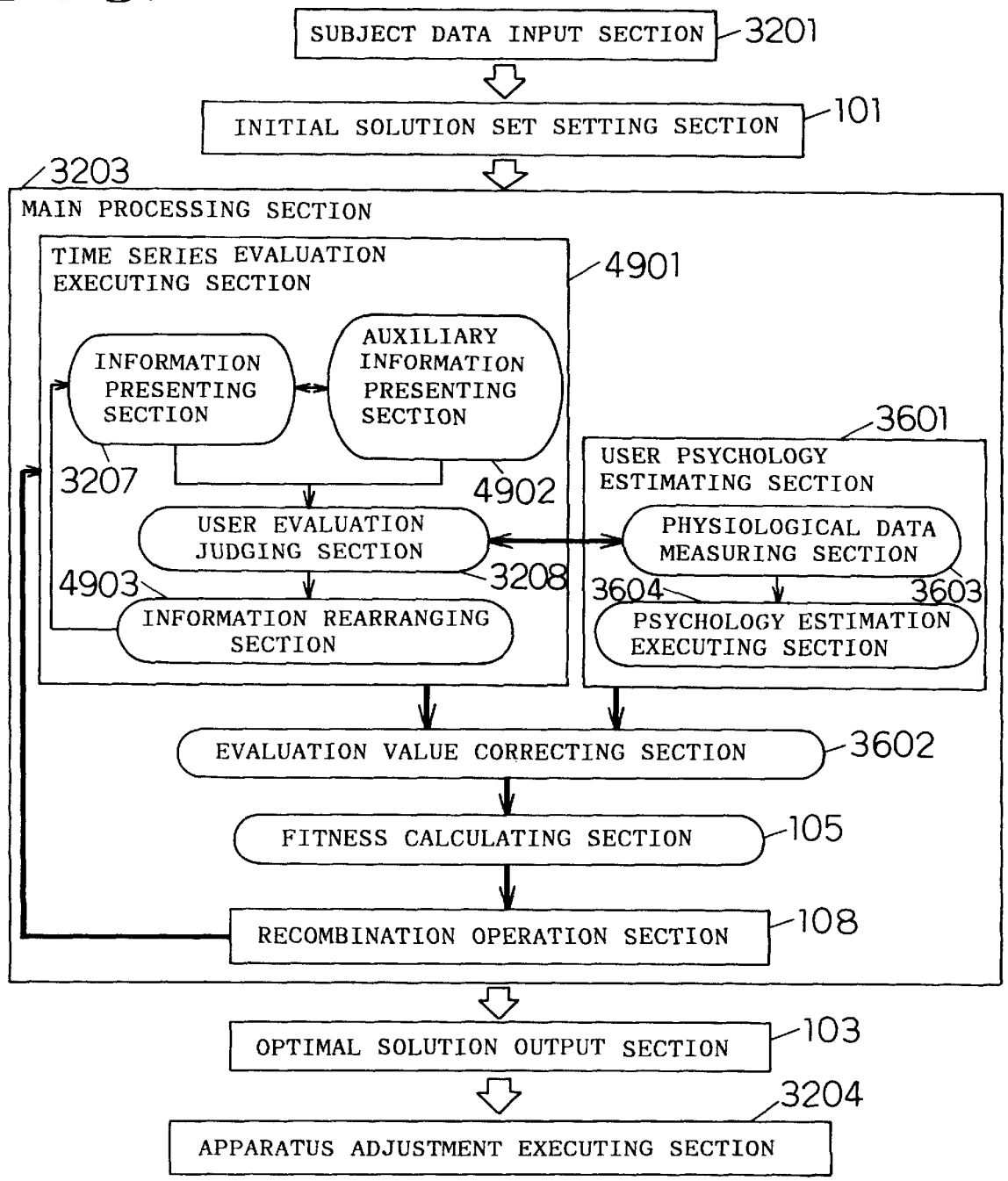
FIG. 55 is a block diagram showing the configuration of an optimization adjusting apparatus according to a 19th embodiment of the present invention.
Figure 57:
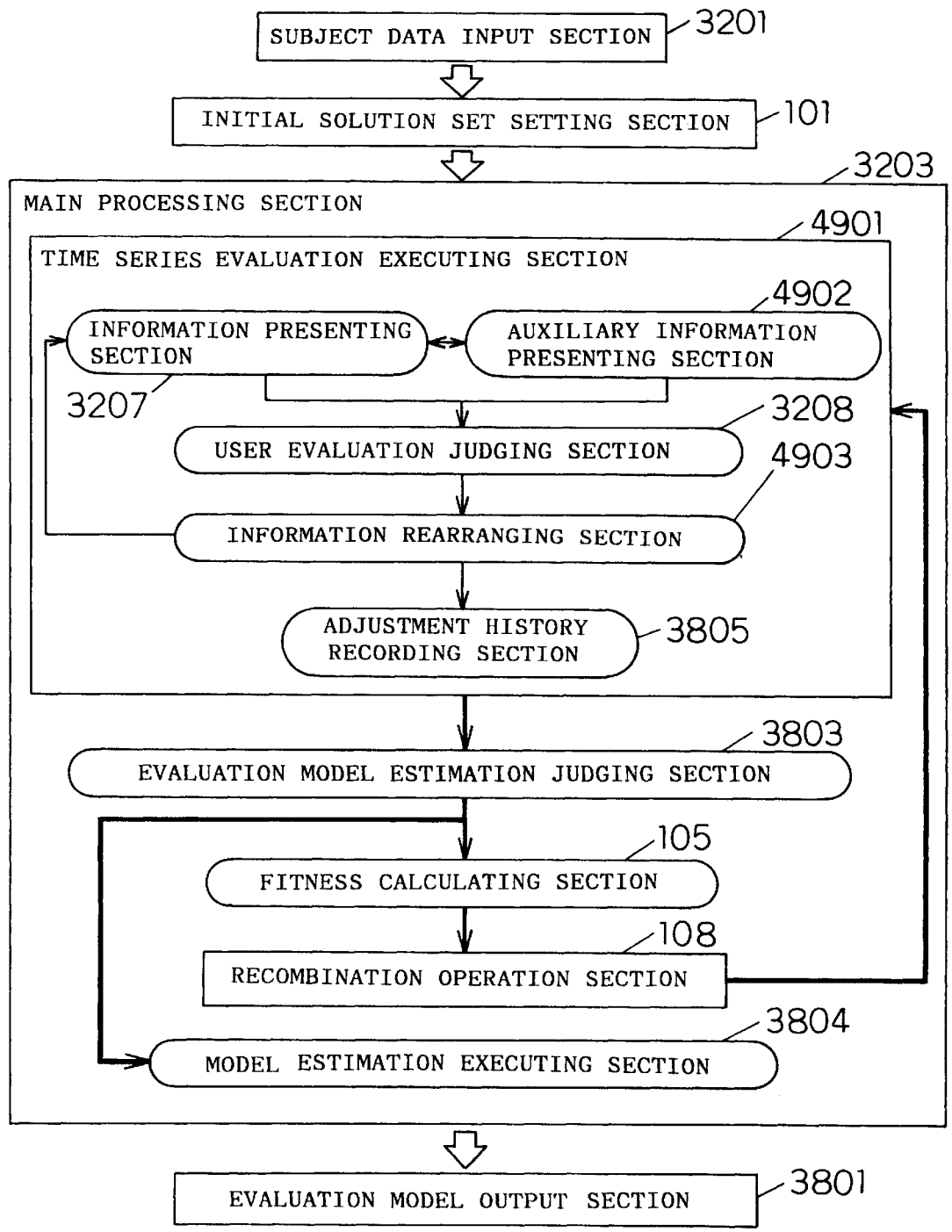
FIG. 57 is a block diagram showing the configuration of an optimization adjusting apparatus according to a 20th embodiment of the present invention.
Figure 59:
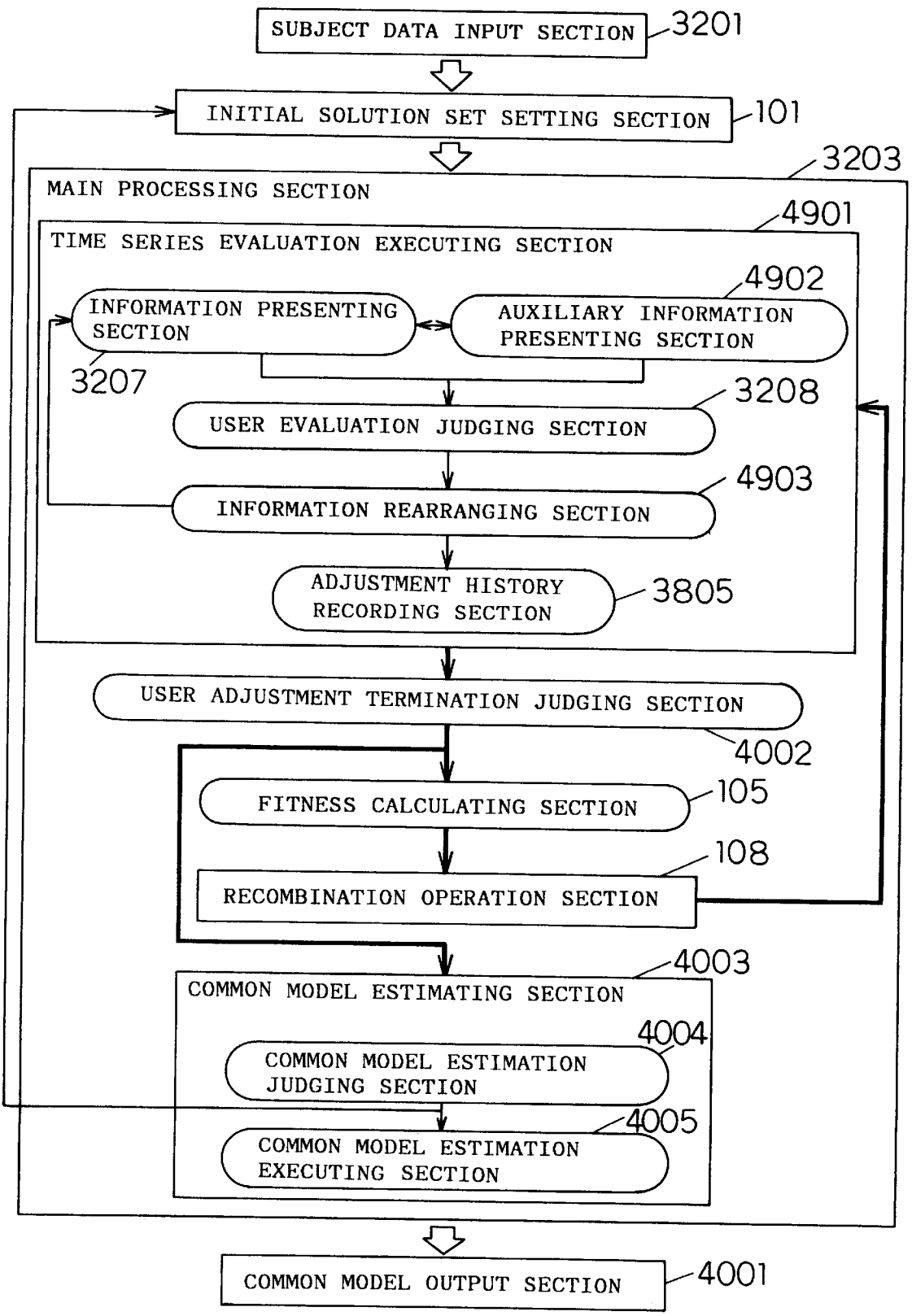
FIG. 59 is a block diagram showing the configuration of an optimization adjusting apparatus according to a 21st embodiment of the present invention.
Figure 62:
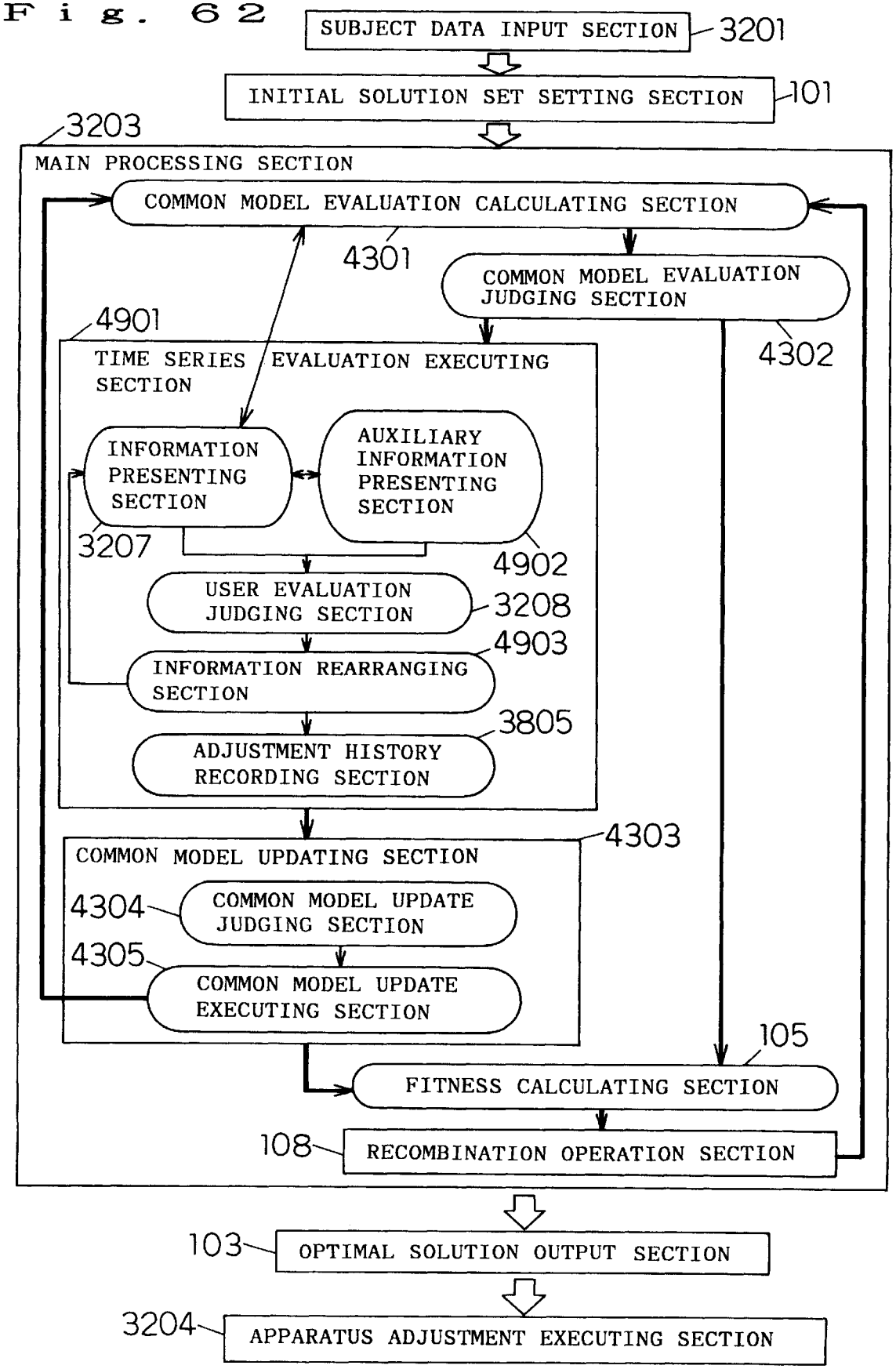
FIG. 62 is a block diagram showing the configuration of an optimization adjusting apparatus according to a 22nd embodiment of the present invention.
Figure 65:
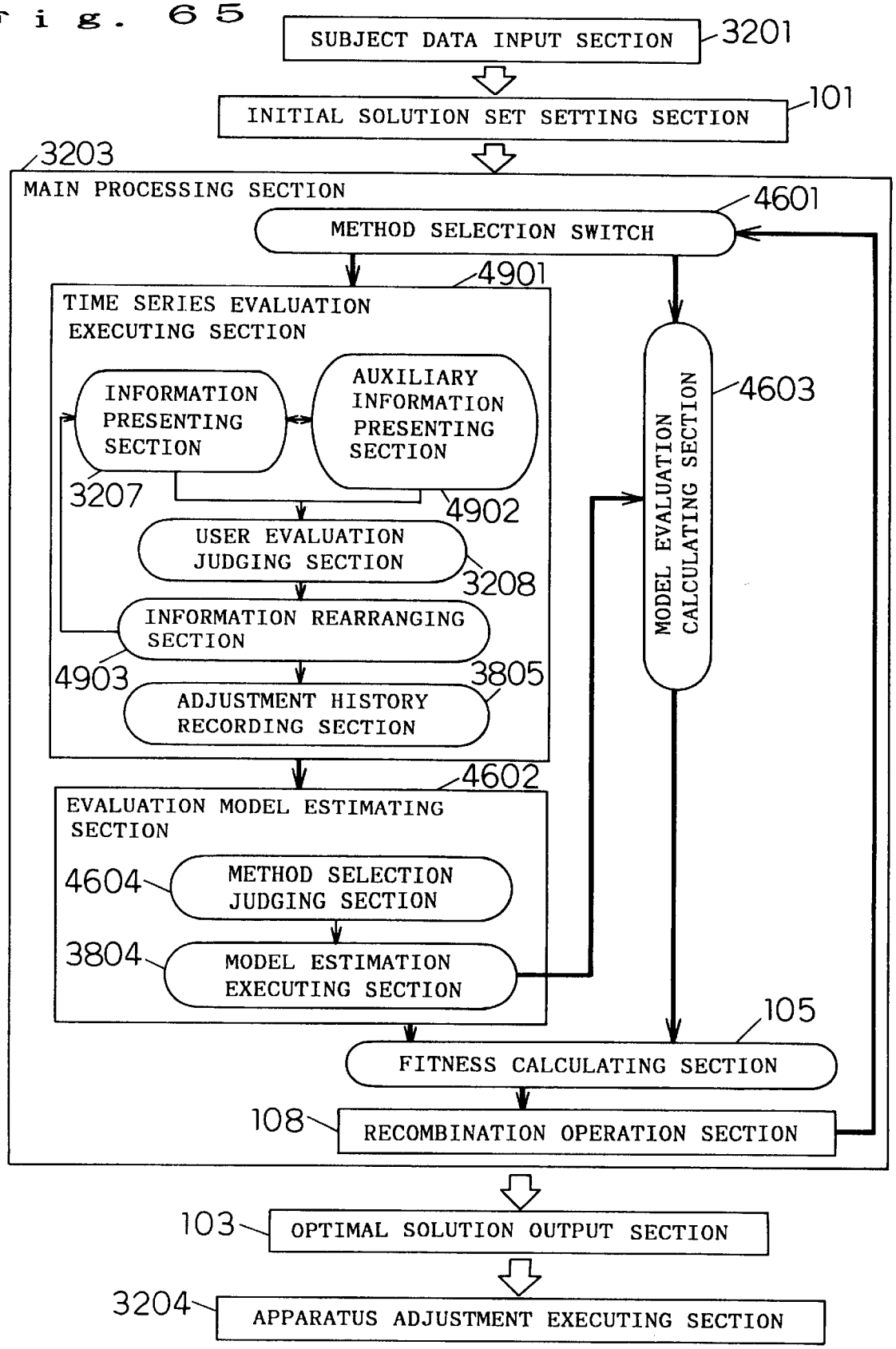
FIG. 65 is a block diagram showing the configuration of an optimization adjusting apparatus according to a 23rd embodiment of the present invention.

The preferred embodiments of the present invention will now be described below with reference to the accompanying drawings. FIG. 1 is a block diagram of an optimization adjusting apparatus according to a first embodiment of the present invention; FIG. 2 is a block diagram of a recombination operation section which forms an essential portion of the optimization adjusting apparatus according to the first embodiment of the present invention; FIG. 10 is a block diagram of an optimization adjusting apparatus according to a second embodiment of the present invention; FIG. 13 is a block diagram of an optimization adjusting apparatus according to a third embodiment of the present invention; FIG. 16 is a block diagram of an optimization adjusting apparatus according to a fourth embodiment of the present invention; FIG. 19 is a block diagram of an optimization adjusting apparatus according to a fifth embodiment of the present invention; FIG. 22 is a block diagram of an optimization adjusting apparatus according to a sixth embodiment of the present invention; FIG. 25 is a block diagram of an optimization adjusting apparatus according to a seventh embodiment of the present invention; FIG. 28 is a block diagram of an optimization adjusting apparatus according to an eighth embodiment of the present invention; FIG. 32 is a block diagram of an optimization adjusting apparatus according to a ninth embodiment of the present invention; FIG. 34 is a block diagram of an optimization adjusting apparatus according to a 10th embodiment of the present invention; FIG. 36 is a block diagram of an optimization adjusting apparatus according to an 11th embodiment of the present invention; FIG. 38 is a block diagram of an optimization adjusting apparatus according to a 12th embodiment of the present invention; FIG. 40 is a block diagram of an optimization adjusting apparatus according to a 13th embodiment of the present invention; FIG. 43 is a block diagram of an optimization adjusting apparatus according to a 14th embodiment of the present invention; FIG. 46 is a block diagram of an optimization adjusting apparatus according to a 15th embodiment of the present invention; FIG. 49 is a block diagram of an optimization adjusting apparatus according to a 16th embodiment of the present invention; FIG. 51 is a block diagram of an optimization adjusting apparatus according to a 17th embodiment of the present invention; FIG. 53 is a block diagram of an optimization adjusting apparatus according to an 18th embodiment of the present invention; FIG. 55 is a block diagram of an optimization adjusting apparatus according to a 19th embodiment of the present invention; FIG. 57 is a block diagram of an optimization adjusting apparatus according to a 20th embodiment of the present invention; FIG. 59 is a block diagram of an optimization adjusting apparatus according to a 21st embodiment of the present invention; FIG. 62 is a block diagram of an optimization adjusting apparatus according to a 22nd embodiment of the present invention; and FIG. 65 is a block diagram of an optimization adjusting apparatus according to a 23rd embodiment of the present invention.

Figure 3:
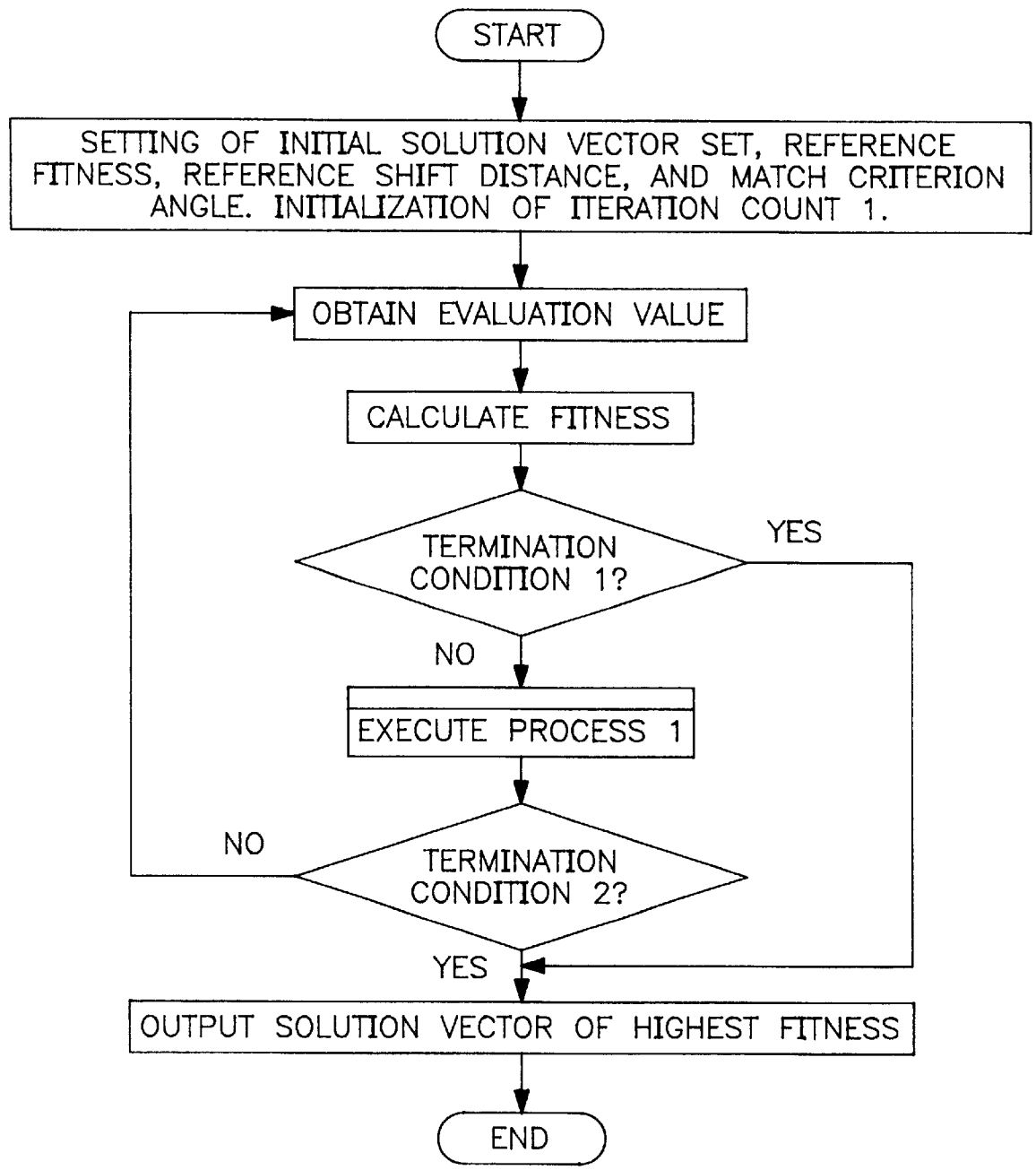
FIG. 3 is a flowchart illustrating an entire process sequence for an optimization adjusting method according to the first embodiment of the present invention.
Figure 5:
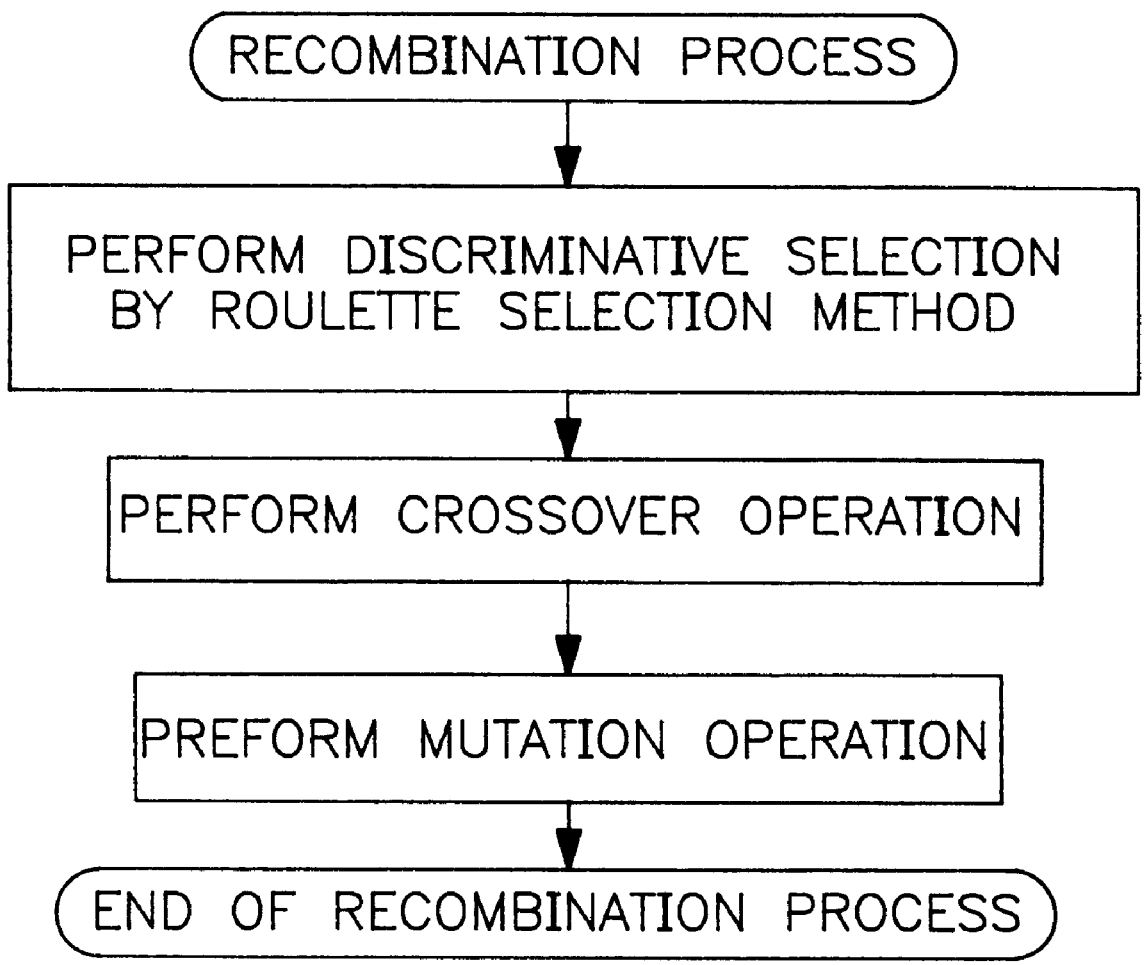
FIG. 5 is a flowchart illustrating a recombination operation process which is an essential process in the optimization adjusting method according to the first embodiment of the present invention.
Figure 11:
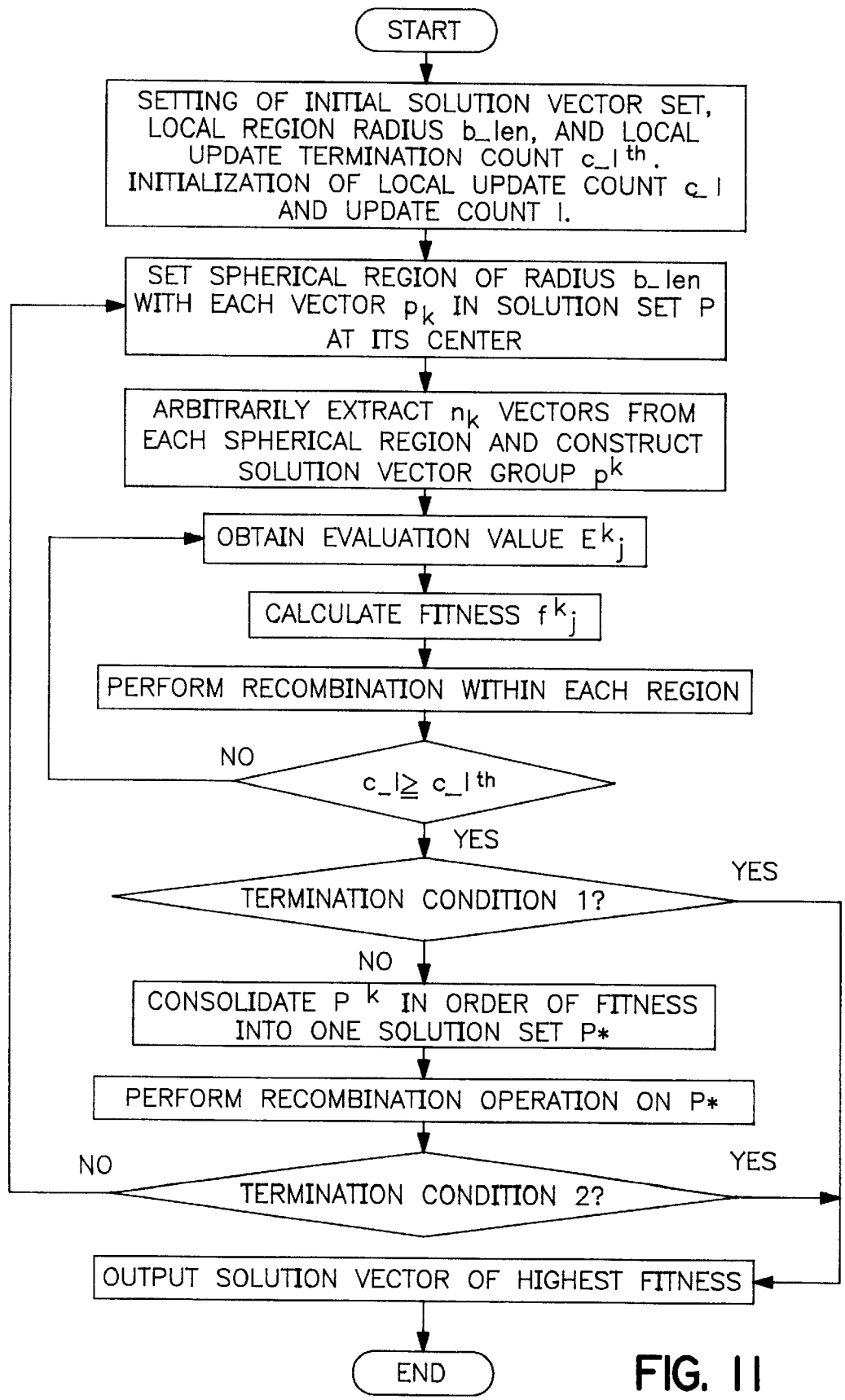
FIG. 11 is a flowchart illustrating a process sequence for an optimization adjusting method according to the second embodiment of the present invention.
Figure 14:
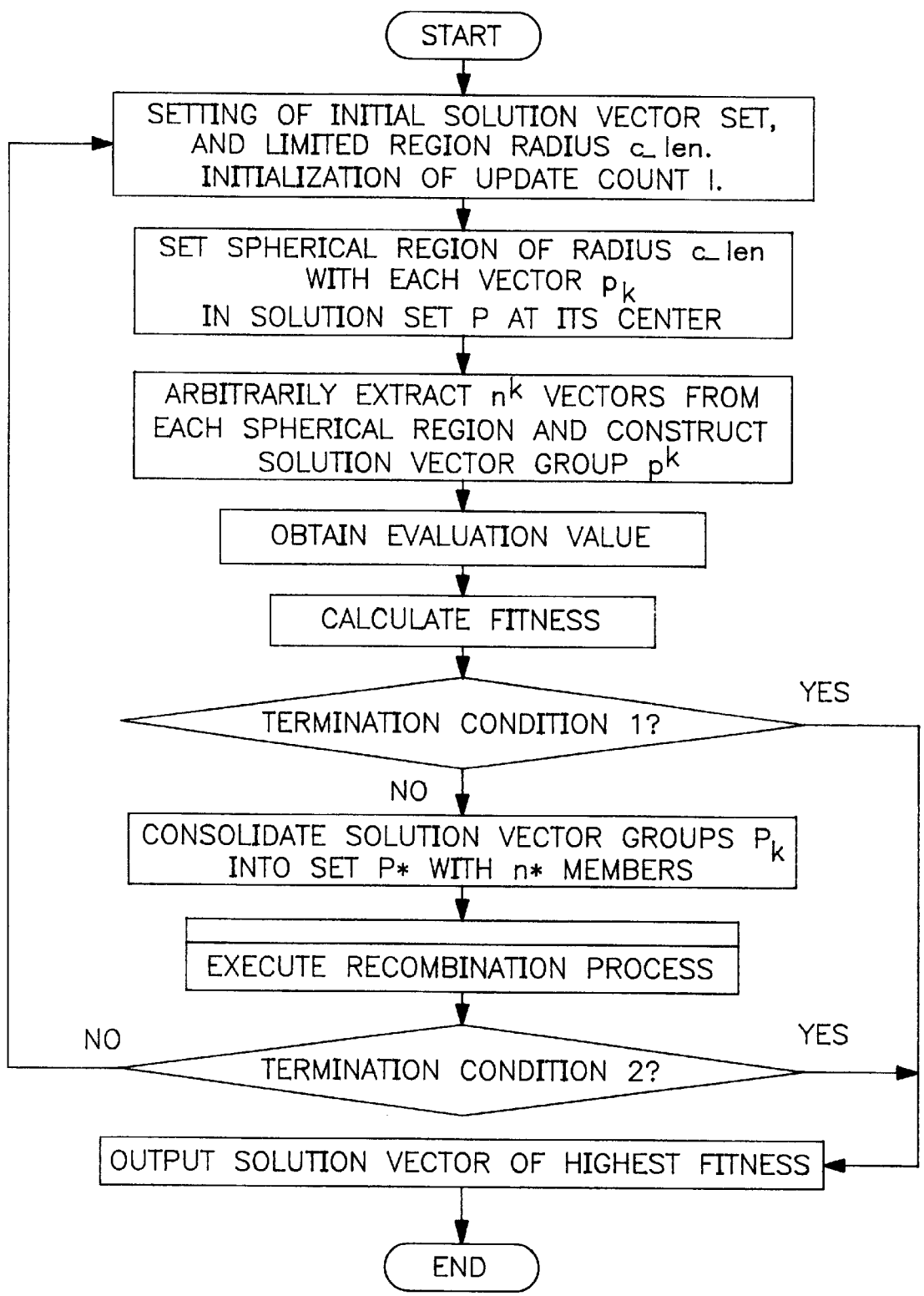
FIG. 14 is a flowchart illustrating a process sequence for an optimization adjusting method according to the third embodiment of the present invention.
Figure 17:
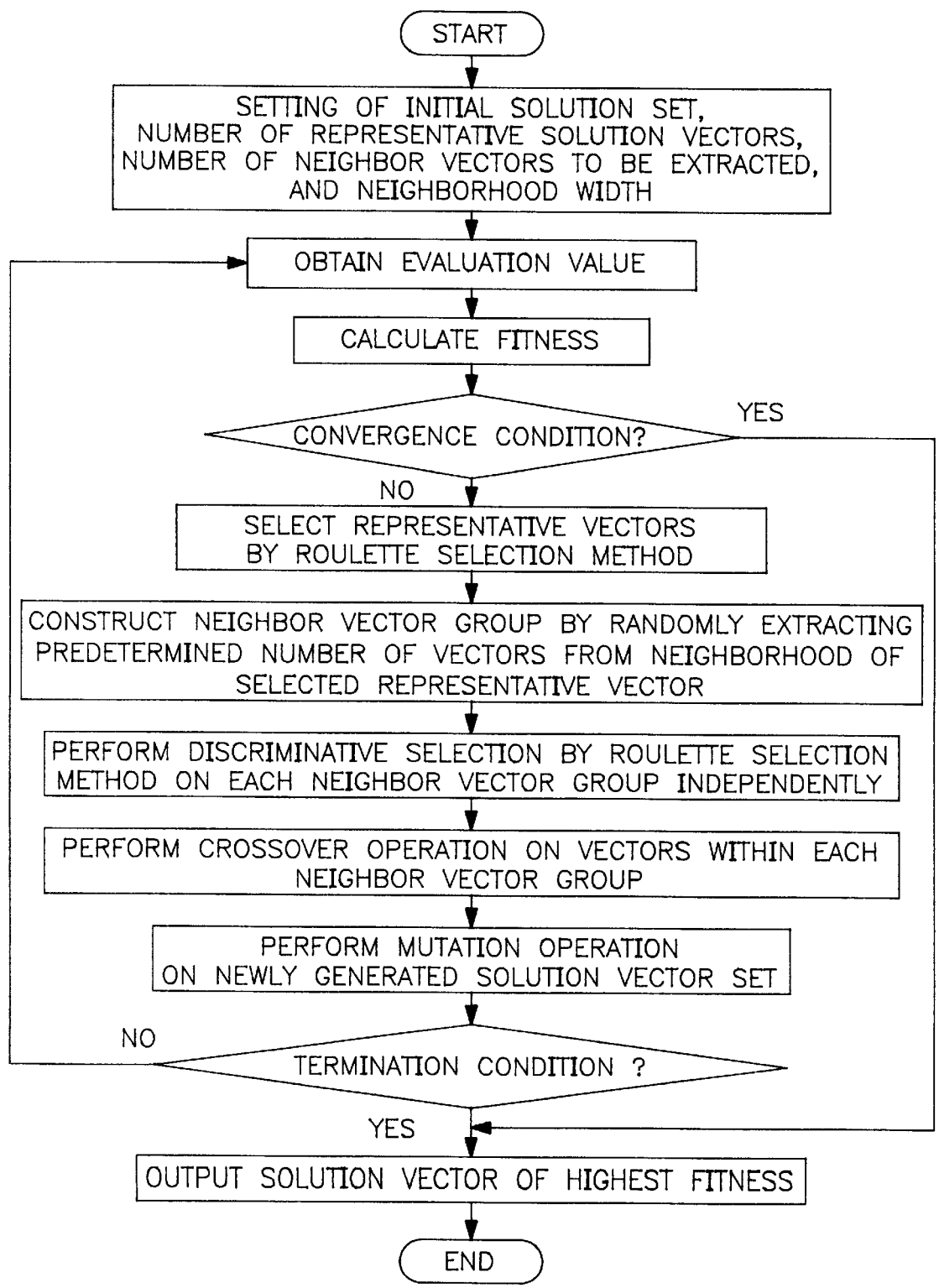
FIG. 17 is a flowchart illustrating a process sequence for an optimization adjusting method according to the fourth embodiment of the present invention.
Figure 20:
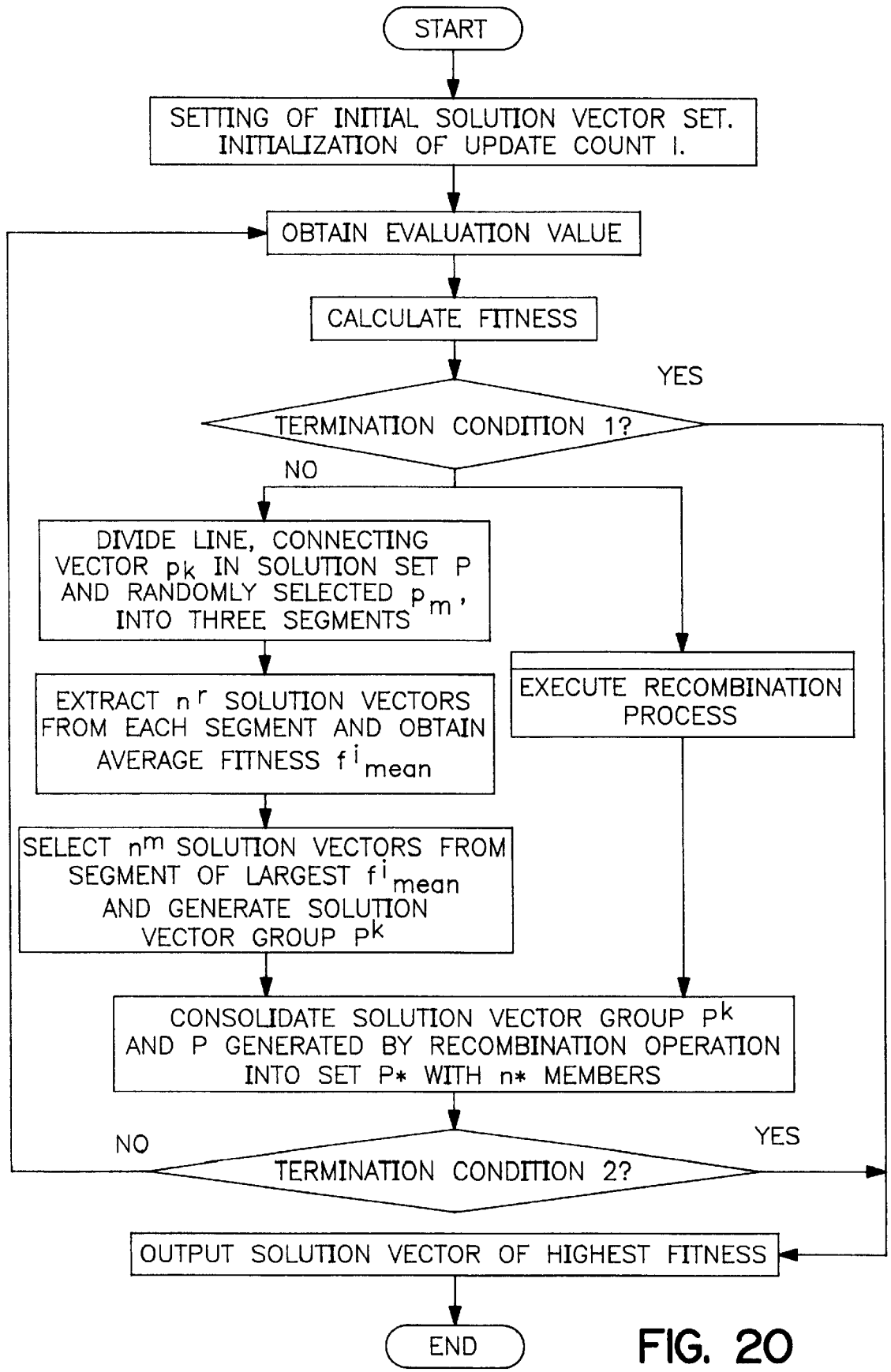
FIG. 20 is a flowchart illustrating a process sequence for an optimization adjusting method according to the fifth embodiment of the present invention.
Figure 23:
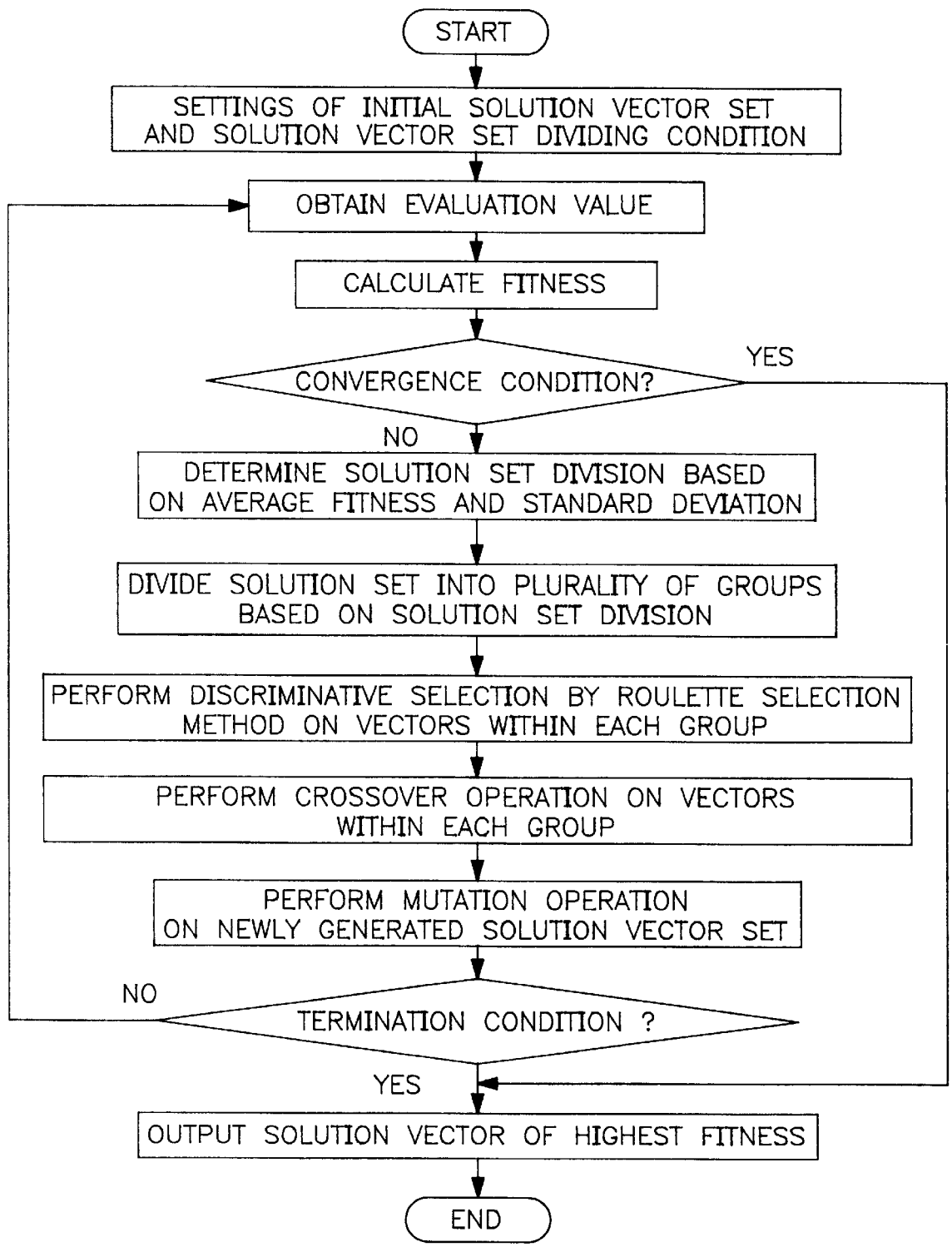
FIG. 23 is a flowchart illustrating a process sequence for an optimization adjusting method according to the sixth embodiment of the present invention.
Figure 26:
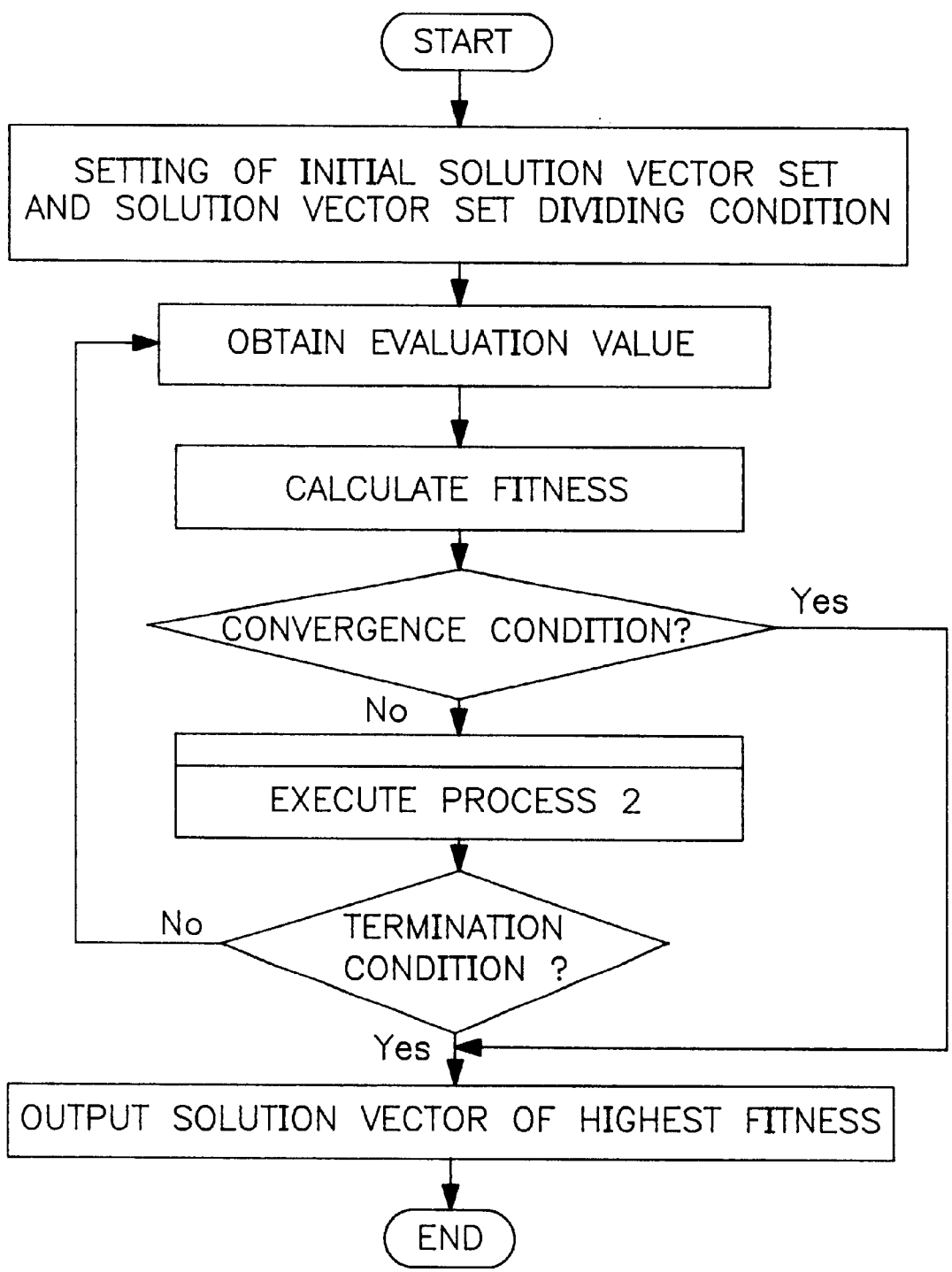
FIG. 26 is a flowchart illustrating an entire process sequence for an optimization adjusting method according to the seventh embodiment of the present invention.
Figure 27:
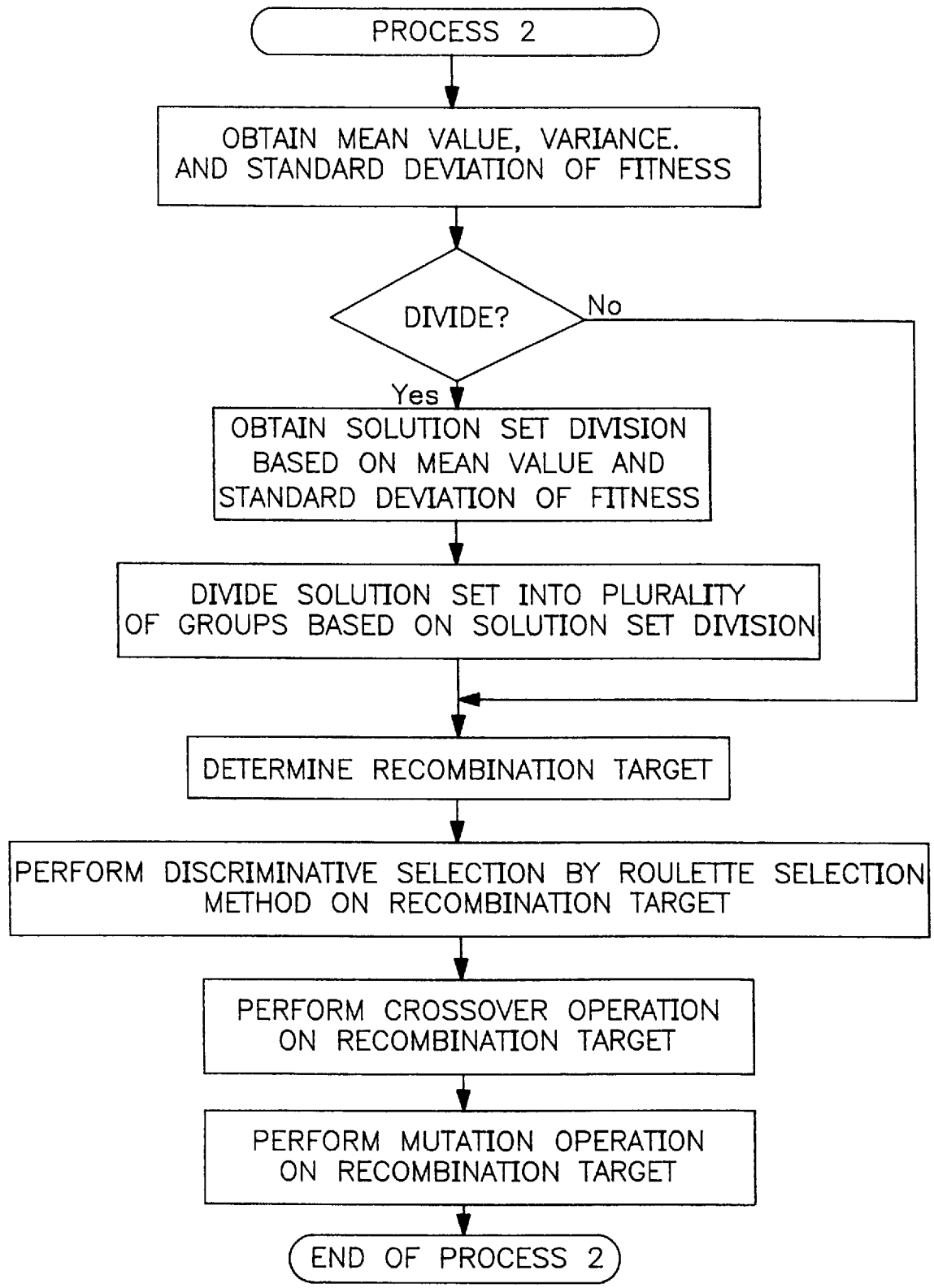
FIG. 27 is a flowchart illustrating the sequence of operations in process 2 in the optimization adjusting method according to the seventh embodiment of the present invention.
Figure 29:
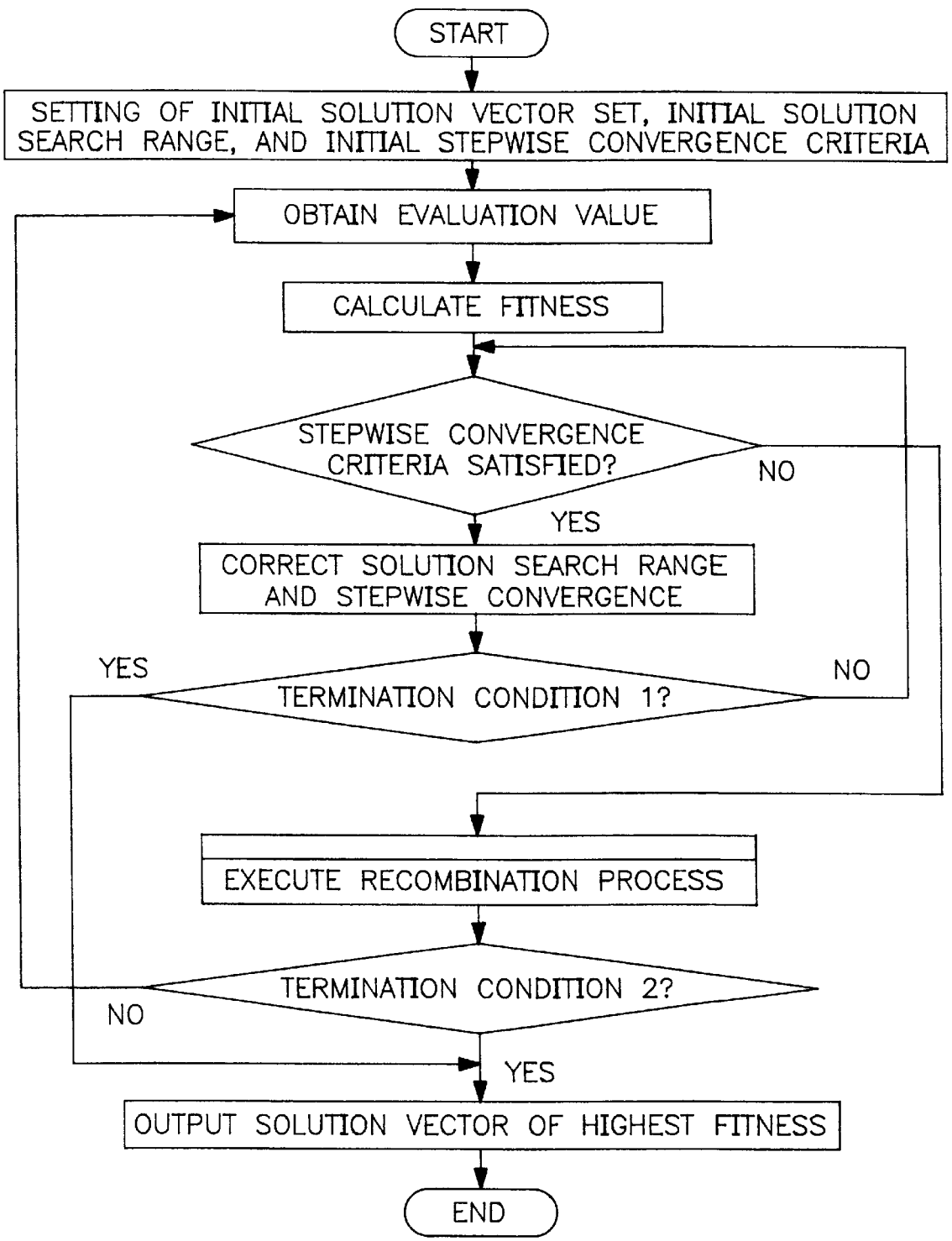
FIG. 29 is a flowchart illustrating a process sequence for an optimization adjusting method according to the eighth embodiment of the present invention.
Figure 33:
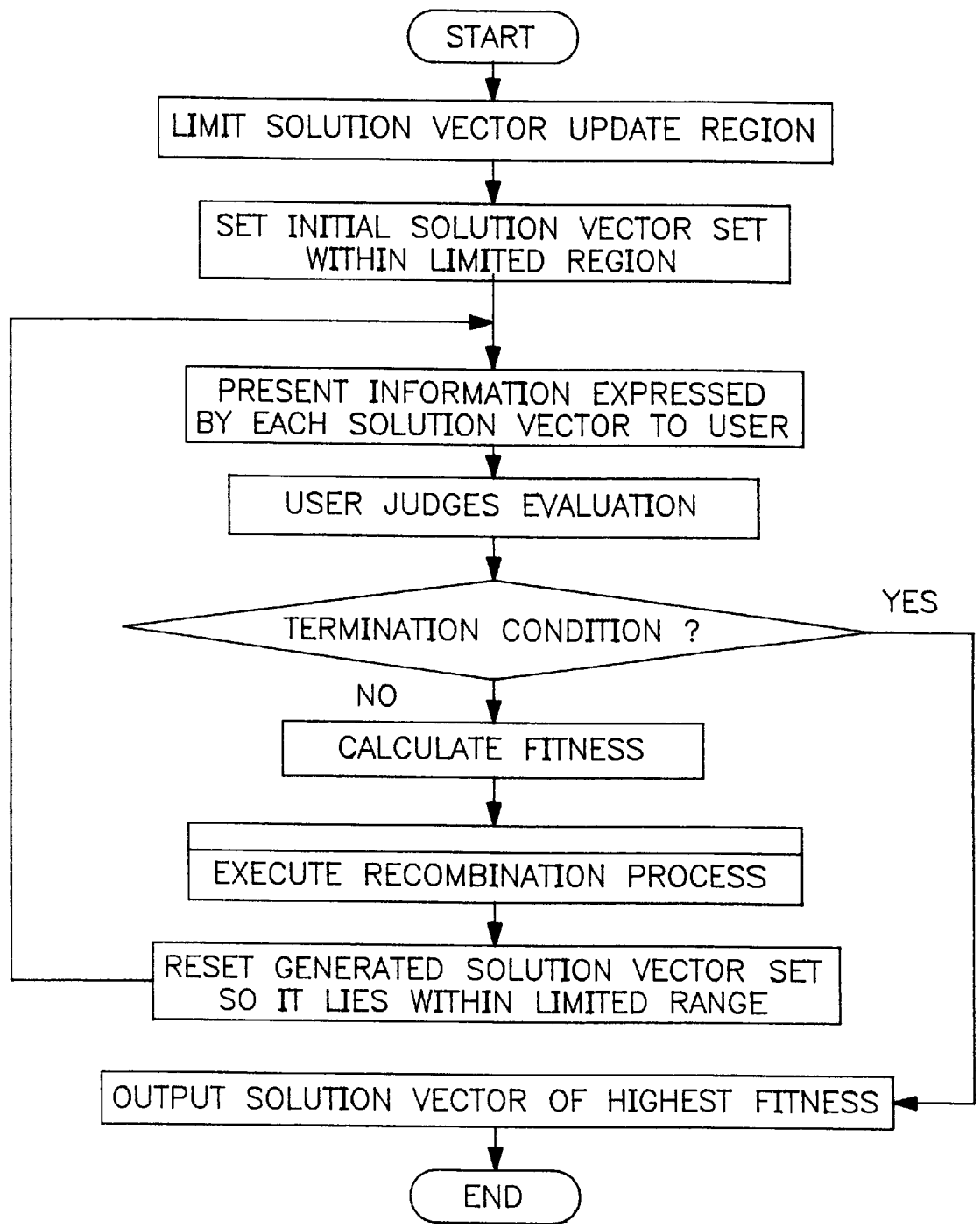
FIG. 33 is a flowchart illustrating a process sequence for an optimization adjusting method according to the ninth embodiment of the present invention.
Figure 35:
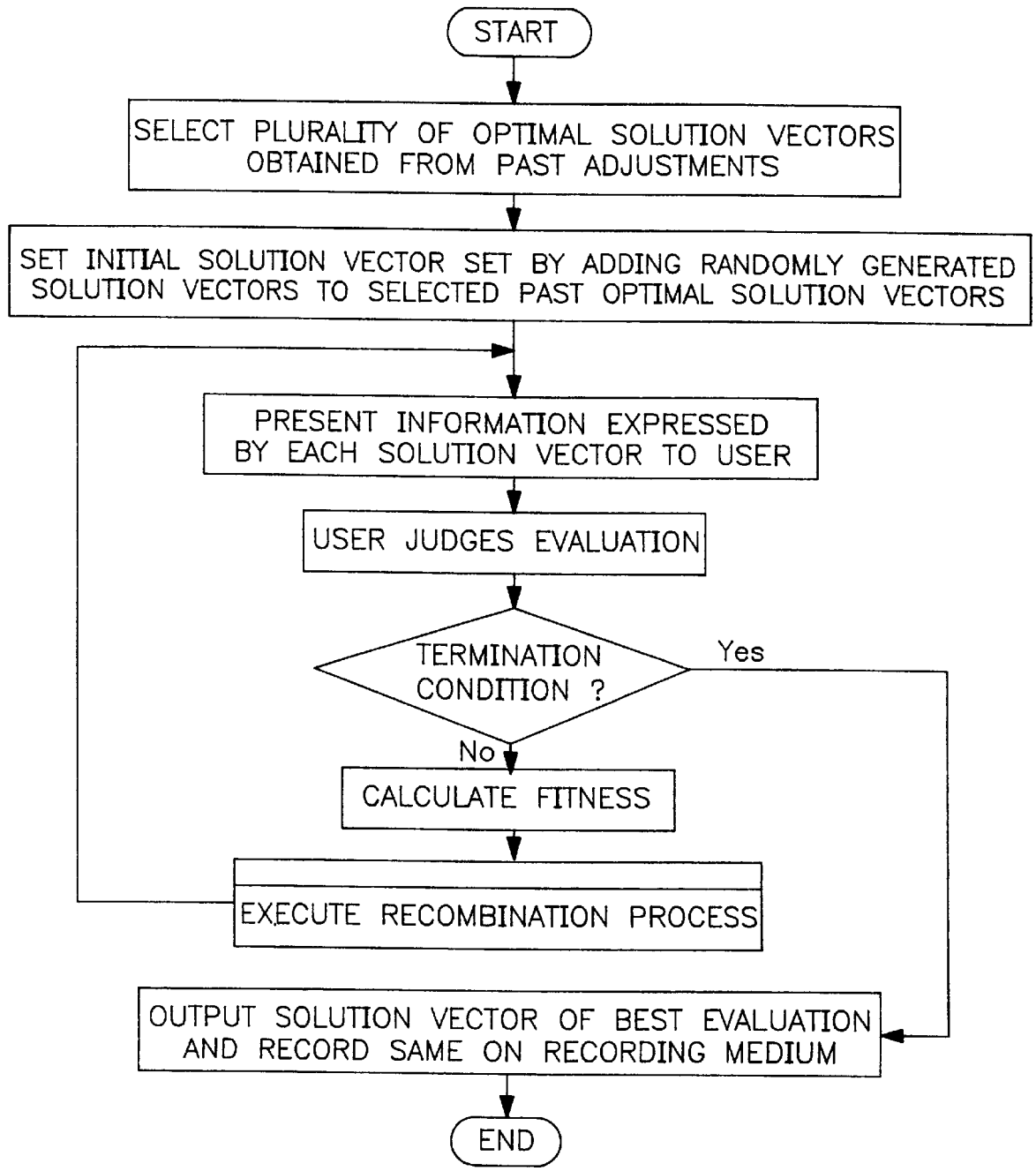
FIG. 35 is a flowchart illustrating a process sequence for an optimization adjusting method according to the 10th embodiment of the present invention.
Figure 37:
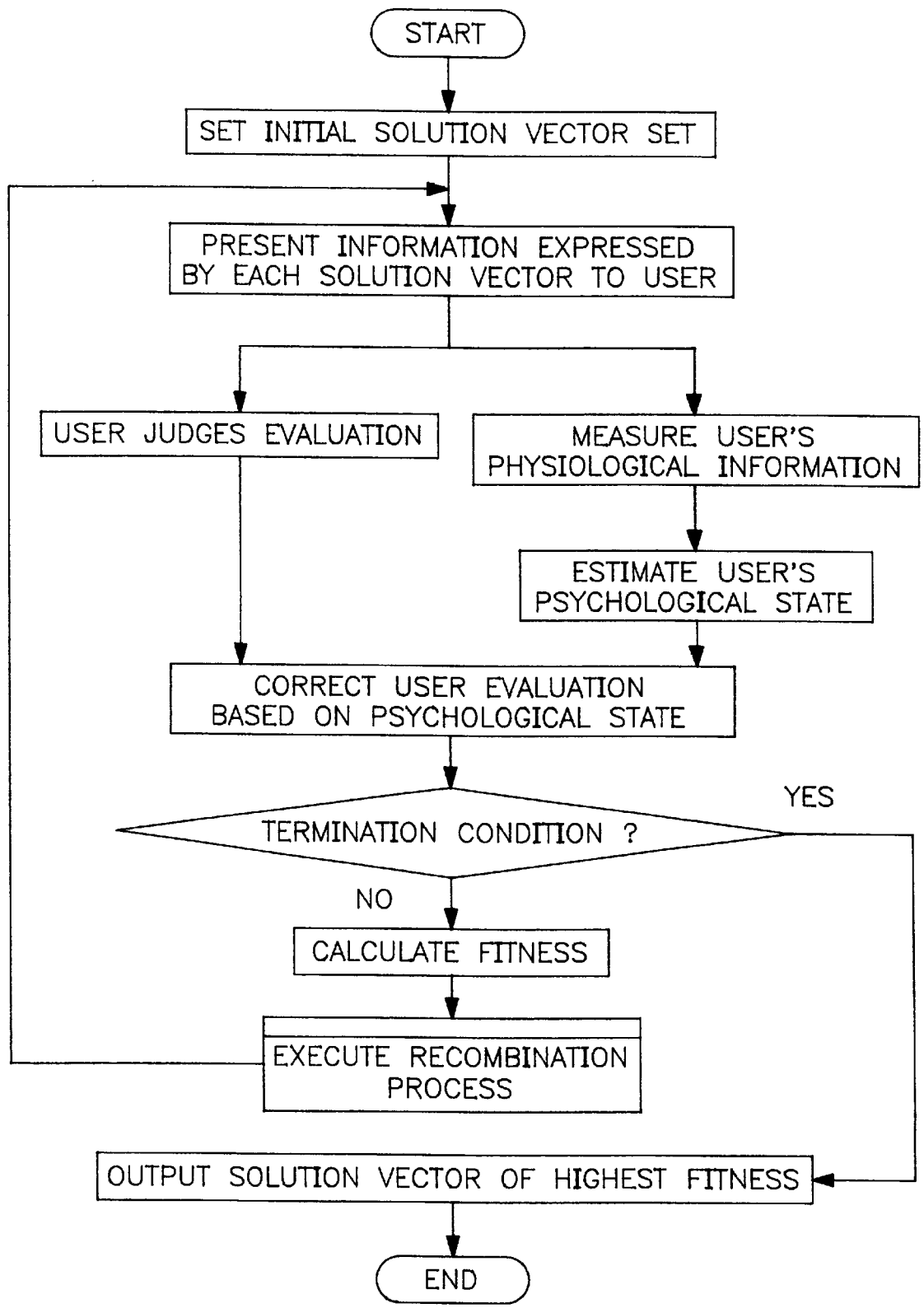
FIG. 37 is a flowchart illustrating a process sequence for an optimization adjusting method according to the 11th embodiment of the present invention.
Figure 39:
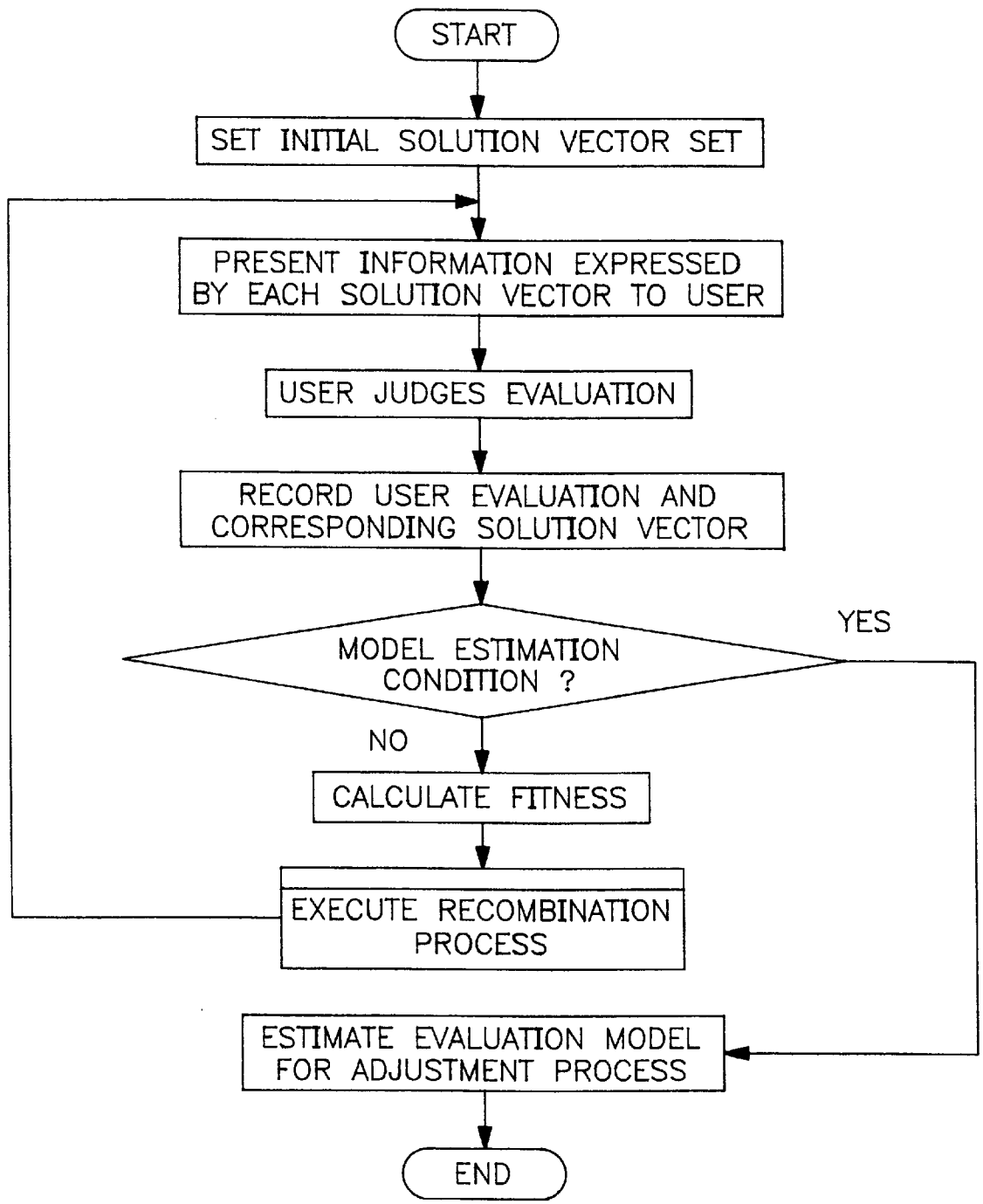
FIG. 39 is a flowchart illustrating a process sequence for an optimization adjusting method according to the 12th embodiment of the present invention.
Figure 41:
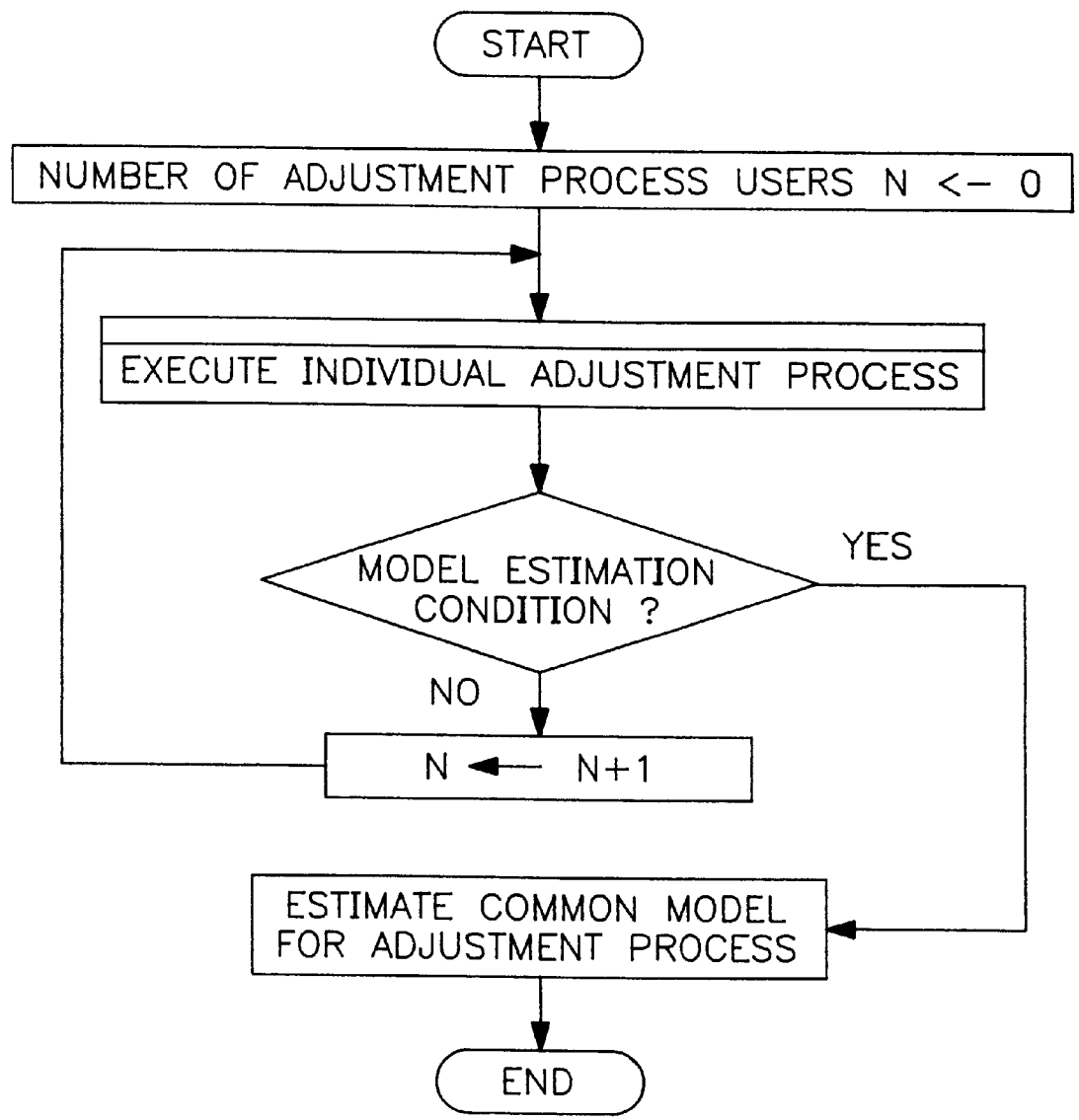
FIG. 41 is a flowchart illustrating a process sequence for an optimization adjusting method according to the 13th embodiment of the present invention.
Figure 42:
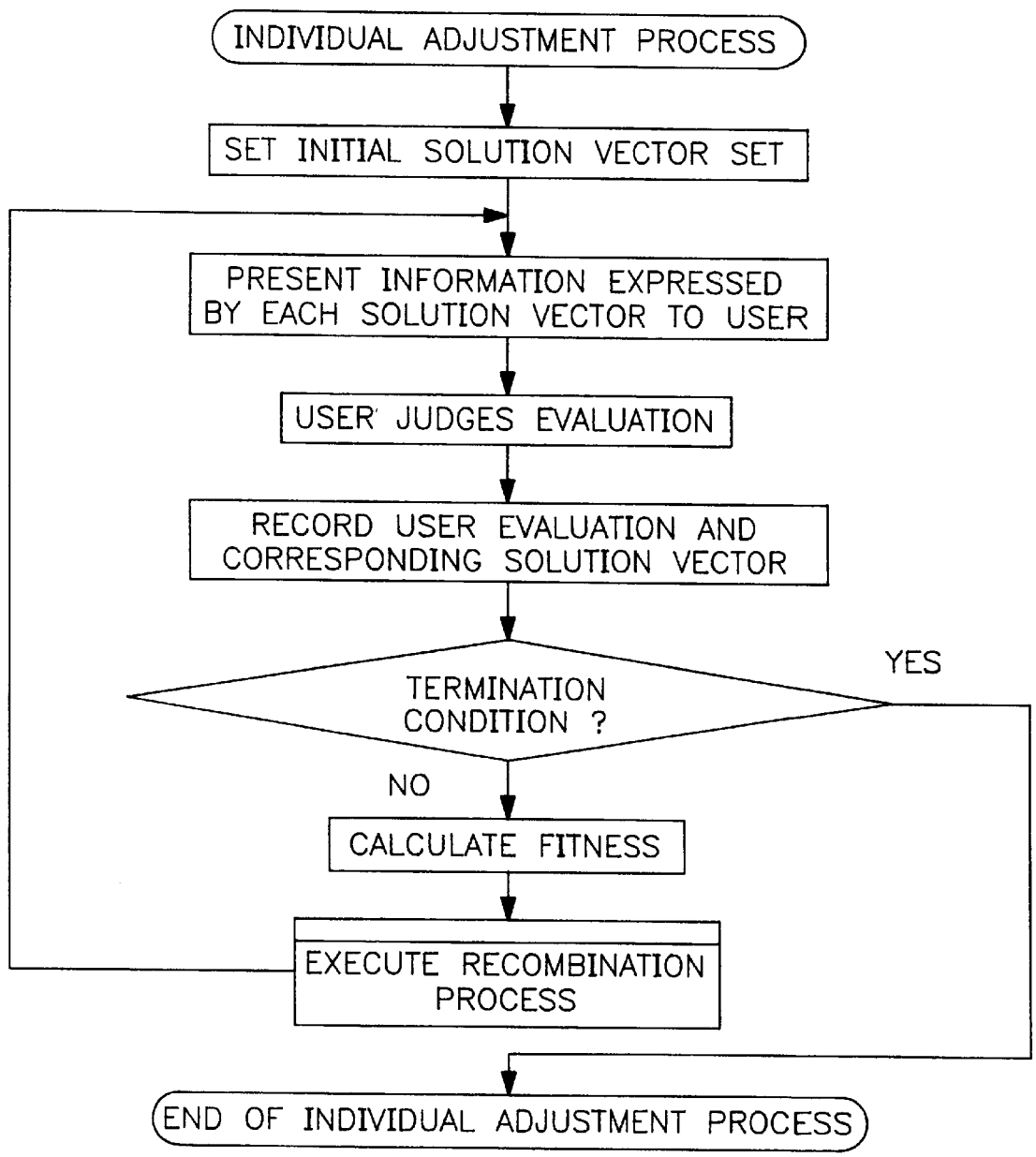
FIG. 42 is a flowchart illustrating the sequence of operations in an individual adjustment process in the optimization adjusting method according to the 13th embodiment of the present invention.
Figure 44:
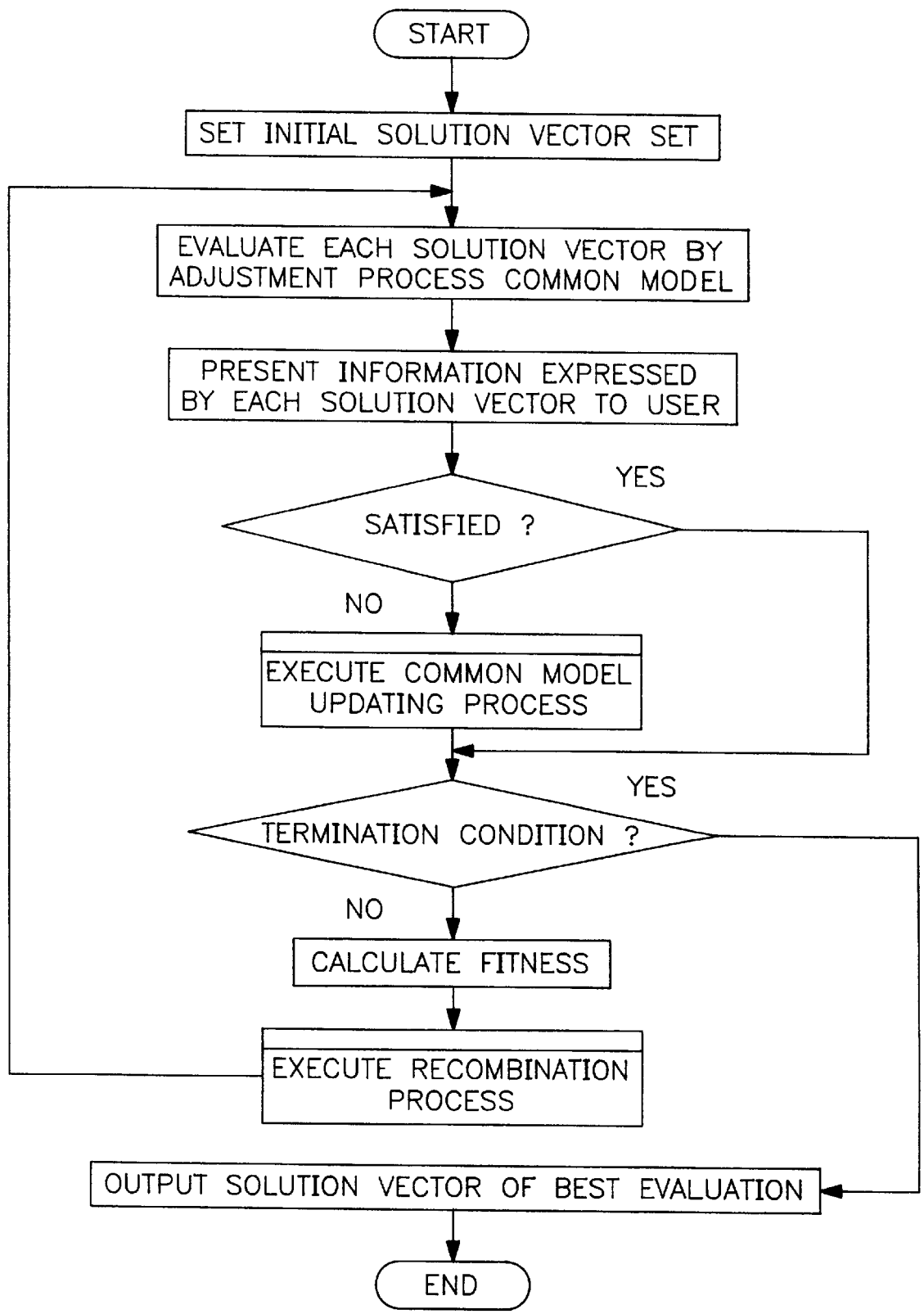
FIG. 44 is a flowchart illustrating a process sequence for an optimization adjusting method according to the 14th embodiment of the present invention.
Figure 45:
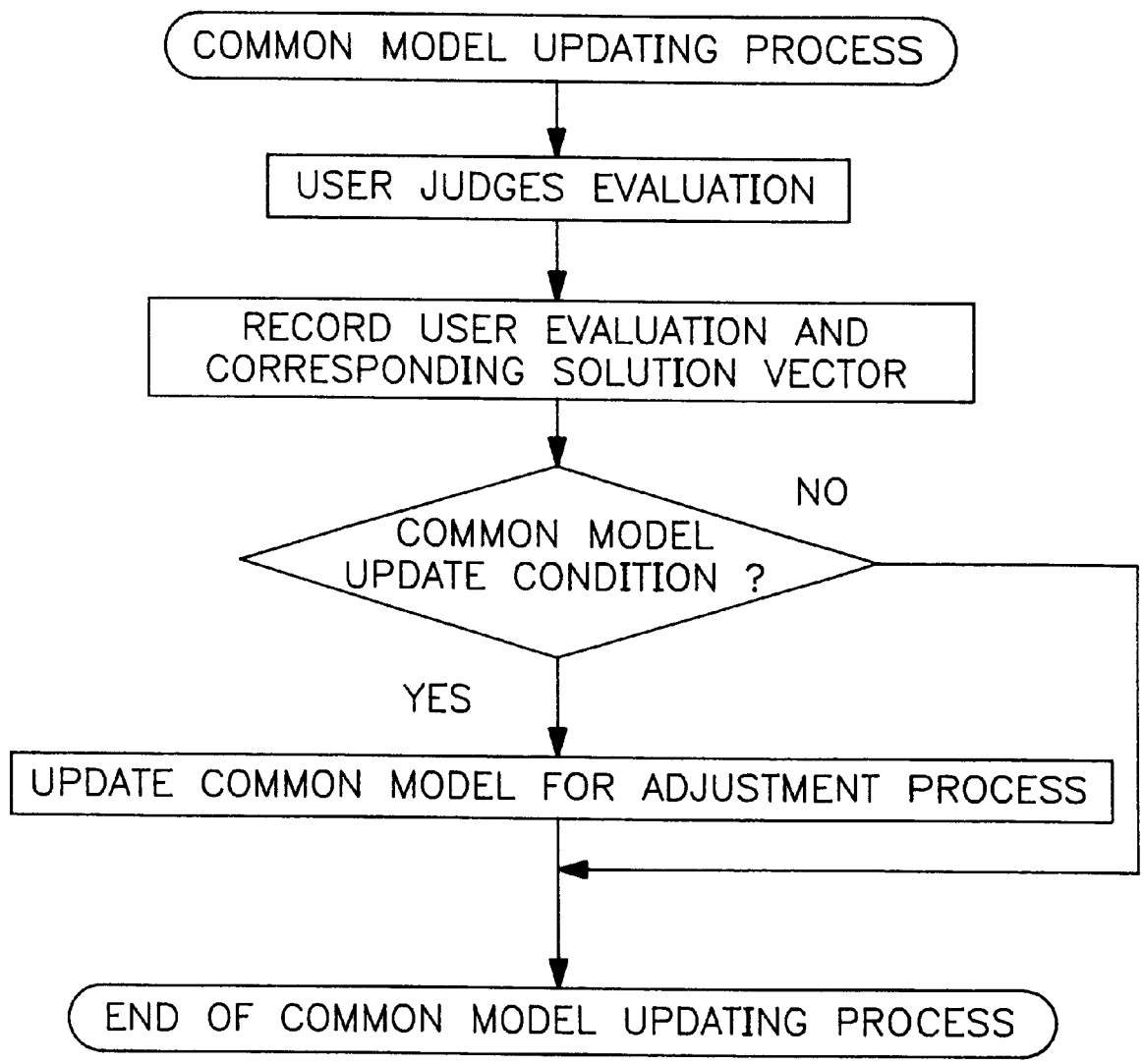
FIG. 45 is a flowchart illustrating the sequence of operations in a common model updating process in the optimization adjusting method according to the 14th embodiment of the present invention.
Figure 47:
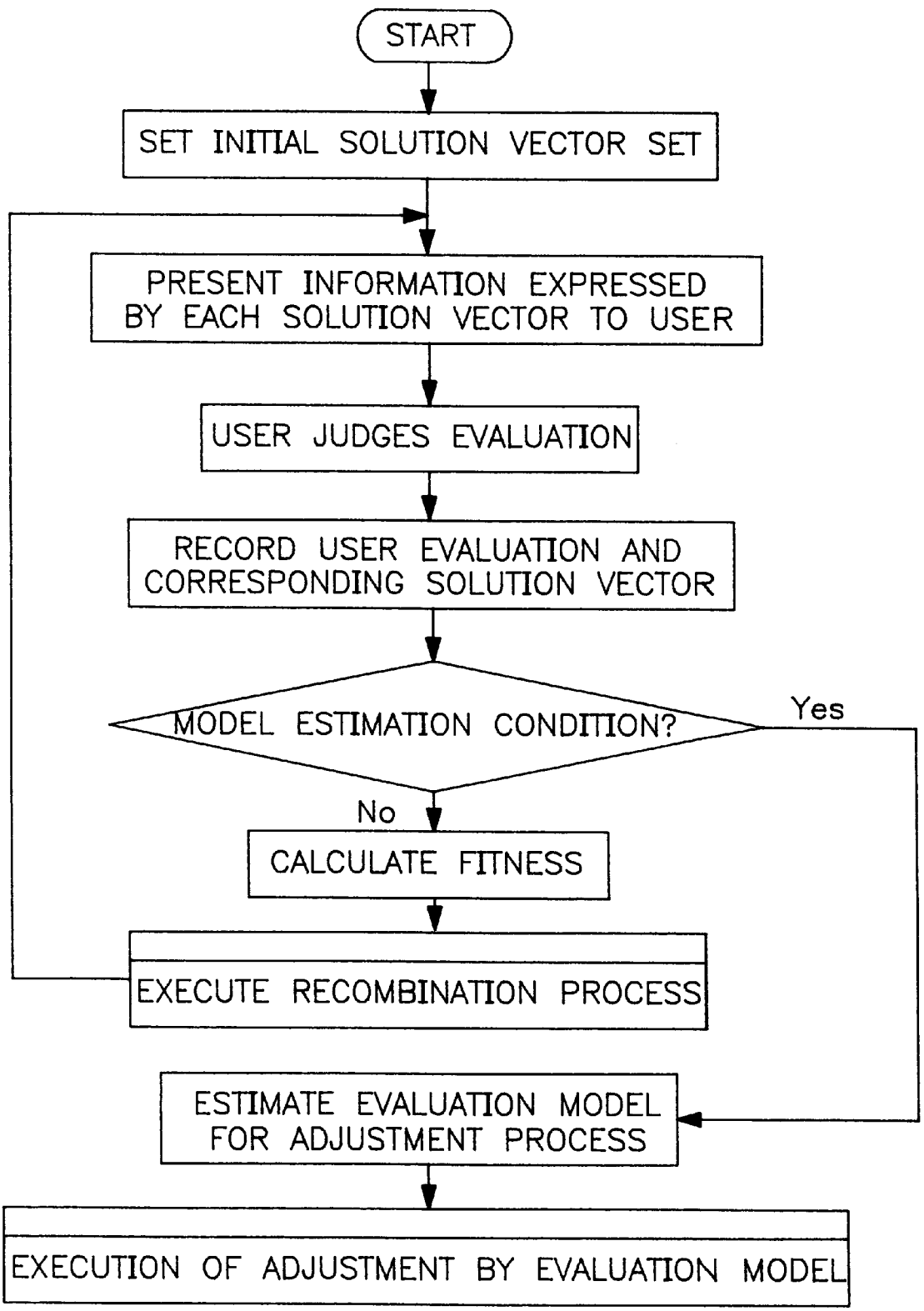
FIG. 47 is a flowchart illustrating a process sequence for an optimization adjusting method according to the 15th embodiment of the present invention.
Figure 48:
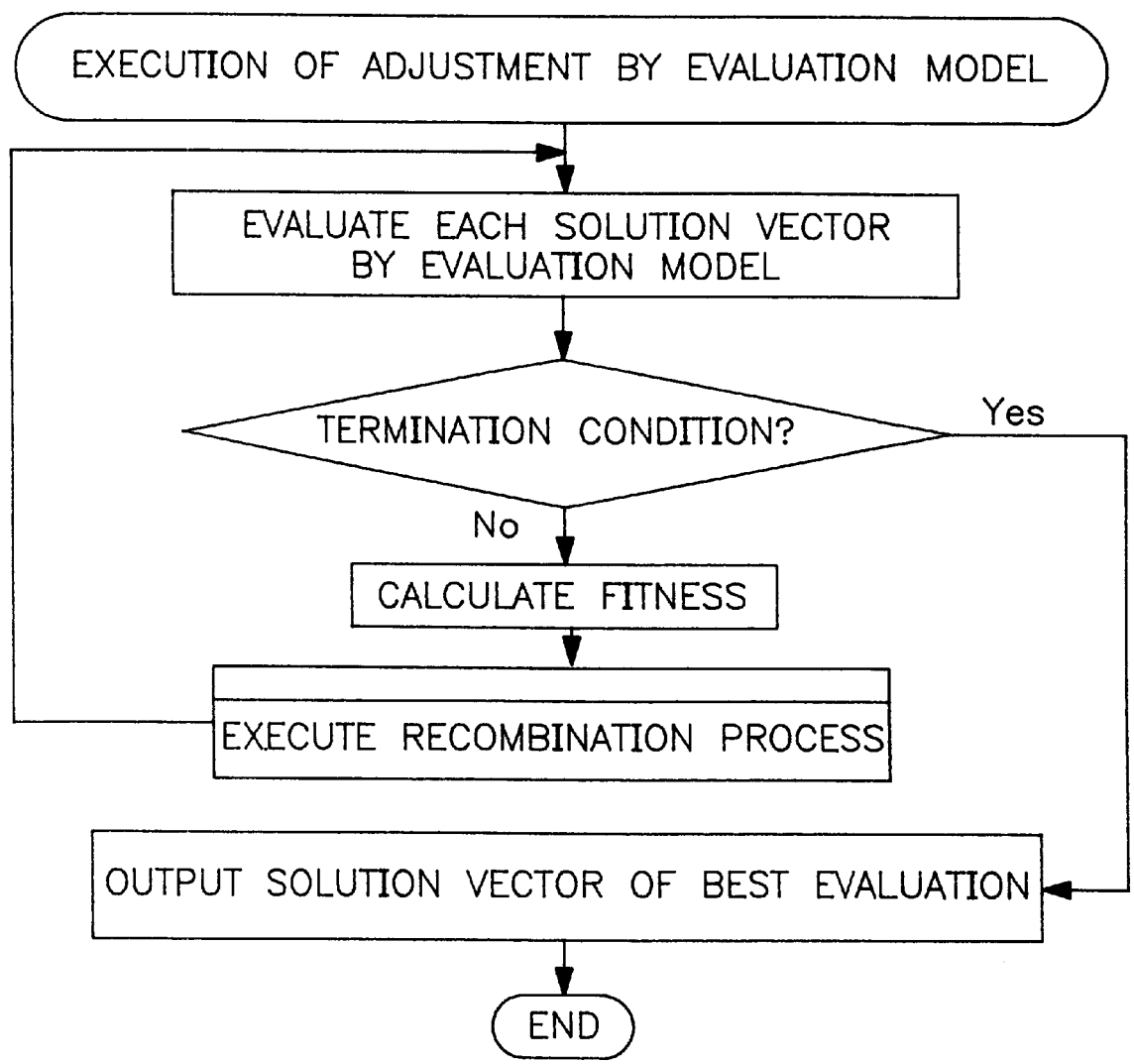
FIG. 48 is a flowchart illustrating the remaining part of the process sequence for the optimization adjusting method according to the 15th embodiment of the present invention.
Figure 50:
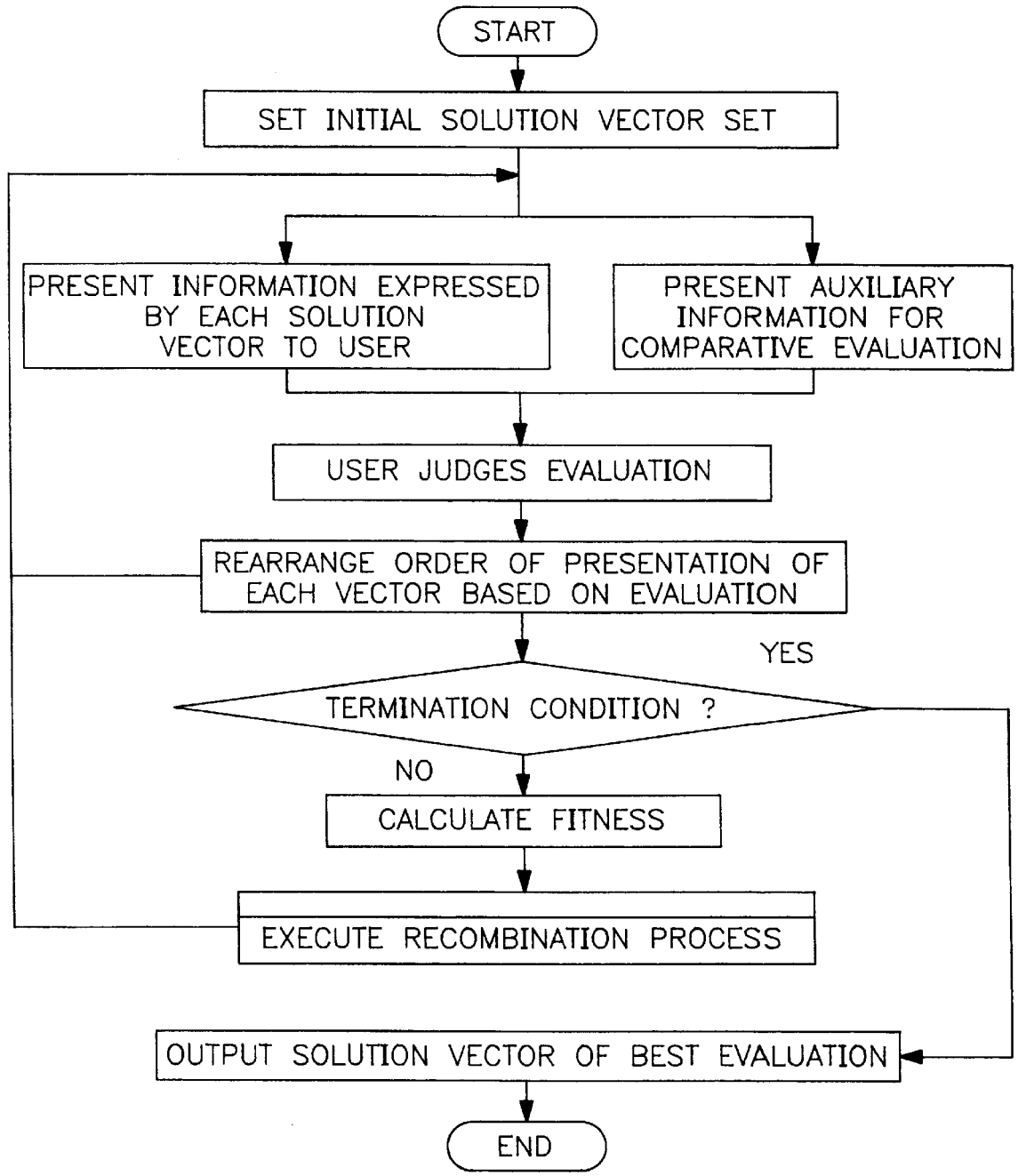
FIG. 50 is a flowchart illustrating a process sequence for an optimization adjusting method according to the 16th embodiment of the present invention.
Figure 52:
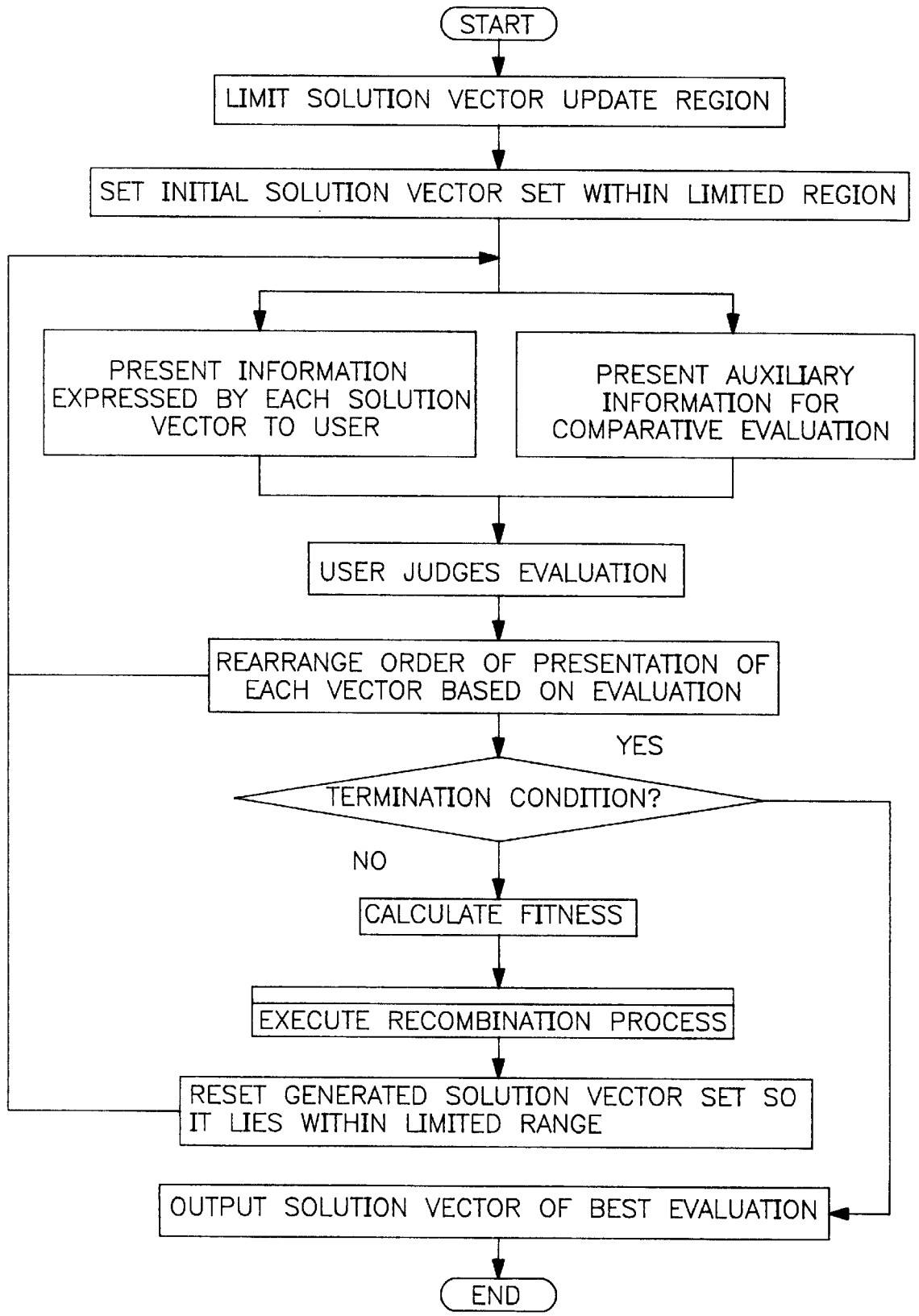
FIG. 52 is a flowchart illustrating a process sequence for an optimization adjusting method according to the 17th embodiment of the present invention.
Figure 54:
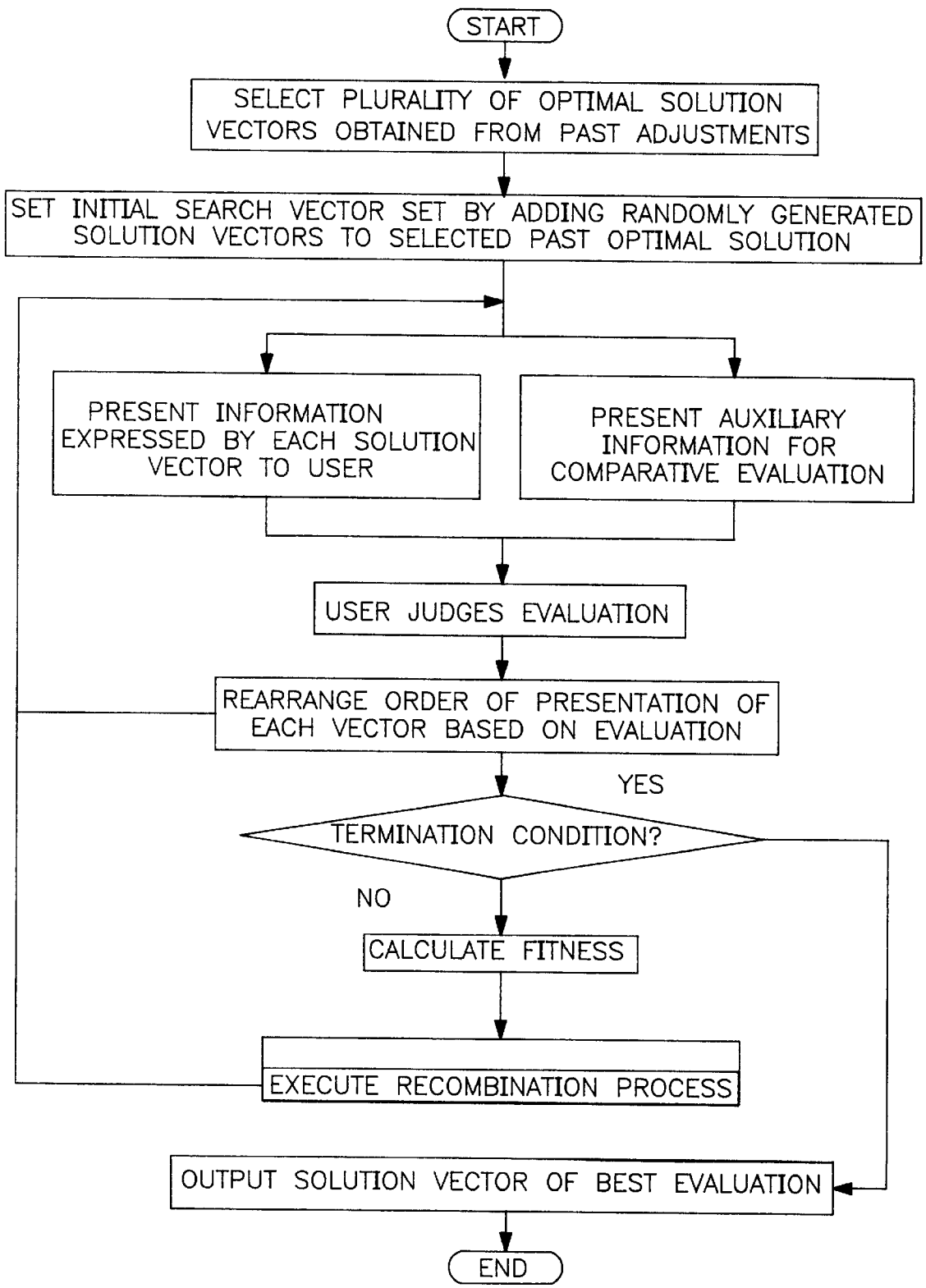
FIG. 54 is a flowchart illustrating a process sequence for an optimization adjusting method according to the 18th embodiment of the present invention.
Figure 56:
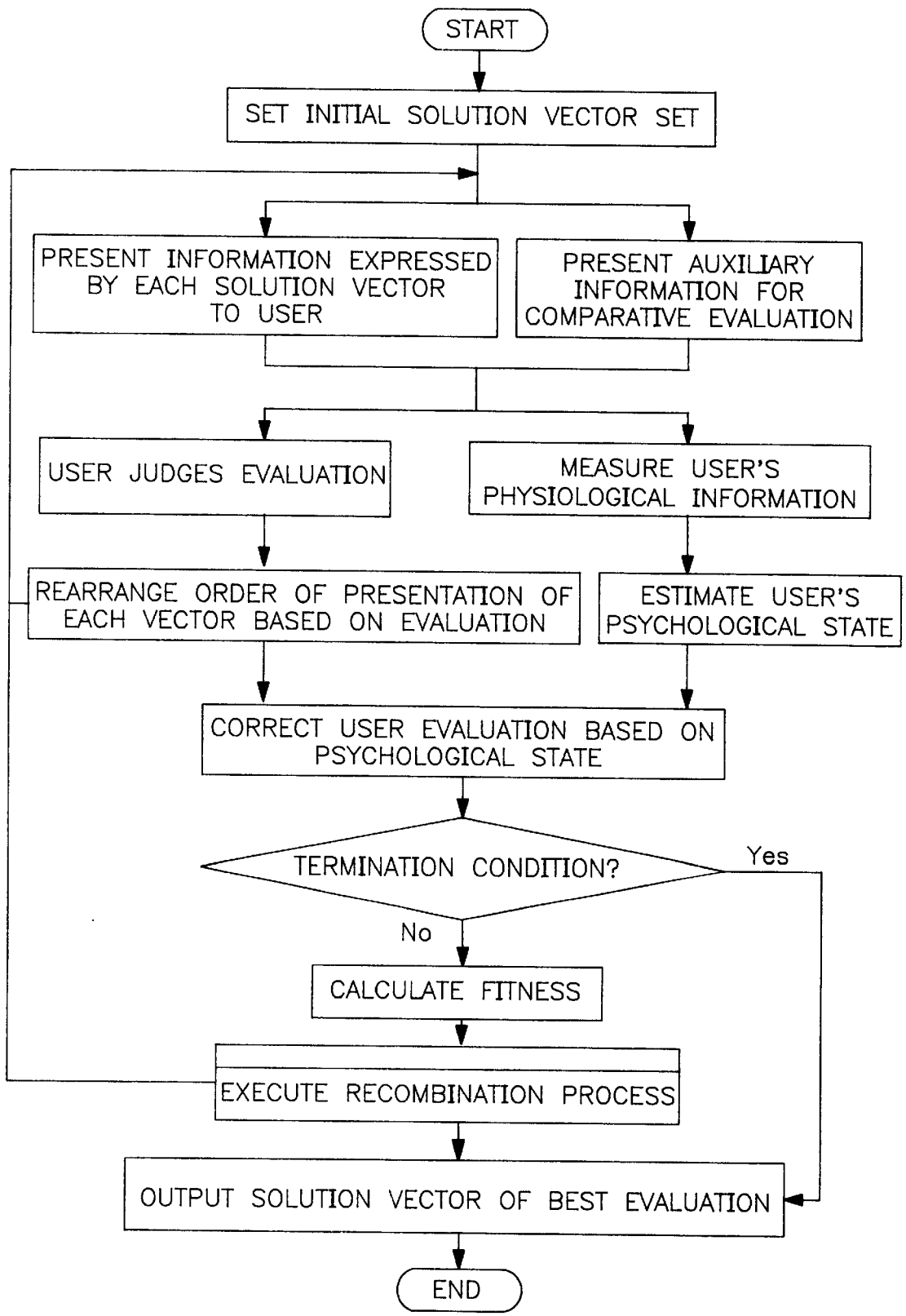
FIG. 56 is a flowchart illustrating a process sequence for an optimization adjusting method according to the 19th embodiment of the present invention.
Figure 58:
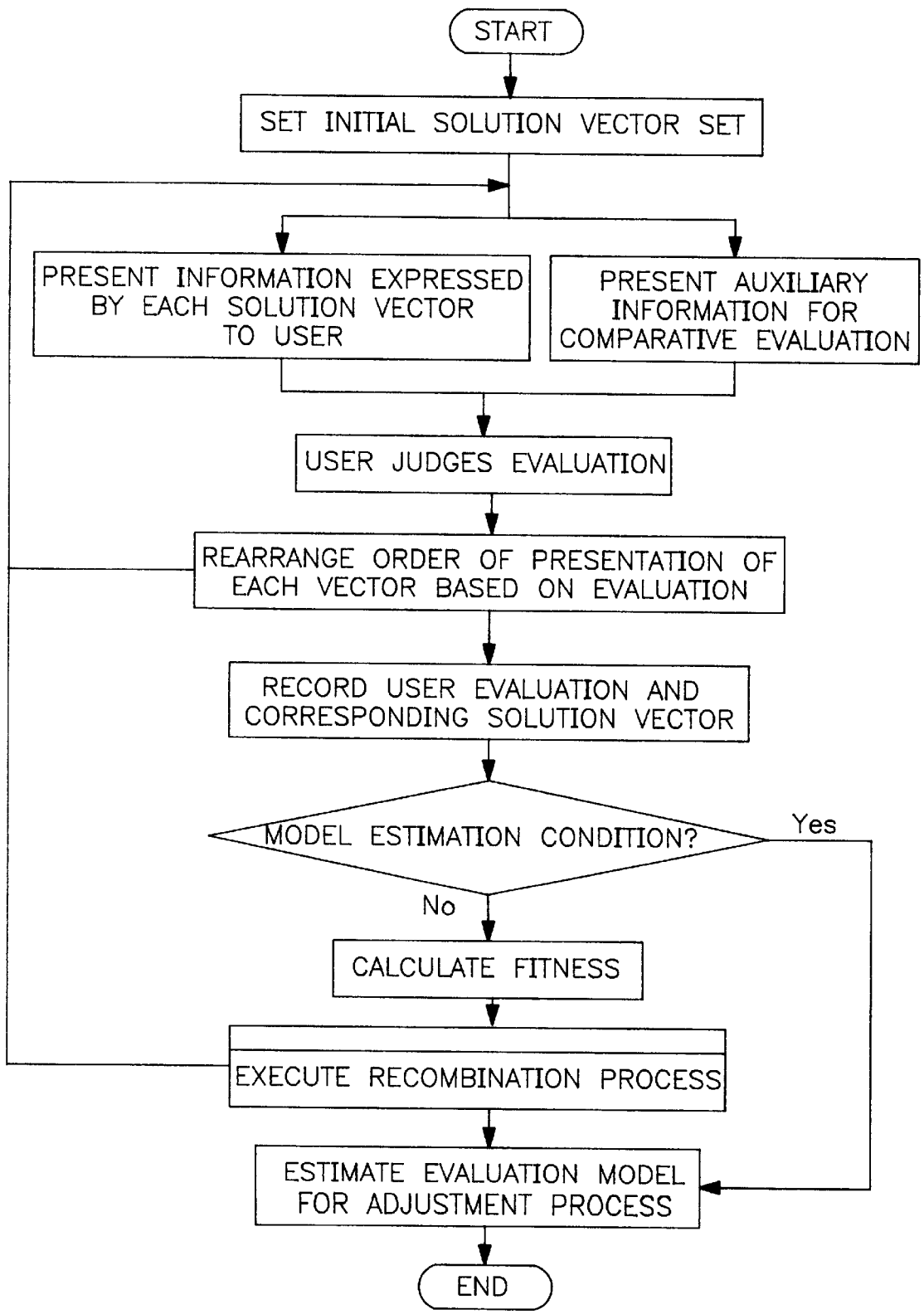
FIG. 58 is a flowchart illustrating a process sequence for an optimization adjusting method according to the 20th embodiment of the present invention.
Figure 60:
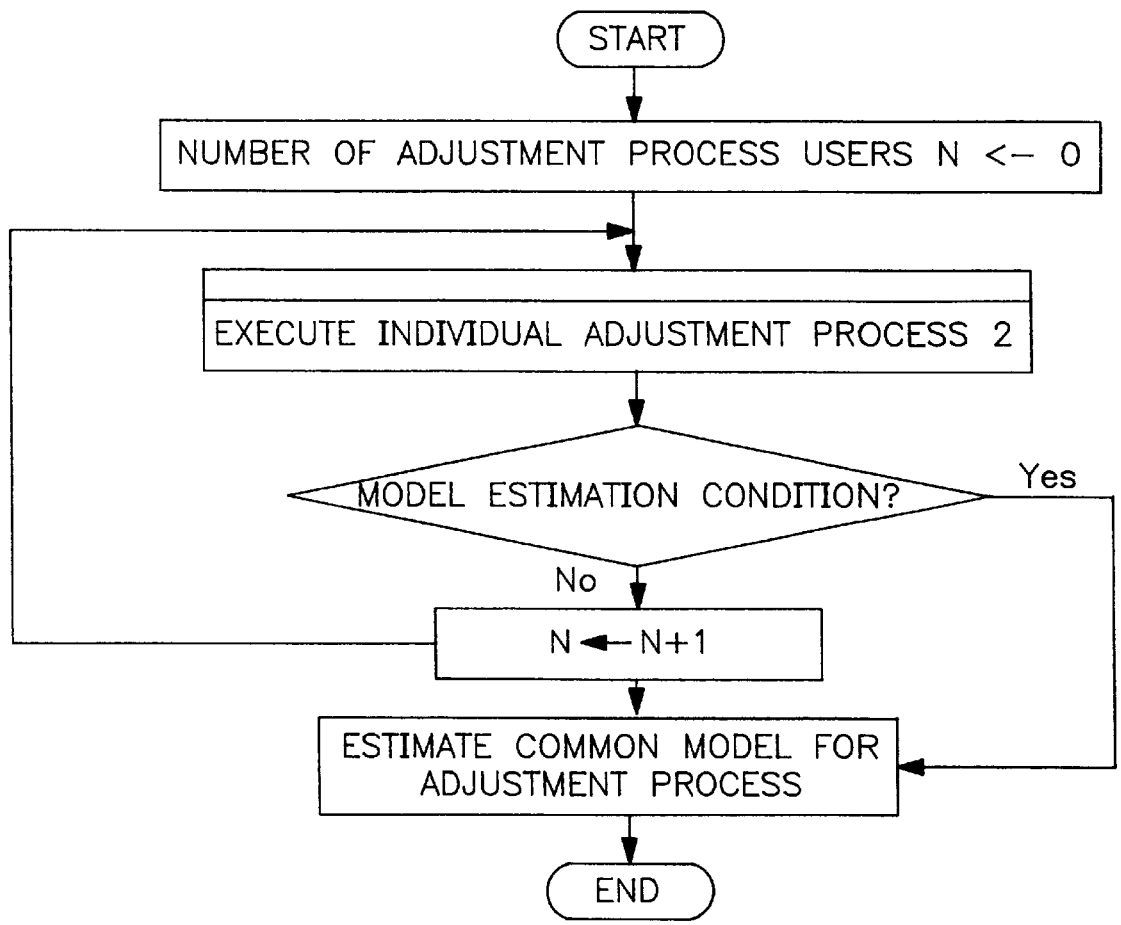
FIG. 60 is a flowchart illustrating a process sequence for an optimization adjusting method according to the 21st embodiment of the present invention.
Figure 61:
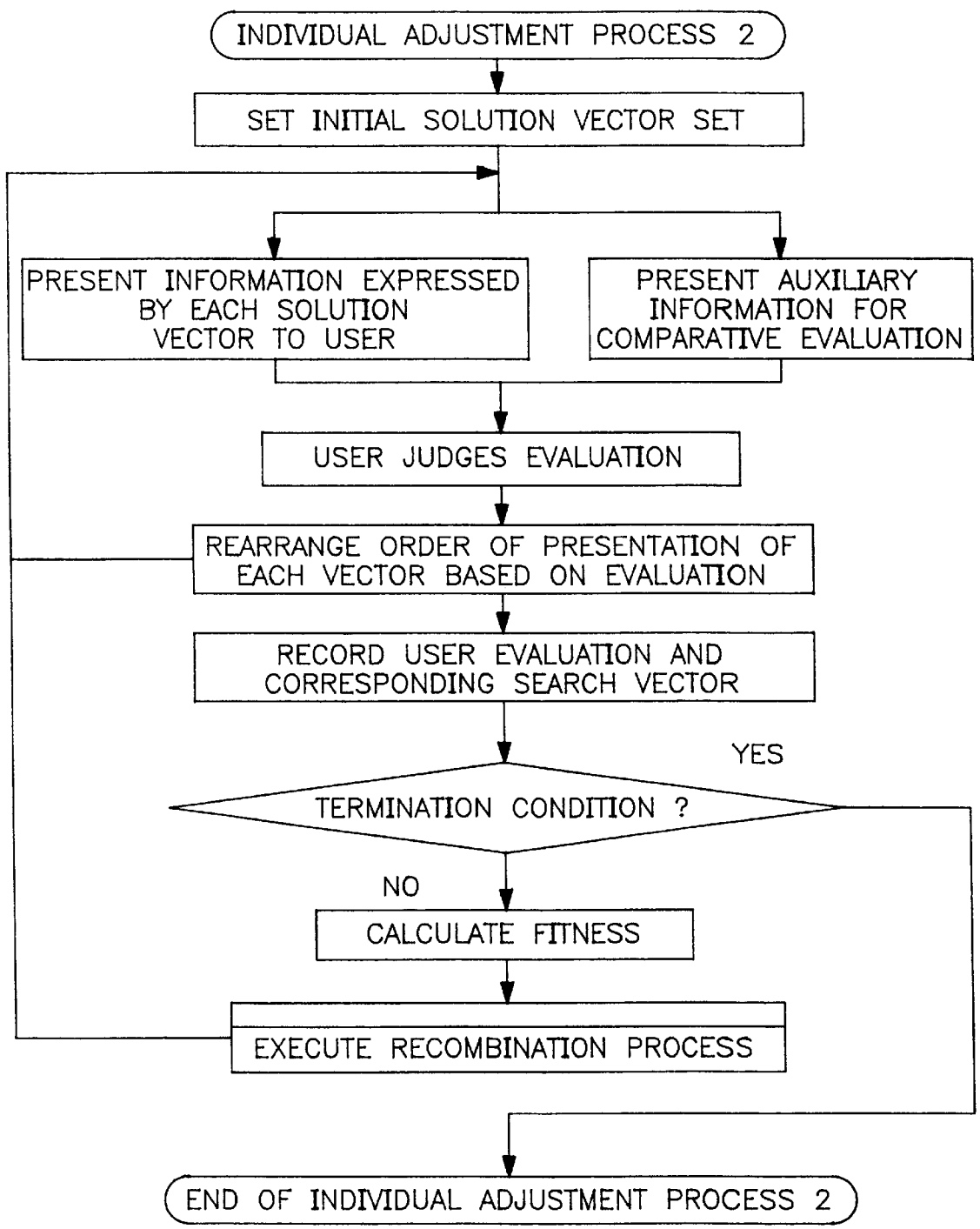
FIG. 61 is a flowchart illustrating the sequence of operations in individual adjustment process 2 in the optimization adjusting method according to the 21st embodiment of the present invention.
Figure 63:
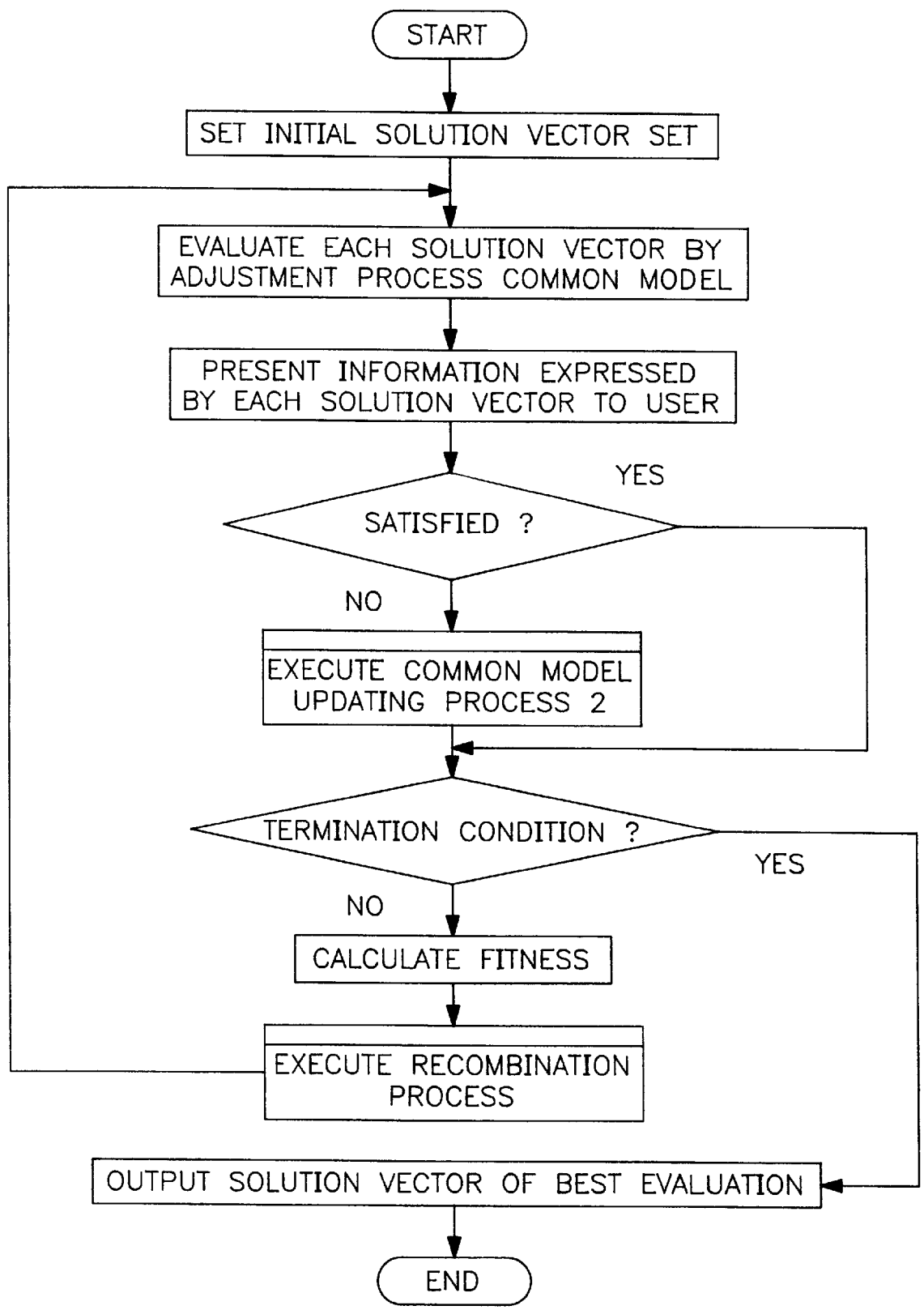
FIG. 63 is a flowchart illustrating a process sequence for an optimization adjusting method according to the 22nd embodiment of the present invention.
Figure 64:
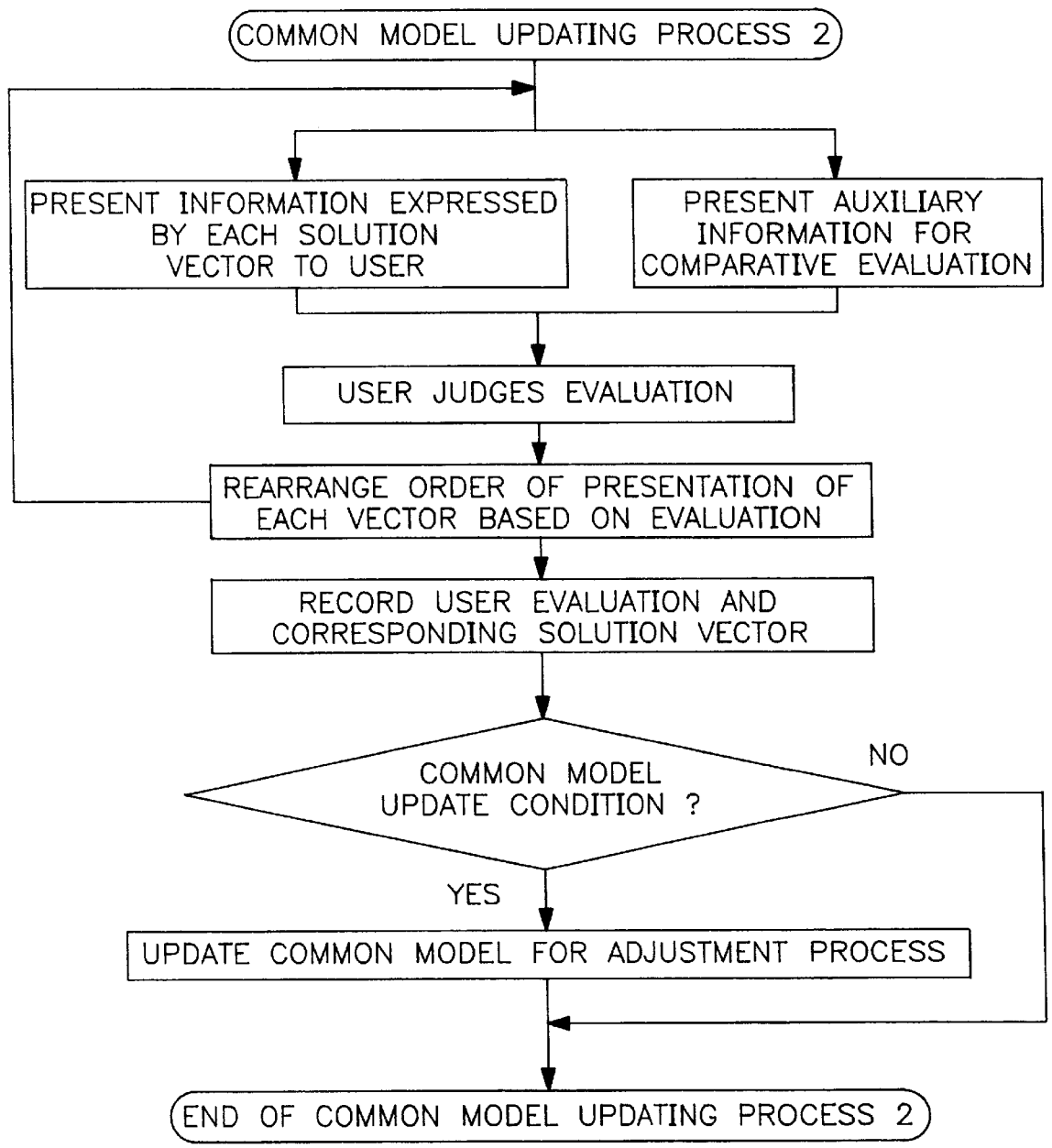
FIG. 64 is a flowchart illustrating the sequence of operations in common model updating process 2 in the optimization adjusting method according to the 22nd embodiment of the present invention.
Figure 66:
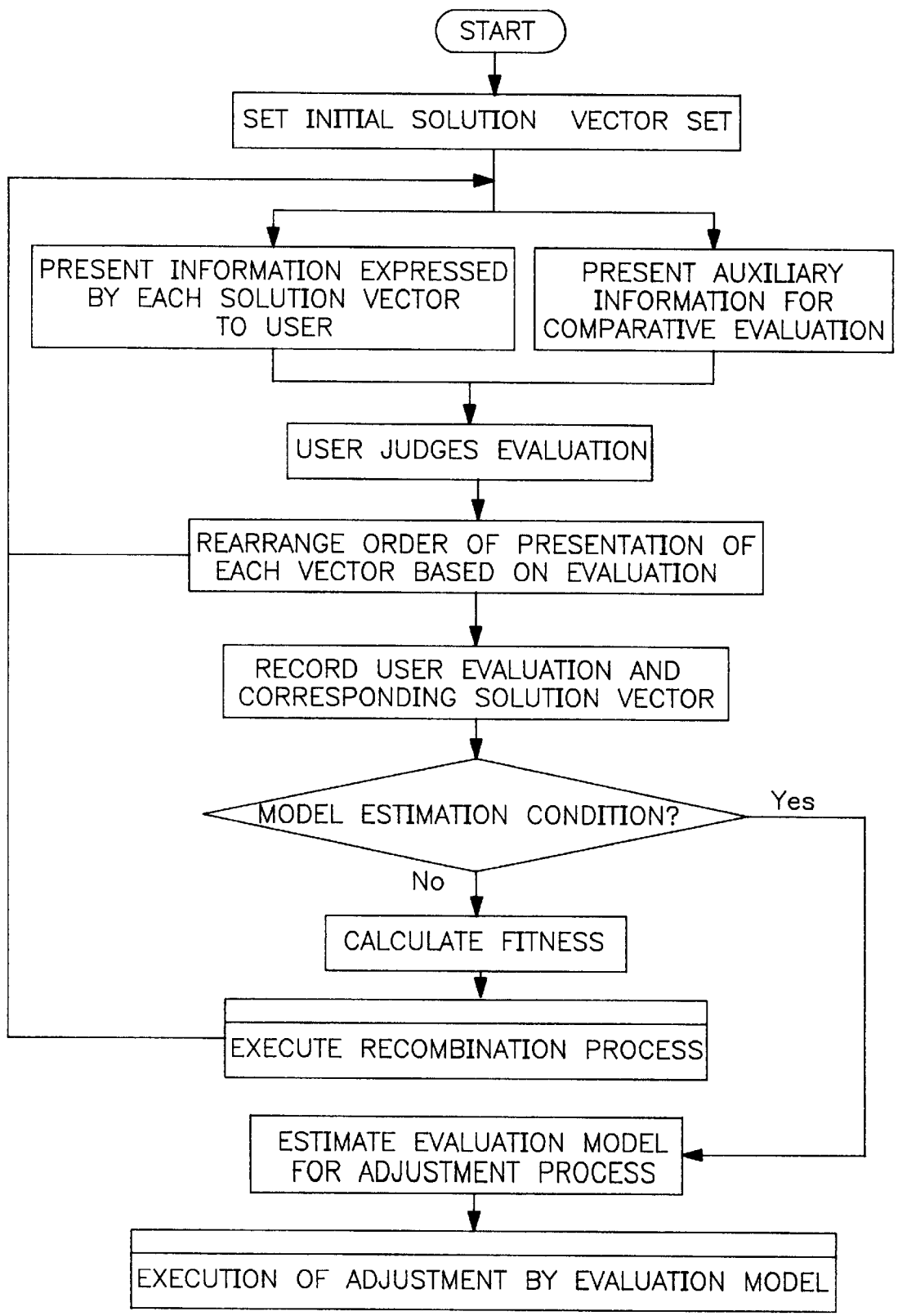
FIG. 66 is a flowchart illustrating a process sequence for an optimization adjusting method according to the 23rd embodiment of the present invention.
Figure 67:
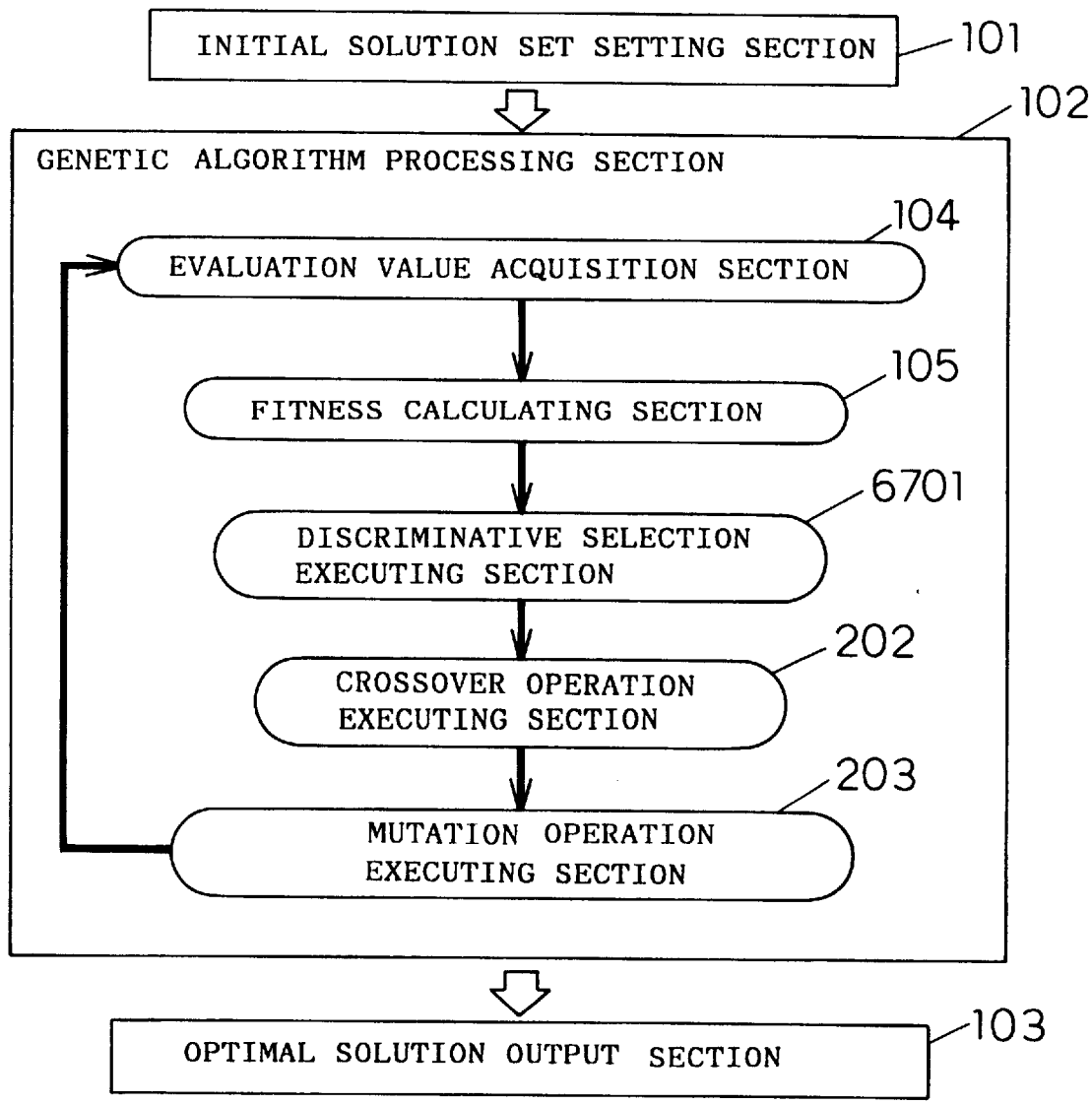
FIG. 67 is a block diagram showing the configuration of an optimization adjusting apparatus according to a prior art genetic algorithm.
Figure 68:
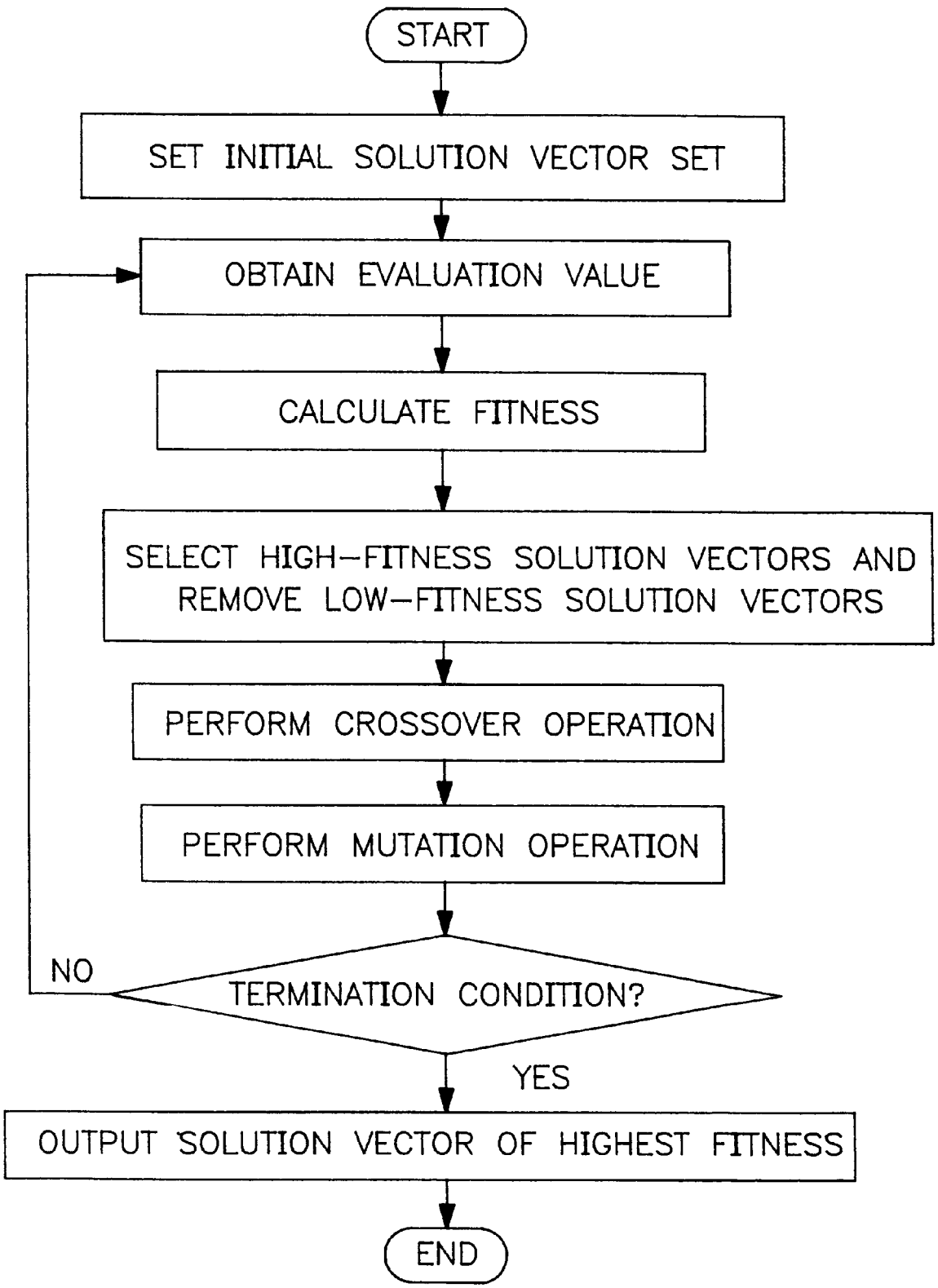
FIG. 68 is a flowchart illustrating a process sequence for an optimization adjusting method according to the prior art genetic algorithm.
Figure 69:
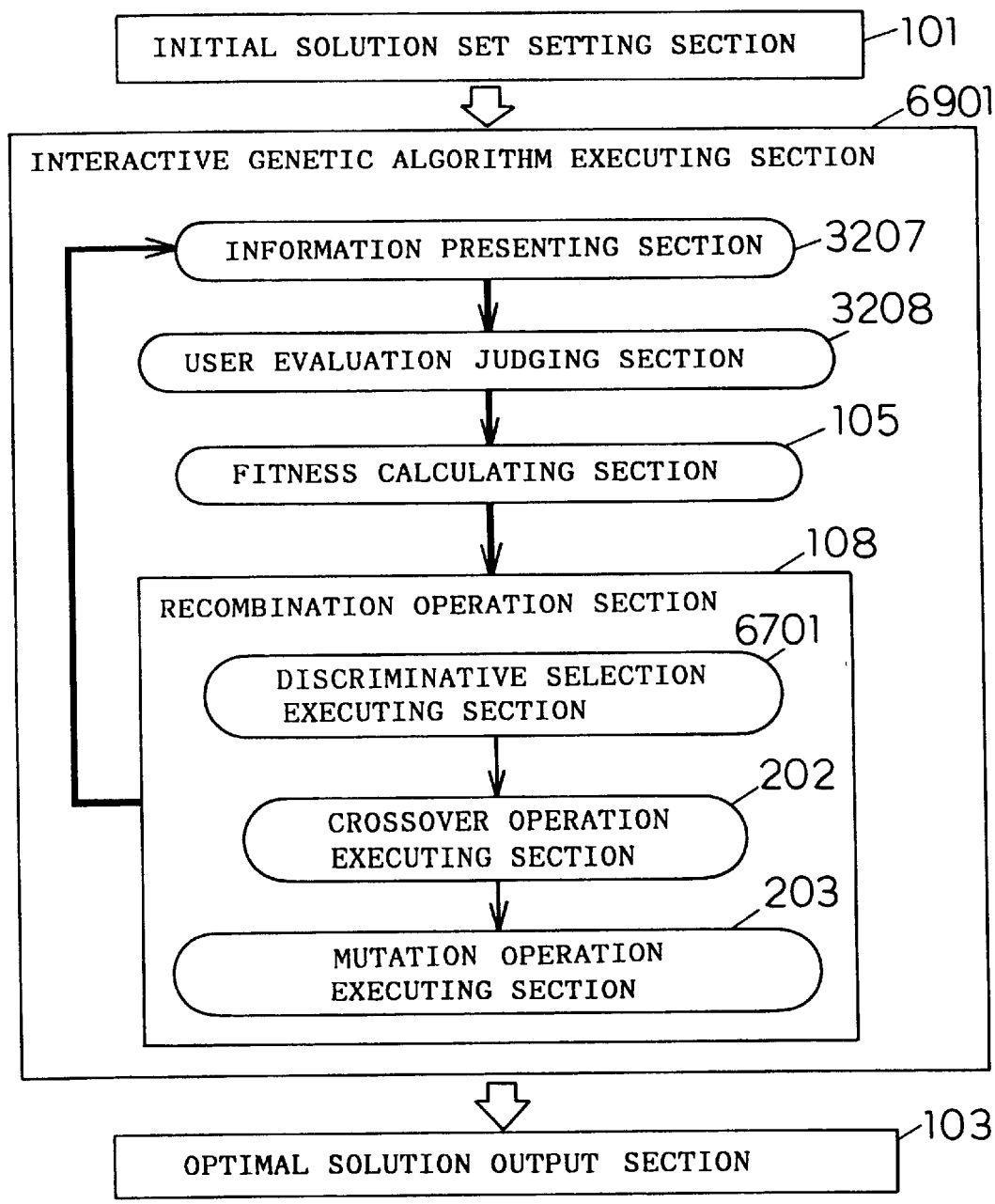
FIG. 69 is a block diagram showing the configuration of an optimization adjusting apparatus according to a prior art interactive genetic algorithm.
Figure 70:
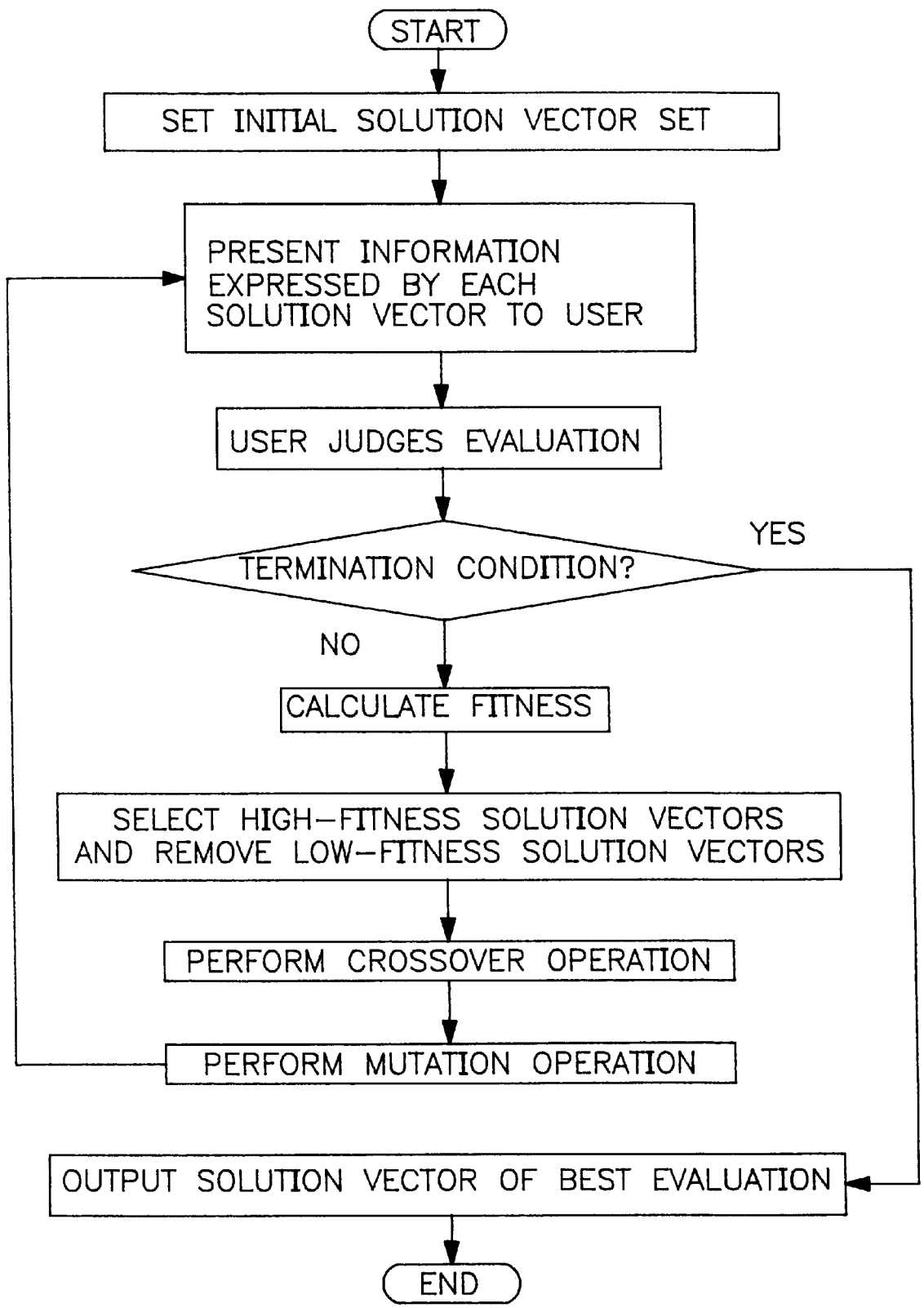
FIG. 70 is a flowchart illustrating a process sequence for an optimization adjusting method according to the prior art interactive genetic algorithm.

Further, FIG. 3 is a flowchart illustrating a process sequence for an optimization adjusting method according to the first embodiment of the present invention; FIG. 5 is a flowchart illustrating a process sequence for a recombination operation which forms an essential process in the optimization adjusting method according to the first embodiment of the present invention; FIG. 11 is a flowchart illustrating a process sequence for an optimization adjusting method according to the second embodiment of the present invention; FIG. 14 is a flowchart illustrating a process sequence for an optimization adjusting method according to the third embodiment of the present invention; FIG. 17 is a flowchart illustrating a process sequence for an optimization adjusting method according to the fourth embodiment of the present invention; FIG. 20 is a flowchart illustrating a process sequence for an optimization adjusting method according to the fifth embodiment of the present invention; FIG. 23 is a flowchart illustrating a process sequence for an optimization adjusting method according to the sixth embodiment of the present invention; FIG. 26 is a flowchart illustrating an entire process sequence for an optimization adjusting method according to the seventh embodiment of the present invention; FIG. 27 is a flowchart illustrating the sequence of operations in process 2 in the optimization adjusting method according to the seventh embodiment of the present invention; FIG. 29 is a flowchart illustrating a process sequence for an optimization adjusting method according to the eighth embodiment of the present invention; FIG. 33 is a flowchart illustrating a process sequence for an optimization adjusting method according to the ninth embodiment of the present invention; FIG. 35 is a flowchart illustrating a process sequence for an optimization adjusting method according to the 10th embodiment of the present invention; FIG. 37 is a flowchart illustrating a process sequence for an optimization adjusting method according to the 11th embodiment of the present invention; FIG. 39 is a flowchart illustrating a process sequence for an optimization adjusting method according to the 12th embodiment of the present invention; FIG. 41 is a flowchart illustrating a process sequence for an optimization adjusting method according to the 13th embodiment of the present invention; FIG. 42 is a flowchart illustrating the sequence of operations in an individual adjustment process in the optimization adjusting method according to the 13th embodiment of the present invention; FIG. 44 is a flowchart illustrating a process sequence for an optimization adjusting method according to the 14th embodiment of the present invention; FIG. 45 is a flowchart illustrating the sequence of operations in a common model updating process in the optimization adjusting method according to the 14th embodiment of the present invention; FIG. 47 is a flowchart illustrating a process sequence for an optimization adjusting method according to the 15th embodiment of the present invention; FIG. 48 is a flowchart illustrating the remaining part of the process sequence for the optimization adjusting method according to the 15th embodiment of the present invention; FIG. 50 is a flowchart illustrating a process sequence for an optimization adjusting method according to the 16th embodiment of the present invention; FIG. 52 is a flowchart illustrating a process sequence for an optimization adjusting method according to the 17th embodiment of the present invention; FIG. 54 is a flowchart illustrating a process sequence for an optimization adjusting method according to the 18th embodiment of the present invention; FIG. 56 is a flowchart illustrating a process sequence for an optimization adjusting method according to the 19th embodiment of the present invention; FIG. 58 is a flowchart illustrating a process sequence for an optimization adjusting method according to the 20th embodiment of the present invention; FIG. 60 is a flowchart illustrating a process sequence for an optimization adjusting method according to the 21st embodiment of the present invention; FIG. 61 is a flowchart illustrating the sequence of operations in individual adjustment process 2 in the optimization adjusting method according to the 21st embodiment of the present invention; FIG. 63 is a flowchart illustrating a process sequence for an optimization adjusting method according to the 22nd embodiment of the present invention; FIG. 64 is a flowchart illustrating the sequence of operations in common model updating process 2 in the optimization adjusting method according to the 22nd embodiment of the present invention; and FIG. 66 is a flowchart illustrating a process sequence for an optimization adjusting method according to the 23rd embodiment of the present invention. The same parts are designated by the same reference numerals throughout the block diagrams.

The first to eighth embodiments of the present invention are each concerned with an optimization adjusting method using a genetic algorithm and an optimization adjusting apparatus for implementing the same method, while the ninth to 23rd embodiments are each concerned with an optimization adjusting method using an interactive genetic algorithm which performs the estimation of an optimal solution based on user evaluation, and an optimization adjusting apparatus for implementing the same method.

The optimization adjusting method and apparatus according to the first embodiment of the invention will be described below. In the first embodiment, an optimal solution is efficiently estimated by predicting and utilizing the direction of the distribution of solution vectors having high fitness on the basis of the history of past solution vector updates.

In FIG. 1, reference numeral 101 is an initial solution set setting section for setting, in accordance with a prescribed procedure or by an external instruction, an initial set of solutions, $P=\{p_k\}(k=1, \ldots, n)$, which is subsequently updated; 102 is a genetic algorithm processing section for performing the estimation of an optimal solution by genetic recombination operations; and 103 is an optimal solution output section for outputting as the optimal solution vector a solution vector having the highest fitness in the most recent solution vector set when a predetermined termination condition is satisfied. The genetic algorithm processing section 102 comprises: an evaluation value acquisition section 104 for calculating an evaluation value $E_k$ for each solution vector in the solution vector set P by using a prescribed fitness function; a fitness calculating section 105 for calculating the fitness $f_k$ of each solution vector with respect to the problem at hand on the basis of the evaluation value $E_k$ calculated by the evaluation value acquisition section 104; an update direction judging section 106 for selecting a solution vector group P' having a higher fitness than a predetermined reference fitness $f^{th}$, and for judging whether an update direction vector along which vectors having high fitness are distributed can be estimated from the barycentric vector $g_1$ (1 is the number of iterations) of the selected vector group P' and from a previous barycentric vector; a direction application updating section 107 for updating a plurality of solution vectors along the direction of the update direction vector when the update direction vector is estimated by the update direction judging section 106, and for setting the number of solution vectors to be generated by a recombination operation; and a recombination operation section 108 for accepting the result of the operation from the update direction judging section 106 or the direction application updating section 107, and for generating the specified number of solution vectors by performing a recombination operation, based on a genetic operation, on the solution vectors in the solution vector set. Further, the update direction judging section 106 comprises: a barycenter estimating section 109 for selecting the solution vector group P' having a higher fitness than the predetermined fitness $f^{th}$ on the basis the fitness calculated by the fitness calculating section 105, and for calculating its barycentric vector $g_1$; an update direction candidate recording section 110 for obtaining a difference vector $\Delta g_{1-1}$ between the $g_1$ calculated by the barycenter estimating section 109 and the previous barycentric vector $g_{1-1}$, and for recording it as an update direction candidate vector $v'_{1-1}=\Delta g_{1-1}$; and an update direction acquisition section 111 for evaluating the degree of matching between $v_1$ and $v'_{1-1}$ stored in the update direction candidate recording section 110, and for, when it is judged that they match, then passing the processing to the direction application updating section 107 by determining that the update direction vector $v=v'_1$ has been obtained, and when they do not match, then passing the processing to the recombination operation section 108 by setting all the solution vectors in the solution vector set as the target of the recombination operation. The direction application updating section 107 comprises: a barycenter shifting section 112 for shifting the barycentric vector calculated by the barycenter estimating section 109 by a reference shifting distance "length" in accordance with the update direction vector v; and a barycenter-surrounding solution vector generating section 113 for generating a predetermined number of solution vectors around the new barycentric vector obtained by the barycenter shifting section 112. As shown in FIG. 2, the recombination operation section 108 comprises: a candidate selecting section 201 for performing selection to select solution vectors from the solution vector set P on the basis of the fitness $f_k$; a crossover operation executing section 202 for performing a crossover operation on the set of solution vectors generated by the candidate selecting section 201; and a mutation operation executing section 203 for performing a mutation operation on the set of solution vectors generated by the crossover operation processing section 202. Further, the candidate selecting section 201 comprises: a selection range deriving section 204 for deriving a selection probability $h_k$ of a certain solution vector being selected from the solution vector set and a selection range $I_k$ where the selection can be made; a random number generating section 205 for generating a set, $R=(r_1, r_2, \ldots, r_n)$, of uniform random numbers $r_k$ in [0,1); and a solution vector extracting section 206 for extracting solution vectors selected from the solution vector set in accordance with the result from the random number generating section 205.

We will now describe the operation of the above-configured optimization adjusting apparatus according to the first embodiment of the present invention. As a specific problem to be solved, the present embodiment deals with the problem of estimating the maximum value of an m-dimensional function $w(x_1, x_2, \ldots x_m)$, such as shown in FIG. 6.

Figure 4:
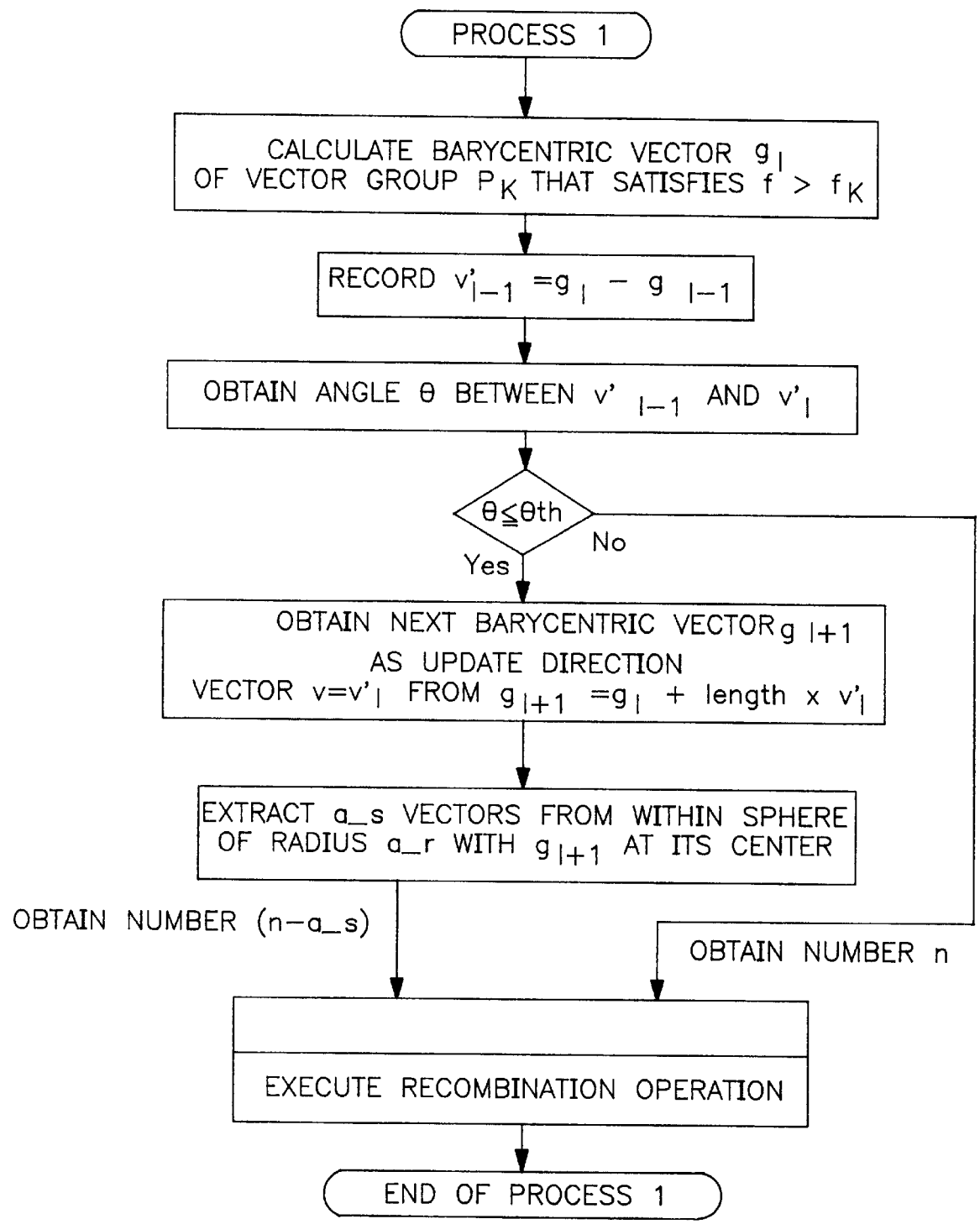
FIG. 4 is a flowchart illustrating the sequence of operations in process 1 in the optimization adjusting method according to the first embodiment of the present invention.
Figure 6:
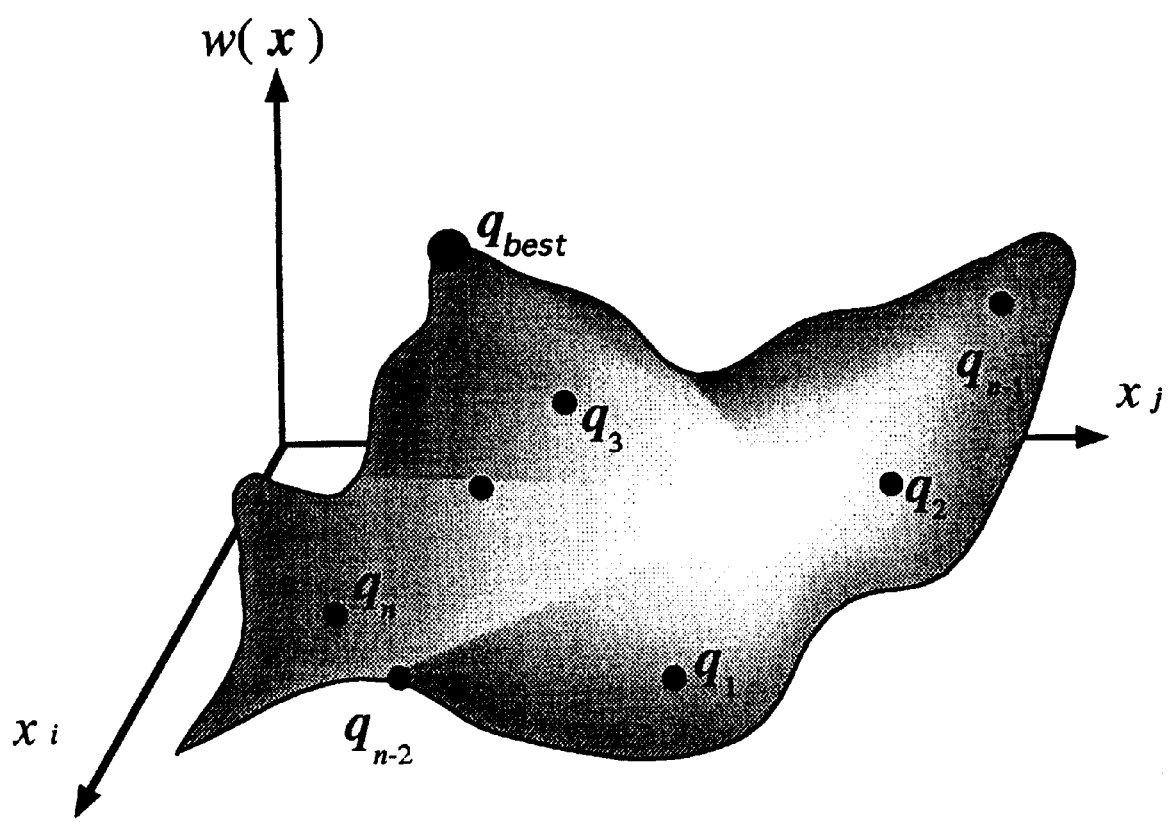
FIG. 6 is a conceptual diagram for an multi-dimensional function maximum value estimation problem treated as a specific example.

As shown in FIG. 6, the problem of estimating the maximum value of the m-dimensional function w, for example, takes the following steps. <<Condition 1>> A set Q, consisting of the number, n, of m-dimensional vectors $q_i$ $(x1^i, x2^i, \ldots, xm^i)$ $(i=1, \ldots, n)$, is constructed in accordance with a prescribed procedure or by an external instruction. <<Condition 2>> A function value $w(q_i)$ is obtained for each $q_i$ $(i=1, \ldots, n)$, and based on that value, an m-dimensional vector q that gives the largest function value $w(q)$ is estimated. <<Condition 3>> The absolute value of each element $x_k$ satisfies $|x_k| \leftarrow c_k$. <<Condition 4>> Each element $x_k$ is only accurate to a decimal places. Using the maximum value estimating problem for such an m-dimensional function w as an example, the operation of the first embodiment of the invention will be described below with reference to the flowcharts shown in FIGS. 4 and 5.

First, in the initial solution set setting section 101, an initial solution vector set, $P=\{pk\}(k=1, \ldots, n)$, is set in accordance with a prescribed procedure or by an external instruction. Various methods of setting are possible. In this example, assuming that the elements $x^i_j$ $(j=1, \ldots, m)$ of the m-dimensional vector $q_1$ to be obtained are real values accurate to one decimal place, each value is converted to a bit string code of length Blen mapped as shown in FIG. 7. The solution vector $p_k$ $(k=1, \ldots, n)$ is expressed by arranging in sequence the bit string codes converted from the elements $x^i_j$ of the vector $q_i$. In this example, the solution vector is expressed by fixed-length bit string codes, but the method of expressing the solution vector is not limited to the above one; for example, the real values may be directly used as the elements of the solution vector.

In accordance with the above expression method using bit string codes, and using uniform random numbers in [0,1) and using Expression 1, the l-th bit $(l=1, \ldots, $ Blen x m$)$ of the solution vector expressed in the form of a fixed-length bit string code is obtained, thereby setting the initial solution vector set $P=\{p_k\}(k=1, \ldots, n)$. In Expression 1, $u_1$ represents the value at the l-th bit from the least significant bit.

[Mathematical Expression 1]

$$r \geq 0.5 \rightarrow u_l = 1$$

$$r < 0.5 \rightarrow u_l = 0$$

Starting with this initial solution vector set P, the estimation of an optimal solution vector is performed. At the same time, the reference fitness $f^{th}$ to be used in the barycenter estimating section 109 and the reference shifting distance "length" to be used in the barycenter shifting section 112 are set.

The evaluation value acquisition section 104, as previously described, calculates an evaluation value $E_k$ for each solution vector $p_k$ $(k=1, \ldots, n)$ using a fitness function, for example, as shown by Expression 2.

[Mathematical Expression 2]

$$E_k = \frac{(w(q_k) - w^l_{min})}{\sum_{k=1}^{n}(w(q_k) - w^l_{min})}$$

where $q_k$ represents a coordinate vector when the solution vector $p_k$ is mapped in the original m-dimensional space, and $w^l$min indicates the smallest value of the function values $w(q_k)$ when the solution vectors $p_k$ in the set P are mapped back into the m-dimensional space coordinates, the function values being taken over all the solution vector sets obtained up to the l-th updates. As can be seen from Expression 2, the value obtained by subtracting the minimum function value in the solution vector sets so far obtained is normalized over all the solution vector sets. In the present embodiment, the problem can be regarded as the maximization problem that maximizes this evaluation value.

In the fitness calculating section 105, a value to be used to judge the fitness of each solution vector is calculated from the evaluation value calculated by the evaluation value acquisition section 104. Various functions can be considered for deriving the fitness $f_k$. In this example, $f_k$ is made equal to $E_k$, which means that the fitness increases with increasing evaluation value, so that the problem can be treated as a maximum value estimation problem.

Next, the operation of the update direction judging section 106 will be described. First, in the barycenter estimating section 109, the fitness $f_k$ of each solution vector $p_k$ $(k=1, \ldots, n)$, calculated by the fitness calculating section 105, is compared with the reference fitness $f^{th}$, and a solution vector group $P'=\{p_j^1\}$ $(j=1, \ldots, p\_num)$ having a greater fitness value than the value $f^{th}$ is selected. p_num represents the number of solution vectors belonging to P', and at this time, the barycentric vector $g_1$ can be calculated by Expression 3, where l indicates the number of update operations so far performed in the genetic algorithm processing section 102.
[Mathematical Expression 3]

$$g_l = \sum_{j=1}^{p\_num} p_j^l / p\_num$$

The update direction candidate recording section 110 obtains a difference vector $\Delta g_{l-1}$ between the barycentric vector $g_l$ calculated in the barycenter estimating section 109 in the l-th update operation and the barycentric vector $g_{l-1}$ in the (l−1)th update operation, and records it as an update direction candidate vector $v'_{l-1}=\Delta g_{l-1}$. In the update direction acquisition section 111, the degree of matching between the update direction candidate vectors $v'_l$ and $v'_{l-1}$ stored in the update direction candidate recording section 110 is evaluated; more specifically, the angle θ between the two vectors is obtained and is compared with a predetermined match criterion angle $\theta^{th}$, and if the angle is smaller than this criterion angle, then the two update direction candidate vectors $v'_l$ and $v'_{l-1}$ are judged to be directed in the same direction. θ can be calculated by Expression 4, where $\cos^{-1}$ represents an arc-cosine function, (x,y) an inner product of vectors x an y, and ‖x‖ the norm (magnitude) of the vector x.
[Mathematical Expression 4]

$$\cos^{-1}\theta = \frac{(v'_l, v'_{l-1})}{\|v'_l\| \cdot \|v'_{l-1}\|}$$

Figure 8:
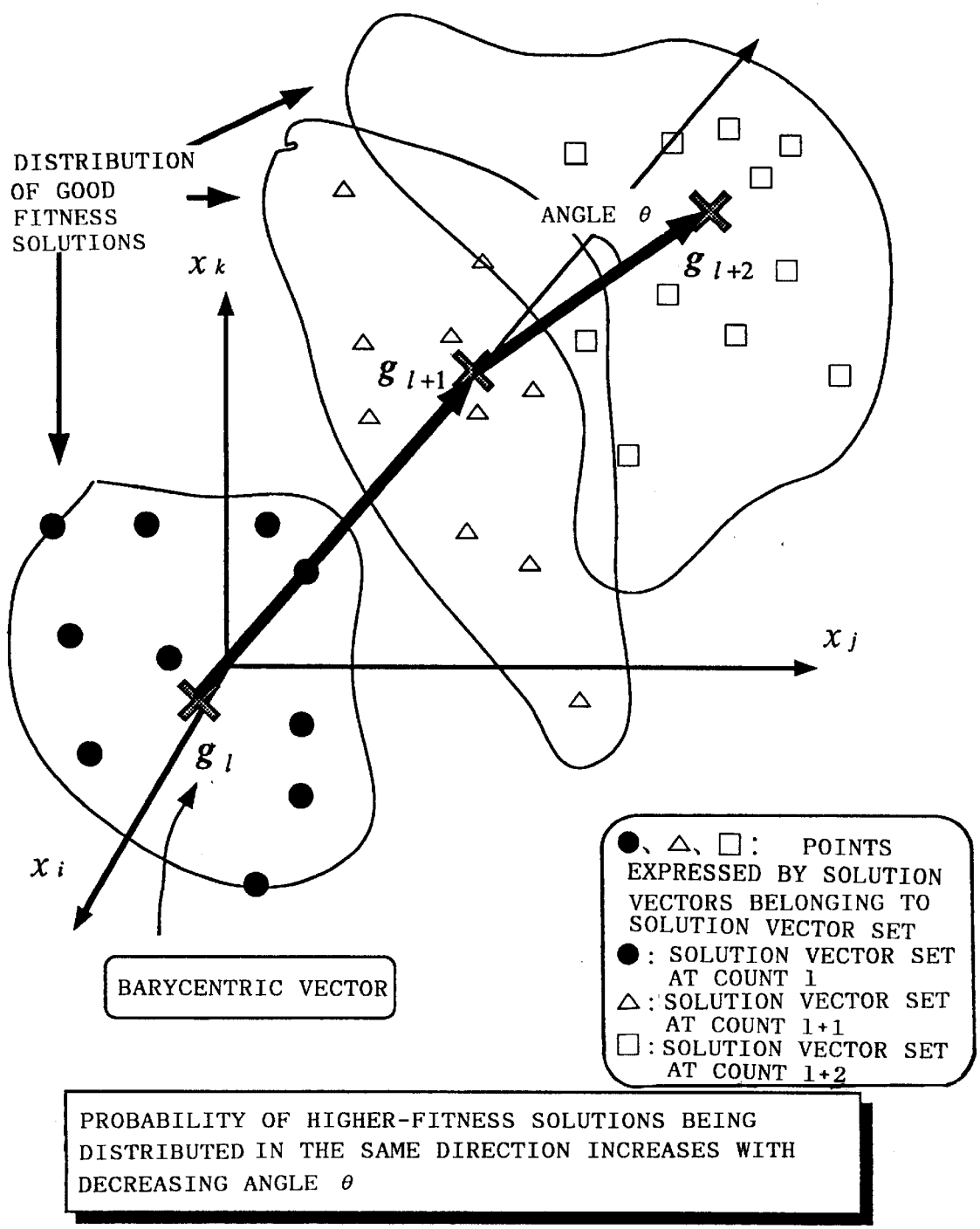
FIG. 8 is a diagram schematically illustrating the updating of solution vectors along an update direction vector.

If $v'_l$ and $v'_{l-1}$ are judged to be directed in the same direction, then it is determined that the update direction vector v has been obtained, and hence, $v=v'_l$. In this case, the process proceeds to the processing in the direction application updating section 107. On the other hand, if it is judged that $v'_l$ and $v'_{l-1}$ are not directed in the same direction, all the n solution vectors $p_k$ in the solution vector set P are updated by the recombination operation, based on a genetic operation, performed in the recombination operation section 108. FIG. 8 illustrates in schematic form how this is done.

First, the processing will be described when the update direction vector v has been obtained. In this case, the process proceeds to the processing in the direction application updating section 107, where the processing is performed first in the barycenter shifting section 112 and then in the barycenter-surrounding solution vector generating section 113. The barycenter shifting section 112 performs the processing to shift the barycentric vector $g_l$, calculated by the barycenter estimating section 109, in the direction in which the update direction vector v is pointing. For simplicity, in the method described here, the new barycentric vector $g_{l+1}$ is estimated by shifting by a predetermined translation distance "length". In an alternative method, a point that provides the greatest evaluation value in the direction of the update direction vector v may be obtained using a line search method such as the PATAN method, and that point may be taken as the barycentric vector $g_{l+1}$. The barycenter-surrounding vector generating section 113 arbitrarily extracts a number, a_s, of points contained in a sphere of multi-dimensional space of radius a_len with its center at the new barycentric vector $g_{l+1}$ calculated by the barycenter shifting section 112, as shown by Expression 5, and sets these points as the members of a new solution vector set.
[Mathematical Expression 5]

$$|p - g_{l+1}| < a\_len$$

In this example, a_s and a_len are both treated as predetermined fixed value, but other methods may be considered; for example, these values may be made to vary dynamically, or these values may be added to the solution vector $p_k$, which then may be redefined as a solution vector. The barycenter-surrounding solution vector generating section 113 also sets (n−a_s) as the number of new solution vectors to be generated by the recombination operation performed in the recombination operation section 108 at the next stage.

Figure 9:
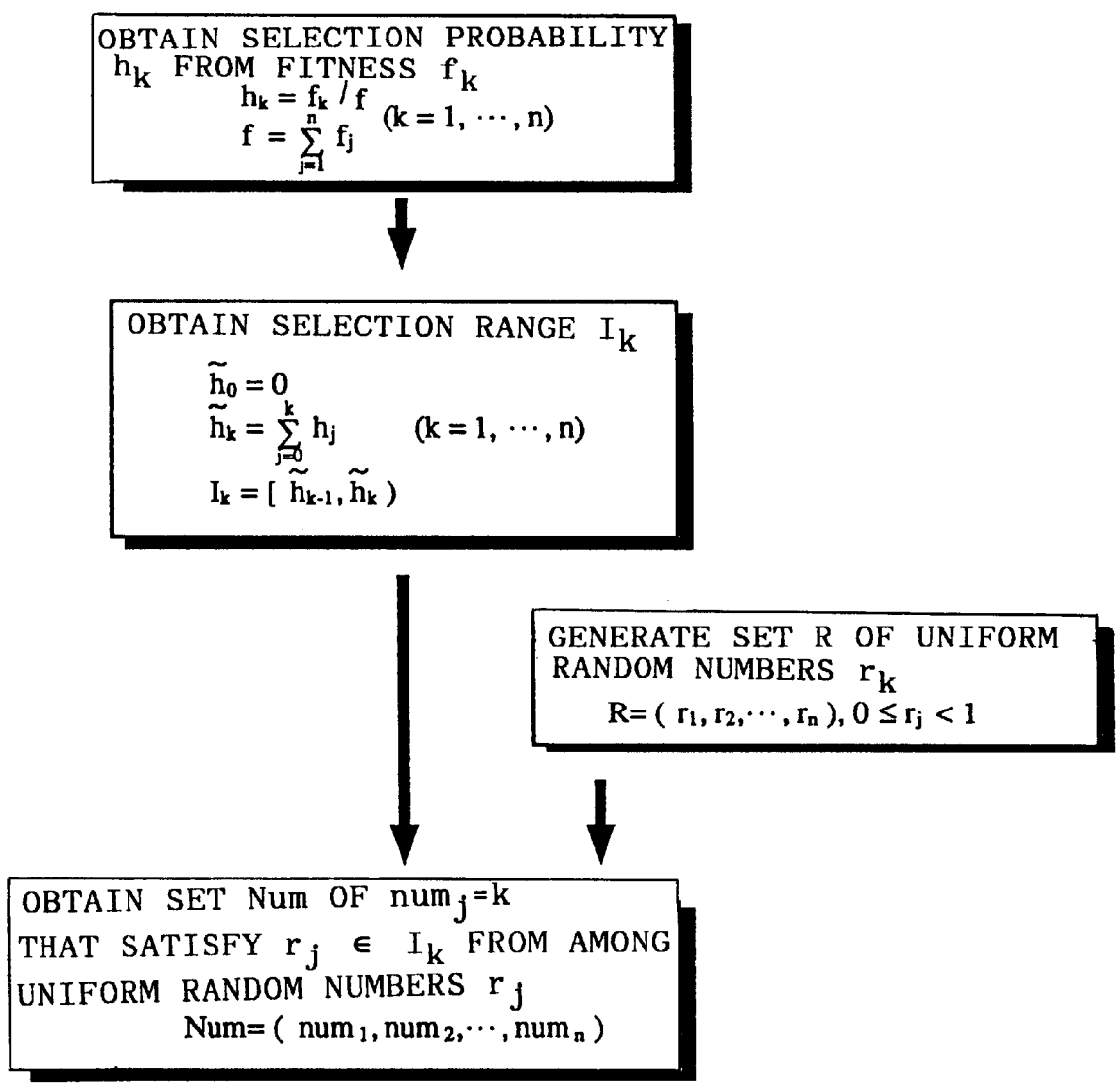
FIG. 9 is a diagram for explaining a Roulette wheel selection method used for selection.

Next, the operation of the recombination operation section 108 will be described. In this example, the same number of new solution vectors as the number specified by the update direction acquisition section 111 or the barycenter-surrounding solution vector generating section 113 are generated by applying a recombination operation to the solution vectors in the solution vector set P updated in the l-th update operation. The processing sequence from the candidate selecting section 201 through to the solution vector extracting section 206 will be described next. First, in the candidate selecting section 201, selection of solution vectors is performed. In this case, a Roulette wheel selection method is used by which solution vectors are selected with a probability proportional to the fitness, as shown in FIG. 9.
(Roulette selection method)
(i) The fitness $f_k$ of each solution vector $p_k$ (k=1, ..., n) belonging to the set P is obtained, and then the sum of the fitness values of all the solution vectors is obtained.
(ii) The selection probability $h_k$ of $p_k$ being selected as the parent for creating the next-generation solution vector is given by Expression 6.
[Mathematical Expression 6]

$$h_k = f_k / f$$

$$f = \sum_{j=1}^{n} f_j \quad (k = 1, \ldots, n)$$

This probability is assigned to each solution vector using, for example, the following method.
(iii) The selection range $I_k$ of each solution vector is mapped within the interval [0, 1) by using the following Expressions 7 and 8. That is, if
[Mathematical Expression 7]

$$\tilde{h}_0 = 0$$

$$\tilde{h}_k = \sum_{j=0}^{k} h_j \quad (k = 1, \ldots, n)$$

then, the selection range $I_k$ of $p_k$ is given
[Mathematical Expression 8]

$$I_k = [\tilde{h}_{k-1}, \tilde{h}_k)$$

Here, a set, $R=(r_1, r_2, \ldots, r_n)$, of uniform random numbers $r_k$ is generated within [0,1). By obtaining a set, Num=(num$_1$, num$_2$, ..., num$_n$), of num$_j$=k that satisfy $r_j \in I_k$ (j, k=1, ..., n), a set of n solution vectors corresponding to the set Num is selected.

By using the Roulette wheel selection method, as described above, solution vectors $p_k$ are selected from within the current solution vector set P. First, using Expressions 6 to 8, the selection range deriving section 204 calculates the selection probability $h_k$ for each solution vector and its selection range $I_k$. Next, the random number generating section 205 generates the number, n, of uniform random numbers between 0 and 1. The set R of random numbers generated by the random number generating section 205 and the selection range $I_k$ calculated by the selection range deriving section 204 are passed to the solution vector extracting section 206, where the set Num of $num_j=k$ that satisfies $r_j \in I_k$ is obtained. The solution vector extracting section 206 thus outputs a new solution vector set P consisting of solution vectors specified by Num. The crossover operation executing section 202 performs a crossover operation on the new solution vector set P obtained from the candidate selecting section 201. As previously described, there are various methods of crossover. The present embodiment uses one-point crossover or two-point crossover as shown in FIG. 71. In the mutation operation section 203, the solution vector set resulting from the processing in the crossover operation section 202 is subjected to a mutation operation by which single bits in each solution vector are inverted with low probabilities. At this time, the probability of mutation is changed between the first and second halves of the solution vector set, trying to maintain the variety of solution vectors. In this example, each solution vector to be obtained is converted to a bit string code, but as previously noted, the elements of a coordinate vector in a multi-dimensional space may be arranged as real values, to form a solution vector. In this case, the crossover processing is similar to that performed on bit string codes, and the mutation operation is accomplished by appending random numbers given within a certain range to genes (elements of a coordinate vector in a multi-dimensional space) selected with a low probability.

Finally, termination conditions for the genetic algorithm processing section 102 will be described. The conditions for terminating the solution vector update operations being performed by the genetic recombinations in the genetic algorithm processing section 102 may vary according to the problem being solved. In this embodiment, the following two conditions are set. <<Termination condition 1>> Maximum value $f^{max}$ of the fitness $f_k$ calculated in the fitness calculating section 105 is greater than convergence criterion fitness $f^{end}$. <<Termination condition 2>> The number of iterations, 1, has exceeded the termination update repetition count $g\_num^{end}$. If neither of the conditions are satisfied, the process returns to the evaluation value acquisition section 104. The estimation of an optimal solution vector is performed by iteratively performing the above process until either of the termination conditions, 1 or 2, is satisfied. In the present embodiment, as described, attention is focused on the shift vector of the barycentric vector of a group having high fitness within the solution vector set, and the solution vector group is updated by estimating the direction in which solution vectors of high fitness are expected to be distributed. At the same time, solution vectors are optimized by performing a recombination operation on the initial solution vector set, thus achieving fast and efficient optimal solution estimation using the history of past solution vector updates.

Next, the optimization adjusting method and the optimization adjusting apparatus according to the second embodiment of the present invention will be described with reference to drawings. FIG. 10 shows the configuration of the optimization adjusting apparatus according to the second embodiment of the invention. In this embodiment, first, local updating of solution vectors is performed by using the recombination operation, and then, global updating of solution vectors is performed, again using the recombination operation, thereby estimating an optimal solution vector.

In FIG. 10, reference numeral 1001 is a local updating section for extracting a dolution vector group $P^k$ of high fitness by first setting an initial dolution vector group $P^k$ around each vector $p_k$ (k=1, . . . , n) within the initial solution vector set P that was set by the initial solution set setting section 101, and then repeating the solution vector recombination operation a predetermined number of times in accordance with the fitness $f^k j$ of the solution vectors $p^k j$ (j=1, . . . , $n^k$, k=1, . . . , n) in the initial solution vector group with respect to the problem being solved; and 1002 is a global updating section for consolidating the plurality of solution vector groups $P^k$ generated by the local updating section 1001 into one set P*, and for performing a recombination operation on solution vectors $p^*_k$ (k=1, . . . , n*) within the set P*. The local updating section 1001 comprises: a local update setting section 1003 for determining a range within which to perform local updating of solution vectors from each solution vector $p_k$ within the solution vector set P; a vector group setting section 1004 for setting the initial dolution vector group $p_k$ within the range specified by the local update setting section 1003; an evaluation value acquisition section 104 for obtaining an evaluation value $E^k_j$ for each of the solution vectors $p^k j$ (j=1, . . . , $n^k$, k=1, . . . , n) with respect to the problem being solved; a fitness calculating section 105 for calculating the fitness $f^k_j$ of each solution vector from the evaluation value obtained by the evaluation value acquisition section 104; a local recombination operation section 1005 for performing, in accordance with the fitness calculated by the fitness calculating section 105, a recombination operation on solution vectors within the solution vector group and within the range determined by the local update setting section 1003; and a local update termination judging section 1006 for judging whether the number of local update operations thus far performed satisfies a predetermined number of iterations. On the other hand, the global updating section 1002 comprises: a set consolidating section 1007 for consolidating the solution vector groups $p_k$ (k=1, . . . , n) generated by the local updating section 1001 into one set $P^*=\{p^*_i\}$ (i=1, . . . , n*); and a global recombination operation section 1008 for updating solution vectors by performing a 1recombination operation on the solution vector set P* constructed by the set consolidating section 1007. Further, the local recombination operation section 1005 and the global recombination operation section 1008 each include a candidate selecting section 201, a crossover operation executing section 202, and a mutation operation executing section 203, and the candidate selecting section 201 includes a selection range deriving section 204, a random number generating section 204, and a solution vector extracting section 206.

The operation of the thus configured optimization adjusting apparatus according to the second embodiment of the invention will be described below with reference to the flowchart of FIG. 11. As in the first embodiment of the invention, the present embodiment also deals with the problem of estimating the maximum value of the multi-dimensional function w. In this embodiment also, each element of a coordinate vector in the multi-dimensional space is represented by a bit string code in accordance with the method shown in FIG. 7, and the solution vector to be estimated by the genetic algorithm is expressed by arranging the bit strings in the order of elements.

First, in the initial solution set setting section 101, an initial solution vector set, $P=\{p_k\}$ (k=1, . . . , n), is set in accordance with a prescribed procedure or by an external instruction; at the same time, a local range radius b_len to be used in the local update setting section 1003 and a local update termination count $c\_j^{th}$ to be used in the local update termination judging section 1006 are set. In the local update setting section 1003, a spherical region with its center at $p_k$ of the initial set P is set in the multi-dimensional space within the local range radius b__len, as shown by Expression 9.

[Mathematical Expression 9]

$$|p-p_k| \leq b\_len$$

Here, $c\_1^{th}$ is given as a fixed value, but alternatively, this value may be made to vary dynamically and, for example, this value may be converted to a bit string and added to the solution vector $p_k$.

The vector group initial setting section 1004 sets an initial dolution vector group $P^k$ by arbitrarily extracting a plurality of solution vectors from the range set by the local update setting section 1003. Here, a number, $n^k$, of solution vectors $p^k_j$ (j=1, ..., $n^k$), including the solution vector $p_k$ located at the center, are extracted. In the present embodiment, $n^k$=n. The evaluation value acquisition section 104 calculates the evaluation value $E^k_j$ for each solution vector in accordance with Expression 4, and the fitness calculating section 105 calculates the fitness $f^k_j$ from the evaluation value $E^k_j$. The local recombination operation section 1005 performs a recombination operation on the solution vectors in accordance with the fitness calculated by the fitness calculating section 105, within the region expressed by Expression 9. The processing performed here is the same as that performed in the recombination operation section 108 in the optimization adjusting apparatus of the first embodiment of the invention; therefore, description thereof will not be repeated here. After the dolution vector group $P^k$ has been updated in the local recombination operation section 1005, the local update termination judging section 1006 compares the local update count $c\_1$ with the local update terminal count $c\_1^{th}$ to determine whether $c\_1>=c\_1^{th}$ is satisfied. If it is satisfied, the local updating process is terminated. If it is not satisfied, 1 is added to $c\_1$, and the processing from the evaluation value acquisition section 105 through the local update termination judging section 1006 is repeated once again. In this manner, recombinations based on genetic operations are performed on solution vectors around the initially set solution vector set, to search for solution vectors having higher fitness. In this example, $n^k$ in the local update setting section 1003 has been set equal to n, but alternatively, this value may be made variable relative to the solution vector $P^k$ in the initial solution vector set P. It is also possible to dynamically vary this value relative to the local update count $c\_1$.

Next, the processing performed in the global updating section 1002 will be described. First, the set consolidating section 1007 consolidates the solution vector groups $P^k$ (k=1, ..., n) extracted by the local updating section 1001 into one set $P^*=|p^*_i|$ (i=1, ..., n*). In one method of consolidation, the solution vectors from all the solution vector groups $P^k$ are first sorted in decreasing order of fitness, and then a number, n*, of solution vectors are selected in decreasing order of fitness to generate a consolidated set P*. The global recombination operation section 1008 updates the solution vectors by performing the recombination operation on the solution vector set P* generated by the set consolidating section 1007. The processing performed here is the same as that performed in the recombination operation section 108 in the optimization adjusting apparatus of the first embodiment of the invention; therefore, description thereof will not be repeated here. FIG. 12 is a diagram illustrating the series of operations in schematic form.

Finally, the termination conditions will be described. In this embodiment, as in the optimization adjusting apparatus of the first embodiment, comparisons are made against two values, the convergence criterion fitness $f^{end}$ and the termination update repetition count $g\_num^{end}$. That is, the following two conditions are set. <<Termination condition 1>> In the set consolidating section, the maximum value $f^{max}$ of the fitness $f_k$ of the solution vectors $p^k i$ in each solution vector group $P^k$ is greater than the convergence criterion fitness $f^{end}$. <<Termination condition 2>> The repetition count 1, representing the number of update cycles through the local updating section 1001 and global updating section 1002, has exceeded the termination update repetition count $g\_num^{end}$.

If neither of the conditions are satisfied, the process returns to the local update setting section 1003. If the conditions are satisfied, the process proceeds to the optimal solution output section 103, and a solution vector having the highest fitness in the most recent solution vector set is output as the optimal solution vector. The second optimization adjusting apparatus according to this embodiment performs the estimation of an optimal solution by iteratively performing the above process until either of the termination conditions, 1 or 2, is satisfied. In this manner, by first performing local updating of solution vectors a predetermined number of times using the recombination operation, and then performing global updating of solution vectors, again using the recombination operation, the local updating ability of solution vector can be reinforced without impairing the global updating ability of solution vector innate to the genetic algorithm. This achieves quick estimation of an optimal solution.

Next, the optimization adjusting method and the optimization adjusting apparatus according to the third embodiment of the present invention will be described. FIG. 13 shows the configuration of the optimization adjusting apparatus according to the third embodiment of the invention. A feature of this embodiment is that each solution vector within the solution vector set is compared against a vector group randomly extracted from its neighboring space and a vector group having high fitness is selected as solution vectors belonging to the solution vector set to be updated and is subjected to the recombination operation.

In FIG. 13, reference numeral 1301 is an initial update region limiting section for setting a range for selecting arbitrary solution vectors from the neighborhood of each solution vector $p_k$ (k=1, ..., n) of the solution vector set P. An initial solution vector group extracting section 1302 extracts arbitrary solution vectors contained within the range set by the initial update region limiting section 1301 and constructs a solution vector group $p^k$ (k=1, ..., n). A solution vector set consolidating section 1303 consolidates the solution vector groups $P^k$ into one set P* on which the recombination operation is performed.

The operation of the thus configured optimization adjusting apparatus and optimization adjusting method according to the third embodiment of the invention will be described below with reference to the flowchart of FIG. 14. As in the first and second embodiments of the invention, the present embodiment also deals with the problem of estimating the maximum value of the multi-dimensional function w. In this embodiment also, each element of a solution vector is represented by a bit string code in accordance with the method shown in FIG. 7, and the solution vector is expressed by arranging the bit strings in the order of the elements of a coordinate vector in the multi-dimensional space.

Figure 15:
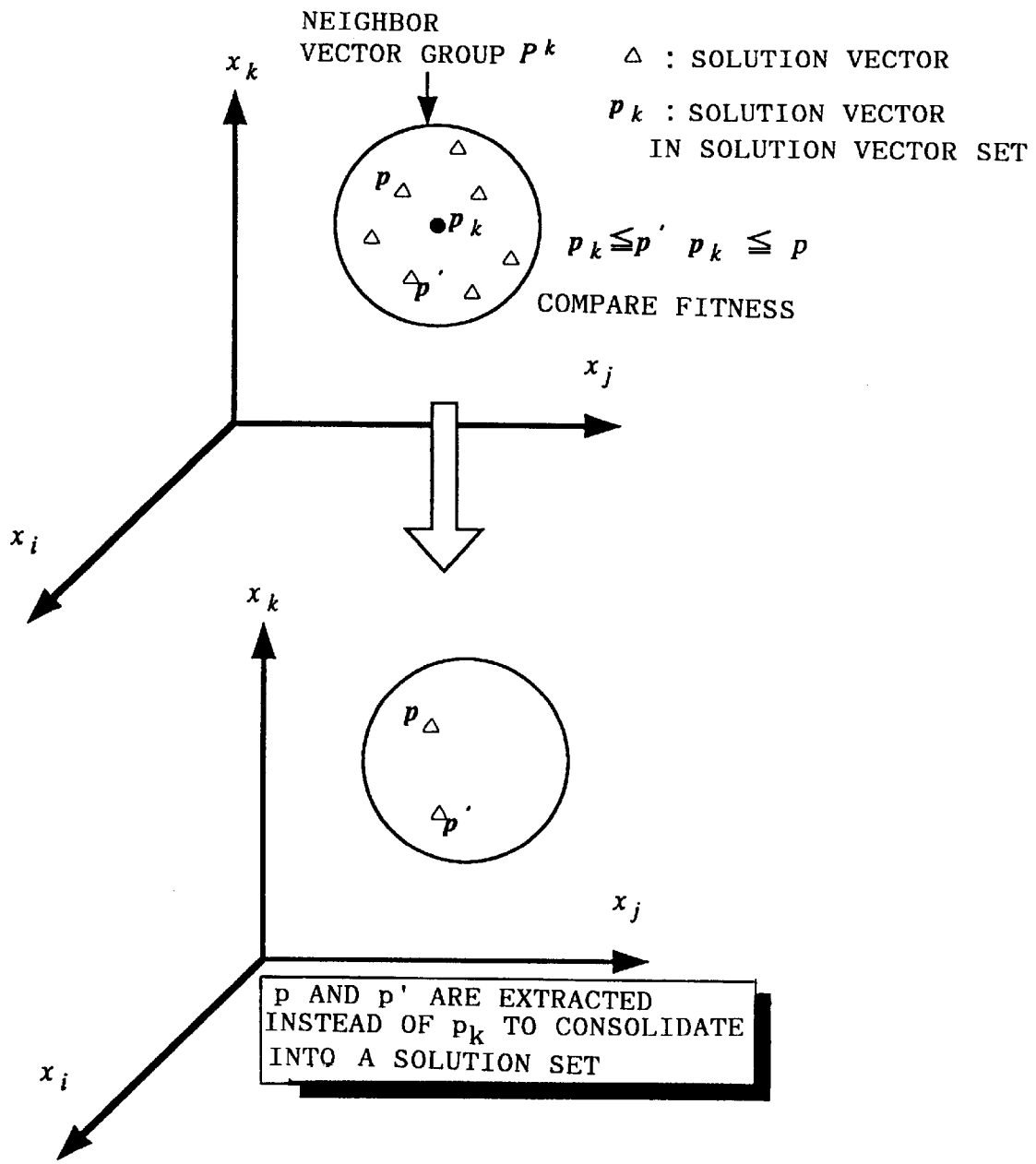
FIG. 15 is a diagram illustrating how an initial set vector group is extracted.

First, in the initial solution set setting section 101, an initial solution vector set, $P=\{p_k\}$ (k=1, ..., n), is set in accordance with a prescribed procedure or by an external instruction; at the same time, a limited region radius c_len to be used in the initial update region limiting section 1301 is set. There are various methods for setting the limited region. In the present embodiment, the initial update region limiting section 1301 uses the radius c_len and sets a spherical region in the multi-dimensional space, with its center at each solution vector $p_k$ (k=1, ..., n) of the initial solution vector set P. Next, the initial solution vector group extracting section 1302 sets a solution vector group $P^k$ with its center at each solution vector $p_k$. The solution vector group is set by arbitrarily extracting a number, $n^k$, of vectors from each spherical region. The process then goes through the evaluation value acquisition section 104 and through the fitness calculating section 105 where fitness $f^k_j$ (j=1, ..., nk) is calculated for each solution vector $p^k_j$ of the solution vector group pk. Based on the fitness thus calculated, the solution vector set consolidating section 1303 consolidates the solution vector groups into one set P*. FIG. 15 is a diagram schematically illustrating how this is done. One method to accomplish this may be by arranging the solution vectors from each solution vector group in decreasing order of fitness and by selecting a number, n*, of solution vectors in decreasing order of fitness, as in the second embodiment. In the present embodiment, however, n* solution vectors are extracted by using the same Roulette wheel selection method as used in the candidate selecting section 201 in the recombination operation section 108. More specifically, the selection probability $r^k_j$ for each solution vector $p^k_j$ is defined as the ratio of each fitness $f^k_j$ to the sum f_t, as shown by Expression 10, and this value is assigned to a range occupied by the Roulette wheel. Then, when the value selected by a random number comes to rest at a position, the solution vector at that position is extracted. Probabilistically, this leads to extracting solution vectors having high fitness.

[Mathematical Expression 10]

$$r^k_j = \frac{f^k_j}{f\_t}$$

$$f\_t = \sum_{k=1}^{n}\sum_{j=1}^{n^k} f^k_j$$

In the recombination operation section 108, as in the first embodiment of the invention, the candidate selecting section 201, the crossover operation executing section 202, and the mutation operation executing section 203, respectively perform the selection of solution vectors by the Roulette wheel selection method, the crossover operation, and the mutation operation on the solution vectors $P^*_i$ (i=1, ..., n*) within the solution vector set P* generated by the solution vector set consolidating section 1303. As compared to the optimization adjusting apparatus of the second embodiment of the invention, the method employed in the present embodiment improves the local updating ability in the simplest possible procedure.

Finally, a termination judgement is made based on whether the update repetition count 1 has exceeded the update termination repetition count $g\_num^{end}$ or whether the maximum value $f^{max}$ of the fitness fj(j=1, ..., n*) calculated by the fitness calculating section 105 has exceeded the convergence criterion fitness $f^{end}$. If one or other of these conditions is satisfied, the update process is terminated, and the optimal solution output section 103 outputs a solution vector having the highest fitness. If neither of the conditions are satisfied, the process returns to the initial update region limiting section 1301. Thus the estimation of an optimal solution is performed by iteratively performing the above process until either of the two termination conditions is satisfied. As described, according to the third optimization adjusting apparatus of the invention, each solution vector within the solution vector set is compared with a vector group randomly extracted from its neighborhood space, and a vector group having high fitness is selected as solution vectors belonging to the solution vector set that is to be subjected to an update operation. The resulting solution vector set is then subjected to the recombination operation. This overcomes the lack of the local updating ability which has been a weak point of the prior art genetic algorithm.

Next, the optimization adjusting method and the optimization adjusting apparatus according to the fourth embodiment of the present invention will be described with reference to drawings. FIG. 16 shows the configuration of the optimization adjusting apparatus according to the fourth embodiment of the invention. This embodiment resets the whole solution set by extracting a vector group from the neighborhood of each of solution vectors selected on the basis of fitness, and performs a recombination operation only on the solution vectors within each of the neighbor vector groups, thereby searching for an optimal solution.

In FIG. 16, reference numeral 1601 is a solution set resetting section for performing the resetting of the whole solution vector set, and 1602 is a group recombination operation section for generating a new solution vector set by performing a recombination operation only on the solution vectors within each of the neighbor vector groups set by the solution set resetting section 1601. The solution set resetting section 1601 comprises a representative solution vector selecting section 1603 for selecting a number of representative solution vectors from the whole solution vector set, and a neighbor vector group extracting section 1604 for extracting a vector group from the neighborhood of each of the representative solution vectors selected by the representative solution vector selecting section 1603. The group recombination operation section 1602 comprises a candidate selecting section 201, a crossover operation executing section 202, and a mutation operation executing section 203, and the candidate selecting section 201 includes a selection range deriving section 204, a random number generating section 205, and a solution vector extracting section 206.

The operation of the thus configured optimization adjusting apparatus and optimization adjusting method according to the fourth embodiment of the invention will be described below with reference to the flowchart of FIG. 17. The specific problem treated here and the method of expressing the elements of a solution vector are the same as those described in the first to third embodiments of the invention.

First, in the initial solution set setting section 101, an initial solution vector set, P={$p_k$} (k=1, ..., n), is set in accordance with a prescribed procedure or by an external instruction; at the same time, a number, $N_c$, of representative vectors, a number, $N_s$, of neighbor vectors to be extracted from a region surrounding each representative vector, and a neighborhood width $w_i$ (i=1, ..., $N_c$) defining the neighborhood, are set. The evaluation value acquisition section 104 calculates the evaluation value $E_k$ for each solution vector in accordance with Expression 4, and the fitness calculating section 105 calculates the fitness $f_k$ from the evaluation value $E_k$.

Next, the operation of the solution set resetting section 1601 will be described. First, the representative solution vector selecting section 1603 selects representative solution vectors $p^c_i$ (i=1, ..., Nc) necessary to extract neighbor vector groups from the solution sector set. Various selection methods are possible; in this embodiment, vectors probabilistically having high fitness are selected as representative solution vectors by using the same Roulette wheel selection method as used in the candidate selecting section 201 constituting a part of the group recombination operation section 1602. For the representative solution vectors $p^i_c$ selected by the representative solution vector selecting section 1603, the neighbor vector group extracting section 1604 extracts $N_s$ neighbor vectors p, each satisfying Expression 11, and creates a total of $N_c$ neighbor vector groups.

[Mathematical Expression 11]

$$|p-p_c^i| \leq w_i$$

Expression 11 expresses the inside of a sphere, in a real space, of radius $w_i$ with its center at the representative solution vector $p_i^t$. The number, $N_s$, of neighboring vectors are randomly selected from among the solution vectors contained in the sphere expressed by Expression 11 by using uniform random numbers. In the present embodiment, an Euclidean distance between solution vectors in an actual real space is used to judge the neighborhood, as shown by Expression 11. Other methods may be used for defining the neighborhood; for example, between two solution vectors x and y converted to bit string codes, the low-order L bits from the rightmost position may be compared, to define the neighborhood on the basis of the number of inverted bits.

With the above processing in the solution set resetting section 1601, the number, $N_c$, of neighbor vector groups are extracted. Next, the group recombination operation section 1602 performs an recombination operation only on the solution vectors within each of the neighbor vector groups. First, the candidate selecting section 201 performs the selection of solution vectors within each neighbor vector group by using the Roulette wheel selection method, and then the crossover operation executing section 202 performs the crossover operation on each new neighbor vector group generated by the candidate selecting section 201. As a result of the recombination operation thus performed separately on each of the neighbor vector groups, a new solution vector set is generated, on which the mutation operation executing section 203 performs the mutation operation.

Finally, a termination judgement is made based on whether the update repetition count 1 has exceeded the update termination repetition count $g\_num^{end}$ or whether the maximum value $f^{max}$ of the fitness f calculated by the fitness calculating section 105 has exceeded the convergence criterion fitness $f^{end}$. If one or other of these conditions is satisfied, the update process is terminated, and the optimal solution output section 103 outputs a solution vector having the highest fitness. By selecting vector groups from the neighborhoods of the representative solution vectors and grouping them together, as described above, local search can be performed more efficiently. Furthermore, by performing the recombination operation separately on each of the neighbor vector groups, solution vectors having particularly high fitness are prevented from causing a direct and significant influence on the whole solution set.

Next, the optimization adjusting method and the optimization adjusting apparatus according to the fifth embodiment of the present invention will be described with reference to drawings. In the fifth embodiment, the neighborhood of a solution vector in the solution vector set is divided into a plurality of regions, and of these regions, a region having high average fitness is selected, from which region a plurality of solution vectors are arbitrarily extracted; concurrently with this selection process, solution vector updating is carried out by performing a recombination operation on the solution vectors within the initial solution vector set. FIG. 19 shows the configuration of the optimization adjusting apparatus according to the fifth embodiment of the invention. An update region dividing section 1901 divides a space in the neighborhood of two solution vectors arbitrarily selected from the solution vector set into a plurality of regions, and an average fitness calculating section 1902 extracts a plurality of solution vector points from within each of the plurality of regions created by the update region dividing section 1901, and obtains the evaluation value and the average fitness of each region. Further, a fit region solution vector group extracting section 1903 arbitrarily selects a plurality of solution vectors from the region selected by the average fitness calculating section 1902, and a solution vector consolidating section 1904 consolidates a solution set generated by the recombination operation and a solution vector group updated by a neighbor region search into one set P*.

The operation of the thus configured optimization adjusting apparatus and optimization adjusting method according to the fifth embodiment of the invention will be described below with reference to the flowchart of FIG. 20. The specific problem treated here and the method of expressing the elements of a solution vector are the same as those described in the first to fourth embodiments of the invention.

First, as in the foregoing embodiments, the initial solution set setting section 101 sets an initial solution vector set, $P=\{p_k\}$ (k=1, . . . , n), in accordance with a prescribed procedure or by an external instruction. The evaluation value acquisition section 104 calculates the evaluation value $E_k$ for each solution vector in accordance with Expression 4, and the fitness calculating section 105 calculates the fitness $f_k$ from the evaluation value $E_k$. Based on the fitness $f_k$, the recombination operation section 108 performs genetic recombination operations on the solution vectors $p_k$ within the solution vector set P. Concurrently with this processing, the following processing is performed.

First, in the update region dividing section 1901, a straight line section L connecting solution vectors $p_k$ and $p_m$ can be set. This section L can be expressed as Expression 12.

[Mathematical Expression 12]

$$p=(p_k-p_m)\cdot\alpha+p_m$$

where $\alpha$ is a real value.

This straight line section is divided into the following three regions.

(1) Region moving away from $p_k$ with $p_m$ as the starting point, that is, $\alpha<0.0$.
(2) Region between vectors $p_k$ and $p_m$, that is, $0.0 \leftarrow \alpha \leftarrow -1.0$.
(3) Region moving away from $p_m$ with $p_k$ as the starting point, that is, $\alpha>0.0$.

For the solution vector $p_k$, mating solution vectors $p_m$ are randomly selected from the solution vector set P. Using straight lines in this manner, the neighborhood of the solution vector $p_k$ can be divided into a plurality of regions. Alternatively, it is possible to consider a spherical region with $p_k$ at its center and divide the spherical region by a meridian angle $\beta$ into a plurality of regions.

Figure 21:
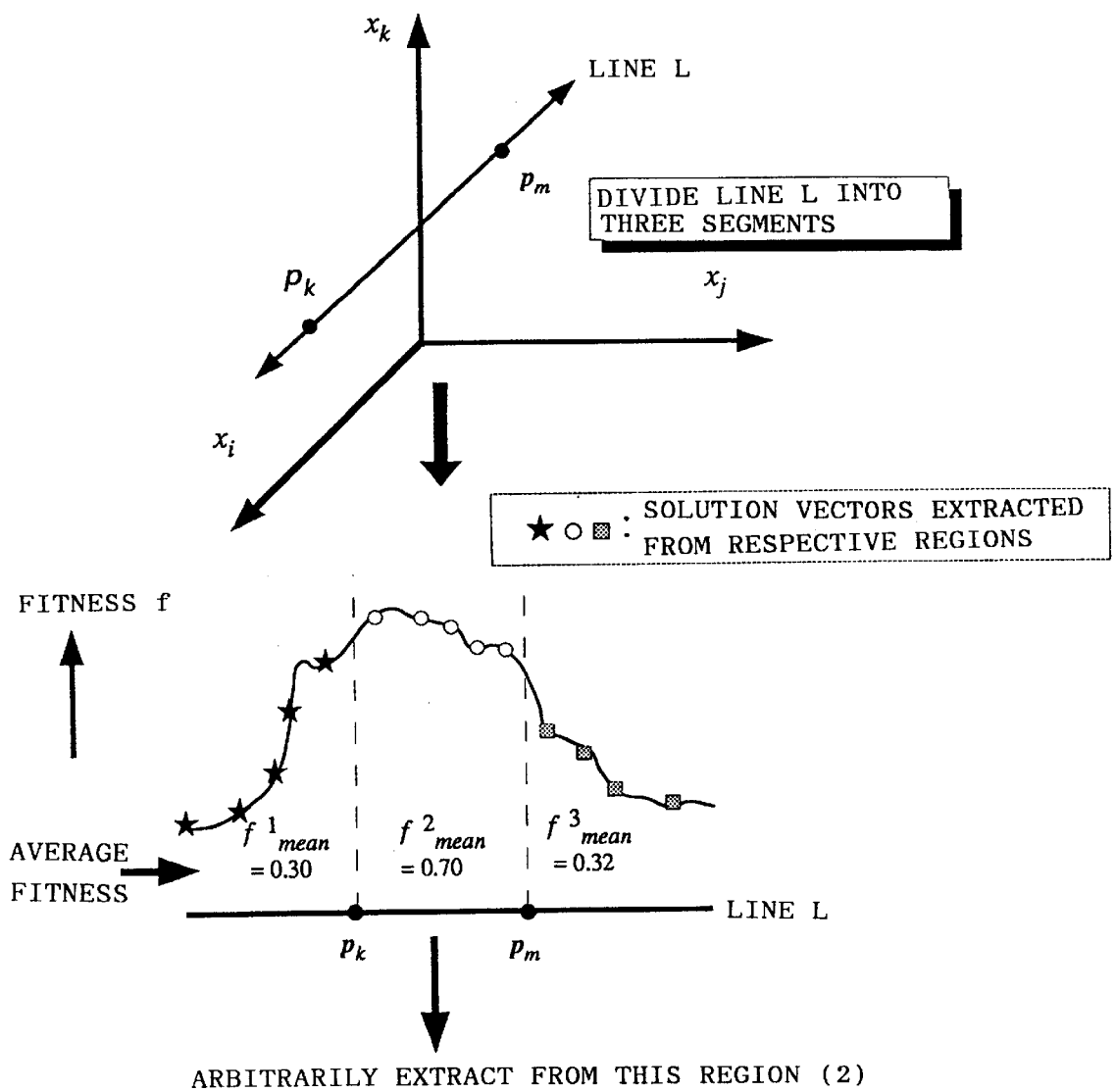
FIG. 21 is a diagram schematically illustrating the division of an update region and the extraction of solution vectors therefrom.

The average fitness calculating section 1902 selects a number, $n^c$, of solution vectors from each of the regions (1), (2), and (3), calculates their evaluation values and fitnesses, and derives average fitness $f^i_{mean}$ (i=1, 2, 3) for each region. Based on the results from the average fitness calculating section 1902, the fit region solution vector extracting section 1903 selects a region having the highest average fitness, and randomly extracts from it a vector group $P^k$ having $n^d$ solution vectors as its members. FIG. 21 illustrates how this is done. In the illustrated example, region (2) is selected. A solution vector having the highest fitness in the most recent solution vector set is output. The solution vector group $P^k$ (k=1, . . . , n) extracted by the fit region solution vector extracting section 1903 and the new solution vector set P generated by the recombination operation section 108 are consolidated by the solution vector consolidating section 1904 into one set P*. Various selection methods are possible, such as the method of the second embodiment that extracts solution vectors in decreasing order of fitness, and the method of the third embodiment that selects those probabilistically having high fitness by using the Roulette wheel selection method.

As in the foregoing embodiments, the following two termination conditions are set. <<Termination condition 1>> The update repetition count 1 has exceeded the update termination repetition count $g\_num^{end}$. <<Termination condition 2>> The maximum fitness $f^{max}$ has exceeded the convergence criterion fitness $f^{end}$.

If neither of the conditions are satisfied, the process returns to the evaluation acquisition section 104; if one or other of the conditions is satisfied, the optimal solution output section 103 outputs a solution vector having the highest fitness as the optimal solution. Searching for an optimal solution is conducted by iteratively performing the above process until one or other of the termination conditions is satisfied. In this manner, the operation to update solution vectors near each solution vector of the solution vector set is performed concurrently with the optimization of solution vectors performed by the recombination operation within the solution vector set. As a result, the local solution vector updating ability can be reinforced while retaining the efficient global solution vector updating ability that the genetic algorithm innately has; thus, the estimation of an optimal solution vector can be performed efficiently.

Next, the optimization adjusting method and the optimization adjusting apparatus according to the sixth embodiment of the present invention will be described below. FIG. 22 shows the configuration of the optimization adjusting apparatus according to the sixth embodiment of the invention. In this embodiment, the solution vector set is divided into a plurality of groups based on the arithmetic mean and standard deviation of fitnesses, and searching for an optimal solution is conducted by performing a recombination operation only on the solution vectors within each separate group.

In FIG. 22, reference numeral 2201 is a solution set dividing section for dividing the whole solution vector set into a plurality of groups. The solution set dividing section 2201 comprises a divided region determining section 2202 for determining the regions into which the whole solution vector set is to be divided, and a division executing section 2203 for dividing the solution vector set into a plurality of groups based on the result from the division region determining section 2202.

The operation of the thus configured optimization adjusting apparatus and optimization adjusting method according to the sixth embodiment of the invention will be described below with reference to the flowchart of FIG. 23. The specific problem treated here and the method of expressing the elements of a solution vector are the same as those described in the first to fifth embodiments of the invention.

First, in the initial solution set setting section 101, an initial solution vector set, $P=\{p_k\}$ (k=1, . . . , n), is set in accordance with a prescribed procedure or by an external instruction; at the same time, a number, $N_g$, of groups into which to divide the solution vector set and a natural constant n used to divide it are set. The evaluation value acquisition section 104 calculates the evaluation value $E_k$ for each solution vector in accordance with Expression 4, and the fitness calculating section 105 calculates the fitness $f_k$ from the evaluation value $E_k$. Two conditions are set to determine convergence, that is, whether the update repetition count 1 has exceeded the update termination repetition count $g\_num^{end}$, or whether the maximum value $f^{max}$ of the fitness f calculated by the fitness calculating section 105 has exceeded the convergence criterion fitness $f^{end}$. If either one of these conditions is satisfied, the solution vector update process is terminated, and the optimal solution output section 103 outputs a solution vector having the highest fitness.

Next, the operation of the solution set dividing section 2201 will be described. First, the divided region determining section 2202 calculates the arithmetic mean Ave of the fitness $f_k$ calculated by the fitness calculating section 105 and its standard deviation σ. Then, when $N_g$=3, for example, the following three regions are determined by using Ave, σ, and the natural constant n that was set in the initial solution set setting section 101, as shown in FIG. 24(a) illustrating population distribution relative to the fitness $f_k$.
(A) Region of $f_k$>(Ave+σ×n)
(B) Region of (Ave−σ×n)←$f_k$←(Ave+σ×n)
(C) Region of $f_k$<(Ave−σ×n)
In accordance with the result of the divided region determining section 2202, the division executing section 2203 divides the whole solution vector set. FIG. 24(b) is a diagram schematically illustrating the distribution of the divided groups in an actual real space. In the fourth embodiment of the invention, vector groups were extracted from the neighborhoods of representative solution vectors without regard to the distribution considered based on the fitness of the current solution vector set, but the sixth embodiment differs significantly from the fourth embodiment in that the current solution vector set is divided in accordance with the distribution of the fitness. In the present embodiment, n is assumed to be a fixed value, but alternatively, this value may be made to vary dynamically.

In the group recombination operation section 1602, as in the fourth embodiment of the present invention, the selection of solution vector using the Roulette wheel selection method and the crossover operation are performed in the candidate selecting section 201 and the crossover operation executing section 202, respectively, only on the solution vectors within the plurality of groups created by the solution set dividing section 2201. Then, the mutation operation executing section 203 performs the mutation operation on the whole solution vector set newly generated.

The estimation of an optimal solution vector is performed by iteratively performing the above-described solution vector set update process until the convergence conditions are satisfied. In this manner, by dividing the whole solution vector set into a plurality of groups on the basis of the average fitness and the standard deviation, and by performing the recombination operation only on the solution vectors of each group independently of the other groups, solution vectors having particularly high fitness and solution vectors having low fitness are separately grouped together for subjection to the recombination operation independently of each other. This prevents such solution vectors from causing a direct and significant influence on the whole solution vector set. Furthermore, within each group, convergence to a solution is quickly achieved, thus accomplishing efficient estimation of an optimal solution vector.

Next, the optimization adjusting method and the optimization adjusting apparatus according to the seventh embodiment of the present invention will be described with reference to drawings. In the seventh embodiment, every time the fitness is calculated, a decision is made, based on the arithmetic mean of the fitness, its standard deviation, and the maximum and minimum fitnesses, as to whether the solution vector set should be divided into a plurality of groups, and based on this decision, the target of the recombination operation is selected; then, an optimal solution search is conducted by performing the recombination operation on the solution vectors within the thus selected target. FIG. 25 shows the configuration of the optimization adjusting apparatus according to the seventh embodiment of the invention, wherein reference numeral 2501 is a recombination target control section for making a decision as to whether to divide the whole solution vector set into a plurality of groups, based on the arithmetic mean of the fitness, its standard deviation, and the maximum and minimum fitnesses.

The operation of the thus configured optimization adjusting apparatus and optimization adjusting method according to the seventh embodiment of the invention will be described below with reference to the flowchart of FIG. 26 illustrating the whole process and the flowchart of FIG. 27 illustrating process 2. The specific problem treated here and the method of expressing the elements of a solution vector are the same as those described in the first to sixth embodiments of the invention.

First, in the initial solution set setting section 101, an initial solution vector set, $P=\{p_k\}$ (k=1, . . . , n), is set in accordance with a prescribed procedure or by an external instruction, as in the foregoing embodiments; at the same time, a number, $N_g$, of groups into which to divide the solution vector set and a natural constant n used to divide it are set. The evaluation value acquisition section 104 calculates the evaluation value $E_k$ for each solution vector in accordance with Expression 4, and the fitness calculating section 105 calculates the fitness $f_k$ from the evaluation value $E_k$. Two conditions are set to determine convergence, that is, whether the update repetition count 1 has exceeded the update termination repetition count $g\text{-num}^{end}$, or whether the maximum value $f^{max}$ of the fitness f calculated by the fitness calculating section 105 has exceeded the convergence criterion fitness $f^{end}$. If either one of these conditions is satisfied, the solution vector update process is terminated, and the optimal solution output section 103 outputs a solution vector having the highest fitness.

This embodiment differs from the sixth embodiment in that the control section 2501 for making a decision as to whether to divide the solution vector set is provided in order to avoid efficiency loss due to meaningless division (for example, when all the solution vectors of the solution vector set have fitnesses very close to each other). The recombination target control section 2501 first obtains the average Ave and standard deviation σ from the fitness $f_k$ calculated by the fitness calculating section 104, and based on these values and on the maximum and minimum fitnesses, makes a decision as to whether the solution vector set should be divided into a plurality of groups. Various criteria for the decision are possible; the present embodiment adopts the convention that when the condition expressed by Expression 13 is satisfied, it is decided that the solution vector set needs to be divided into a plurality of groups

[Mathematical Expression 13]

$$\frac{(f_{\max} - f_{\min})}{2\sigma} > c_f$$

where $f^{max}$ denotes the maximum fitness, $f_{min}$ the minimum fitness, and $c_f$ a fitness distribution criterion constant. In accordance with the result of the above decision, the recombination target control section 2501 operates in the following manner.

<<Decision 1>> If it is decided that the solution vector set should not be divided, the whole solution vector set is selected as the recombination target and the process proceeds to the recombination operation section 108.

<<Decision 2>> If it is decided that the solution vector set should be divided, the process proceeds to the solution set dividing section 2201, where the solution vector set is divided based on the average fitness value Ave and standard deviation σ using a method similar to that used in the sixth embodiment of the invention.

In the recombination operation section 108, the recombination target selected by the recombination target control section 2501 is subjected to the selection of solution vectors by the Roulette wheel selection method in the candidate selecting section 201, one-point or two-point crossover in the crossover operation executing section 202, and mutation in the mutation operation executing section 203.

Then, a decision is made as to whether updating of the solution vector set should be continued or not, based on the same convergence conditions as used in the first to sixth embodiments of the invention. The estimation of an optimal solution vector is performed by iteratively performing the above process. In this manner, a decision is made as to whether the solution vector set should be divided into a plurality of groups, based on the arithmetic mean of the fitness, the standard deviation, and the maximum and minimum fitnesses. If it is decided that the set should be divided, the solution set dividing section divides the whole solution set into a plurality of groups; if it is decided otherwise, the whole solution set is selected as the recombination target. Solution vector selection and recombination operations are performed on the thus selected recombination target, and based on the distribution of the fitness, the presence or absence of a solution vector having particularly high fitness is detected. Then, the recombination target is limited in such a manner as to reduce the effect of such a solution vector. Efficient estimation of an optimal solution vector can thus be achieved.

Next, the optimization adjusting method and the optimization adjusting apparatus according to the eighth embodiment of the present invention will be described below. FIG. 28 shows the configuration of the optimization adjusting apparatus according to the eighth embodiment of the invention. In this embodiment, a stepwise convergence fitness value and the number of solution vectors that satisfy that value are defined as stepwise convergence criteria used in an update region setting section, and every time the stepwise convergence criteria are satisfied, the update region setting section further localizes the update region and increases the precision of the stepwise convergence fitness, based on which the estimation of an optimal solution vector is performed.

In FIG. 28, reference numeral 2801 is the update region setting section for evaluating the stepwise convergence criteria, i.e., the stepwise convergence fitness value and the number of solution vectors that satisfy the value, and for localizing the search region and tightening the precision of the stepwise convergence fitness every time the criteria are satisfied. The update region setting section 2801 includes a stepwise convergence judging section 2802 for evaluating the stepwise convergence fitness value $fl_{th}$ and the number, $Nl_{th}$, of solution vectors that satisfy the value, and a convergence criterion altering section 2803 for localizing the update region and tightening the precision of the stepwise convergence fitness when the stepwise convergence judging section 2802 has judged that convergence has been achieved.

The operation of the thus configured optimization adjusting apparatus and optimization adjusting method according to the eighth embodiment of the invention will be described below with reference to the flowchart of FIG. 29. The specific problem treated here and the coding method for solution vectors are the same as those described in the first to seventh embodiments of the invention.

First, in the initial solution set setting section 101, an initial solution vector set, $P=\{p_k\}$ (k=1, . . . , n), is set in accordance with a prescribed procedure or by an external instruction, as in the foregoing embodiments. Starting with this initial solution vector set P, the estimation of an optimal solution vector is performed. At the same time, the update region of the initial solution vectors and the initial stepwise convergence criteria are set. The stepwise convergence criteria are defined as the stepwise convergence fitness value $fl_{th}$ and as the number, $Nl_{th}$, of solution vectors that satisfy the value, and the initial stepwise convergence fitness value $fl_{th0}$ and the initial population count $Nl_{th0}$ are set as $fl_{th}=fl_{th0}$ and $Nl_{th}=Nl_{th0}$, respectively. The initial update region is a region expressed by a binary code of length Blen corresponding to a coefficient, with only the most significant Clen bit being set valid and less significant bits set to 0.

In the update region setting section 2801, first the stepwise convergence judging section 2802 compares the fitness value $f_k$ calculated by the fitness calculating section 105 with the stepwise convergence fitness value $fl_{th}$, and counts the number, N1, of solution vectors for which $f_k$ is greater than $fl_{th}$. In the stepwise convergence judging section 2802, a stepwise convergence condition is set to judge whether the stepwise convergence fitness $fl_{th}$ has exceeded the predetermined convergence criterion fitness $f^{end}$, and the following decisions are made.

<<Decision 1>> When $N1 >= Nl_{th}$, and when the stepwise convergence condition is satisfied, the process proceeds to the optimal solution output section 103.

<<Decision 2>> When $N1 >= Nl_{th}$, but when the stepwise convergence condition is not satisfied, the convergence criteria altering section 2803 alters the stepwise convergence fitness $fl_{th}$ in accordance with Expression 14.

$$fl_{th}^{new} = fl_{th}^{prv} + \Delta fl$$

[Mathematical Expression 14]

where $fl_{th}^{new}$ is the newly set stepwise convergence fitness, $fl_{th}^{prv}$ is the current stepwise convergence fitness, and $\Delta fl$ is a positive real constant representing the predetermined rate of change of the stepwise convergence fitness. In this example, $\Delta fl$ is set as a fixed value, but it is also possible to set this value to vary dynamically. In the convergence criteria altering section 2803, the Clen bit, which is the current update region of each binary-coded coefficient, is stored as is when the coefficient is contained in a vector satisfying $fl_{th}^{prv}$. For those vectors that do not satisfy the condition, one randomly selected from among a plurality of vectors that satisfy the condition is copied to the Clen bit which is the current search region of each coefficient. After that, the region expressed by the next significant bit in each coefficient is newly set as the update region. In this case, the upper bits than the update region,are left unchanged , while the lower bits than the update region are set to 0. If the Clen bit is shifted beyond the predetermined Blen bit length assigned to each coefficient, then the update region is set starting at the least significant bit which is set as the Clen bit.

When the above processing is complete, a decision is made once again in the stepwise convergence judging section 2802.

<<Decision 3>> When $N1<=Nl_{th}$, the process proceeds to the recombination operation section 108.

FIG. 30 illustrates the update bit selection process performed in the case of decision 2, with the update region being mapped in a space of real values that the actual coefficient can take. Since the coefficient, an element of a solution vector, is expressed by a bit string code as shown in FIG. 7, variation in high-order bits corresponds to a large variation in the actual real space, while variation in low-order bits corresponds to a local variation centering around the current point. Therefore, as shown in FIG. 30, the update bit selection process performed in the case of decision 2 corresponds to a process in which updating is performed by limiting and reducing the size of the update region in a stepwise manner, that is, first by roughly and globally updating the region each coefficient can take, and then by gradually limiting the size of the searching region for local updating.

Two conditions are set as convergence conditions based on which to judge the termination of solution vector updating within the solution vector set: that is, the stepwise convergence condition used in decisions 1 and 2 and the condition for judging whether the update repetition count 1 has exceeded the update termination repetition count $g\_num^{end}$. The estimation of an optimal solution is performed by iteratively performing the above solution vector update process until either one of these conditions are satisfied. In this manner, by first performing a global and rough search on solution vectors and then gradually narrowing down the search, it becomes possible to reduce the effects of the poor local search ability in the neighborhood of an optimal solution, which has been a problem with the prior art. An efficient and fast optimal solution search can thus be achieved.

In the above description of the optimization adjusting method and optimization adjusting apparatus based on the genetic algorithm according to the first to eighth embodiments of the invention, the problem of estimating the maximum value of a multi-dimensional function has been used as a specific example, but it will be recognized that the method and apparatus can also be applied to other problems such as the previously described travelling salesman problem, a knapsack problem which is the problem of finding the maximum number of given items that can be put into a knapsack with a limited volume, a multi-dimensional function approximation problem which is the problem of finding from multiple points in a given multi-dimensional space a multi-dimensional function properly approximating them, a scheduling problem for appropriately working out midnight shift schedules, for example, for nurses working the night shift in a hospital, and parametric design of aircraft, etc. As an example, a one-dimensional function approximation problem that can be described below will be discussed.

<<Condition 1'>> A set Q consisting of a number, t, of two-dimensional vectors $q_i$ ($x_i$, $y_i$) (i=1, . . . , t) is constructed in accordance with a prescribed procedure or by an external instruction.

<<Condition 2'>> A function of the (s-l)th degree as shown by Expression 15 is defined.

<<Condition 3'>> Coefficient aj (j=0, . . . , s-l) in each term of the function of the (s-l)th degree expressed by Expression 15 that best approximates the two-dimensional vector set Q in condition 1 is found within the range satisfying Expression 16. Here, $x \in xk$ is regarded as an independent variable, and $c_j$ as an upper search limit of the absolute value of the coefficient $a_j$.

[Mathematical Expression 15]

$$y \cong \sum_{j=0}^{s-1} a_j \cdot x^j$$

[Mathematical Expression 16]

$$|a_j| \leq c_j$$

Figure 31:
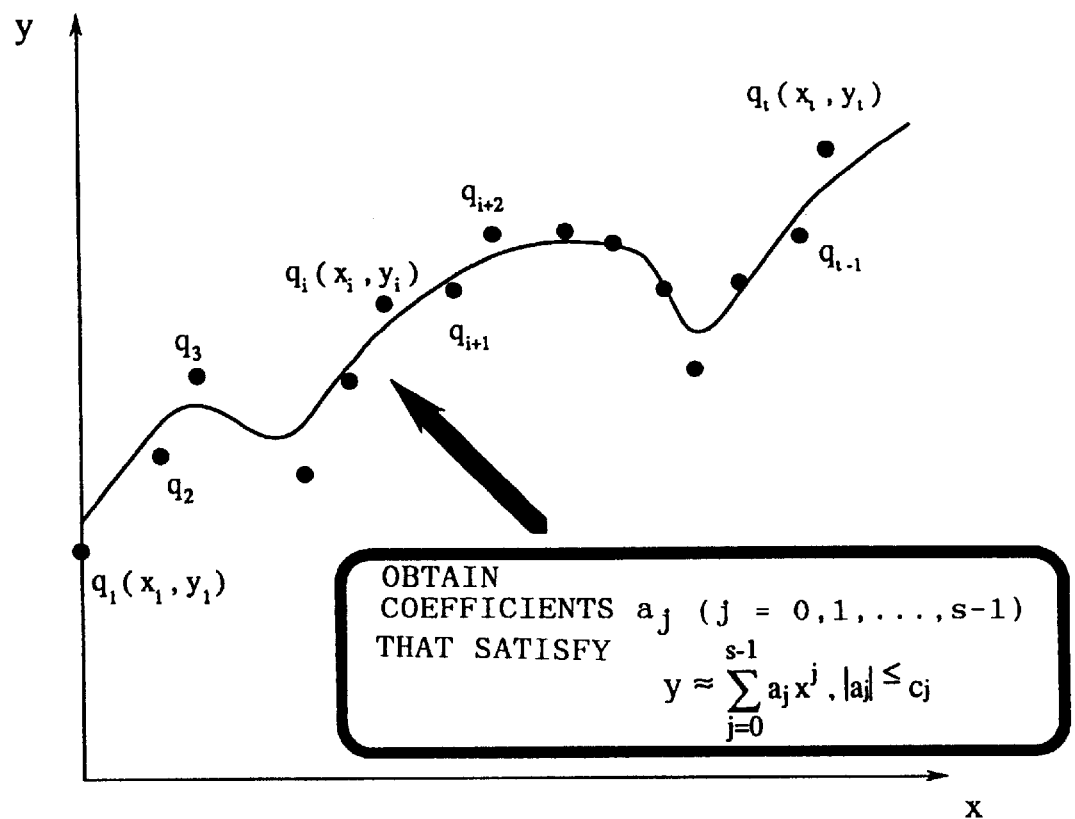
FIG. 31 is a conceptual diagram for a one-dimensional function approximation problem.

<Condition 4>> It is, however, assumed that the two-dimensional vector data count t in condition 1 is far larger than the number, s, of coefficients $a_j$ to be searched. FIG. 31 represents this in schematic form. In this case, a method can be considered wherein the evaluation value acquisition section 104 calculates the evaluation value $E_k$ for each solution vector $p_k$ by using as the fitness function the sum of the square of the difference between the predetermined two-dimensional vector data $q_i$ ($x_i$, $y_i$) and the vector data $o_i$ ($x_i$, $z_i$) estimated from the obtained approximation function, as shown for example by Expression 17.

[Mathematical Expression 17]

$$E_k = \frac{1}{2}\sum_{i=1}^{t}(y_i - z_i)^2$$

Thus the one-dimensional function approximation problem can be regarded as the minimization problem of minimizing the evaluation value.

From the evaluation value calculated by the evaluation value acquisition section 104, the fitness calculating section 105 calculates the fitness value to judge the fitness of each solution vector. Various functions can be considered for deriving the fitness value $f_k$. In this example, $f_k = V - E_k$ where V is a positive real constant larger than $E_k$. In this way, the fitness value can be derived as a value that increases as the evaluation value decreases.

The optimization adjusting method and optimization adjusting apparatus according to the ninth to 23rd embodiments of the present invention will now be described below with reference to drawings. The ninth to 23rd embodiments hereinafter described are each concerned with the optimization adjusting method and optimization adjusting apparatus utilizing an interactive genetic algorithm for estimating an optimal solution vector on the basis of user evaluation.

The optimization adjusting method and optimization adjusting apparatus according to the ninth embodiment of the invention will be described below with reference to drawings. In the ninth optimization adjusting method and optimization adjusting apparatus hereinafter described, the update region of the solution vectors to be adjusted is limited in accordance with their characteristics and past adjustment results, and using an interactive genetic algorithm, the adjustment of an optimal solution is performed on the solution vectors within that region. The ninth embodiment described here is concerned with an example in which the optimization adjusting method and optimization adjusting apparatus are applied to the adjustment of lenses used for vision correction.

In FIG. 32, reference numeral 3201 is a subject data input section for inputting subject data; 3202 is an update region limiting section for limiting the region that solution vectors can take; 101 is an initial solution set setting section for setting an initial solution vector set, $P=\{p_k\}$ (k=1, ..., n), to be adjusted, in accordance with a prescribed procedure or by an external instruction; 3203 is a main processing section for actually adjusting the optimal solution vector by genetic recombination operations or the like; and 3204 is an apparatus adjustment executing section for adjusting an apparatus operating on the data input through the subject data input section 3201, in accordance with the optimal solution vector output from the optimal solution output section. The main processing section 3203 comprises: a user evaluation section 3205 for presenting information expressed by each solution vector to the user and for making the user evaluate the solution vector; a fitness calculating section 105 for calculating the fitness $f_k$ of each solution with respect to the problem being solved, from the evaluation value $E_k$ calculated by the user evaluation section 3205; a recombination operation section 108 for performing selection of solution vectors and recombination operations such as crossover and mutation, in accordance with the fitness of each vector calculated by the fitness calculating section 105; and a set resetting section 3206 for resetting the solution vector set by replacing, in the solution vector set generated by the recombination operation section 1081, the solution vectors lying outside the limited range set by the update region limiting section 3202 with arbitrary vectors that fall within the limited range. The user evaluation section 3205 comprises: an information presenting section 3207 for presenting to the user the information expressed by each solution vector; and a user evaluation judging section 3208 for making the user judge the evaluation value of each solution vector on the basis of the information presented by the information presenting section 3207. The recombination operation section 108 comprises, as shown in FIG. 2, a candidate selecting section 201, a crossover operation executing section 202, and a mutation operation executing section 203, and the candidate selecting section 201 includes a selection range deriving section 204, a random number generating section 205, and a solution vector extracting section 206.

Figure 72:
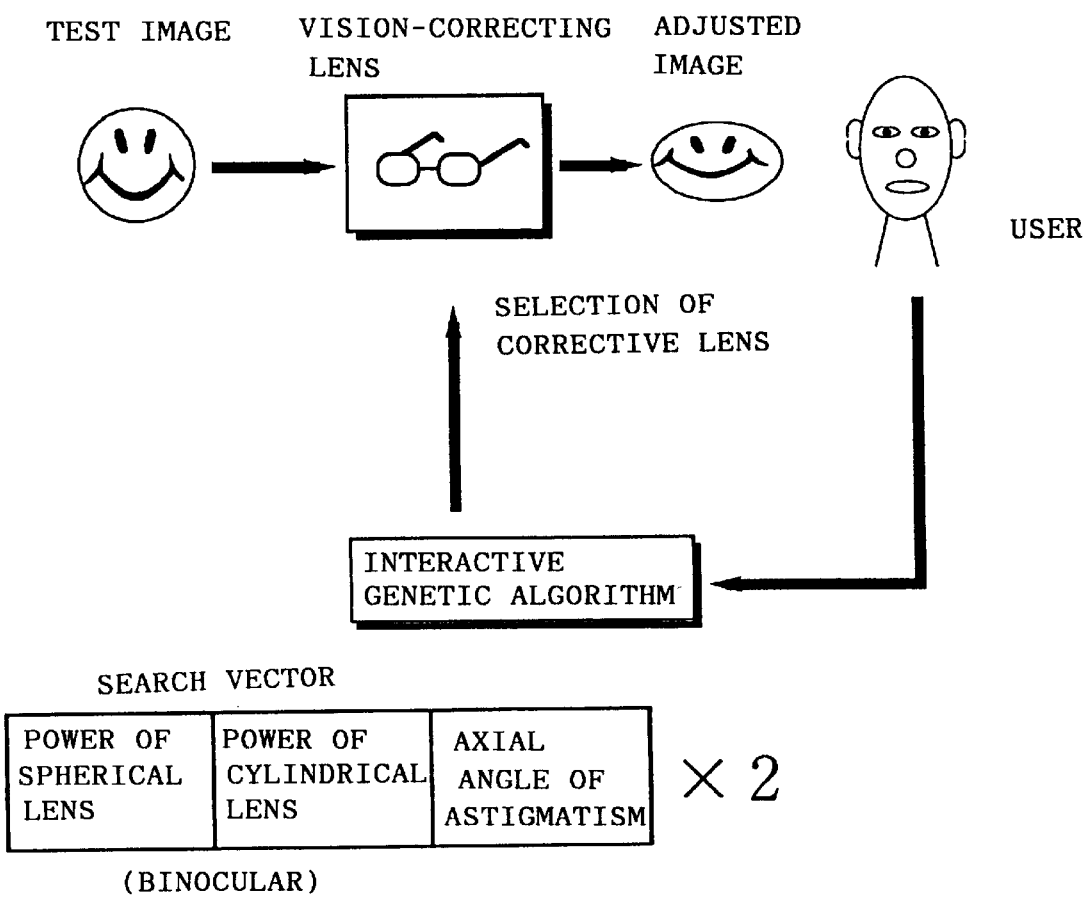
FIG. 72 is a conceptual diagram illustrating the problem of adjusting vision correcting lenses.
Figure 73:
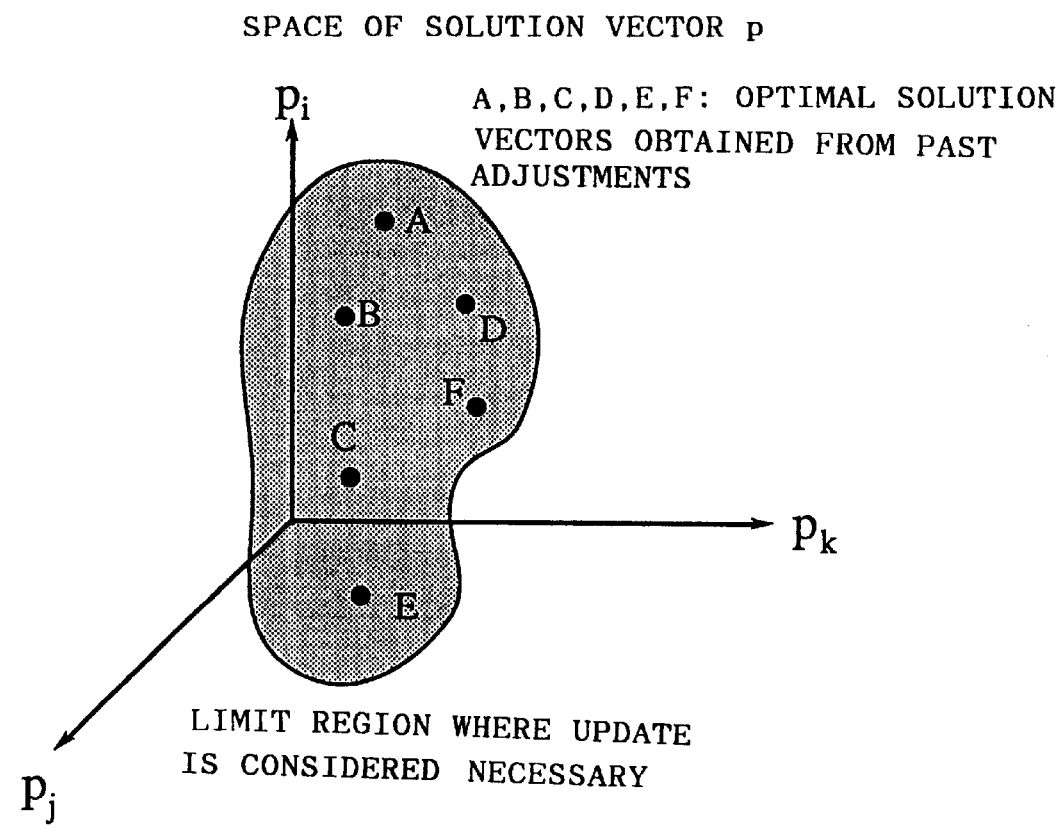
FIG. 73 is a conceptual diagram illustrating the limiting of an update region in a solution vector space.

The operation of the thus configured optimization adjusting apparatus and optimization adjusting method according to the ninth embodiment of the invention will be described below with reference to the flowchart of FIG. 33. First, a test image for presentation to the user is input as input data at the subject data input section 3201, as shown in FIG. 72. The solution vector $p_k$ to be adjusted is expressed by a combination of (the power of a spherical lens $L^{SPH}$(D), the power of a cylindrical lens, $L^{CYL}$(D), for correction of astigmatism, and the angle of the axis of astigmatism $L^{AXIS}$(degrees), used for the left eye, and the power of a spherical lens $R^{SPH}$(D), the power of a cylindrical lens, $R^{CYL}$(D), for correction of astigmatism, and the angle of the axis of astigmatism $R^{AXIS}$(degrees), used for the right eye). Here, the power of each lens is expressed in units of D which is the reciprocal of the focal length (m). Nearsightedness is represented by the minus sign (−) and farsightedness by the plus sign (+); for example, a nearsighted eye with the far point of the focal length at 50 cm is expressed as −2.0 D (1 m/50 cm), and a corrective lens with a power of −2.0 D is used. In this example, each solution vector is treated as having elements of real values, but it is also possible to convert each real value to a bit string code of the corresponding length Blen and express a solution vector by arranging the bit string codes in sequence, as shown in FIG. 7. The update region limiting section 3202 limits the search area so that in the solution vector space a search is conducted only within a region Φ where the past optimal solution vectors exist, for example, as shown in the conceptual drawing of FIG. 73.

Using uniform random numbers, the initial solution set setting section 101 randomly selects solution vectors from among the solution vectors contained within the region Φ, to construct an initial solution vector set P={$p_k$} (k=1, ..., n). Starting with this initial solution vector set P, the adjustment of an optimal solution vector is performed. The information presenting section 3207 presents an adjusted image of the test image input from the subject data input section 3201, as viewed through the corrective lens expressed by the solution vector $p_k$ constituting a member of the solution vector set P. The user sees this image and judges the evaluation value $E_k$ of the corrective lens created by each solution vector; this operation is performed in the user evaluation judging section 3208. Based on the evaluation value obtained from the user evaluation judging section 3208, the fitness calculating section 105 calculates the fitness value $f_k$ to judge the fitness of each solution vector. Various functions are proposed to derive the fitness value $f_k$, but in this example, $f_k$ is set equal to $E_k$.

The operation of the recombination operation section 108 is the same as that in the first to eighth embodiments, and therefore, explanation will not be repeated here. The set resetting section 3206 resets the solution vector set by removing, from the solution set newly generated by the recombination operation, those solution vectors which lie outside the limited region Φ set by the update region limiting section 3202, and by adding the solution vectors randomly selected from within the limited region Φ.

As termination conditions, a decision is made as to whether the number of iterations has exceeded the allowable number of iterations, and at the same time, it is checked whether the information the user was requested to evaluate meets the user's satisfaction. If neither of these conditions are satisfied, the process returns to the information presenting section 3207. Optimization of the solution vector is achieved by iteratively carrying out the above process until either the number of iterations as a termination condition is satisfied or the user's satisfaction is met. Then, the optimal solution output section 103 outputs a solution vector having the highest evaluation value as the optimal solution vector, in accordance with which the apparatus adjustment executing section 3204 adjusts the corrective lens or directs the adjustment thereof. In this way, the user can easily adjust by himself vision-correcting lenses in accordance with the degree of vision based on his eyesight. Further, since the search region for the solution vector to be adjusted is limited on the basis of its characteristics and the past adjustment results so that the search is performed on the solution vectors within the limited region, there is no need to search through unnecessary regions, thereby enabling quick adjustment of the optimal solution vector.

Next, the optimization adjusting method and optimization adjusting apparatus according to the 10th embodiment of the invention will be described below with reference to drawings. In the 10th optimization adjusting method and optimization adjusting apparatus hereinafter described, the initial solution vector set to be adjusted is constructed based on the past optimal solution vector information already recorded, and the optimal solution vector is derived by using an interactive genetic algorithm. As in the ninth embodiment of the invention, the 10th embodiment also is concerned with an application to the adjustment of lenses used for vision correction. FIG. 34 shows the configuration of the adjusting apparatus according to the 10th embodiment of the invention.

In FIG. 34, reference numeral 3401 is a recording medium on which optimal solution vectors obtained from past adjustments are recorded; 3402 is a recorded information reading section for reading a group of past optimal solution vectors recorded; 3403 is an initial solution vector selecting section for selecting, from among the past optimal solution vectors read by the recorded information reading section 3402, solution vectors to be used in the initial solution set P; 3404 is an initial solution vector replenishing section for constructing the initial set of solution vectors by adding randomly-generated solution vectors to the solution vectors selected by the initial solution vector selecting section 3403; and 3405 is an optimal solution vector recording section for recording the solution vector, optimized for the user and output from the optimal solution output section 103, on the recording medium 3401.

The operation of the thus configured optimization adjusting apparatus and optimization adjusting method according to the 10th embodiment of the invention will be described below with reference to the flowchart of FIG. 35.

First, test image data for presentation to the user is input at the subject data input section 3201. As in the case of the optimization adjusting method and optimization adjusting apparatus according to the ninth embodiment of the invention, the solution vector $p_k$ to be adjusted is expressed by a combination of (the power of a spherical lens $L^{SPH}$(D), the power of a cylindrical lens, $L^{CYL}$(D), for correction of astigmatism, and the angle of the axis of astigmatism $L^{AXIS}$(degrees), used for the left eye, and the power of a spherical lens $R^{SPH}$(D), the power of a cylindrical lens, $R^{CYL}$(D), for correction of astigmatism, and the angle of the axis of astigmatism $R^{AXIS}$(degrees), used for the right eye). The recorded information reading section 3402 reads a group of optimal solution vectors obtained from the past adjustments recorded on the recording medium 3401. The initial solution vector selecting section 3403 selects a number, $n_s$, solution vectors from the past optimum solution group read by the recorded information reading section 3402, and the initial solution vector replenishing section 3404 at the next stage adds (n−$n_s$) solution vectors randomly generated by uniform random numbers, thereby constructing the initial set P of solution vectors. If the number of solution vectors recorded on the recording medium 3401 is smaller than $n_s$, as many solution vectors as recorded are selected by the initial solution vector selecting section 3403, and the initial solution vector replenishing section 3404 adds solution vectors so that the number of elements of the initial solution vector set becomes equal to n. An adjusted image as viewed through the corrective lens is presented by the information presenting section 3207, the evaluation value of each solution vector is judged in the user evaluation judging section 3208, the fitness of each solution vector is calculated by the fitness calculating section 105, and recombination of solution vectors is performed by the recombination operation section 108, thus generating a new solution vector set. As termination conditions, as in the case of the optimization adjusting method and optimization adjusting apparatus of the ninth embodiment of the invention, a decision is made as to whether the number of iterations has exceeded the allowable number of iterations, and at the same time, it is checked whether the information the user was requested to evaluate meets the user's satisfaction. If neither of these conditions are satisfied, the process returns to the information presenting section 3207. Optimization of the solution vector is achieved by iteratively carrying out the above process until either the number of iterations as a termination condition is satisfied or the user's satisfaction is met. Then, the optimal solution output section 103 outputs a solution vector having the highest evaluation value as the optimal solution vector, in accordance with which the apparatus adjustment executing section 3204 adjusts the corrective lens or directs the adjustment thereof. At this time, the optimal solution vector recording section 3405 records the optimal solution vector on the recording medium 3401 so that it serves as the starting point for the next adjustment process. In this way, the user can easily adjust by himself vision-correcting lenses in accordance with the degree of vision based on his eyesight. Further, since the initial set of solution vectors is constructed using the past optimal adjustment information already recorded and the search is conducted by excluding solution vectors undesirable for the user, the adjustment of the optimal solution vector can be performed efficiently, while alleviating the user burden when performing the evaluation of each solution vector.

Next, the optimization adjusting method and optimization adjusting apparatus according to the 11th embodiment of the invention will be described below with reference to drawings. In the 11th optimization adjusting method and optimization adjusting apparatus hereinafter described, user evaluation value is corrected based on the user's psychological state estimated from the user's physiological information, and based on the thus corrected evaluation value, the optimal solution vector is adjusted using an interactive genetic algorithm. The 11th embodiment deals with the problem of adjusting lenses used for vision correction, as in the ninth embodiment of the invention. FIG. 36 shows the configuration of the optimization adjusting apparatus according to the 11th embodiment of the invention.

In FIG. 36, reference numeral 3601 is a user psychology estimating section for estimating the user's psychological state from the user's physiological data obtained when the user evaluates information expressed by each solution vector; and 3602 is an evaluation value correcting section for correcting the user-judged evaluation value on the basis of the obtained psychological state. The user psychology estimating section 3601 comprises a physiological data measuring section 3603 for measuring the user's physiological data while the user is evaluating information expressed by each solution vector, and a psychology estimation executing section 3604 for estimating the user's psychological state from the thus measured physiological data.

The operation of the thus configured optimization adjusting apparatus and optimization adjusting method according to the 11th embodiment of the invention will be described below with reference to the flowchart of FIG. 37.

Figure 75:
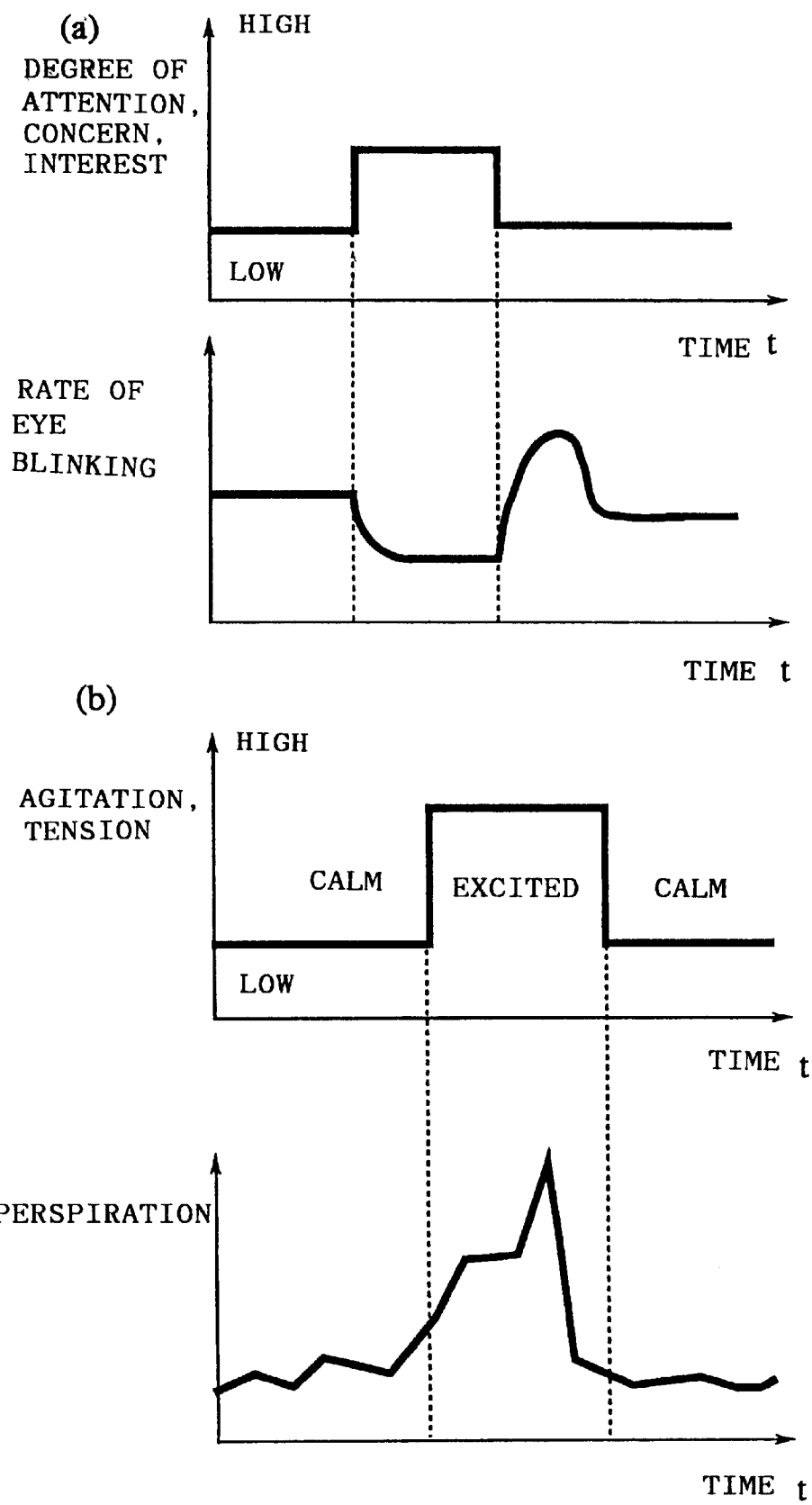
FIG. 75 is a diagram showing an example of a psychological state estimating method employed in the optimization adjusting apparatus according to the 11th and 19th embodiments of the present invention, part (a) showing the relationship of the rate of eye blinking relative to the degree of attention and interest, and part (b) the relationship of perspiration relative to tension and agitation.

First, test image data for presentation to the user is input at the subject data input section 3201. As in the case of the optimization adjusting method and optimization adjusting apparatus of the ninth embodiment of the invention, the solution vector $p_k$ to be adjusted is expressed by a combination of (the power of a spherical lens $L^{SPH}(D)$, the power of a cylindrical lens, $L^{CYL}(D)$, for correction of astigmatism, and the angle of the axis of astigmatism $L^{AXIS}$(degrees), used for the left eye, and the power of a spherical lens $R^{SPH}(D)$, the power of a cylindrical lens, $R^{CYL}(D)$, for correction of astigmatism, and the angle of the axis of astigmatism $R^{AXIS}$(degrees), used for the right eye). The initial solution set setting section 101 sets an initial solution vector set $P=\{p_k\}$ (k=1, ..., n) in accordance with a prescribed procedure or by an external instruction. The information presenting section 3207 presents to the user an adjusted image as viewed through the corrective lens created by each solution vector. The user then judges how well the image is adjusted by each solution vector; this operation is performed in the user evaluation judging section 3208. At the same time, the physiological data measuring section 3603 measures the user's physiological data while the user is judging the image adjusted by each solution vector. Various kinds of data (skin electrode resistance, respiration volume, pulse rate, blood pressure, eyeball movement, brain wave, etc.) can be used as the physiological data to be measured. The following description deals with an example in which the rate of eye blinking and the amount of perspiration are used as the physiological data. As shown in FIG. 75(*a*), in the case of a human, if the subject he is looking at is interesting or attracts his attention, eye blinking is suppressed and the rate of blinking tend to become lower than usual. When he is released from such a condition, then his eye blinking rate tends to increase rapidly as if to catch up on the blinking so far suppressed and then decrease gradually to the usual rate. By utilizing this phenomenon, when the user's blinking rate $n_{eye}$ is greater than a predetermined allowable blinking rate $n_{eye}^{th}$, it can be judged that the user's interest in the subject is low. Further, as shown in FIG. 75(*b*), when he gets nervous or is agitated, perspiration increases and skin electrode resistance varies greatly. The psychological estimation executing section 3604 judges these conditions. First, when it is judged by the psychology estimation executing section 3604 that the user's interest is low, the average evaluation value $E_{ave}$ and standard deviation $\sigma_E$ of the evaluation values $E_k$ (k=1, ..., n) of the solution vectors $p_k$ are calculated, and the following correction is made.

(i) When $0.0 < E_k - E_{ave} <= \sigma_E$, then $E_k \leftarrow E_k +$ Correction amount $\Delta E_{cor}^1$.

(ii) When $0.0 < E_{ave} - E_k <= \sigma_E$, then $E_k \leftarrow E_k -$ Correction amount $\Delta E_{cor}^1$.

Generally, when interest is low, it is expected that the user evaluation value tends to become small, but by applying these corrections (i) and (ii), the evaluation value Ek can be distributed over a wide range. This is effective in performing the adjustment of the optimal solution vector by using a genetic algorithm. On the other hand, when it is judged that the user is agitated, the following correction is made.

(iii) When $E_k - E_{ave} >= \sigma_E$, then $E_k < E_k -$ Correction amount $\Delta E_{cor}^2$.

(iv) When $E_{ave} - E_k >= \sigma_E$, then $E_k \leftarrow E_k +$ Correction amount $\Delta E_{cor}^2$.

These corrections, contrary to the corrections (i) and (ii), have the effect of suppressing the tendency of the user evaluation to vary greatly due to his state of mind being shaken. In the corrections (i) to (iv), when $E_k$ is greater than the maximum feasible evaluation value $EA_{max}$, then $E_k$ is set equal to $EA_{max}$, and when $E_k$ is smaller than the minimum feasible evaluation value $EA_{min}$, then $E_k$ is set equal to $EA_{min}$.

The fitness calculating section 105 calculates the fitness from the corrected evaluation value obtained from the evaluation value correcting section 3602, and the recombination operation section 108 performs the selection of solution vectors and carries out recombination of solution vectors by crossover and mutation operations. The process, starting with the presentation of an adjusted image at the information presenting section and ending with the recombination operation, is performed iteratively until the number of iterations exceeds the allowable number of iterations or until the information presented to the user for evaluation meets the user's satisfaction. The optimal solution output section 103 outputs a solution vector having the highest evaluation value as the optimal solution vector, based on which the apparatus adjustment executing section 3204 adjusts the corrective lens or directs the adjustment thereof. In this way, since the user's psychological state is constantly estimated based on the user's physiological data obtained when the user is performing evaluation, and the user evaluation value is corrected based on the result of the estimation, the effect of variation in the user evaluation can be reduced, and thus the solution vector adjustment optimum to the user condition (hearing, vision, etc.) can be achieved without being affected by the environment.

Next, the optimization adjusting method and optimization adjusting apparatus according to the 12th embodiment of the invention will be described below with reference to drawings. In the 12th optimization adjusting method and optimization adjusting apparatus hereinafter described, an evaluation model for the user adjustment process is estimated based on the history of adjustments made by each individual user when searching for a solution vector optimum for his own requirements by using an interactive genetic algorithm. The 12th embodiment deals with the problem of adjusting lenses used for vision correction, as in the ninth embodiment of the invention. FIG. 38 shows the configuration of the optimization adjusting apparatus according to the 12th embodiment of the invention. In FIG. 38, reference numeral 3801 is an evaluation model output section for outputting a set of parameters that can describe the evaluation model for the user adjustment process obtained in the main processing section 3203; 3802 is a second user evaluation section for presenting information expressed by each solution vector for evaluation by the user, and for recording the resulting evaluation value and its corresponding solution vector; 3803 is an evaluation model estimation judging section for judging whether the recorded history of user adjustments satisfies a predetermined evaluation model estimation condition; and 3804 is a model estimation executing section for estimating an evaluation model for the user adjustment process on the basis of the user adjustment history recorded in an adjustment history recording section, when it is judged by the evaluation model estimation judging section 3803 that the evaluation model estimation condition is satisfied. The second user evaluation section comprises: the information presenting section 3207 for presenting information of each solution vector to the user; the user evaluation judging section 3208 for making the user evaluate each solution vector on the basis of the information presented by the information presenting section 3207; and the adjustment history recording section 3805 for recording the evaluation value obtained from the user evaluation judging section 3208 and its corresponding solution vector.

The operation of the thus configured optimization adjusting apparatus according to the 12th embodiment of the invention will be described below with reference to the flowchart of FIG. 39.

Figure 76:
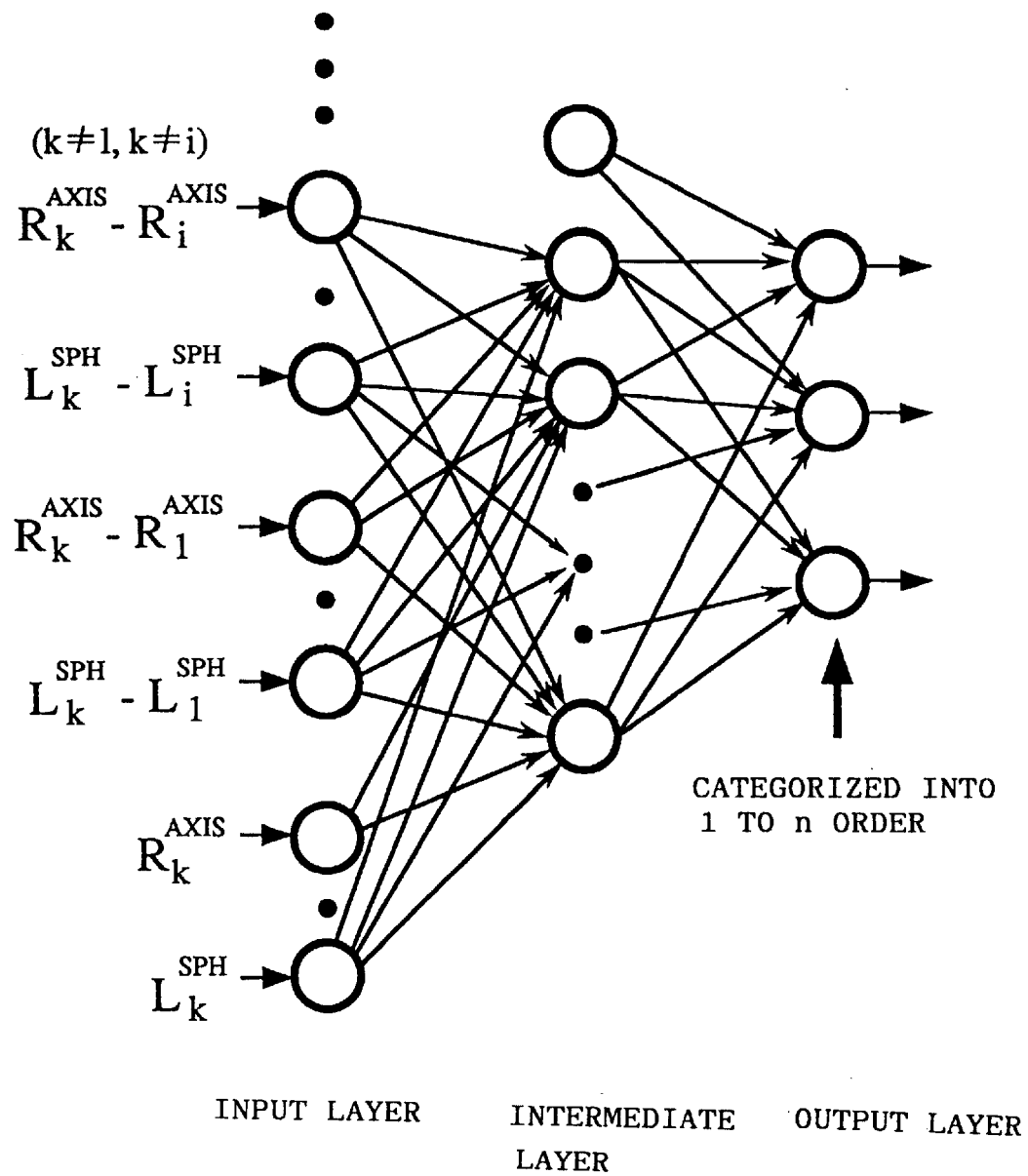
FIG. 76 is a diagram illustrating a neural network configuration used in an evaluation model estimating section in the optimization adjusting apparatus according to the 12th, 15th, 20th, and 23rd embodiments of the present invention.

First, test image data for presentation to the user is input at the subject data input section 3201. As in the case of the optimization adjusting method and optimization adjusting apparatus of the ninth embodiment of the invention, the solution vector $p_k$ to be adjusted is expressed by a combination of (the power of a spherical lens $L^{SPH}(D)$, the power of a cylindrical lens, $L^{CYL}(D)$, for correction of astigmatism, and the angle of the axis of astigmatism $L^{AXIS}$(degrees), used for the left eye, and the power of a spherical lens $R^{SPH}(D)$, the power of a cylindrical lens, $R^{CYL}(D)$, for correction of astigmatism, and the angle of the axis of astigmatism $R^{AXIS}$(degrees), used for the right eye). The initial solution set setting section 101 sets an initial solution vector set $P=\{p_k\}$ (k=1, . . . , n) in accordance with a prescribed procedure or by an external instruction. The information presenting section 3207 presents to the user an adjusted image as viewed through the corrective lens created by each solution vector. The user then judges how well the image is adjusted by each solution vector; this operation is performed in the user evaluation judging section 3208. The adjustment history recording section 3805 records the evaluation value obtained from the user evaluation judging section 3208 and its corresponding solution vector. Then, the evaluation model estimation judging section 3803 judges whether the evaluation model estimation condition is satisfied. Various factors may be used to set the evaluation model estimation condition. In this example, loop >=$loop^{th}$ is set as the evaluation model estimation condition, where loop denotes the number of iterations, 1 being added to the total number each time the processing cycle from the second user evaluation section 3802 through the recombination operation section 108 is completed, and $loop^{th}$ represents a predetermined allowable number of iterations. This is based on the assumption that more than a certain amount of data will be needed to estimate an evaluation model for the user adjustment process. If, in the evaluation model estimation judging section 3803, the evaluation model estimation condition of the number of iterations, loop, is not satisfied, then the fitness calculating section 105 calculates the fitness of each solution vector, and the recombination operation section 108 performs recombination of solution vectors to generate a new solution vector set, based on which the information presenting section 3207 again presents to the user an adjusted image as viewed through the corrective lens created by each solution vector. On the other hand, when the evaluation model estimation judging section 3803 has judged that the evaluation model estimation condition of the number of iterations, loop, is satisfied, then the model estimation executing section 3804 performs the estimation of an evaluation model for the user by using the user adjustment history recorded in the adjustment history recording section 3805. Various techniques may be used to estimate the evaluation model for the user adjustment process. In this example, a neural network, like the one shown in FIG. 76, is used. As illustrated, the neural network used in this embodiment is a feed-forward network consisting of an input layer, an hidden layer, and an output layer. The input layer consists of 6×n neurons. The values of the components of a solution vector $p_k=(L^{SPH}_k, L^{CYL}_k, L^{AXIS}_k, R^{SPH}_k, R^{CYL}_k, R^{AXIS}_k)$ (k=1, . . . ,n) and the values of the components of (n−1) vector differences $p_k - p_l = (L^{SPH}_k - L^{SPH}_l, L^{CYL}_k - L^{CYL}_l, L^{AXIS}_k - L^{AXIS}_l, R^{SPH}_k - R^{SPH}_l, R^{CYL}_k - R^{CYL}_l, R^{AXIS}_k - R^{AXIS}_l)$ (k,l=1, . . . , n, l ≠ k) are input. The output layer consists of n neurons corresponding to the order within a solution vector set having n members. The outputs of the input layer are passed to the hidden layer and on to the output layer, to produce an output of the network. For each neuron, an output $o_i$ is calculated by Expression 18.

[Mathematical Expression 18]

$$o_i = f\left(\sum_j w_{ij} x_j + \theta_i\right)$$

In Expression 18, $o_i$ is the output of each neuron i, $w_{ij}$ is a connection weight, $x_j$ is an input from another neuron, and $\theta_i$ is the threshold. The nonlinear function f is a sigmoid function expressed by Expression 19.

[Mathematical Expression 19]

$$f(x) = 1/(1+\exp(-x))$$

Each neuron performs the calculation shown in Expressions 18 and 19 and outputs the result.

The model estimation executing section 3804 performs the training of this neural network so that it can assimilate the user adjustment process. More specifically, the connection weights of the network are changed (learned) so that the order Of $p_k$ in the solution vector set can be judged from the six components of the solution vector $p_k$ and the 6×(n−1) components of the differences between it and other solution vectors $P_1$ in the solution vector set. To achieve this, 1 is given as a teacher signal to an output neuron corresponding to the order of the solution vector obtained from the evaluation value recorded in the adjustment history recording section 3805, and 0 is given as a teacher signal to the other output neurons, to perform the learning. As the learning method, a back propagation method is used wherein as shown by Expression 21, the connection weight of each neuron is changed in such a direction as to reduce the difference between the output signal and the teacher signal shown by Expression 20.

[Mathematical Expression 20]

$$Err = 0.5 \times (out - target)^2$$

where out is the output signal of the network, and target is the teacher signal. [Mathematical Expression 21]

$$\Delta w_{ij}(n^{loop}) = -\alpha \cdot (\partial Err / \partial w_{ij}) + \eta \cdot \Delta w_{ij}(n^{loop} - 1)$$

where $\Delta w_{ij}(n)$ is the amount of change of the connection weight, $\alpha$ and $\eta$ are suitable positive real numbers, $n^{loop}$ is the number of learnings, and $\partial Err / \partial w_{ij}$ is the sensitivity that the change of each connection weight affects the output error of the network. In Expression 21, the first term denotes the weight change direction that reduces the error, and the second term is a momentum term. The value $w_{ij}$ of each connection weight of the neural network obtained by the above learning is output from the evaluation model output section 3801. In this manner, an evaluation model for the user adjustment process can be estimated based on the history of adjustments made by the user when adjusting the solution vector optimum for his requirements, and furthermore, using this evaluation model, it is possible to evaluate a given solution vector. In the neural network described in this embodiment, a learning method based on back propagation is applied to each neuron that uses a sigmoid function, but it will be recognized that the invention is not limited to the learning method described here. For example, learning methods utilizing a conjugate gradient method or a quasi-Newton method may also be used. Further, instead of the three-layer, feed-forward network described above, it is also possible to utilize a network using learning vector quantization, which will be described in the 13th embodiment of the invention, or a neural network having a feedback connection from the output layer to the input layer.

Next, the optimization adjusting method and optimization adjusting apparatus according to the 13th embodiment of the invention will be described below with reference to drawings. In the 13th optimization adjusting method and optimization adjusting apparatus hereinafter described, a common model for a plurality of users' adjustment processes is estimated based on the history of adjustments made by a plurality of users when optimizing solution vectors by using an interactive genetic algorithm. The 13th embodiment deals with the problem of adjusting lenses used for vision correction, as in the ninth embodiment of the invention. FIG. 40 shows the configuration of the optimization adjusting apparatus according to the 13th embodiment of the invention. In FIG. 40, reference numeral 4001 is a common model output section for outputting a set of parameters that can describe the common model for a plurality of users' adjustment processes obtained in the main processing section 3203; 4002 is a user adjustment termination judging section for judging whether an adjustment termination condition is satisfied for the current user; and 4003 is a common model estimating section for estimating a common model for the adjustment processes on the basis of the history of a plurality of users' adjustments thus far obtained. The common model estimating section 4003 comprises a common model estimation judging section 4004 for judging whether the history of a plurality of users' adjustments recorded in the adjustment history recording section 3805 satisfies a predetermined common model estimation condition, and a common model estimation executing section 4005 for estimating the common model for a plurality of users' adjustment processes when the common model estimation condition is satisfied.

The operation of the thus configured optimization adjusting apparatus and optimization adjusting method according to the 13th embodiment of the invention will be described below with reference to the flowcharts of FIGS. 41 and 42.

Figure 77:
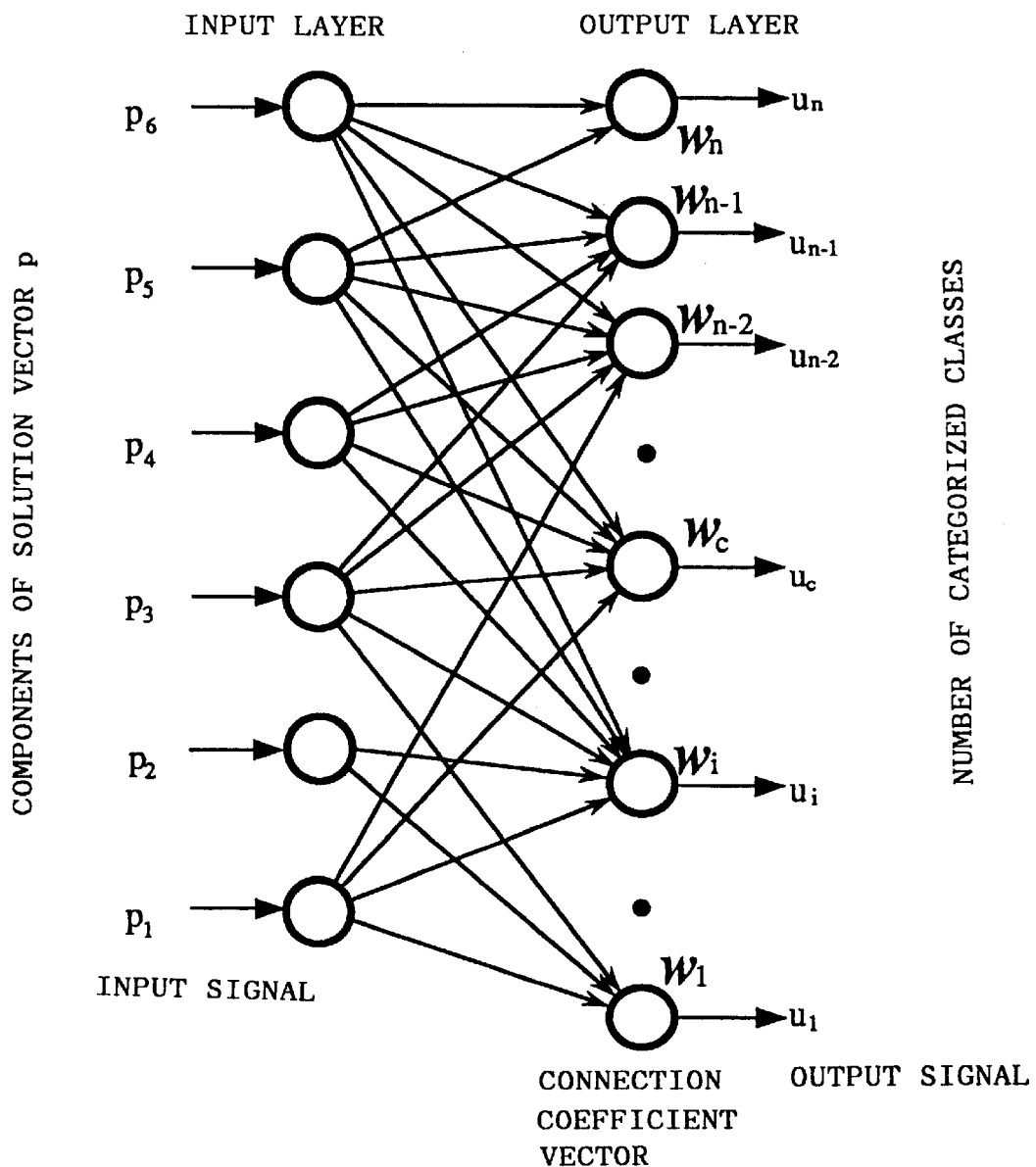
FIG. 77 is a diagram illustrating a neural network configuration used in a common model estimating section in the optimization adjusting apparatus according to the 13th, 14th, 21st, and 22nd embodiments of the present invention.

First, test image data for presentation to the user is input at the subject data input section 3201. The solution vector $p_k$ to be adjusted is the same as the one used in the optimization adjusting method and optimization adjusting apparatus of the ninth embodiment of the invention; that is, the solution vector is expressed as $p_k = (L^{SPH}_k, L^{CYL}_k, L^{AXIS}_k, R^{SPH}_k, R^{CYL}_k, R^{AXIS}_k)$. The initial solution set setting section 101 sets an initial solution vector set $P = \{p_k\}$ (k=1, ..., n). The information presenting section 3207 presents to the user an adjusted image as viewed through the corrective lens created by each solution vector. The user then judges how well the image is adjusted by each solution vector; this operation is performed in the user evaluation judging section 3208. The adjustment history recording section 3805 records the evaluation value obtained from the user evaluation judging section 3208 and its corresponding solution vector. The user adjustment termination judging section 4002 judges the termination condition, that is, whether the number of iterations, loop, for the current user working on the adjustment has exceeded the allowable number of iterations, $loop^{th}$. If this condition is not satisfied, a new solution vector set is generated through the process in the fitness calculating section 105 and recombination operation section 108. Then the process returns to the second user evaluation section 3802, where the user evaluates each solution vector once again. On the other hand, if the termination condition is satisfied in the user adjustment termination judging section 4002, the common model estimation judging section 4004 judges whether the history of the plurality of users' adjustments recorded in the adjustment history recording section 3805 satisfies the predetermined common model estimation condition. Various factors may be used to set the common model estimation condition. In this example, whether the number of users of the adjustment process has exceeded the allowable number of users is set as the common model estimation condition in order to obtain the adjustment process characteristics common to as many users as possible. If the number of users who have completed the adjustment process is smaller than the predetermined number, the process returns to the initial solution set setting section 102, and work on the adjustment of vision correcting lenses is started by another user. If the number of users has exceeded the allowable number of users, it is then determined that sufficient data to estimate the common model for a plurality of users have been collected, and the common model estimation executing section 4005 actually estimates the common model. As in the optimization adjusting method and optimization adjusting apparatus of the 12th embodiment of the invention, various techniques may be used to estimate the common model. In this example also, the common model is estimated by using a neural network. FIG. 77 is a conceptual diagram for the neural network used to estimate the common model for a plurality of users' adjustment processes according to the present embodiment. Rather than the model estimation based on the pattern classification by the back-propagation, hierarchical neural network used in the optimization adjusting method and optimization adjusting apparatus of the 12th embodiment of the invention, the present embodiment employs a neural network using a learning vector quantization method which can achieve highly intelligent pattern classification with a smaller number of samples by using a relatively simple learning algorithm. It is, however, possible to use a hierarchical network using a back propagation method, such as the one used in the 12th embodiment of the invention.

As shown in FIG. 77, the neural network used in the 13th embodiment has a two-layer structure consisting of 6 neurons in the input layer and n neurons in the output layer. The number of input neurons, 6, corresponds to the number of components of the solution vector $p_k$ to be evaluated here, and the number of output neurons, n, corresponds to the order of $p_k$ in a solution vector set having n members. This means that the input solution vector is classified into 1 to n order categories.

A solution vector p ($p_1, p_2, \ldots, p_n$) is input as the input vector; an input vector corresponding to the m-th order category in the solution vector set is denoted by $p^m$ (m=1, ..., n) and the connection coefficient by $W_{ij}$ (i, j=1,2, ..., n).

The common model estimation executing section 4005 estimates the common model by having the above neural network learn the history of adjustments made by a plurality of users. The neural network used in the present embodiment has the function of dividing the space of the solution vector p, the input vector, into n regions by n vectors $W_i$ ($W_{i1}, W_{i2}, \ldots, W_{i6}$) constituting the connection coefficient $W_{ij}$. The n connection coefficient vectors are called reference vectors, one vector being associated with each region. Each reference vector corresponds to the nearest neighbor vector with respect to all the solution vectors contained within its associated region. When, of the vectors $W_i$, a vector having the shortest distance to the input vector p is denoted by vector $W_c$, then we have Expression 22 given below, and the output $u_i$ from a neuron i in the output layer is given by Expression 23.

[Mathematical Expression 22]

$$\|p - w_c\| = \min_j \|p - w_j\|$$

[Mathematical Expression 23]

$$u_i = w_i \cdot p = \sum_j w_{ij} \cdot p_j$$

Learning is performed by updating only this vector $W_c$, and the amount of update, $\Delta W_c$, is determined in accordance with Expression 24 given below.
[Mathematical Expression 24]
(1) When $p_m$ is correctly classified $\Delta w_c = \eta(n^{loop}) \cdot (p^m - w_c)$
(2) When $p_m$ is not correctly classified $\Delta w_c = \eta(n^{loop}) \cdot (p^m - w_c)$ where $\eta$ ($n^{loop}$) is the learning coefficient ($0 < \eta$ ($n^{loop}$) < 1) which monotonically decreases with increasing number of learnings $n^{loop}$. Expression 24 indicates that, when correctly classified, the reference vector Wc approaches the input vector $p^m$, but when incorrectly classified, moves away from $p^m$, thereby forming a region boundary surface. Thus, in the learning process, a solution vector to be classified is input as an input learning vector, and learning is performed by giving a sufficient number of input learning vectors (learning vector quantization method). In this way, the common model estimation executing section 4005 trains, for example, the neural network of the present embodiment by using the history of many users' adjustments recorded in the adjustment history recording section 3805, and performs processing so that input solution vectors can be classified into 1 to n order categories within the solution vector set. Then, the common model output section 4001 outputs the connection coefficients $W_{ij}$ of the neural network as parameters expressing the estimated common model. With the above processing, the 13th optimization adjusting method and optimization adjusting apparatus of the invention, using an interactive genetic algorithm, estimate the common model for adjustment processes from the history of solution vector optimizations performed by a plurality of users, so that common factors in the preferences of the plurality of users can be extracted.

Next, the optimization adjusting method and optimization adjusting apparatus according to the 14th embodiment of the invention will be described below. In the 14th optimization adjusting method and optimization adjusting apparatus hereinafter described, by using an interactive genetic algorithm a solution vector optimum for a particular user is adjusted and, at the same time, the common model for a plurality of users' adjustment processes is updated. The 14th embodiment, as in the ninth embodiment of the invention, deals with the problem of adjusting lenses used for vision correction. FIG. 43 shows the configuration of the optimization adjusting apparatus according to the 14th embodiment of the invention. In FIG. 43, reference numeral 4301 is a common model evaluation calculating section for calculating an evaluation value for each solution vector by using a previously obtained common model representing a plurality of users' adjustment processes; 4302 is a common model evaluation judging section for making the user judge whether the evaluation value calculated by the common model evaluation judging section 4301 is appropriate or not; and 4303 is a common model updating section for updating the currently used common model representing a plurality of users' adjustment processes on the basis of the history of user adjustments recorded in the adjustment history recording section 3805. The common model updating section 4303 comprises a common model update judging section 4304 for judging whether the history of user adjustments recorded in the adjustment history recording section 3805 satisfies a predetermined common model update condition, and a common model update executing section 4305 for actually performing the updating of the common model by using the recorded history of user adjustments.

The operation of the thus configured optimization adjusting apparatus and optimization adjusting method according to the 14th embodiment of the invention will be described below with reference to the flowcharts of FIGS. 44 and 45.

First, test image data for presentation to the user is input at the subject data input section 3201. The solution vector $p_k$ to be adjusted is the same as the one used in the optimization adjusting method and optimization adjusting apparatus of the ninth embodiment of the invention; that is, the solution vector is expressed as $p_k=(L^{SPH}_k, L^{CYL}_k, L^{AXIS}_k, R^{SPH}_k, R^{CYL}_k, R^{AXIS}_k)$. The initial solution set setting section 101 sets an initial solution vector set $P=\{p_k\}$ (k=1, ..., n). The common model evaluation calculating section 4301 calculates the evaluation value $E_k$ for each solution vector $p_k$ by using the common model for a plurality of users' adjustment processes which was obtained, for example, by using the optimization adjusting method and optimization adjusting apparatus of the 13th embodiment of the invention. Then, the information presenting section 3207 presents to the user an adjusted image as viewed through the corrective lens created by each solution vector. While viewing the presented image, the user judges whether the evaluation value calculated by the common model evaluation calculating section 4301 is appropriate or not; this operation is performed in the common model evaluation judging section 4302. If it is judged that the value is appropriate, then the process proceeds to the fitness calculating section 105 and on to the recombination operation section 108 where recombination of solution vectors is performed to generate a new solution vector set. Then, if a termination condition is satisfied, that is, if the number of iterations has exceeded the allowable number of iterations, or if the information the user was requested to evaluate meets the user's satisfaction, the process proceeds to the optimal solution output section 103 and then to the apparatus adjustment executing section 3204 which performs the adjustment of the vision correcting lens or directs the adjustment thereof, after which the whole process is terminated. If neither of the termination conditions are satisfied, the process returns to the common model evaluation calculating section 4301 to calculates evaluation values for new solution vectors. On the other hand, if, in the common model evaluation judging section 4302, the user has judged that the evaluation value based on the common model is not appropriate, the process proceeds to the second user evaluation section 3802 where, in the same manner as previously described, the user evaluates each solution vector and records its evaluation value and the solution vector by himself. As the common model update condition, it is judged whether the adjustment history updated by the user and recorded in the adjustment history recording section 3805 has exceeded a predetermined allowable adjustment history count; this judgement is made by the common model update judging section 4304. If the updated adjustment history does not reach the predetermined count, that is, if the common model update condition is not satisfied, the common model is not updated, and fitness calculation and recombination operations are performed to generate a new solution vector set. On the other hand, if the common model update condition is satisfied, the common model updating section 4305 performs processing to actually update the previously estimated common model representing a plurality of users' adjustment processes on the basis of the adjustment history recorded in the adjustment history recording section 3805. Various methods may be used for updating, including the model estimation method using the neural network described in connection with the optimization adjusting method and optimization adjusting apparatus of the 12th or 13th embodiment of the invention. In the present embodiment also, the same method is used, and therefore, description of the neural network configuration, learning method, teacher signal, etc. will not be repeated here.

The new common model updated by the common model update executing section 4305 immediately replaces the previous common model and is used in the common model evaluation calculating section 4301. With the above processing, the optimization adjusting method and optimization adjusting apparatus of the 14th embodiment of the invention perform the adjustment of a solution vector optimum for the user, while working at the same time to update the common model representing a plurality of users' adjustment processes. This eliminates the need for the user to evaluate all of the solution vectors, thus alleviating the user burden.

Next, the optimization adjusting method and optimization adjusting apparatus according to the 15th embodiment of the invention will be described below with reference to drawings. In the 15th optimization adjusting method and optimization adjusting apparatus hereinafter described, an evaluation model for the user adjustment process is estimated using an interactive genetic algorithm, and an optimum adjustment of the solution vector is automatically performed using the obtained evaluation model. The 15th embodiment deals with the same problem as described in the ninth embodiment of the invention. FIG. 46 shows the configuration of the optimization adjusting apparatus according to the 15th embodiment of the invention. In FIG. 46, reference numeral 4601 is a method selection switch for making selection as to whether evaluation should be performed by the user or by using an evaluation model; 4602 is an evaluation model estimating section for estimating an evaluation model for the user adjustment process from the history of user adjustments recorded in the adjustment history recording section 3805; and 4603 is a model evaluation calculating section for calculating an evaluation value for each solution vector by using the evaluation model obtained for the user adjustment process. The evaluation model estimating section 4602 comprises: a method selection judging section 4604 for judging whether the user adjustment history recorded in the adjustment history recording section 3805 satisfies a predetermined evaluation model estimation condition, and for directing the method selection switch 4601 to perform switching when it is satisfied; and a model estimation executing section 3804.

The operation of the thus configured optimization adjusting apparatus and optimization adjusting method according to the 15th embodiment of the invention will be described below with reference to the flowcharts of FIGS. 47 and 48.

First, test image data for presentation to the user is input at the subject data input section 3201. The solution vector $p_k$ to be adjusted is the same as the one used in the optimization adjusting method and optimization adjusting apparatus of the ninth embodiment of the invention; that is, the solution vector is expressed as $p_k=(L^{SPH}_k, L^{CYL}_k, L^{AXIS}_k, R^{SPH}_k, R^{CYL}_k, R^{AXIS}_k)$. The initial solution set setting section 101 sets an initial solution vector set $P=\{p_k\}$ (k=1, ..., n). The method selection switch 4601 makes selection as to whether evaluation should be performed by the user or by using an evaluation model. At the time the process is first started, the second user evaluation section 3802 is selected. The information presenting section 3207 presents to the user an adjusted image as viewed through the corrective lens created by each solution vector, based on which the user evaluation judging section 3208 evaluates each solution vector. The evaluation value and its corresponding solution vector are recorded in the adjustment history recording section 3805. If it is judged in the method selection judging section 4604 that the history recorded in the adjustment history recording section 3805 satisfies the predetermined evaluation model estimation condition, the model estimation executing section 3804 estimates the evaluation model for the user adjustment process. At the same time, the method selection judging section 4604 directs the method selection switch 4601 to switch the method of evaluation. In accordance with this direction, switching is made from the second user evaluation section 3802 where evaluation is performed by the user to the model evaluation calculating section 4603 where evaluation of each solution vector is performed by using the evaluation model for the user adjustment process obtained in the model estimation calculating section 4603. The evaluation model estimation condition and the model estimation executing section 3804 are the same as those used in the optimization adjusting method and optimization adjusting apparatus of the 12th embodiment of the invention, and description thereof will not be repeated here. Based on the evaluation value obtained from the model evaluation calculating section 4603 or the user evaluation judging section 3208, the fitness calculating section 105 calculates the fitness of each solution vector, and based on the fitness thus calculated, the recombination operation section 108 performs an arithmetical recombination operation on the solution vectors. An optimal solution vector can be obtained by iteratively performing the above process until a predetermined termination condition is satisfied, that is, until either the number of iterations exceeds the allowable number of iterations or the information the user was requested to evaluate meets the user's satisfaction. The optimal solution output section 103 then outputs the optimal solution vector, and the apparatus adjustment executing section 3204 performs the adjustment of the vision correcting lens or directs the adjustment thereof. With the above series of processing, an evaluation model representing the user adjustment process is estimated using an interactive genetic algorithm, and by using the thus obtained evaluation model, the optimal solution vector can be automatically adjusted. This alleviates the user burden, which has been a problem in the practical implementation of an interactive genetic algorithm, and efficiently achieves the creation of an apparatus optimally adjusted to the user preferences.

The optimization adjusting method and optimization adjusting apparatus in any of the ninth to 15th embodiments of the invention may also be applied to the problem of creating a character font that matches the user's preferences. The following description deals with an example in which the optimization adjusting method and optimization adjusting apparatus in the ninth to 15th embodiments of the invention are applied to the creation of a character font for personal use.

As a character font, an outline font is often used in which the outline of each character is defined as a curve in an imaginary coordinate space and is expressed in terms of x, y coordinates of selected nodes si ($i=1, \ldots, m$) on the curve. For example, in an outline font, the character "b" is represented by the coordinates of 13 solid black dots (nodes) $s_i$. The remaining line segments of the outline are interpolated from the coordinates of these nodes by using a curvature formula. As the curvature formula, a spline function of the second or third degree or a Bezier curve of the third degree, etc. may be used. In this example, curve approximation between nodes is performed by using the function of the third degree given by Expression 25.

[Mathematical Expression 25]

$$Y = \alpha X^3 + \beta X^2 + \gamma X + \delta$$
$$Y_a = \alpha X_a^3 + \beta X_a^2 + \gamma X_a + \delta$$
$$Y_b = \alpha X_b^3 + \beta X_b^2 + \gamma X_b + \delta$$

In Expression 25, $(X_a, Y_a)$ and $(X_b, Y_b)$ represent the coordinates of nodes a and b of a character in an outline font, and (X, Y) the coordinates of an interpolated point between the nodes a and b, while $\alpha$, $\beta$, $\gamma$, and $\delta$ are coefficients each taking an arbitrary real value. The equations of $\alpha$, $\beta$, and $\gamma$ are a necessary condition for an approximation curve to pass through the two nodes a and b. Considering these, a solution vector $p_k$ for generating a character font consists of the x-coordinates $X_{si}$ and y-coordinates $Y_{si}$ of nodes $s_i$ ($i=1, \ldots, m$) predefined in an outline font, and the coefficients $\alpha_i$, $\beta_i$, $\gamma_i$, and $\delta_i$ of an approximation curve between nodes $s_i$ and $s_{i+1}$ arranged in the order of the nodes. Data of a test character set of an outline font are input to the subject data input section 3201. The information presenting section 3207 creates an adjusted character set from the outline font test character set by using each solution vector, and presents it for viewing on the screen. The user evaluation judging section 3208 then judges the evaluation value of each solution vector. In the ninth optimization adjusting method and optimization adjusting apparatus of the present invention, the update region limiting section 3202 is provided that defines the limited region that each solution vector can take. In this example, the region is limited so that the x-coordinates $X_{si}$ and y-coordinates $Y_{si}$ of the nodes $s_i$ ($i=1, \ldots, m$) are defined within the region $\Lambda$ expressed by Expression 26.

[Mathematical Expression 26]

$$(X_{si}-X_{i0})^2 + (Y_{si}-Y_{i0})^2 \leq r_i^2$$

where $(x_{io}, y_{io})$ represents the coordinate data of each node of the outline font test character input to the subject data input section 3201, and $r_i$ denotes the radius of the circular region $\Lambda$ that each node can take. The region within which each node can move is thus limited in order to eliminate the possibility that when an outline font character actually obtained from each solution vector is displayed on the font, the character may look like an entirely different character or like nothing but a mere image. After a solution vector having the highest evaluation value is output as the optimal solution vector from the optimal solution output section 103, the apparatus adjustment executing section 3204 adjusts character output means or directs the adjustment thereof so that characters can be displayed using the outline font created for personal use. In the adjustment apparatus of the ninth to 15th embodiment of the invention, the remaining component elements operate in the same manner as already described in the foregoing embodiments, and further description will not be given here. It should, however, be noted that in this example also, where the optimization adjusting method and optimization adjusting apparatus of the ninth to 15th embodiment are applied to the above-described problem, character fonts based on the preferences of individual users can be created without the need for expert knowledge; furthermore, by omitting search operations through regions not necessary for searching, or by creating an evaluation model for an adjustment process from the history of user adjustments and by automatically making the adjustment by using that model, the optimal solution vector can be derived efficiently, using which the user can create a character font best suited to his preferences. This contributes to alleviating the burden on the user who is conducting the evaluation, which has been a problem with the prior art.

Next, the optimization adjusting method and optimization adjusting apparatus according to the 16th embodiment of the invention will be described below. The 16th optimization adjusting method and optimization adjusting apparatus hereinafter described are adapted to handle a problem dealing with a time sequential signal; more specifically, the adjustment of an optimal solution is performed using an interactive genetic algorithm into which an operation to present information for facilitating comparative evaluation of each solution vector and an operation to rearrange the order of presentation are incorporated. The 16th embodiment is concerned with an example in which the method and apparatus are applied to the problem of improving the sound quality of sound distorted due to information dropout, etc. during transmission. FIG. 49 shows the configuration of the adjusting apparatus according to the 16th embodiment.

In FIG. 49, reference numeral 4901 designates a time series evaluation executing section for presenting time sequential information expressed by each solution vector for evaluation by the user. The time series evaluation executing section 4901 comprises: an information presenting section 3207 for presenting time sequential information expressed by each solution vector to the user; an auxiliary information presenting section 4902 for presenting auxiliary information that assists the memory of the user when comparing and evaluating multiple pieces of time sequential information presented by the information presenting section 3207; a user evaluation judging section 3208 for making the user evaluate each solution vector; and an information rearranging section 4903 for rearranging the order of presenting each piece of time sequential information and auxiliary information, on the basis of the evaluation value obtained from the user evaluation judging section 3208.

Figure 78:
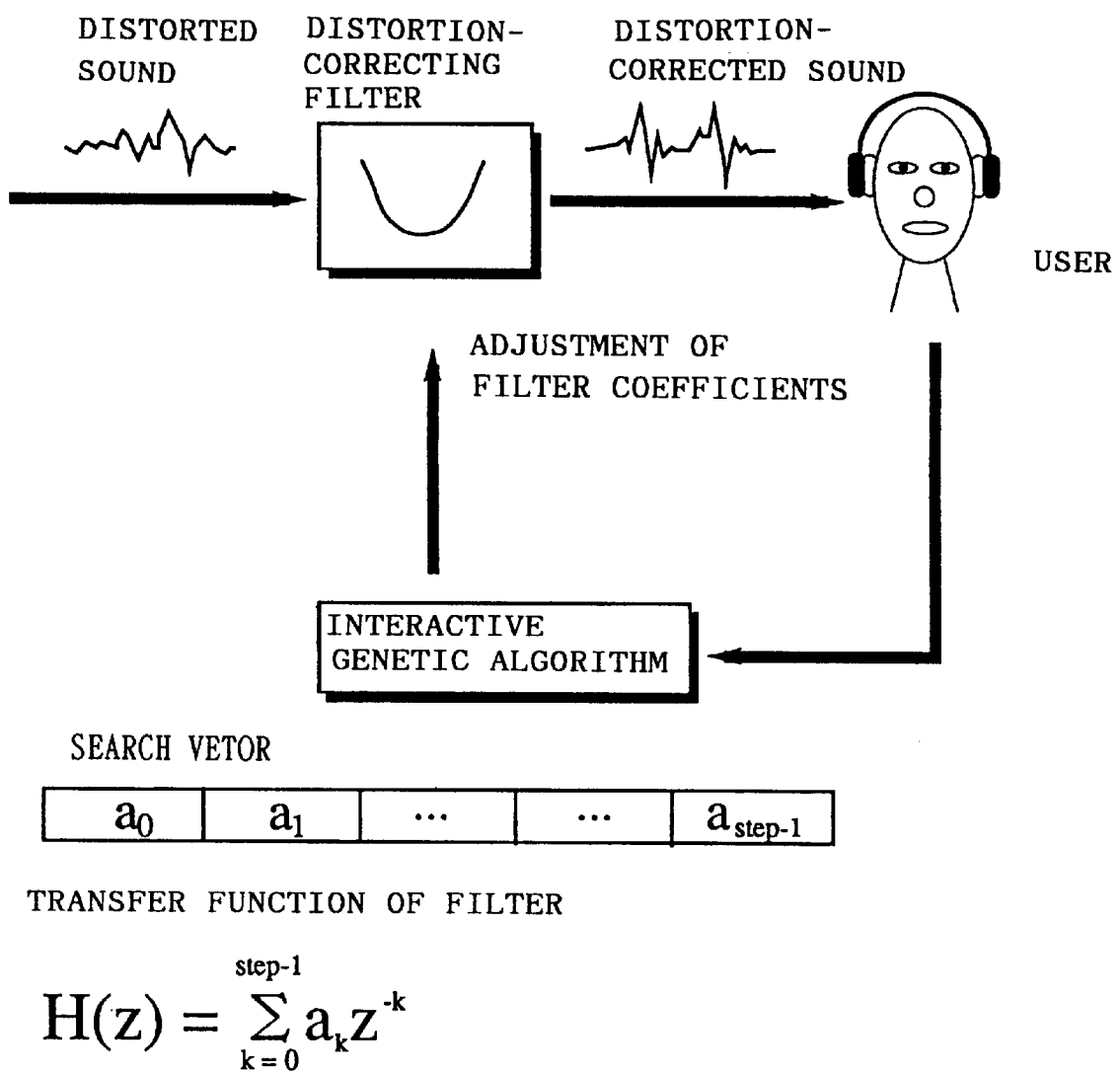
FIG. 78 is a conceptual diagram illustrating the problem of creating a filter for improving sound quality of distorted speech.

The operation of the thus configured optimization adjusting apparatus and optimization adjusting method according to the 16th embodiment of the invention will be described below with reference to the flowchart of FIG. 50. The following description specifically deals with an example in which the method and apparatus are applied to the problem of improving the sound quality of distorted sound in accordance with the procedure shown in FIG. 78. The objective in this problem is to have the user listen to distorted sound and adjust the coefficients of a distortion-correcting filter to improve the sound quality on the basis of the user's perception of the sound. First, as shown in FIG. 78, sound distorted due to information dropout, etc. during transmission is input at the subject data input section 3201. Various methods may be used to improve the sound quality of distorted sound; the present embodiment specifically considers a method which, as shown in the figure, uses a finite-impulse-response (FIR) filter as the distortion-correcting filter to improve the sound quality of distorted sound. The filter coefficient vectors $a=(a_0, a_1, \ldots, a_{step})$ of an FIR filter, the number of whose steps is denoted by "step", are adjusted using an interactive genetic algorithm. Therefore, each solution vector $p_k$ to be adjusted is defined by an arrangement of these filter coefficients $a_i$. In the solution vector, each filter coefficient is treated as a real value, as in the embodiments thus far described, but it is also possible to convert $a_i$ to binary numbers Blen, for example, and treat them by arranging these binary numbers. The initial solution set setting section 101 sets an initial solution vector set $P=\{p_k\}$ (k=1, . . . , n) in accordance with this definition. The information presenting section 3207 prepares a distortion-correcting filter constructed from each solution vector, and presents to the user distortion-corrected sound obtained by filtering the distorted sound input through the subject data input section 3201. However, if the number, n, of distortion-corrected sounds are directly presented, it will become increasingly difficult to compare and evaluate the differences between them as the number n increases. Static data such as images and graphics can be compared and evaluated with relative ease because they can be arranged spatially on a display or the like. In the case of sound, on the other hand, two sounds can be compared and evaluated, but if more than two sounds are presented, it will become very difficult to compare and evaluate them. This is because, when too many pieces of sound data are presented, the user gets confused and becomes unable to distinguish between them. Therefore, the auxiliary information presenting section 4902 presents auxiliary information to facilitate comparative evaluation of each sound. Various kinds of information may be considered to present as the auxiliary information. In the present embodiment, a face image (FIG. 79) is used that is obtained by converting the filter coefficients to parameters defining the size, angle, and position of the eyes, mouth, and nose forming a face. This face by itself does not have any relations to the distortion-corrected sound quality, but is expected to assist the user's memory when the user compares and evaluates n distortion-corrected sounds at the same time. Based on these pieces of information, the user evaluates the evaluation value of each solution vector in the user evaluation judging section 3208. Further, in the information rearranging section 4903, the distortion-corrected sound to be compared and the face image as its auxiliary information are rearranged on the basis of each evaluation value judged in the user evaluation judging section 3208. The user can thus rearrange his evaluation of each distortion-corrected sound in a visible form. This serves to reduce the effect of variation in the user evaluation. The processing within the time series evaluation executing section 4901 is performed iteratively until the evaluation by the user is complete. From the evaluation value thus obtained, the fitness calculating section 105 calculates the fitness of each solution vector, and based on the fitness thus calculated, the recombination operation section 108 performs recombination of each solution vector. The above process is repeated until either the number of iterations, loop, exceeds the allowable number of iterations, $loop^{th}$, or the distortion-corrected sound meets the user's satisfaction. The apparatus adjustment executing section 3204 constructs a filter expressed by the obtained optimal solution vector, thereby achieving the improvement of sound quality of distorted sound. In this manner, for a problem dealing with a time sequential signal, the adjustment of an optimal solution vector is performed using an interactive genetic algorithm into which an operation to present information for facilitating comparative evaluation of each solution vector and an operation to rearrange the order of presentation are incorporated. The interactive genetic algorithm, which has previously been applied only to static data such as images, can thus be applied to dynamic data such as time sequential data. As a result, if a need arises to adjust, for example, a hearing aid to the hearing characteristics of its wearer, there is no need to take the trouble to visit a specialist skilled in the tuning of hearing aides, but the user, who is a hearing-impaired person, can easily make the adjustment by himself. Previously, it was only possible to adjust the volume, but by using the adjusting apparatus of this embodiment, if there occurs a change in his sense of hearing, the user can readily adjust the tone depending on his sense of hearing.

Next, the optimization adjusting method and optimization adjusting apparatus according to the 17th embodiment of the invention will be described below. The 17th optimization adjusting method and optimization adjusting apparatus hereinafter described are adapted to handle a problem dealing with a time sequential signal; more specifically, the adjustment of an optimal solution vector is performed using an interactive genetic algorithm into which an operation to present information for facilitating comparative evaluation of each solution vector and an operation to rearrange the order of presentation are incorporated, while limiting the search area for a solution vector on the basis of its characteristics and the history of past adjustments. The 17th embodiment, as in the 16th embodiment, deals with the problem of constructing a filter for improving the sound quality of distorted sound. FIG. 51 shows the configuration of the optimization adjusting apparatus according to the 17th embodiment of the invention.

As can be seen from FIG. 51, the optimization adjusting apparatus of the 17th embodiment is identical in configuration to the adjusting apparatus of the ninth embodiment of the invention, except for the addition of the time series evaluation section which is a feature of the optimization adjusting apparatus of the 16th embodiment.

The operation of the optimization adjusting apparatus of the 17th embodiment of this invention is performed in accordance with the flowchart of FIG. 52, which is fundamentally the same as the flowchart for the optimization adjusting apparatus of the ninth embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that.the apparatus adjustment executing section 3204 constructs a filter expressed by the obtained optimal solution vector, thereby achieving the improvement of sound quality of distorted sound. The remaining component elements and the flow of processing are the same as those described in connection with the optimization adjusting method and optimization adjusting apparatus of the ninth embodiment of the invention, and further description will not be given here. As illustrated in the flowchart of FIG. 52, by incorporating into the interactive genetic algorithm the functions to present information for facilitating comparative evaluation of each solution vector and to rearranges the order of presentation, and by limiting the region that the solution vector to be adjusted can take and thereby saving the trouble of searching unnecessary regions, the adjustment t of dynamic data such as time sequential data can be performed efficiently by using the interactive genetic algorithm. The optimization adjusting method and optimization adjusting apparatus of the 17th embodiment of the invention thus offer the combined advantages of the optimization adjusting methods and optimization adjusting apparatus of t he ninth and 16th embodiments of the invention.

Next, the optimization adjusting method and optimization adjusting apparatus according to the 18th embodiment of the invention will be described below. The 18th optimization adjusting method and optimization adjusting apparatus hereinafter described are adapted to handle a problem dealing with a time sequential signal; more specifically, an initial solution vector set is constructed on the basis of past adjustment information already recorded, and the optimization of a solution vector is performed using an interactive genetic algorithm into which an operation to present information for facilitating comparative evaluation of each solution vector and an operation to rearrange the order of presentation are incorporated. The 18th embodiment, as in the 16th embodiment, deals with the problem of constructing a filter for improving the sound quality of distorted sound. FIG. 53 shows the configuration of the optimization adjusting apparatus according to the 18th embodiment of the invention.

As can be seen from FIG. 53, the optimization adjusting apparatus of the 18th embodiment is identical in configuration to the adjusting apparatus of the 10th embodiment of the invention, except for the addition of the time series evaluation section which is a feature of the optimization adjusting apparatus of the 16th embodiment.

The optimization adjusting apparatus of the 18th embodiment of this invention operates in accordance with the flowchart of FIG. 54, which is fundamentally the same as the flowchart illustrating the processing process of the optimization adjusting apparatus of the 10th embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that the apparatus adjustment executing section 3204 constructs a filter expressed by the obtained optimal solution vector, thereby achieving the improvement of sound quality of distorted sound. The remaining component elements and the flow of processing are the same as those described in connection with the adjusting apparatus of the 10th embodiment of the invention, and further description will not be given here. As illustrated in the flowchart of FIG. 54, with the functions to present information for facilitating comparative evaluation of each solution vector and to rearrange the order of presentation, which are incorporated into the interactive genetic algorithm, the user burden when performing evaluation can be alleviated. Furthermore, by performing solution vector optimization starting with an initial set constructed using a plurality of past optimal solution vectors, an interactive genetic algorithm can be applied efficiently to dynamic data such as time sequential data. The optimization adjusting method and optimization adjusting apparatus of the 18th embodiment of the invention thus offer the combined advantages of the optimization adjusting methods and optimization adjusting apparatus of the 10th and 16th embodiments of the invention.

Next, the optimization adjusting method and optimization adjusting apparatus according to the 19th embodiment of the invention will be described below. The 19th optimization adjusting method and optimization adjusting apparatus hereinafter described are adapted to handle a problem dealing with a time sequential signal; more specifically, user evaluation value is corrected based on the user's psychological state estimated from the user's physiological information, and based on the corrected evaluation value, an optimal solution vector is derived using an interactive genetic algorithm into which an operation to present information for facilitating comparative evaluation of each solution vector and an operation to rearrange the order of presentation are incorporated. The 19th embodiment, as in the 16th embodiment, deals with the problem of constructing a filter for improving the sound quality of distorted sound. FIG. 55 shows the configuration of the optimization adjusting apparatus according to the 19th embodiment of the invention.

As can be seen from FIG. 55, the optimization adjusting apparatus of the 19th embodiment is identical in configuration to the optimization adjusting apparatus of the 11th embodiment of the invention, except for the addition of the time series evaluation section which is a feature of the optimization adjusting apparatus of the 16th embodiment.

The operation of the optimization adjusting apparatus of the 19th embodiment of this invention is performed in accordance with the flowchart of FIG. 56, which is fundamentally the same as the flowchart for the optimization adjusting apparatus of the 11th embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that the apparatus adjustment executing section 3204 constructs a filter expressed by the obtained optimal solution vector, thereby achieving the improvement of sound quality of distorted sound. The remaining component elements and the flow of processing are the same as those described in connection with the optimization adjusting method and optimization adjusting apparatus of the 11th embodiment of the invention, and further description will not be given here. As illustrated in the flowchart of FIG. 56, with the functions to present information for facilitating comparative evaluation of each solution vector and to rearrange the order of presentation, which are incorporated into the interactive genetic algorithm, the user burden when performing evaluation can be alleviated; furthermore, since the psychological state of the user who is conducting the evaluation is estimated and its effect is compensated for, solution vector optimization can be performed while suppressing the variation of the evaluation due to the user's psychological state (agitation, indifference, etc.) as much as possible. The optimization adjusting method and optimization adjusting apparatus of the 19th embodiment of the invention thus offer the combined advantages of the optimization adjusting methods and optimization adjusting apparatus of the 11th and 16th embodiments of the invention.

Next, the optimization adjusting method and optimization adjusting apparatus according to the 20th embodiment of the invention will be described below. The 20th optimization adjusting method and optimization adjusting apparatus hereinafter described are adapted to handle a problem dealing with a time sequential signal; more specifically, an operation to present information for facilitating comparative evaluation of each solution vector and an operation to rearrange the order of presentation based on evaluation value are incorporated into an interactive genetic algorithm, and using this genetic algorithm, an evaluation model for the user adjustment process is estimated from the history of user adjustments. The 20th embodiment, as in the 16th embodiment, deals with the problem of constructing a filter for improving the sound quality of distorted sound. FIG. 57 shows the configuration of the optimization adjusting apparatus according to the 20th embodiment of the invention.

As can be seen from FIG. 57, the optimization adjusting apparatus of the 20th embodiment is identical in configuration to the optimization adjusting apparatus of the 12th embodiment of the invention, except for the addition of the time series evaluation section which is a feature of the optimization adjusting apparatus of the 16th embodiment.

The optimization adjusting apparatus of the 20th embodiment of this invention operates in accordance with the flowchart of FIG. 58, which is fundamentally the same as the flowchart for the optimization adjusting apparatus of the 12th embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that the apparatus adjustment executing section 3204 constructs a filter expressed by the obtained optimal solution vector, thereby achieving the improvement of sound quality of distorted sound. The remaining component elements and the flow of processing are the same as those described in connection with the optimization adjusting method and optimization adjusting apparatus of the 12th embodiment of the invention, and further description will not be given here. As illustrated in the flowchart of FIG. 58, the operation to present information for facilitating comparative evaluation of each solution vector and the operation to rearrange the order of presentation based on evaluation value are incorporated into the interactive genetic algorithm, and an evaluation model for the user adjustment process is estimated from the history of user adjustments; this makes it possible to incorporate user preferences into the adjustment of time sequential information, which has previously been difficult. The optimization adjusting method and optimization adjusting apparatus of the 20th embodiment of the invention thus provides the function that enables the optimization adjusting problem of the 12th embodiment to be applied to the problem of time sequential signals.

Next, the optimization adjusting method and optimization adjusting apparatus according to the 21st embodiment of the invention will be described below. The 21st optimization adjusting method and optimization adjusting apparatus hereinafter described are adapted to handle a problem dealing with a time sequential signal; more specifically, an operation to present information for facilitating comparative evaluation of each solution vector and an operation to rearrange the order of presentation based on evaluation value are incorporated into an interactive genetic algorithm, and using this genetic algorithm, a common model for a plurality of users' adjustment processes is estimated from a recorded history of the adjustments made by a plurality of users. The 21st embodiment, as in the 16th embodiment, deals with the problem of constructing a filter for improving the sound quality of distorted sound. FIG. 59 shows the configuration of the optimization adjusting apparatus according to the 21st embodiment of the invention.

As can be seen from FIG. 59, the optimization adjusting apparatus of the 21st embodiment is identical in configuration to the optimization adjusting apparatus of the 13th embodiment of the invention, except for the addition of the time series evaluation section which is a feature of the optimization adjusting apparatus of the 16th embodiment.

The optimization adjusting apparatus of the 21st embodiment of this invention operates in accordance with the flowcharts of FIGS. 60 and 61, which are fundamentally the same as the flowcharts for the optimization adjusting apparatus of the 13th embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that the apparatus adjustment executing section 3204 constructs a filter expressed by the obtained optimal solution vector, thereby achieving the improvement of sound quality of distorted sound. The remaining component elements and the flow of processing are the same as those described in connection with the optimization adjusting method and optimization adjusting apparatus of the 13th embodiment of the invention, and further description will not be given here. As illustrated in the flowcharts of FIGS. 60 and 61, the operation to present information for facilitating comparative evaluation of each solution vector and the operation to rearrange the order of presentation based on evaluation value are incorporated into the interactive genetic algorithm, and a common model for a plurality of users' adjustment processes is estimated from a recorded history of the adjustments made by a plurality of users; this makes it possible to extract common factors in the preferences of a plurality of users when handling time sequential signals, which has been difficult with the prior art interactive genetic algorithm.

Next, the optimization adjusting method and optimization adjusting apparatus according to the 22nd embodiment of the invention will be described below. The 22nd optimization adjusting method and optimization adjusting apparatus hereinafter described are adapted to handle a problem dealing with a time sequential signal; more specifically, an operation to present information for facilitating comparative evaluation of each solution vector and an operation to rearrange the order of presentation based on evaluation value are incorporated into an interactive genetic algorithm, and using this genetic algorithm, a solution vector optimum for the user is derived, while, at the same time, updating a common model representing a plurality of users' adjustment processes. The 22nd embodiment, as in the 16th embodiment, deals with the problem of constructing a filter for improving the sound quality of distorted sound. FIG. 62 shows the configuration of the optimization adjusting apparatus according to the 22nd embodiment of the invention.

As can be seen from FIG. 62, the optimization adjusting apparatus of the 22nd embodiment is identical in configuration to the optimization adjusting apparatus of the 14th embodiment of the invention, except for the addition of the time series evaluation section which is a feature of the optimization adjusting apparatus of the 16th embodiment.

The optimization adjusting apparatus of the 22nd embodiment of this invention operates in accordance with the flowcharts of FIGS. 63 and 64, which are fundamentally the same as the flowcharts for the optimization adjusting apparatus of the 14th embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that the apparatus adjustment executing section 3204 constructs a filter expressed by the obtained optimal solution vector, thereby achieving the improvement of sound quality of distorted sound. The remaining component elements and the flow of processing are the same as those described in connection with the optimization adjusting method and optimization adjusting apparatus of the 14th embodiment of the invention, and further description will not be given here. As illustrated in the flowcharts of FIGS. 63 and 64, with the functions to present information for facilitating comparative evaluation of each solution vector and to rearrange the order of presentation based on evaluation value, the interactive genetic algorithm can be applied to the adjustment of time sequential information, an area where the prior art algorithm was not suited; furthermore, since the apparatus operates to update the common model representing a plurality of users' adjustment processes, the user burden can be alleviated.

Next, the optimization adjusting method and optimization adjusting apparatus according to the 23rd embodiment of the invention will be described below. The 23rd optimization adjusting method and optimization adjusting apparatus hereinafter described are adapted to handle a problem dealing with a time sequential signal; more specifically, an operation to present information for facilitating comparative evaluation of each solution vector and an operation to rearrange the order of presentation based on evaluation value are incorporated into an interactive genetic algorithm, and using this genetic algorithm, an evaluation model for user adjustment process is estimated, using which the adjustment of an optimal solution vector is automatically performed. The 23rd embodiment, as in the 16th embodiment, deals with the problem of constructing a filter for improving the sound quality of distorted sound. FIG. 65 shows the configuration of the optimization adjusting apparatus according to the 23rd embodiment of the invention.

As can be seen from FIG. 65, the optimization adjusting apparatus of the 23rd embodiment is identical in configuration to the optimization adjusting apparatus of the 15th embodiment of the invention, except for the addition of the time series evaluation section which is a feature of the optimization adjusting apparatus of the 16th embodiment.

The optimization adjusting apparatus of the 23rd embodiment of this invention operates in accordance with the flowcharts of FIGS. 48 and 66, which are fundamentally the same as the flowcharts for the optimization adjusting apparatus of the 15th embodiment; the differences are that sound distorted due to information dropout, etc. during transmission is input at the subject data input section 3201, that the solution vector $p_k$ to be adjusted is defined by an arrangement of distortion-correcting filter coefficients $a_i$, that the information presenting section 3207 prepares a distortion-correcting filter constructed from each solution vector and presents to the user distortion-corrected sound obtained by filtering the distorted sound input through the subject data input section 3201, that the auxiliary information presenting section 4902 presents, as auxiliary information for facilitating comparative evaluation of each sound, a face image obtained by converting the filter coefficients to parameters defining the size, angle, and position of the eyes, mouth, and nose forming a face, that the information rearranging section 4903 rearranges the distortion-corrected sound to be compared and the face image as its auxiliary information on the basis of each evaluation value judged in the user evaluation judging section 3208, that the processing within the time series evaluation executing section 4901 is performed iteratively until the evaluation by the user is complete, and that the apparatus adjustment executing section 3204 constructs a filter expressed by the obtained optimal solution vector, thereby achieving the improvement of sound quality of distorted sound. The remaining component elements and the flow of processing are the same as those described in connection with the optimization adjusting method and optimization adjusting apparatus of the 15th embodiment of the invention, and further description will not be given here. As illustrated in the flowcharts of FIGS. 48 and 66, the functions to present information for facilitating comparative evaluation of each solution vector and to rearrange the order of presentation are incorporated into the interactive genetic algorithm, and provisions are made so that an evaluation model for user adjustment process is generated using the history of user adjustments and that solution vector optimization is automatically performed by using this evaluation model instead of user evaluation. As a result, the interactive genetic algorithm, which has previously been applied only to static data such as images, can also be applied efficiently to the adjustment of dynamic data such as time sequential data, and furthermore, the burden on the user who is conducting the evaluation can be alleviated greatly.

Figure 80:
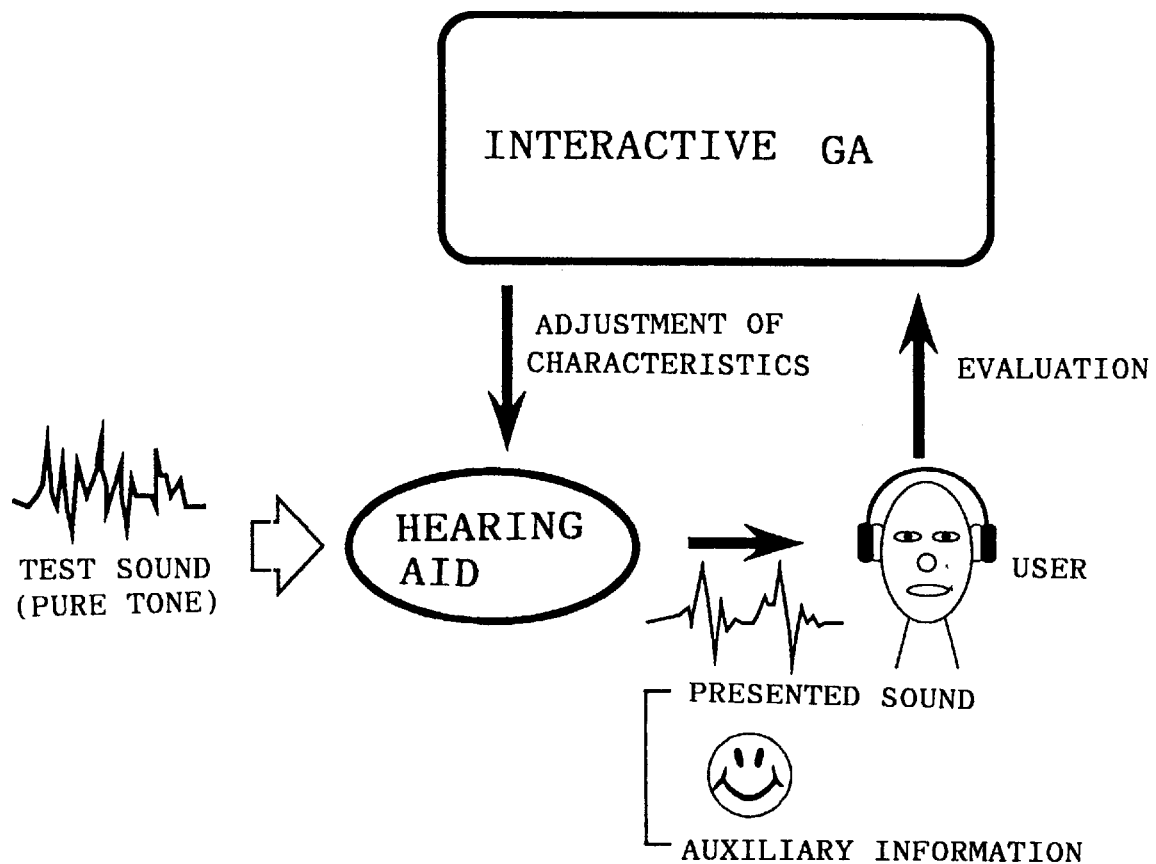
FIG. 80 is a conceptual diagram illustrating the problem of adjusting hearing aid characteristics for a hearing-impaired person.

Furthermore, the optimization adjusting method and optimization adjusting apparatus in any of the 16th to 23rd embodiments of the invention may also be applied to the problem of adjusting the characteristics of a hearing aid to match the hearing characteristics of the wearer (user) of the hearing aid, as shown in FIG. 80. The following description deals with an example in which the optimization adjusting method and optimization adjusting apparatus in the 16th to 23rd embodiments of the invention are applied to the adjustment of hearing aids to match the hearing characteristics of each individual wearer of the hearing aid.

Usually, the adjustment of the characteristics of a hearing aid is performed by reproducing pure tones of frequencies from 125 to 8000 Hz; that is, the intensity $L_f$ (dB) of the threshold of hearing (the minimum power of sound that a ear can perceive), the intensity $H_f$ (dB) of the threshold of feeling (the maximum power of sound that a ear can withstand), and the intensity $(dB)M_f$ of a normally audible sound are taken at a plurality of frequency points, and based on the thus taken values, the gain of the hearing aid is adjusted. For example, if the frequency range of 125 to 8000 Hz is divided into three subranges, and the three values Lf,Hf,Mf are taken at $m^{ear}$ points in each subrange, then the number of parameters used for the adjustment of characteristics is $3 \times m^{ear}$. In addition, the following two points are considered.

(i) The energy of a consonant is small and tends to be masked by a vowel that follows it. Therefore, a consonant must be emphasized by increasing its energy so that the consonant can be distinguished even if masked by a vowel.

(ii) Intelligibility can be increased by emphasizing the low-frequency components (formant components) that greatly affect the speech intelligibility to the human ear.

This serves to increase the naturalness of speech sounds when heard with a hearing aid. The condition (i) can be controlled by limit $P^{limit}$ (dB) that defines the degree of consonant emphasis and emphasis release time $t^{rel}$ (msec) that determines how long the consonant-to-vowel transition should be emphasized. It is also believed that the condition (ii) can be controlled by $P^{sub}$ (dB) that suppresses dips with respect to speech spectral peaks (formants) at low frequencies and frequency width $f^{wid}$ (Hz) that defines the frequency width where the suppression should be applied. These four parameters are added to the $3 \times m^{ear}$ parameters to define a solution vector p. A test sound is input at the subject data input section 3201. The information presenting section 3207 presents to the user an adjusted sound obtained by passing the test sound input at the subject data input section 3201 through a hearing aid expressed by each solution vector. Since there are certain relations among the parameters constituting the solution vector, and since it is considered that the region that the parameters can take is limited, the optimization adjusting method and optimization adjusting apparatus of the 17th embodiment of the invention, among others, are expected to offer a significant effect because of their characteristic of limiting the region for solution vector adjustment. The optimal solution output section 103 outputs a solution vector having the highest evaluation value as the optimal solution vector, based on which the apparatus adjustment executing section 3204 adjusts the characteristics of the hearing aid. In this example, the auxiliary information presenting section 4902 handles a face image created from the above parameters, in a manner similar to that described in the 16th embodiment, for example. With the thus adapted optimization adjusting method and optimization adjusting apparatus of the 16th to 23rd embodiments, hearing aids can be constructed to match the hearing characteristics of each individual user without requiring any expert knowledge on the user side, as in the case of the filter creation problem for improving sound quality of distorted sound. Furthermore, it is expected that the relations among the parameters can be analized by using the optimization adjusting method and optimization adjusting apparatus of the 20th embodiment that is concerned with the creation of an evaluation model for user adjustment process or by using the optimization adjusting method and optimization adjusting apparatus of the 21st embodiment that is concerned with the creation of a common model for a plurality of users' adjustment processes.

In the optimization adjusting method and optimization adjusting apparatus of the 1st to 23rd embodiments of the invention, the Roulette wheel selection method was used for the selection of solution vectors, but other methods may be considered. For example, an elite strategy wherein high-fitness, superior solution vectors are copied unchanged into the next new solution vector set, or a linear normalization method wherein fitness values are not used but emphasis is placed only on their order, may be used in combination. Further, for user evaluation, a value continuously variable between the maximum feasible evaluation value $EA_{max}$ and the minimum feasible evaluation value $E_{min}$ was used as an evaluation value, but alternatively, a graduated evaluation value based on relative evaluation among n solution vectors simultaneously presented to the user, for example, the order of n solution vectors, may be used as an evaluation value. Moreover, when solution vectors are represented by bit string codes, one-point or two-point crossover was applied in the above embodiments, but a simplex crossover method, such as shown in FIG. 74, may be used instead. In the simplex crossover method illustrated in FIG. 74, the following processing is performed.

(i) First, two solution vectors having high fitness and one solution vectors having low fitness are selected using the probability used in the selection probability section.

(ii) Then, the two solution vectors having high fitness are compared with each other. If corresponding values between the bit string codes match, such values are adopted; if they do not match, negated values of the corresponding bits in the solution vector having low fitness are adopted. A new solution vector is thus created. Compared with the one-point or two-point crossover method, the simplex crossover method has the advantage that the adjustment can be performed while retaining the variety of solution vectors and it does not easily fall into local solutions.

As described above according to the first optimization adjusting method and optimization adjusting apparatus of the invention, attention is focused on the shift vector of the barycentric vector of a group having high fitness within the solution vector set, and when the shift vector is directed in the same direction, it is determined that solution vectors having high fitness exist in that direction, and the solution vector group is updated along that vector. At the same time, solution vector optimization is carried out by performing a recombination operation on the current solution vector set. This embodiment offers the excellent advantage of being able to quickly estimate the direction of an optimal solution by using a history of past solution vector updates, while exploiting the superior global updating ability innate to the genetic algorithm.

According to the second optimization adjusting method and optimization adjusting apparatus of the invention, an initial solution vector group is constructed around each solution vector in an initial solution vector set, and a recombination operation is performed a predetermined number of times to optimize the solution vector group within a limited region. Then, a plurality of solution vector groups obtained are consolidated into a larger set, and again a recombination operation is performed to optimize the solution vectors. In this manner, by first performing local updating of solution vectors using a recombination operation, and then performing global updating of solution vectors, again using a recombination operation, the local solution vector updating ability is reinforced, thus achieving quick estimation of an optimal solution.

According to the third optimization adjusting method and optimization adjusting apparatus of the invention, each solution vector in a solution vector set is compared with a vector group randomly extracted from its neighborhood space, and a vector group having high fitness is selected as solution vectors belonging to the solution vector set that is to be subjected to an update operation. The resulting solution vector set is then subjected to a recombination operation. This embodiment thus offers the excellent advantage of being able to overcome the lack of the local updating ability which has been a weak point of the prior art genetic algorithm.

According to the fourth optimization adjusting method and optimization adjusting apparatus of the invention, neighbor vector groups are extracted from the neighborhoods of solution vectors selected based on their fitness, and a solution vector recombination operation is performed on each of the neighbor vector groups. This serves to improve the local updating ability, while preventing solution vectors having particularly high fitness from causing a direct and significant influence on the whole solution set.

According to the fifth optimization adjusting method and optimization adjusting apparatus of the invention, the neighborhood of each solution vector in a solution vector set is divided into a plurality of regions, and a plurality of solution vectors are selected randomly from a region having the highest average fitness, while at the same time, a recombination operation is performed on the solution vectors within the original solution vector set to generate a new solution vector set. From the solution vectors thus obtained, solution vectors are selected in decreasing order of fitness to reset a new solution vector set. In this manner, the operation to update solution vectors near each solution vector of the solution vector set is performed concurrently with the optimization of solution vectors performed by the recombination operation within the solution vector set. This serves to reinforce the local solution vector updating ability, while retaining the efficient global solution vector updating ability that the genetic algorithm innately has. This embodiment thus offers the excellent advantage of being able to estimate an optimal solution vector efficiently.

According to the sixth optimization adjusting method and optimization adjusting apparatus of the invention, with the provision of the solution set dividing section for dividing the solution vector set into a plurality of groups based on the arithmetic mean and standard deviation of the fitness, and the group recombination operation section for performing a solution vector recombination operation on each of the groups created by the solution set dividing section, solution vectors having particularly high fitness can be prevented from causing a direct and significant influence on the whole solution set, and at the same time, the local updating ability can be reinforced.

According to the seventh optimization adjusting method and optimization adjusting apparatus of the invention, a decision is made as to whether the solution vector set should be divided into a plurality of groups, based on the arithmetic mean of the fitness, the standard deviation, and the maximum and minimum fitnesses. If it is decided that the set should be divided, the solution set dividing section divides the whole solution set into a plurality of groups; if it is decided otherwise, the whole solution set is selected as the recombination target. Solution vector selection and recombination operations are performed on the thus selected recombination target, and based on the distribution of the fitness, the presence or absence of a solution vector having particularly high fitness is detected. Then, the recombination target is limited in such a manner as to reduce the effect of such a solution vector. Efficient estimation of an optimal solution can thus be achieved.

According to the eighth optimization adjusting method and optimization adjusting apparatus of the invention, an optimal solution estimation is performed in a stepwise manner by dynamically varying the stepwise convergence criterion by which to determine the convergence of a solution vector, while varying dynamically the region within which to update new solution vectors. This offers the excellent advantage of being able to achieve efficient estimation of an optimal solution.

According to the ninth optimization adjusting method and optimization adjusting apparatus of the invention, the update region of each parameter to be adjusted is limited on the basis of its characteristics and the past adjustment results, and the interactive genetic algorithm is performed on the solution vectors within the limited region, omitting adjustment operations through regions where adjustments are presumably not necessary. The embodiment thus offers the excellent advantage of being able to quickly adjust the optimal solution vector.

According to the 10th optimization adjusting method and optimization adjusting apparatus of the invention, when using the interactive genetic algorithm, the initial set of solution vectors is constructed using the previously recorded information and the adjustment is performed by excluding solution vectors undesirable for the user. This offers the excellent advantage that convergence to an optimal solution vector can be quickly accomplished, while alleviating the user burden when performing the evaluation of each solution vector.

According to the 11th optimization adjusting method and optimization adjusting apparatus of the invention, the effect of variation in user evaluation is reduced by correcting user evaluation value on the basis of the user's psychological state estimated from the user's physiological information. This offers the excellent advantage that the adjustment of a solution vector optimum to the user's conditions (hearing, vision, etc.) free from the user's psychological state can be achieved using an interactive genetic algorithm.

According to the 12th optimization adjusting method and optimization adjusting apparatus of the invention, using an interactive genetic algorithm an evaluation model for user adjustment process is estimated based on the history of adjustments obtained when the user adjusts a solution vector optimum for him. This offers the excellent advantage that the user's preferences on the problem being solved can be obtained.

According to the 13th optimization adjusting method and optimization adjusting apparatus of the invention, using an interactive genetic algorithm a common model for user adjustment process is estimated based on the history of solution vector optimizations performed by a plurality of users. This offers the excellent advantage that common factors in the preferences of a plurality of users can be extracted.

According to the 14th optimization adjusting method and optimization adjusting apparatus of the invention, using an interactive genetic algorithm the adjustment of a solution vector optimum for the user is quickly performed, while at the same time, updating the common model representing a plurality of users' adjustment processes. This offers the excellent advantage that the user need not evaluate information presented by all the solution vectors, thus alleviating the user burden.

According to the 15th optimization adjusting method and optimization adjusting apparatus of the invention, an evaluation model representing the user adjustment process is estimated using an interactive genetic algorithm, and by using the thus obtained evaluation model, the optimal solution vector is automatically adjusted. This offers the excellent advantage of alleviating the user burden, which has been a problem in the implementation of an interactive genetic algorithm.

According to the 16th optimization adjusting method and optimization adjusting apparatus of the invention, for a problem dealing with a time sequential signal the adjustment of an optimal solution vector is performed using an interactive genetic algorithm into which an operation to present information for facilitating comparative evaluation of each solution vector and an operation to rearrange the order of presentation are incorporated. This offers an excellent advantage in that the interactive genetic algorithm, which has previously been applied only to static data such as images, can be applied to dynamic data such as time sequential data.

According to the 17th optimization adjusting method and optimization adjusting apparatus of the invention, for a problem dealing with a time sequential signal the adjustment of an optimal solution vector is performed using an interactive genetic algorithm into which an operation to present information for facilitating comparative evaluation of each solution vector and an operation to rearrange the order of presentation are incorporated, while limiting the update region of each solution vector to be adjusted on the basis of its characteristics and the history of past adjustments. This offers an advantage in that the adjustment of the optimal solution vector can be achieved quickly when the interactive genetic algorithm, which has previously been applied only to static data such as images, is applied to dynamic data such as time sequential data.

According to the 18th optimization adjusting method and optimization adjusting apparatus of the invention, for a problem dealing with a time sequential signal an initial solution vector set is constructed on the basis of previously recorded adjustment information, and the optimization of a solution vector is performed using an interactive genetic algorithm into which an operation to present information for facilitating comparative evaluation of each solution vector and an operation to rearrange the order of presentation are incorporated. This offers an advantage in that the adjustment of the optimal solution vector can be achieved quickly when the interactive genetic algorithm, which has previously been applied only to static data such as images, is applied to dynamic data such as time sequential data.

According to the 19th optimization adjusting method and optimization adjusting apparatus of the invention, for a problem dealing with a time sequential signal an optimal solution vector update is performed using an interactive genetic algorithm into which an operation to present information for facilitating comparative evaluation of each solution vector and a function to rearrange the order of presentation are incorporated, while correcting the user evaluation value based on the user's psychological state estimated from the user's physiological information, and thereby reducing the effect of variation in the user evaluation. This offers the advantage that the interactive genetic algorithm, which has previously been applied only to static data such as images, can be applied to dynamic data such as time sequential data, and also that the adjustment of an optimum solution vector that matches the user's own conditions can be performed without being affected by the environment.

According to the 20th optimization adjusting method and optimization adjusting apparatus of the invention, for a problem dealing with a time sequential signal an operation to present information for facilitating comparative evaluation of each solution vector and an operation to rearrange the order of presentation based on evaluation value are incorporated into an interactive genetic algorithm, and thereby an evaluation model for the user adjustment process is estimated from the history of user adjustments. This offers the advantage that the user's preferences can be obtained with respect to the problem dealing with a time sequential signal.

According to the 21st optimization adjusting method and optimization adjusting apparatus of the invention, for a problem dealing with a time sequential signal an operation to present information for facilitating comparative evaluation of each solution vector and an operation to rearrange the order of presentation based on evaluation value are incorporated into an interactive genetic algorithm, and thereby a common model for a plurality of users' adjustment processes is estimated from a recorded history of the adjustments made by a plurality of users. This offers the advantage that common factors in the preferences of a plurality of users when handling time sequential signals can be extracted.

According to the 22nd optimization adjusting method and optimization adjusting apparatus of the invention, for a problem dealing with a time sequential signal a operation to present information for facilitating comparative evaluation of each solution vector and a operation to rearrange the order of presentation based on evaluation value are incorporated into an interactive genetic algorithm, and using this genetic algorithm, the adjustment of a solution vector optimum for the user is quickly accomplished, while, at the same time, updating a common model representing a plurality of users' adjustment processes. This offers the advantage that the user need not evaluate information presented by all the solution vectors, which alleviates the user burden.

According to the 23rd optimization adjusting method and optimization adjusting apparatus of the invention, for a problem dealing with a time sequential signal a function to present information for facilitating comparative evaluation of each solution vector and a function to rearrange the order of presentation based on evaluation value are incorporated into an interactive genetic algorithm; using this genetic algorithm, an evaluation model for user adjustment process is estimated, and using a personal model obtained the adjustment of an optimal solution vector is automatically performed. This offers the advantage of alleviating the user burden, which has been a problem in the implementation of an interactive genetic algorithm, and making it possible to apply the interactive genetic algorithm to time sequential signals.

What is claimed is:

1. An optimization adjusting method for estimating an optimal solution, using a processing means, by successively updating solution vectors, arbitrarily set for a problem, in accordance with fitness thereof, comprising:

a first step of selecting previously stored optimal solution vectors when setting an initial solution vector set;

a second step of setting an initial set of solution vectors to be adjusted, by using the solution vectors selected in the first step;

a third step of presenting information expressed by each solution vector to a user;

a fourth step of making the user evaluate each solution vector on the basis of his own criterion;

a fifth step of obtaining the fitness of each solution vector from the user's evaluation value;

a sixth step of performing an arithmetical recombination operation based on genetic recombination, on the solution vectors in the solution vector set in accordance with the fitness of each solution vector, and thereby constructing a new solution vector set; and a seventh step of outputting an optimal solution vector after storing the same on a recording medium, wherein the third through sixth steps are iteratively performed until a predetermined termination condition is satisfied, and in the seventh step, the resulting optimal solution vector is stored, so that a group of optimal solution vectors obtained in previous adjustments is used as an adjustment starting point when the user next performs an adjustment process, thereby enabling quick estimation of a solution vector optimum for the user.

2. An optimization adjusting method for estimating an optimal solution, using a processing means, by successively updating solution vectors, arbitrarily set for a problem, in accordance with fitness thereof, comprising:

a first step of setting an initial set of solution vectors;

a second step of presenting information expressed by each solution vector to a user;

a third step of making the user evaluate each solution vector on the basis of his own criterion;

a fourth step of measuring physiological data when the user is making the evaluation;

a fifth step of estimating the user's psychological state from the physiological data thus measured;

a sixth step of correcting the evaluation value obtained in the third step on the basis of the thus estimated psychological state;

a seventh step of obtaining the fitness of each solution vector from the corrected evaluation value;

an eighth step of performing an arithmetical recombination operation on the solution vectors in the solution vector set in accordance with the fitness of each solution vector, and thereby constructing a new solution vector set; and a ninth step of outputting an optimal solution vector, wherein by iteratively performing the second through eighth steps until a predetermined termination condition is satisfied, a solution vector optimum for the user is quickly estimated, while reducing the effect of the user's psychological state.

3. An optimization adjusting method for estimating an optimal solution, using a processing means, by successively updating solution vectors, arbitrarily set for a problem, in accordance with fitness thereof, the method being specifically concerned with an evaluation model for a user's adjustment process, comprising:

a first step of setting an initial set of solution vectors;

a second step of presenting information expressed by each solution vector to a user;

a third step of making the user evaluate each solution vector on the basis of his own criterion;

a fourth step of recording the user's evaluation and its corresponding solution vector as a history;

a fifth step of judging whether the history of the user's adjustments satisfies a predetermined evaluation model estimation condition;

a sixth step of obtaining the fitness of each solution vector from the user's evaluation value when it is judged in the fifth step that the history does not satisfy the predetermined condition;

a seventh step of performing an arithmetical recombination operation on the solution vectors in the solution vector set in accordance with the fitness of each solution vector, and thereby constructing a new solution vector set; and an eighth step of estimating an evaluation model for the current user's adjustment process from the history of the user's adjustments when it is judged in the fifth step that the history satisfies the predetermined condition, wherein in the eighth step the evaluation model for the user's adjustment process is estimated from the history of adjustments obtained by iteratively performing the second through seventh steps until the predetermined condition is satisfied.

4. An optimization adjusting method for estimating an optimal solution, using a processing means, by successively updating solution vectors, arbitrarily set for a problem, in accordance with fitness thereof, the method being specifically concerned with a common model representing a plurality of user's adjustment processes, comprising:

a first step of setting an initial set of solution vectors to be adjusted;

a second step of presenting information expressed by each solution vector to a user;

a third step of making the user evaluate each solution vector on the basis of his own criterion;

a fourth step of recording the user's evaluation and its corresponding solution vector as a history;

a fifth step of obtaining the fitness of each solution vector from the user's evaluation value;

a sixth step of performing an arithmetical recombination operation on the solution vectors in the solution vector set in accordance with the fitness of each solution vector, and thereby constructing a new solution vector set;

a seventh step of, when a predetermined user evaluation termination condition is satisfied, judging whether the number of users recorded satisfies a predetermined common model estimation condition; and an eighth step of, when it is judged in the seventh step that the number of users satisfies the predetermined condition, estimating a common model for an adjustment process from the recorded history of the adjustments made by a plurality of users, wherein the common model representing the adjustment processes by the plurality of users is estimated from the history of adjustments obtained by iteratively performing the second through seventh steps until the predetermined condition is satisfied.

5. An optimization adjusting method for estimating an optimal solution, using a processing means, by successively updating solution vectors, arbitrarily set for a problem, in accordance with fitness thereof, comprising:

a first step of setting an initial set of solution vectors to be adjusted;

a second step of evaluation each solution vector by using a previously extracted common model representing a plurality of users' adjustment processes;

a third step of presenting information expressed by each solution vector to a user;

a fourth step of making the user judge whether the evaluation made in the second step using the common model is appropriate or not;

a fifth step of, when it is judged in the fourth step that the evaluation is not appropriate, making the user evaluate each solution vector on the basis of his own criterion;

a sixth step of, when the evaluation is made by the user in the fifth step, recording the solution vector and the user's evaluation thereof as a history;

a seventh step of judging whether the recorded history of solution vector set updates satisfies a common model update condition;

an eighth step of, when it is decided in the seventh step that the common model be updated, updating the common model representing the plurality of users' adjustment processes by using the recorded history of data;

a ninth step of obtaining the fitness of each solution vector from the user's subjective evaluation value or from the evaluation value obtained from the adjustment process common model;

a 10th step of performing an arithmetical recombination operation on the solution vectors in the solution vector set in accordance with the fitness of each solution vector, and thereby constructing a new solution vector set; and an 11th step of outputting an optimal solution vector, wherein by iteratively performing the second through 10th steps until a predetermined termination condition is satisfied, the common model representing the plurality of users' adjustment processes is constantly updated, while, at the same time, estimating a solution vector optimum for the user.

6. An optimization adjusting method for estimating an optimal solution, using a processing means, by successively updating solution vectors, arbitrarily set for a problem, in accordance with fitness thereof, comprising:

a first step of setting an initial set of solution vectors to be adjusted;

a second step of presenting information expressed by each solution vector to a user;

a third step of making the user evaluate each solution vector on the basis of his own criterion;

a fourth step of recording the user's evaluation and its corresponding solution vector as a history;

a fifth step of judging whether the history of the user's adjustments satisfies a predetermined evaluation model estimation condition;

a sixth step of estimating an evaluation model for the current user's adjustment process from the history of a series of user adjustments when it is judged in the fifth step that the history satisfies the predetermined condition;

a seventh step of obtaining the fitness of each solution vector from each evaluation value;

an eighth step of performing an arithmetical recombination operation on the solution vectors in the solution vector set in accordance with the fitness of each solution vector, and thereby constructing a new solution vector set;

a ninth step of, when the evaluation model for the user's adjustment process is estimated in the sixth step, estimating each solution vector by using the evaluation model instead of going through the third step; and a 10th step of outputting an optimal solution vector, wherein the evaluation model for the user's adjustment process is estimated from the history of adjustments obtained by iteratively performing the second through eighth steps until the evaluation model estimation condition is satisfied, and thereafter, the seventh through ninth steps are performed iteratively by using the evaluation model until a predetermined termination condition is satisfied.

7. An optimization adjusting apparatus comprising:

a subject data input section for inputting data which a target apparatus operates on;

an update region limiting section for limiting an update region that the solution vectors to be adjusted can take;

an initial set setting section for setting an initial set of solution vectors within the update limited region;

an information presenting section for presenting information expressed by each solution vector to a user;

a user evaluation judging section for making the user evaluate each solution vector on the basis of the information presented by the information presenting section;

a fitness deriving section for obtaining the fitness of each solution vector from the evaluation value obtained in the user evaluation judging section;

a recombination operation section for performing an arithmetical recombination operation on the solution vectors in the solution vector set in accordance with the fitness of each solution vector;

a set resetting section for constructing a new solution vector set by replacing, in the solution vector set generated by the recombination operation section, the solution vectors lying outside the limited range with arbitrary vectors that fall within the limited range;

an optimal solution vector output section for outputting an optimal solution vector when a predetermined termination condition is satisfied; and an apparatus adjustment executing section for adjusting the apparatus operating on the data input from the subject data input section, in accordance with the solution vector from the optimal solution vector output section.

8. An optimization adjusting apparatus according to claim 7, as applied to the creation and adjustment of a vision-correcting lens, wherein a set of lens parameters necessary for vision correction is treated as the solution vectors to be adjusted, the subject data input section handles a test image for presentation to the user, the information presenting section presents to the user the test image viewed through a corrective lens created by each solution vector, and the apparatus adjustment executing section adjusts a vision-correcting lens optimum for the user in accordance with the obtained optimum solution vector.

9. An optimization adjusting apparatus according to claim 7, as applied to the creation and adjustment of a character font for personal user, wherein a set of parameters describing a character font is treated as the solution vectors to be adjusted, the subject data input section handles basic character font data for presentation to the user, the information presenting section presents to the user a deformation of the basic character font as created by each solution vector, and the apparatus adjustment executing section makes adjustments to create a character font that best matches the user's preferences by using the obtained optimum solution vector.

10. An optimization adjusting apparatus comprising:

a subject data input section for inputting data which a target apparatus operates on;

a recording medium holding thereon a group of past optimal solution vectors;

a recorded information reading section for reading the group of past optimal solution vectors from the recording medium;

an initial solution vector selecting section for selecting initial solution vectors for the current adjustment from the solution vector group read by the recorded information reading section;

an initial solution vector replenishing section for setting an initial set of solution vectors by adding randomly generated initial solution vectors to the initial solution vectors selected by the initial solution vector selecting section;

an information presenting section for presenting information expressed by each solution vector to a user;

a user evaluation judging section for making the user evaluate each solution vector on the basis of the information presented by the information presenting section;

a fitness deriving section for obtaining the fitness of each solution vector from the evaluation value obtained in the user evaluation judging section;

a recombination operation section for performing an arithmetical recombination operation on the solution vectors in the solution vector set in accordance with the fitness of each solution vector, and thereby constructing a new solution vector set;

an optimal solution vector output section for outputting an optimal solution vector when a predetermined termination condition is satisfied;

an optimal solution vector recording section for recording the optimal solution vector on the recording medium; and an apparatus adjustment executing section for adjusting the apparatus operating on the data input from the subject data input section, in accordance with the solution vector from the optimal solution vector output section.

11. An optimization adjusting apparatus comprising:

a subject data input section for inputting data which a target apparatus operates on;

an initial set setting section for setting an initial set of solution vectors to be adjusted;

an information presenting section for presenting information expressed by each solution vector to a user;

a user evaluation judging section for making the user evaluate each solution vector on the basis of the information presented by the information presenting section;

a physiological data measuring section for measuring physiological data when the user is making the evaluation in the user evaluation judging section;

a psychological state estimating section for estimating the user's psychological state from the physiological data thus measured;

an evaluation value correcting section for correcting an evaluation value on the basis of the user's psychological state estimated by the psychological state estimating section;

a fitness deriving section for obtaining the fitness of each solution vector from the evaluation value corrected by the evaluation value correcting section;

a recombination operation section for performing an arithmetical recombination operation on the solution vectors in the solution vector set in accordance with the fitness of each solution vector, and thereby constructing a new solution vector set;

an optimal solution vector output section for outputting an optimal solution vector when a predetermined termination condition is satisfied; and an apparatus adjustment executing section for adjusting the apparatus operating on the data input from the subject data input section, in accordance with the solution vector from the optimal solution vector output section.

12. An optimization adjusting apparatus for an evaluation model for a user's adjustment process, comprising:

a subject data input section for inputting data which a target apparatus operates on;

an initial set setting section for setting an initial set of solution vectors to be adjusted;

an information presenting section for presenting information expressed by each solution vector to a user;

a user evaluation judging section for making the user evaluate each solution vector on the basis of the information presented by the information presenting section;

an adjustment history recording section for recording an evaluation value obtained by the user evaluation judging section and its corresponding solution vector;

a fitness deriving section for obtaining the fitness of each solution vector from the user's evaluation value;

a recombination operation section for performing an arithmetical recombination operation on the solution vectors in the solution vector set in accordance with the fitness of each solution vector, and thereby constructing a new solution vector set;

an evaluation model estimation judging section for judging whether the history of the user's adjustments recorded in the adjustment history recording section satisfies a predetermined evaluation model estimation condition;

a model estimation executing section for, when it is judged that the evaluation model estimation condition is satisfied, estimating an evaluation model for the current user's adjustment process from the history of the user's adjustments; and an evaluation model output section for outputting information representing the user evaluation model estimated by the model estimation executing section.

13. An optimization adjusting apparatus for an evaluation model for a user's adjustment process according to claim 12, wherein the model estimation executing section is constructed from a neural network.

14. An optimization adjusting apparatus for a common model representing a plurality of user's adjustment processes, comprising:

a subject data input section for inputting data which a target apparatus operates on;

an initial set setting section for setting an initial set of solution vectors to be adjusted;

an information presenting section for presenting information expressed by each solution vector to a user;

a user evaluation judging section for making the user evaluate each solution vector on the basis of the information presented by the information presenting section;

an adjustment history recording section for recording an evaluation value obtained by the user evaluation judging section and its corresponding solution vector;

a fitness deriving section for obtaining the fitness of each solution vector from the user's evaluation value;

a recombination operation section for performing an arithmetical recombination operation on the solution vectors in the solution vector set in accordance with the fitness of each solution vector, and thereby constructing a new solution vector set;

a user adjustment termination judging section for judging whether a predetermined user adjustment termination condition is satisfied;

a common model estimation judging section for, when the user adjustment termination condition is satisfied, judging whether the recorded history of a plurality of users' adjustments satisfies a predetermined common model estimation condition;

a common model estimation executing section for, when it is judged that the common model estimation condition is satisfied, estimating a common model for an adjustment process from the history of the adjustments made by a plurality of users recorded in the adjustment history recording section; and a common model output section for outputting information representing the common model for the adjustment process estimated by the common model estimation executing section.

15. An optimization adjusting apparatus for a common model relating to a plurality of users' adjustment processes according to claim 14, wherein the common model estimation executing section is constructed from a neural network.

16. An optimization adjusting apparatus comprising:

a subject data input section for inputting data which a target apparatus operates on;

an initial set setting section for setting an initial set of solution vectors to be adjusted;

a common model evaluation calculating section for evaluating each solution vector by using a common model representing a plurality of users' adjustment processes;

an information presenting section for presenting information expressed by each solution vector to a user;

a common model evaluation judging section for making the user judge whether the evaluation value calculated by the common model evaluation calculating section is appropriate or not;

a user evaluation judging section for making the user evaluate each solution vector when it is judged in the common model evaluation judging section that the evaluation value is not appropriate;

an adjustment history recording section for recording the evaluation value obtained by the user evaluation judging section and its corresponding solution vector;

a fitness deriving section for obtaining the fitness of each solution vector from the user's evaluation value or from the evaluation value obtained from the adjustment process common model;

a recombination operation section for performing an arithmetical recombination operation on the solution vectors in the solution vector set in accordance with the fitness of each solution vector, and thereby constructing a new solution vector set;

a common model update judging section for judging whether the history of the user's adjustments recorded in the adjustment history recording section satisfies a predetermined common model update condition;

a common model update executing section for, when the common model update condition is satisfied, updating the common model by using the recorded history of the user's adjustments;

an optimal solution vector output section for outputting an optimal solution vector when a predetermined termination condition is satisfied; and an apparatus adjustment executing section for adjusting the apparatus operating on the data input from the subject data input section, in accordance with the solution vector from the optimal solution vector output section.

17. An optimization adjusting apparatus comprising:

a subject data input section for inputting data which a target apparatus operates on;

an initial set setting section for setting an initial set of solution vectors to be adjusted;

a method selection switch for making selection as to whether evaluation should be performed by a user or by using an evaluation model;

an information presenting section for presenting information expressed by each solution vector to the user when evaluation by the user is selected by the method selection switch;

a user evaluation judging section for making the user evaluate each solution vector;

an adjustment history recording section for recording the evaluation value obtained by the user evaluation judging section and its corresponding solution vector;

a method selection judging section for judging whether the history of the user's adjustments recorded in the adjustment history recording section satisfies a predetermined evaluation model estimation condition, and for, when the evaluation model estimation condition is satisfied, directing the method selection switch to switch selection;

a model estimation executing section of the evaluation for, when the switching of selection is directed by the method selection judging section, estimating an evaluation model for the current user's adjustment process from the history of a series of adjustments;

a model evaluation calculating section for, when evaluation by an evaluation model is selected by the method selection switch, evaluating each solution vector by using the evaluation model;

a fitness deriving section for obtaining the fitness of each solution vector from the user's subjective evaluation or from the evaluation by the evaluation model;

a recombination operation section for performing an arithmetical recombination operation on the solution vectors in the solution vector set in accordance with the fitness of each solution vector, and thereby constructing a new solution vector set;

an optimal solution vector output section for outputting an optimal solution vector when a predetermined termination condition is satisfied; and an apparatus adjustment executing section for adjusting the apparatus operating on the data input from the subject data input section, in accordance with the solution vector from the optimal solution vector output section.

18. An optimization adjusting apparatus for a common model representing a plurality of user's adjustment processes in a problem dealing with time sequential information, comprising:

a subject data input section for inputting time sequential information which a target apparatus operates on;

an initial set setting section for setting an initial set of solution vectors to be adjusted;

an information presenting section for presenting information expressed by each solution vector to a user;

an auxiliary information presenting section for creating and presenting information that assists the user's memory when the user compares and evaluates the time sequential information;

a user evaluation judging section for making the user evaluate each solution vector on the basis of the information presented by the information presenting section;

a presentation order altering section for altering the order of presenting information expressed by each solution vector in accordance with an evaluation value obtained in the user evaluation judging section;

an adjustment history recording section for recording the evaluation value and its corresponding solution vector;

a fitness deriving section for obtaining the fitness of each solution vector from the user's evaluation value;

a recombination operation section for performing an arithmetical recombination operation on the solution vectors in the solution vector set in accordance with the fitness of each solution vector, and thereby constructing a new solution vector set;

a user evaluation termination judging section for judging whether a predetermined user evaluation termination condition is satisfied;

a common model estimation judging section for, when the user evaluation termination condition is satisfied, judging whether the recorded history of a plurality of users' adjustments satisfies a predetermined common model estimation condition;

a common model estimation executing section for, when it is judged that the common model estimation condition is satisfied, estimating a common model for an adjustment process from the history of the adjustments made by a plurality of users recorded in the adjustment history recording section; and a common model output section for outputting information representing the common model for the adjustment process estimated by the common model estimation executing section.

19. An optimization adjusting apparatus for a problem dealing with time sequential information, comprising:

a subject data input section for inputting time sequential information which a target apparatus operates on;

an initial set setting section for setting an initial set of solution vectors to be adjusted;

a common model evaluation calculating section for evaluating each solution vector by using a common model representing a plurality of users' adjustment processes;

an information presenting section for presenting information expressed by each solution vector to a user;

an auxiliary information presenting section for creating and presenting information that assists the user's memory when the user compares and evaluate the time sequential information;

a common model evaluation judging section for making the user judge whether the evaluation value calculated by the common model evaluation calculating section is appropriate or not;

a user evaluation judging section for making the user evaluate each solution vector when it is judged in the common model evaluation judging section that the evaluation value is not appropriate;

a presentation order altering section for altering the order of presenting information expressed by each solution vector in accordance with an evaluation value obtained in the user evaluation judging section;

an adjustment history recording section for recording the evaluation value and its corresponding solution vector;

a fitness deriving section for obtaining the fitness of each solution vector from the user's evaluation value or from the evaluation value obtained from the adjustment process common model;

a recombination operation section for performing an arithmetical recombination operation on the solution vectors in the solution vector set in accordance with the fitness of each solution vector, and thereby constructing a new solution vector set;

a common model update judging section for judging whether the history of the user's adjustments recorded in the adjustment history recording section satisfies a predetermined common model update condition;

a common model update executing section for, when the common model update condition is satisfied, updating the common model by using the recorded history of the user's adjustments;

an optimal solution vector output section for outputting an optimal solution vector when a predetermined termination condition is satisfied; and an apparatus adjustment executing section for adjusting the apparatus operating on the data input from the subject data input section, in accordance with the solution vector from the optimal solution vector output section.

20. An optimization adjusting apparatus for a problem dealing with time sequential information, comprising:

a subject data input section for inputting time sequential information which a target apparatus operates on;

an initial set setting section for setting an initial set of solution vectors to be adjusted;

a method selection switch for making selection as to whether evaluation should be performed by a user or by using an evaluation model;

an information presenting section for presenting information expressed by each solution vector to the user when evaluation by the user is selected by the method selection switch;

an auxiliary information presenting section for creating and presenting information that assists the user's memory when the user compares and evaluates the time sequential information;

a user evaluation judging section for making the user evaluate each solution vector;

a presentation order altering section for altering the order of presenting information expressed by each solution vector in accordance with an evaluation value obtained in the user evaluation judging section;

an adjustment history recording section for recording the evaluation value and its corresponding solution vector;

a method selection judging section for judging whether the history of the user's adjustments recorded in the adjustment history recording section satisfies a predetermined evaluation model estimation condition, and for, when the evaluation model estimation condition is satisfied, directing the method selection switch to switch selection;

a model estimation executing section of the evaluation for, when the switching of selection is directed by the method selection judging section, estimating an evaluation model for the current user's adjustment process from the history of a series of adjustments;

a model evaluation calculating section for, when evaluation by an evaluation model is selected by the method selection switch, evaluating each solution vector by using the evaluation model;

a fitness deriving section for obtaining the fitness of each solution vector from the user's subjective evaluation or from the evaluation by the evaluation model;

a recombination operation section for performing an arithmetical recombination operation on the solution vectors in the solution vector set in accordance with the fitness of each solution vector, and thereby constructing a new solution vector set;

an optimal solution vector output section for outputting an optimal solution vector when a predetermined termination condition is satisfied; and an apparatus adjustment executing section for adjusting the apparatus operating on the data input from the subject data input section, in accordance with the solution vector from the optimal solution vector output section.

21. An optimization adjusting apparatus according to claim 20, wherein the user evaluation judging section obtains graduated evaluation based on relative evaluation within the solution vector set presented to the user.

* * * * *

UNITED STATES PATENT AND TRADE MARK OFFICE
CERTIFICATE OF CORRECTION

PATENT NO. : 6,004,015
DATED : December 21, 1999
INVENTOR(S) : Watanabe et al.

It is certified that error appears in the above-identified patent and that said Letters Patent is hereby corrected as shown below:

Column 74, line 15, "evaluation" should be --evaluating--.

Signed and Sealed this

Twenty-seventh Day of March, 2001

Attest:

NICHOLAS P. GODICI

*Attesting Officer*   *Acting Director of the United States Patent and Trademark Office*